US011984961B2

(12) United States Patent
Zhu et al.

(10) Patent No.: US 11,984,961 B2
(45) Date of Patent: May 14, 2024

(54) METHOD AND APPARATUS OF BEAM SELECTION AT TERMINAL

(71) Applicant: Samsung Electronics Co., Ltd., Suwon-si (KR)

(72) Inventors: Dalin Zhu, Richardson, TX (US); Boon Loong Ng, Plano, TX (US); Jianhua Mo, Allen, TX (US); Anum Ali, Plano, TX (US); Daehee Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 16/998,880

(22) Filed: Aug. 20, 2020

(65) Prior Publication Data

US 2021/0058131 A1    Feb. 25, 2021

Related U.S. Application Data

(60) Provisional application No. 62/962,488, filed on Jan. 17, 2020, provisional application No. 62/936,016, (Continued)

(51) Int. Cl.
*H04B 7/06* (2006.01)
*H04B 7/0408* (2017.01)
(Continued)

(52) U.S. Cl.
CPC ......... *H04B 7/0695* (2013.01); *H04B 7/0408* (2013.01); *H04B 7/0478* (2013.01); (Continued)

(58) Field of Classification Search
CPC ..... H04W 16/28; H04B 7/0617; H04B 7/088; H04B 7/0478; H04B 7/0695
See application file for complete search history.

(56) References Cited

U.S. PATENT DOCUMENTS 8,897,254 B2  11/2014  Koivisto et al.
10,341,005 B2 *  7/2019  Furuskog ............. H04B 7/0695
(Continued)

FOREIGN PATENT DOCUMENTS

CN    1163461886 A  *  6/2023
KR    20180060883 A  *  6/2018
(Continued)

OTHER PUBLICATIONS

"3rd Generation Partnership Project; Technical Specification Group Radio Access Network; NR; Physical channels and modulation (Release 16)", 3GPP TS 38.211 v16.0.0, Dec. 2019, 139 pages.
(Continued)

*Primary Examiner* — Jeffrey M Rutkowski
*Assistant Examiner* — Christopher Nguyen

(57) ABSTRACT

Methods and apparatuses for selecting beams. A method includes determining, based on a channel condition, whether to use an adaptive selection method or a cycling selection method to select a subset of a plurality of beams for a beam measurement; based on the channel condition being a first channel condition, using the adaptive selection method to select the subset of beams; and based on the channel condition being a second channel condition, using the cycling selection method to select the subset of beams. The method further includes performing the beam measurement on the selected subset of beams, generating beam measurement information based on the beam measurement on the selected subset of beams, and determining one or more of the plurality of beams to use for a wireless communication based on the beam measurement information.

20 Claims, 84 Drawing Sheets

Related U.S. Application Data filed on Nov. 15, 2019, provisional application No. 62/889,868, filed on Aug. 21, 2019.

(51) Int. Cl.
  *H04B 7/0456* (2017.01)
  *H04B 7/08* (2006.01)
  *H04W 16/28* (2009.01)

(52) U.S. Cl.
  CPC .......... *H04B 7/0617* (2013.01); *H04B 7/088* (2013.01); *H04W 16/28* (2013.01)

(56) References Cited

U.S. PATENT DOCUMENTS

| | | | |
|---|---|---|---|
| 10,992,331 B2 * | 4/2021 | Jassal | G06N 3/045 |
| 2011/0110453 A1 | 5/2011 | Prasad et al. | |
| 2014/0376466 A1 | 12/2014 | Jeong et al. | |
| 2016/0006122 A1 | 1/2016 | Seol et al. | |
| 2017/0223689 A1 | 8/2017 | Son et al. | |
| 2018/0159600 A1 * | 6/2018 | Kim | H04B 7/088 |
| 2019/0081688 A1 | 3/2019 | Deenoo et al. | |
| 2019/0124585 A1 * | 4/2019 | Katabi | H04B 17/30 |
| 2019/0349045 A1 * | 11/2019 | Varatharaajan | H04B 7/0469 |
| 2019/0356378 A1 * | 11/2019 | Takeda | H01Q 25/00 |
| 2020/0067674 A1 * | 2/2020 | Guan | H04L 5/00 |
| 2020/0077285 A1 * | 3/2020 | Yu | H04W 72/12 |
| 2020/0145079 A1 * | 5/2020 | Marinier | H04B 7/0408 |
| 2020/0195333 A1 * | 6/2020 | Li | H04W 72/04 |
| 2021/0126697 A1 * | 4/2021 | Kumar | H04W 16/28 |

FOREIGN PATENT DOCUMENTS

| | | | |
|---|---|---|---|
| WO | 2018085601 A1 | 5/2018 | |
| WO | 2019064270 A1 | 4/2019 | |
| WO | WO-2019118596 A1 * | 6/2019 | ........... H04B 7/0408 |

OTHER PUBLICATIONS

"3rd Generation Partnership Project; Technical Specification Group Radio Access Network; NR; Multiplexing and channel coding (Release 16)", 3GPP TS 38.212 v16.0.0, Dec. 2019, 152 pages.

"3rd Generation Partnership Project; Technical Specification Group Radio Access Network; NR; Physical layer procedures for control (Release 16)", 3GPP TS 38.213 v16.0.0, Dec. 2019, 155 pages.

"3rd Generation Partnership Project; Technical Specification Group Radio Access Network; NR; Physical layer procedures for data (Release 16)", 3GPP TS 38.214 v16.0.0, Dec. 2019, 154 pages.

"3rd Generation Partnership Project; Technical Specification Group Radio Access Network; NR; Medium Access Control (MAC) protocol specification (Release 16)", 3GPP TS 38.321 v16.0.0, Mar. 2020, 141 pages.

"3rd Generation Partnership Project; Technical Specification Group Radio Access Network; NR; Radio Resource Control (RRC) protocol specification (Release 16)", 3GPP TS 38.331 v16.0.0, Mar. 2020, 835 pages.

International Search Report of the International Searching Authority dated Nov. 27, 2020 in connection with International Application No. PCT/KR2020/011185, 4 pages.

Extended European Search Report dated Aug. 2, 2022 regarding Application No. 20855311.5, 13 pages.

Zte et al., "Group based beam management for NR-MIMO", 3GPP TSG RAN WG1 Meeting #88, R1-1701798, Feb. 2017, 9 pages.

Huawei et al., "Beam measurement and reporting", 3GPP TSG RAN WG1 Meeting NR#3, R1-1715467, Sep. 2017, 9 pages.

* cited by examiner

METHOD AND APPARATUS OF BEAM SELECTION AT TERMINAL

CROSS-REFERENCE TO RELATED APPLICATIONS AND CLAIM OF PRIORITY

The present application claims priority to U.S. Provisional Patent Application Ser. No. 62/889,868, filed on Aug. 21, 2019; U.S. Provisional Patent Application Ser. No. 62/936,016, filed on Nov. 15, 2019; and U.S. Provisional Patent Application Ser. No. 62/962,488, filed on Jan. 17, 2020. The content of the above-identified patent document is incorporated herein by reference.

TECHNICAL FIELD

The present disclosure relates generally to wireless communication systems and, more specifically, the present disclosure relates to a beam selection operation at a terminal or user equipment (UE).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure is related to a beam selection operation at a terminal.

In one embodiment, a UE for selecting beams in a wireless communication system is provided. The UE includes a transceiver and a processor operably connected to the transceiver. The processor is configured to determine, based on a channel condition, whether to use an adaptive selection method or a cycling selection method to select a subset of a plurality of beams for a beam measurement; based on the channel condition being a first channel condition, use the adaptive selection method to select the subset of beams from the plurality of beams for the beam measurement; and based on the channel condition being a second channel condition, use the cycling selection method to select the subset of beams from the plurality of beams for the beam measurement. The processor is further configured to perform the beam measurement on the selected subset of beams, generate beam measurement information based on the beam measurement on the selected subset of beams, and determine one or more of the plurality of beams to use for a wireless communication based on the beam measurement information.

In another embodiment, a method for selecting beams by a UE in a wireless communication system is provided. The method includes determining, by the UE based on a channel condition, whether to use an adaptive selection method or a cycling selection method to select a subset of a plurality of beams for a beam measurement; based on the channel condition being a first channel condition, using the adaptive selection method to select the subset of beams from the plurality of beams for the beam measurement; and based on the channel condition being a second channel condition, using the cycling selection method to select the subset of beams from the plurality of beams for the beam measurement. The method further includes performing the beam measurement on the selected subset of beams, generating beam measurement information based on the beam measurement on the selected subset of beams, and determining one or more of the plurality of beams to use for a wireless communication based on the beam measurement information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
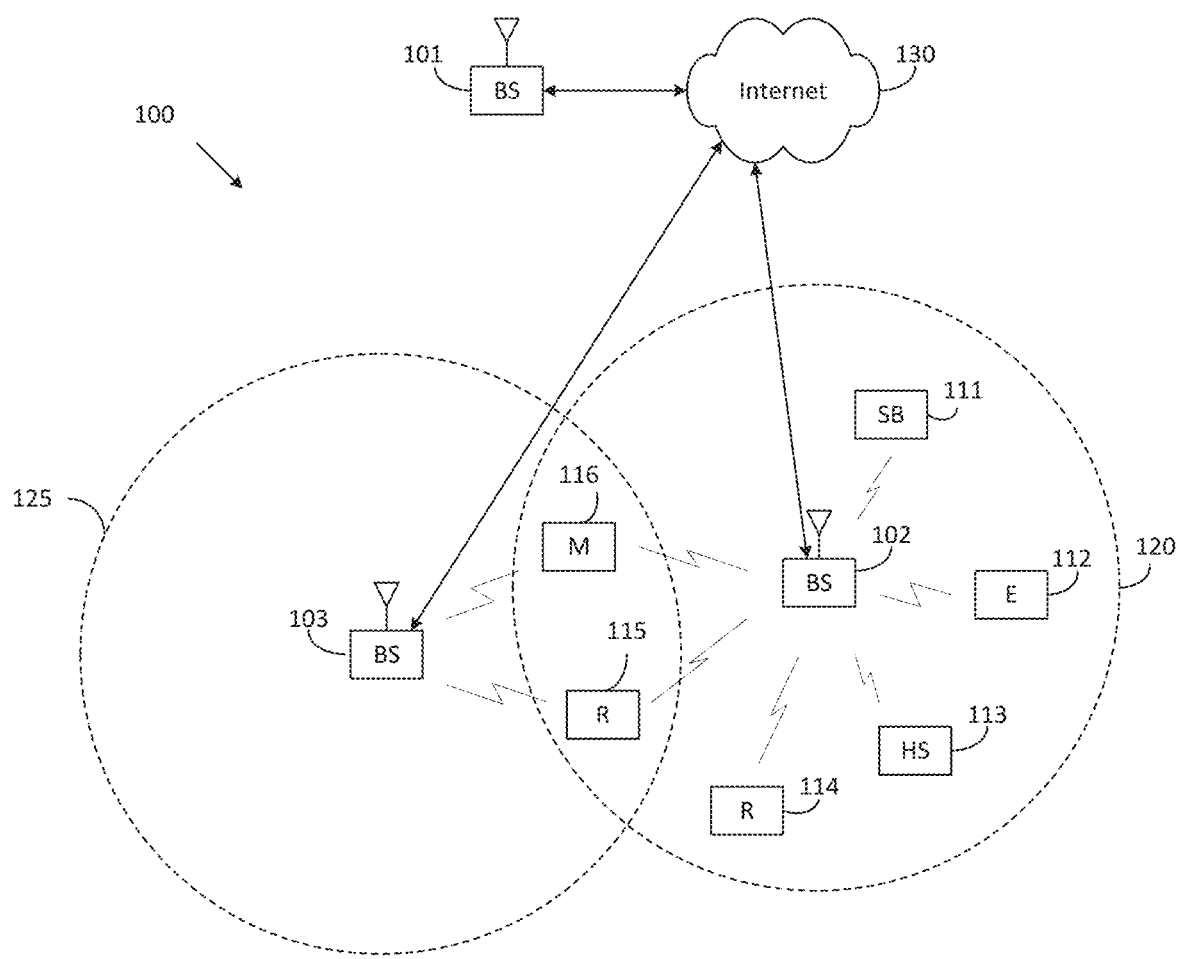
FIG. 1 illustrates an example wireless network according to embodiments of the present disclosure.
Figure 86:
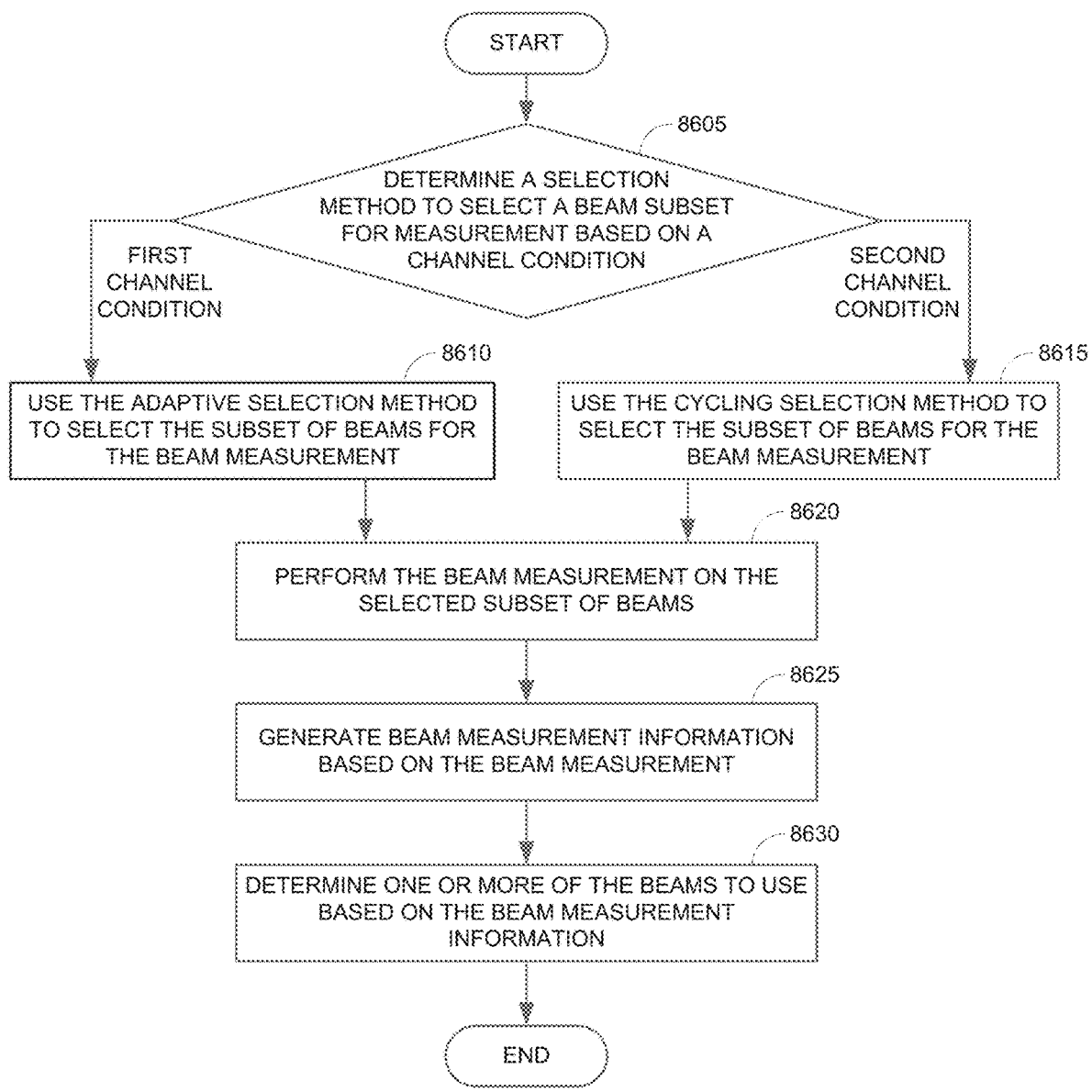
FIG. 86 illustrates a flow chart of a method for UE beam selection according to embodiments of the present disclosure.

FIG. 1 through FIG. 86, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 2:
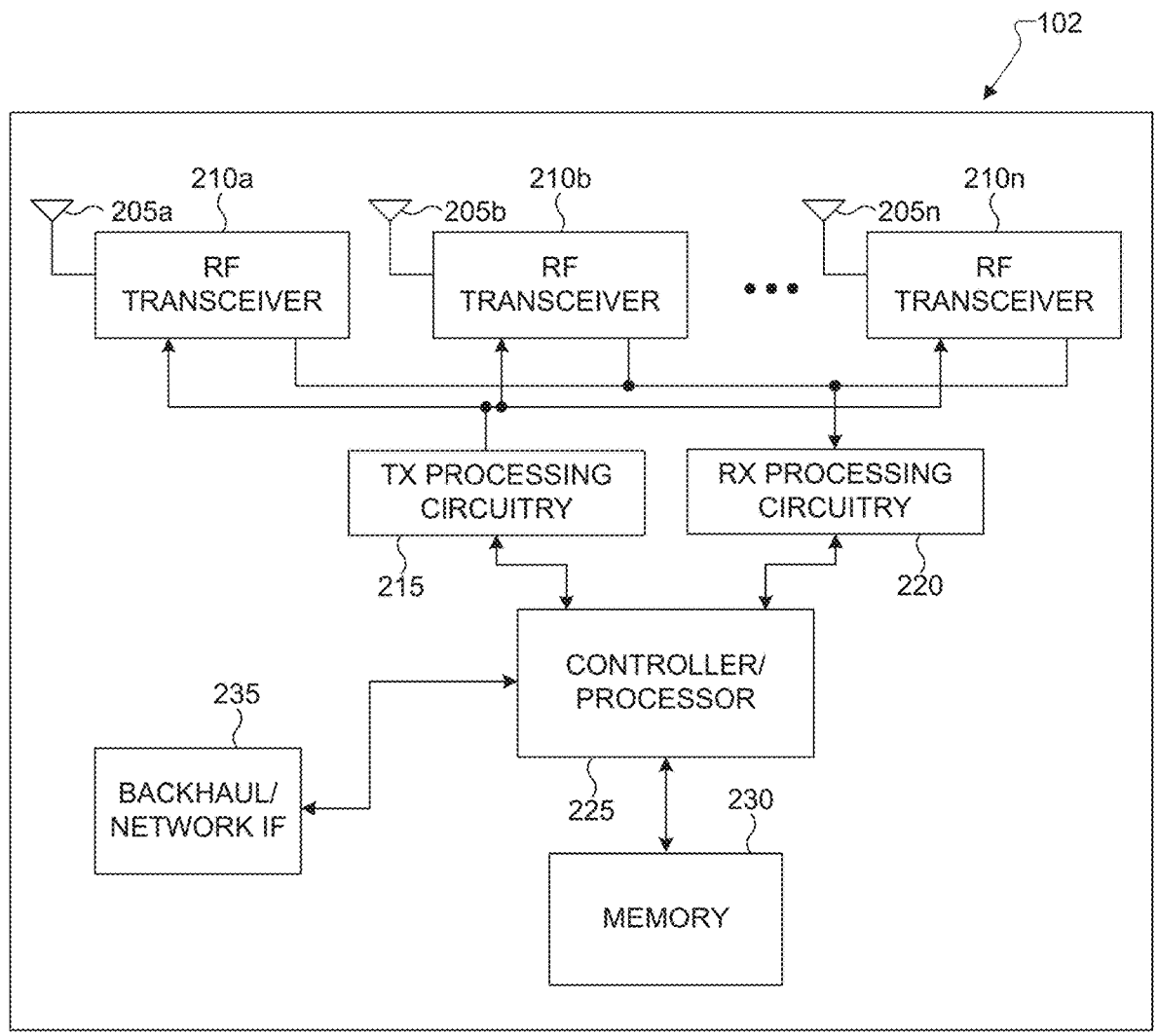
FIG. 2 illustrates an example gNB according to embodiments of the present disclosure.
Figure 3:
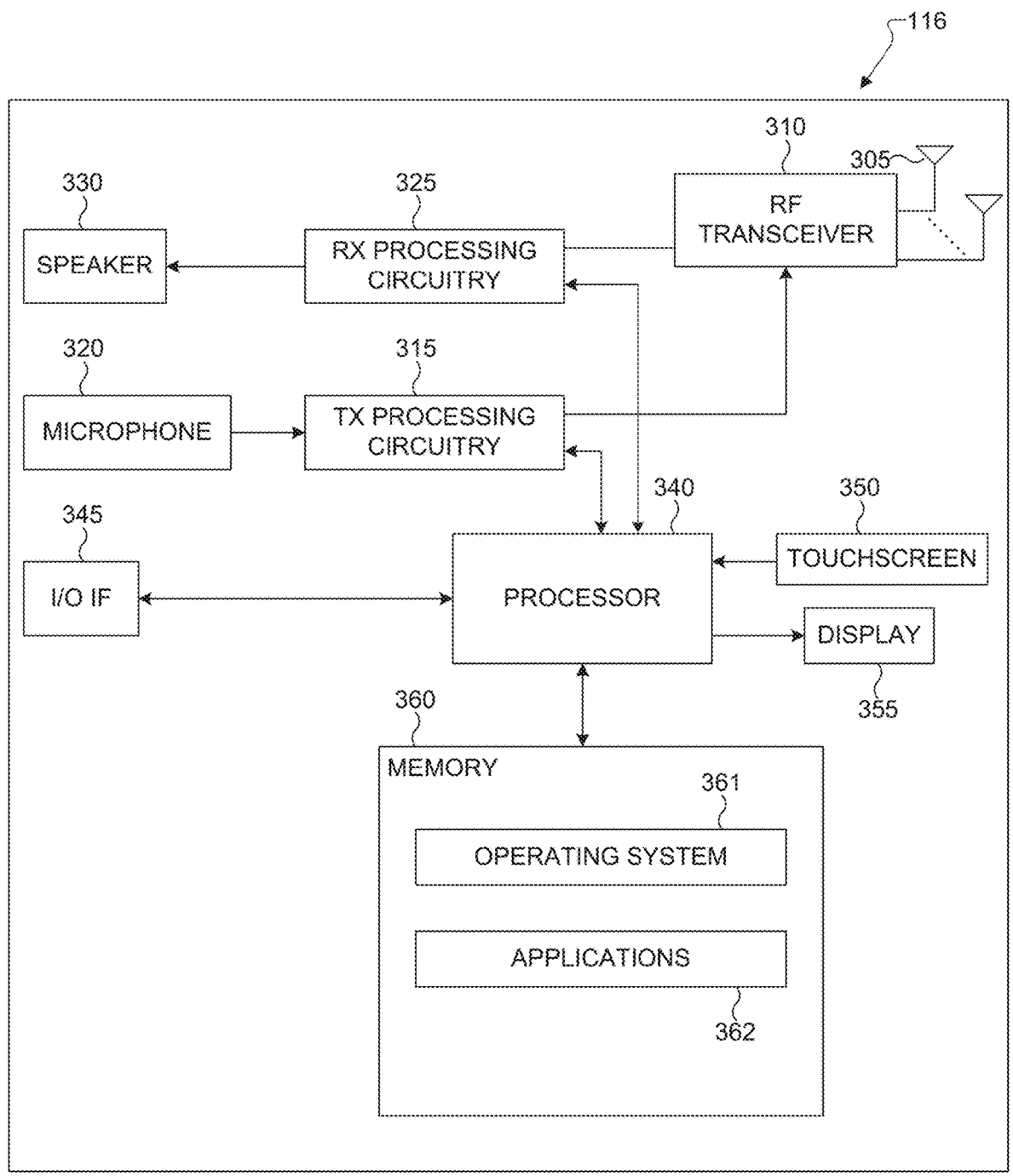
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient beam selection. In certain embodiments, and one or more of the gNBs 101-103 includes circuitry, programing, or a combination thereof, for efficient beam selection.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to millimeter wave (mmWave) wireless communication systems. A communication system includes a downlink (DL) that conveys signals from transmission points such as Base Stations (BSs) or eNodeBs to user equipments (UEs) and an uplink (UL) that conveys signals from UEs to reception points such as eNodeBs. A UE, also commonly referred to as a terminal or a mobile station, may be fixed or mobile and may be a cellular phone, a personal computer device, etc. An eNodeB, which is generally a fixed station, may also be referred to as an access point or other equivalent terminology.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Figure 4:
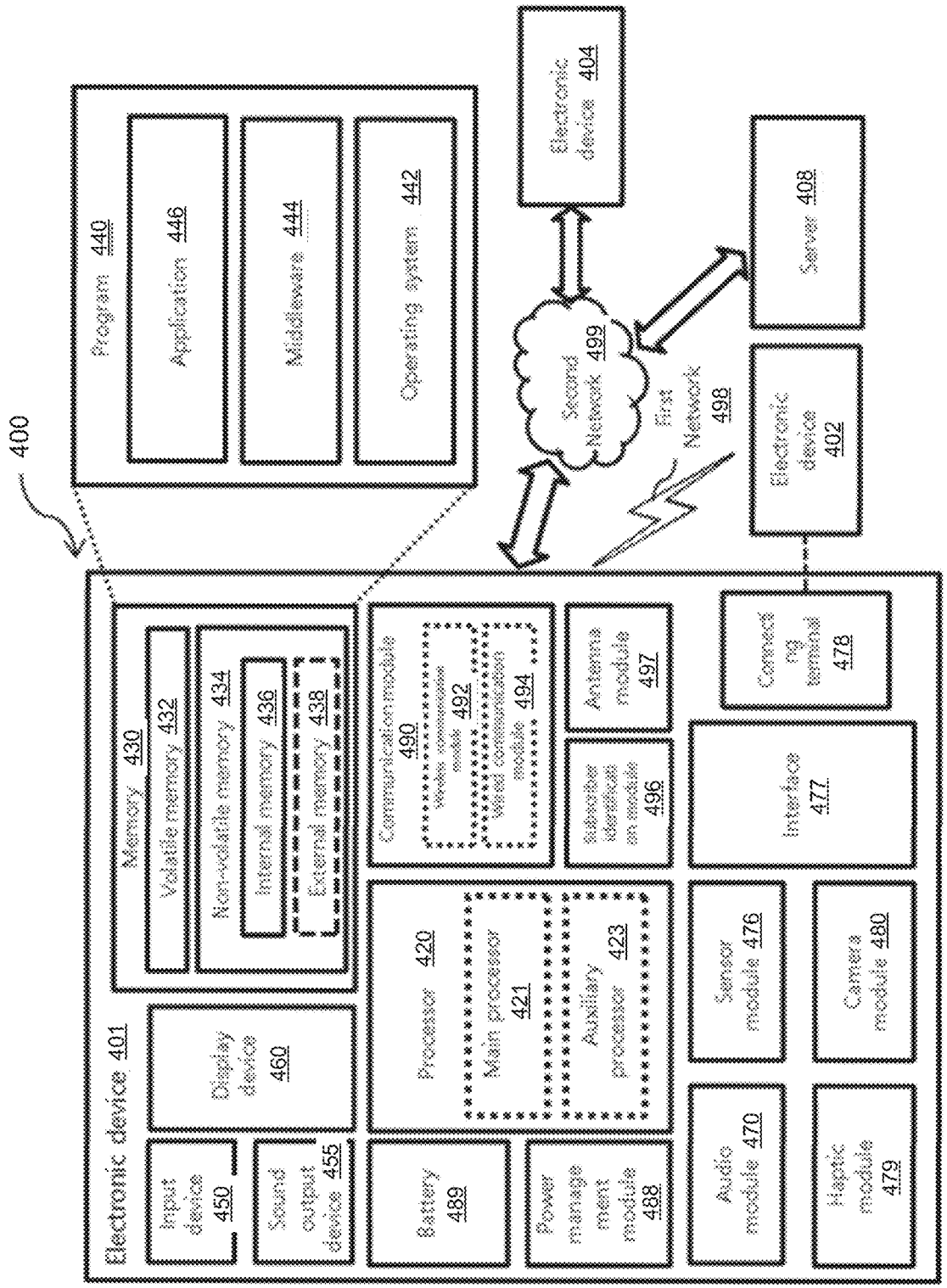
FIG. 4 illustrates an example network configuration according to embodiments of the present disclosure.

FIG. 4 illustrates an example network configuration according to embodiments of the present disclosure. An embodiment of the network configuration shown in FIG. 4 is for illustration only. One or more of the components illustrated in FIG. 4 can be implemented in specialized circuitry configured to perform the noted functions or one or more of the components can be implemented by one or more processors executing instructions to perform the noted functions.

FIG. 4 illustrated a block diagram illustrating a network configuration including an electronic device 401 in a network environment 400 according to various embodiments. As illustrated in FIG. 400, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network).

According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420 and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434.

According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 180 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434. The program 440 may be stored in the memory 430 as software, and may include, for example, an operating system (OS) 442, middleware 444, or an application 446.

The input device 450 may receive a command or data to be used by other components (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, or projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 101 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes. The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication.

According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, Ultra-WideBand (UWB), or infrared data association (IrDA)) or the second network 499 (e.g., a long-range communication network, such as a cellular network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB).

According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna.

According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 104 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 may perform a function or a service automatically, or in response to a request from a user or another device, the electronic device 401, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

Figure 5:
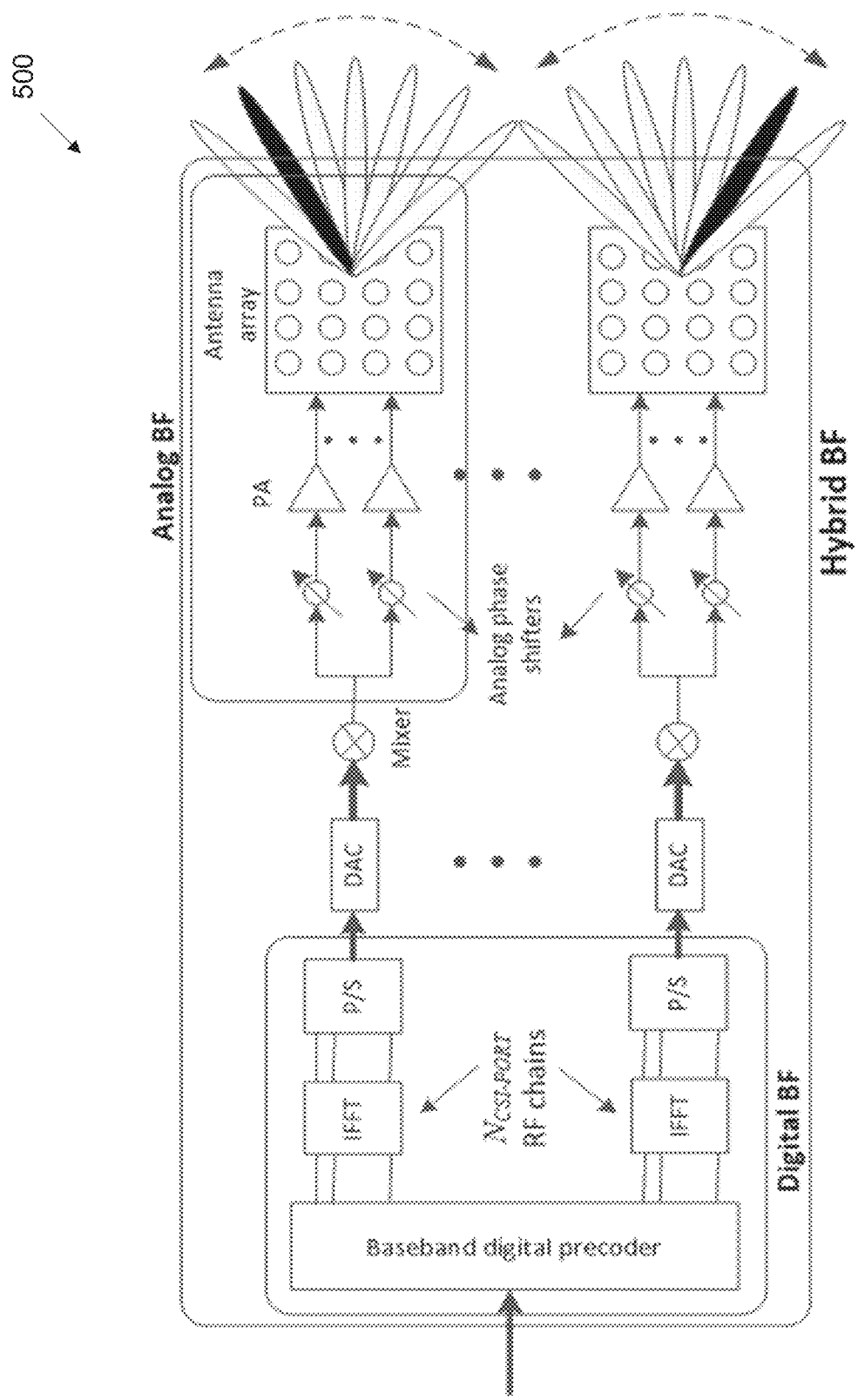
FIG. 5 illustrates an example hybrid beamforming according to embodiments of the present disclosure.

FIG. 5 illustrates an example hybrid beamforming 500 according to embodiments of the present disclosure. An embodiment of the hybrid beamforming 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions.

For mmWave bands, the number of antenna elements can be large for a given form factor. However, the number of digitally chain to be limited due to hardware constraints (such as the feasibility to install a large number of ADCs/DACs at mmWave frequencies) as illustrated in FIG. 5. In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval. The hybrid beamforming architecture as illustrated in FIG. 5 can be applied at the base station and at the UE.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for gNB to provide coverage with a single transmit beam, i.e., ensure adequate received signal quality at all UE locations within the coverage area via the usage of a single transmit beam.

In other words, at lower transmit signal carrier frequencies, the transmit power amplification provided by the transmit beam with a width large enough to cover the area may be sufficient to overcome the propagation losses to ensure adequate received signal quality at all UE locations within the coverage area. However, at higher signal carrier frequencies, the transmit beam power amplification corresponding to the same coverage area may not be sufficient to overcome the higher propagation losses, resulting in a degradation of received signal quality at UE locations within the coverage area.

In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies. The UE may also form receive beams to increase the signal-to-interference-and-noise ratio (SINR) at the receiver. Likewise, in the uplink, the UE may form transmit beams and the gNB may form receive beams.

To assist the UE in determining the RX and/or TX beam, a beam sweeping procedure is employed consisting of the gNB transmitting a set of transmit beams to sweep the cell area and the UE measuring the signal quality on different beams using the receive beams. To facilitate candidate beam identification, beam measurement and beam quality reporting, the gNB configures the UE with one or more RS resource (e.g., SS block, periodic/aperiodic/semi-persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the gNB configures the UE with a set of TX-RX beam pairs for reception of PDCCH and/or PDSCH.

Exhaustive beam sweeping or beam search may introduce extensive delay for the UE to access to the network, and significantly increase the power consumption. Further, such beam search, especially at the UE side, happens in many different deployment scenarios and/or protocol states such as inter-cell measurement, initial access, handover and transmission configuration indicator (TCI) state switch. Hence, there is a need to design fast, yet effective receive beam selection method at the user terminal side to reduce the access delay and implementation complexity.

Figure 6:
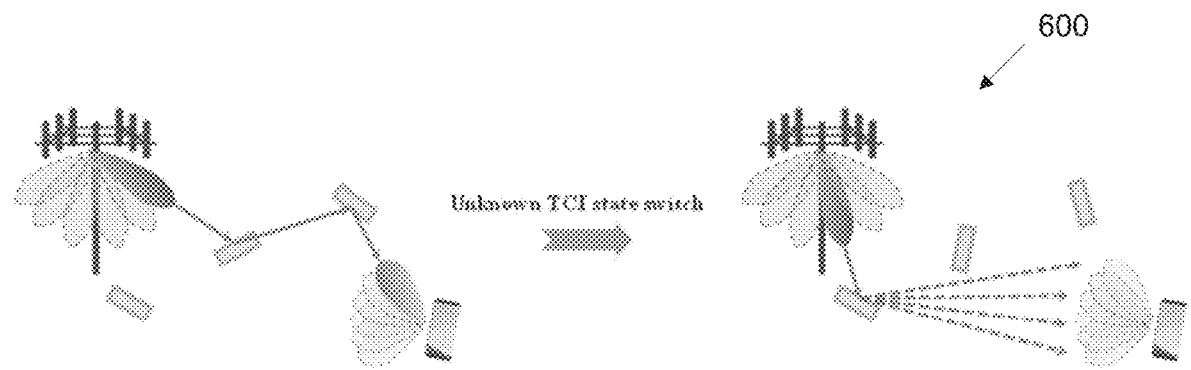
FIG. 6 illustrates an example unknown transmission configuration indicator (TCI) state switch according to embodiments of the present disclosure.

FIG. 6 illustrates an example unknown transmission configuration indicator (TCI) state switch 600 according to embodiments of the present disclosure. An embodiment of the unknown transmission configuration indicator (TCI) state switch 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

In directional beamforming based mmWave systems, to optimize a certain performance metric (e.g., the received signal power), the UE usually conducts an exhaustive search over all candidate beam codewords in the beam codebook, and selects the one that results in the best performance metric (e.g., the highest received signal power) to receive the data. If the number of candidate beam codewords in the beam codebook is large, the exhaustive search may take a very long time to converge, resulting in extensive delay for the UE to connect to the network.

As illustrated in FIG. 6, an example of receive beam selection under unknown TCI state switch is provided. According to the definition in NR standard specification, a TCI state is considered to be known to the UE if: (i) the UE has reported the measurement of the target TCI state to the network at least once before, (ii) the last measurement of the target TCI state was reported by the UE no more than, say, Xms ago, and (iii) the SNR for the target TCI state is above a predefined threshold Th_0, e.g., Th_0=−3 dB. If any of the above conditions does hold, the target TCI state is considered to be unknown to the UE. If the switched TCI state is unknown to the UE, the UE may have to perform a brute-force search over all candidate beam codewords in the beam codebook to find a receive beam, and therefore to re-establish the communication link (see FIG. 6). If the beam codebook size is large, the UE of interest may experience significant outage during the unknown TCI state switch.

The UE may use a smaller beam codebook to cover a given angular space with each beam codeword having a wider beamwidth. With a small number of beam codewords in the beam codebook, the corresponding beam search complexity can be significantly reduced. The link quality, however, may not be satisfactory because wide beams usually result in small array gain, and therefore, low received signal-to-noise ratio (SNR) and/or signal-to-interference-plus-noise ratio (SINR) in a cellular system.

Figure 7:
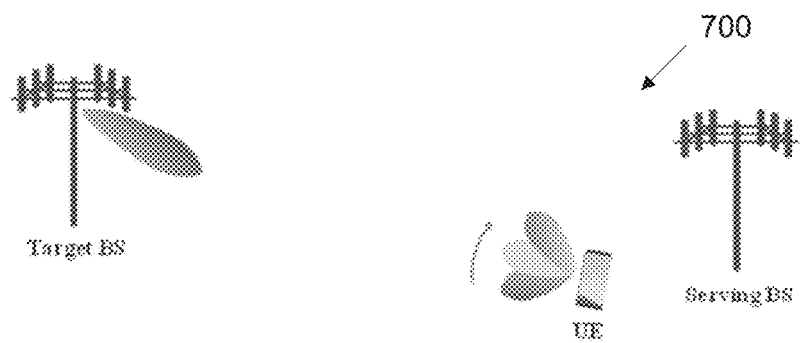
FIG. 7 illustrates an example directional beamforming based inter-cell measurement according to embodiments of the present disclosure.

FIG. 7 illustrates an example directional beamforming based inter-cell measurement 700 according to embodiments of the present disclosure. An embodiment of the directional beamforming based inter-cell measurement 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

For instance, for directional beamforming based inter-cell measurement shown in FIG. 7, the reference signal transmitted by the target BS may not be well detected by the UE of interest with wide receive beams. This is mainly because the channel condition between the target BS and the UE is generally much worse (e.g., comprising of more non-line-of-sight (NLOS) components and larger path-loss) than that between the serving BS and the UE. Hence, using wide receive beams in such an application scenario may not be a viable solution in terms of the link quality.

Figure 8:
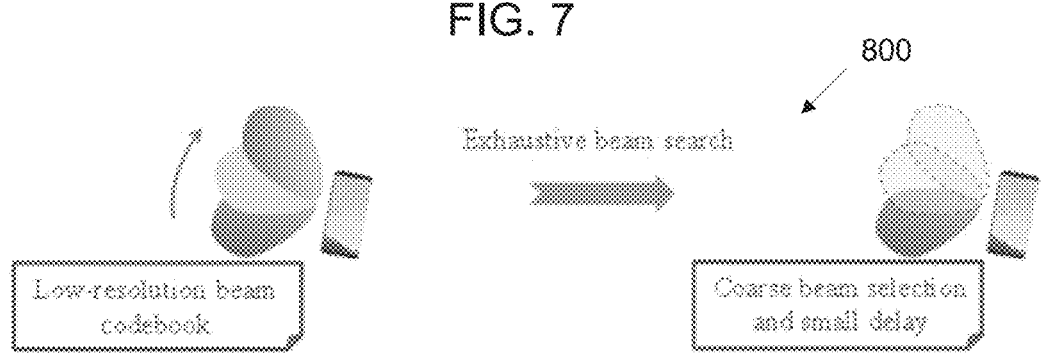
FIG. 8 illustrates an example exhaustive beam search over a low-resolution beam codebook with small number of beams codewords and wide beamwidth for each beam codeword according to embodiments of the present disclosure.

FIG. 8 illustrates an example exhaustive beam search 800 over a low-resolution beam codebook with small number of beam codewords and wide beamwidth for each beam codeword according to embodiments of the present disclosure. An embodiment of the exhaustive beam search 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

Figure 9:
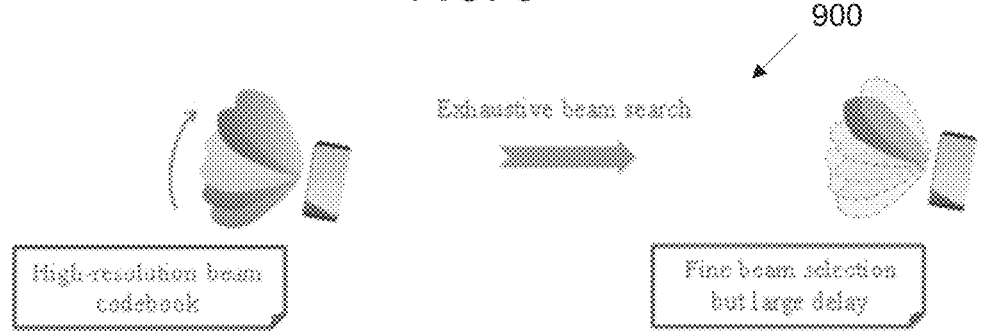
FIG. 9 illustrates an example exhaustive beam search over a high-resolution beam codebook with large number of beams codewords and narrow beamwidth for each beam codeword according to embodiments of the present disclosure.

FIG. 9 illustrates an example exhaustive beam search 900 over a high-resolution beam codebook with large number of beam codewords and narrow beamwidth for each beam codeword according to embodiments of the present disclosure. An embodiment of the exhaustive beam search 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In summary, the mobile device or the UE can perform the beam search over a low-resolution beam codebook such that a small number of beam codewords are used to sample a given angular range (as shown in FIG. 8). In this case, it is highly likely that the selected receive beam may not be able to steer towards the desired direction. The UE can also search over a high-resolution beam codebook such that there are many candidate beams sampling the given angular space (as shown in FIG. 9). The search complexity could be very high in this case, though a better beam whose steering direction matches with the desired direction can be selected.

In the present disclosure, several fast receive beam search/selection methods are provided. A high-resolution beam codebook with many candidate beam codewords is implemented at the UE side. During a beam search process, instead of searching over all candidate beam codewords, the mobile device only searches over a small subset of beams chosen from the high-resolution beam codebook. The mobile terminal or the UE then performs interpolation operation over the measurement collected from the subset of beams and determines a receive beam (or a plurality of receive beams) according to the interpolation result.

The interpolation operation can be based on predefined interpolation function(s) or look-up tables implemented and updated at the user equipment. The interpolation result can be relative position with respect to the steering directions of the measurement beams, explicit angular direction of the propagation channel, or a receive beam. Similar to FIG. 8 and FIG. 9, a conceptual example in FIG. 10 is provided to summarize the features of this present disclosure.

Figure 10:
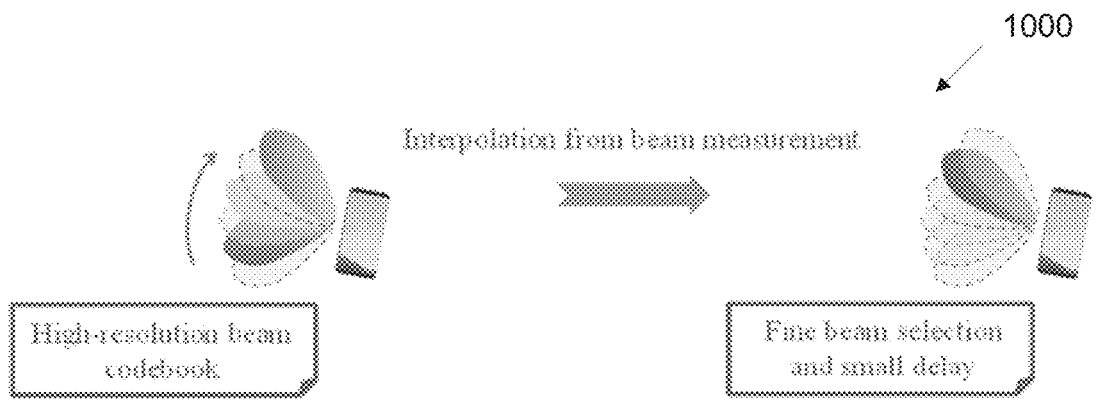
FIG. 10 illustrates an example interpolation based receive beam selection from a high-resolution beam codebook with large number of codewords and narrow beamwidth for each beam codeword according to embodiments of the present disclosure.

FIG. 10 illustrates an example interpolation based receive beam selection 1000 from a high-resolution beam codebook with large number of codewords and narrow beamwidth for each beam codeword according to embodiments of the present disclosure. An embodiment of the interpolation based receive beam selection 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

The provided method can significantly reduce the implementation complexity and delay of receive beam search, meanwhile providing promising beam selection result. The provided method can be implemented in various deployment scenarios and use cases such as TCI state switch, receive beam refinement during the initial access, beam search in handover, inter-cell measurement and many others.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

It should be noted that further embodiments of the disclosure may be derived by utilizing a combination of several of the embodiments listed below. It should also be noted that further embodiments of the present disclosure may be derived by utilizing a particular subset of operational steps as disclosed in each of these embodiments. This disclosure should be understood to cover all such embodiments.

The millimeter-wave (mmWave) band holds promise for providing high data rates in wireless local network and fifth generation (5G) cellular network. The small carrier wavelength at mmWave frequencies enable synthesis of compact antenna arrays, providing large beamforming gains to enable favorable received signal power. Grid-of-beams (GoBs) based beam search is the de facto approach for configuring both the transmit and receive beams; variations are used in IEEE 802.11ad systems and 5G. Specifically, for a given channel condition, both the BS and the UE search over all the candidate beam codewords in their own beam codebooks, and select the best combination(s) of the transmit and receive beams to optimize a given performance metric.

Such kind of exhaustive search over a large beam codebook, however, may impose significantly high power consumption, implementation complexity and large access delay for the user terminal, not to mention that the receive beam search at the UE side appears in many essential deployment scenarios in 5G such as directional initial access, beamforming based inter-cell measurement, TCI state switch, and many mobility related configuration. To reduce the access delay, the UE can use a small beam codebook with broad beamwidth to perform the beam search. In this case, however, the corresponding link quality may become poor and the link budgets may not be satisfied especially when the receive SNR/SINR is the design factor.

In the present disclosure, several fast receive beam selection strategies are provided, targeting at finding a receive beam for the UE under a variety of settings meanwhile reducing the access delay and computational complexity. Instead of searching over all possible beams in the given beam codebook, the UE interpolates from the measurement collected by a few beams and selects a receive beam or a plurality of receive beams from the beam codebook that may not even be measured before.

Figure 11:
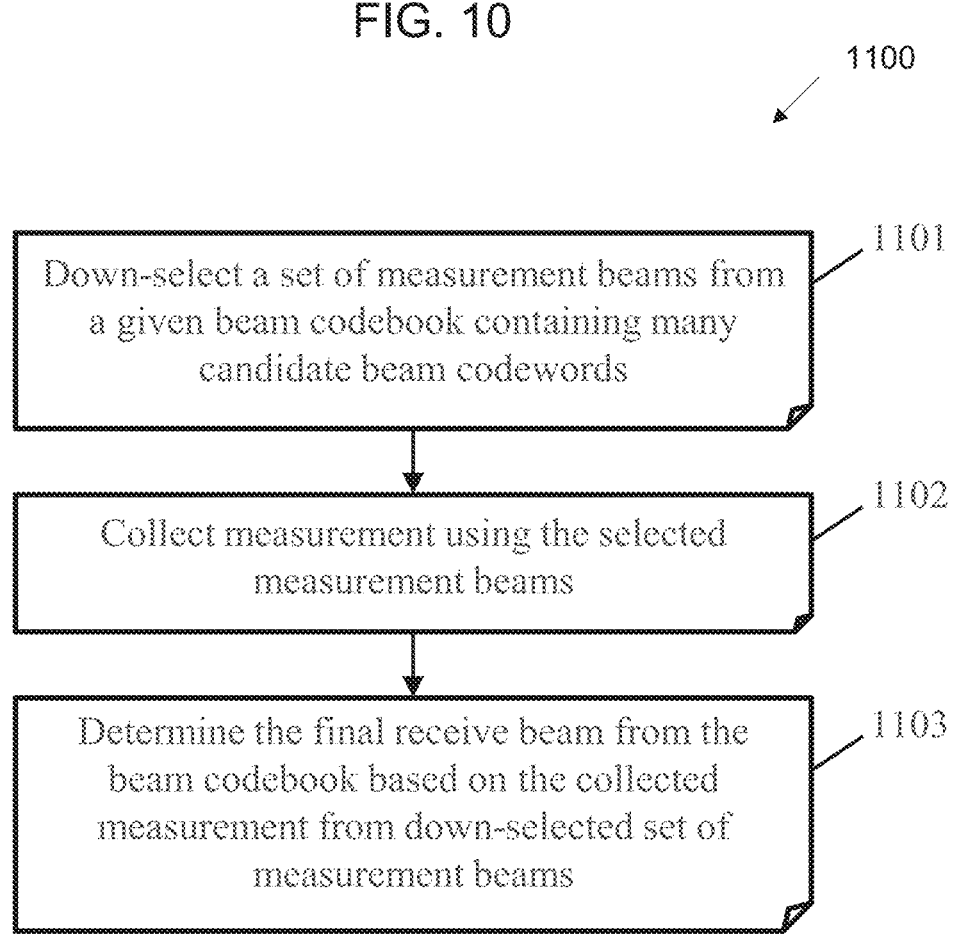
FIG. 11 illustrates a flow chart of a method for UE interpolation based receive beam selection executed at the UE according to embodiments of the present disclosure.

FIG. 11 illustrates a flow chart of a method 1100 for UE interpolation based receive beam selection according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In one embodiment, a sequence of operations illustrated in FIG. 11 is performed by the UE to obtain a receive beam by means of processing (e.g., by means of interpolating) the beam measurement. The components of the provided receive beam selection include selecting a set of measurement beams, collecting necessary measurement via the selected measurement beams, and choosing a receive beam according to the beam measurement result.

In step 1101, the UE constructs a set of measurement beams. The measurement beams can be chosen from a given beam codebook, selected as a subset of beams from a plurality of beams, or dynamically configured (both amplitudes and phases) by the UE according to a certain design criterion. For example, without any prior knowledge of the channel condition, the measurement beams could be uniformly selected from the given beam codebook. A bit map indicating various uniform distribution patterns of the measurement beams in the beam codebook can be implemented at the UE.

In TABLE 1, a bit map example is presented assuming that the size of the beam codebook is two to the power of k, where k is a positive integer. As can be seen from TABLE 1, if the UE selects the first row of the bit map, the UE would apply the receive beams with even beam indices in the beam codebook as the measurement beams; if the UE chooses the second row of the bit map, the UE would apply the receive beams with odd beam indices in the beam codebook as the measurement beams; further, if the UE selects the third row of the bit map shown in TABLE 1, the UE uses every three beams (starting from RX beam #0) in the beam codebook as the measurement beams. Other rows in the bit map are constructed in a similar manner and characterize one or more combinations of the beams in the beam codebook.

In summary, the UE first chooses the row of the bit map based on various conditions, including but not limited to computational complexity, coverage, beam shape, radiation pattern and array structure, and then forms the measurement beams accordingly. Further, the distribution of the measurement beams may not necessarily be uniform within the beam codebook even assuming no prior knowledge of the channel condition and etc.

For example, the UE could randomly choose the measurement beams from the given beam codebook to achieve the asymptotically performance. For another example, the UE could simply select the first half or the second half of the beam codewords in the beam codebook as the measurement beams targeting at different angular ranges. For another example, the UE could select the measurement beams in a sequential manner such that the UE first forms one or more measurement beams (e.g., RX beam #0) to collect necessary measurement, and then forms one or more measurement beams based on the measurement from the previously formed one or more measurement beams.

and/or RSSI as the necessary measurement for further processing to assist the receive beam selection.

As illustrated in FIG. 11, in step 1103, the UE processes the measurement from one or more measurement beams or a subset of a set of measurement beams (e.g., by interpolation operation). The measurement processing, or interpolation operation can be realized by implementing a look-up table, by formulating explicit interpolation function(s), or both at the mobile terminal. In a look-up table, one or more combinations of candidate measurement beams along with their historical measurement values are listed. Each combination in the look-up table corresponds to a single suggested receive beam, and/or channel direction, and/or relative position with respect to the steering directions of the corresponding candidate measurement beams.

Each combination in the look-up table may also correspond to a set of suggested receive beams, and/or channel directions, and/or relative positions with respect to the steering directions of the candidate measurement beams. Explicit interpolation functions can be derived based on the employed antenna array structure, radiation pattern, beam shape, and/or other design factors. As the measurement processing/interpolation result could be a receive beam, channel direction information, and/or relative position with respect to the steering directions of the measurement beams, the formulated interpolation function and the receive beam, and/or the formulated interpolation function and the channel direction, and/or the formulated interpolation function and the relative position with respect to the steering directions of the measurement beams, may have a one-to-one correspondence.

AS illustrated in FIG. 11, in step 1103, the UE determines the receive beam from the measurement processing/interpolation result and use the receive beam to communicate with the base station. For both the look-up table and explicit interpolation function based designs, the interpolation result could be a receive beam (or a plurality of receive beams),

TABLE 1

A bit map characterizes one or more possible combinations of receive beams uniformly distributed in the beam codebook

| RX beam #0 | RX beam #1 | RX beam #2 | RX beam #3 | RX beam #4 | ... | RX beam #K-2 | RX beam #K-1 |
|---|---|---|---|---|---|---|---|
| 1 | 0 | 1 | 0 | 1 | ... | 0 | 1 |
| 0 | 1 | 0 | 1 | 0 | ... | 1 | 0 |
| 1 | 0 | 0 | 1 | 0 | ... | 0/1 | 0/1 |
| 0 | 0 | 1 | 0 | 0 | ... | 0/1 | 0/1 |
| ... | ... | ... | ... | ... | ... | ... | ... |

As illustrated in FIG. 11, in step 1102, the UE forms the measurement beams constructed in step 1101 to receive necessary data and/or reference signal transmitted from the base station. The measurement beams may be formed by the UE in a time-division multiplexing (TDM) manner. Upon receiving the data and/or reference signal transmitted from the base station, the UE computes the received signal strengths, reference signal received powers (RSRPs), reference signal received qualities (RSRQs), signal-to-noise ratio (SNR), signal-to-interference-plus-noise ratio (SINR) and etc., and treats one of them, several of them, or all of them as the necessary measurement for further processing to assist the receive beam selection. The UE can also process the received signal strengths, RSRPs, RSRQs, SNR, SINR and etc. to obtain the channel quality indicator (CQI), received signal strength indicator (RSSI) and etc., and treat the CQI channel direction information, and/or relative position with respect to the steering directions of the measurement beams. If the beam measurement processing result is a receive beam, the UE may directly apply the suggested receive beam for data communication.

If the measurement processing result is an angular direction or a relative position with respect to the steering directions of the measurement beams, the UE may select the receive beam from the beam codebook, whose steering direction is the closest to the angular direction or the relative position with respect to the steering directions of the measurement beams among one or more other beam codewords in the beam codebook. In addition to a beam codeword from a given beam codebook, the final selected receive beam could also be computed by the UE according to certain design criteria. Note that the final selected receive beam may or may not belong to the measurement beams constructed in step 1101. That is, the final selected receive beam may not even be measured by the UE before, which is different from the existing beam search methods.

Figure 12:
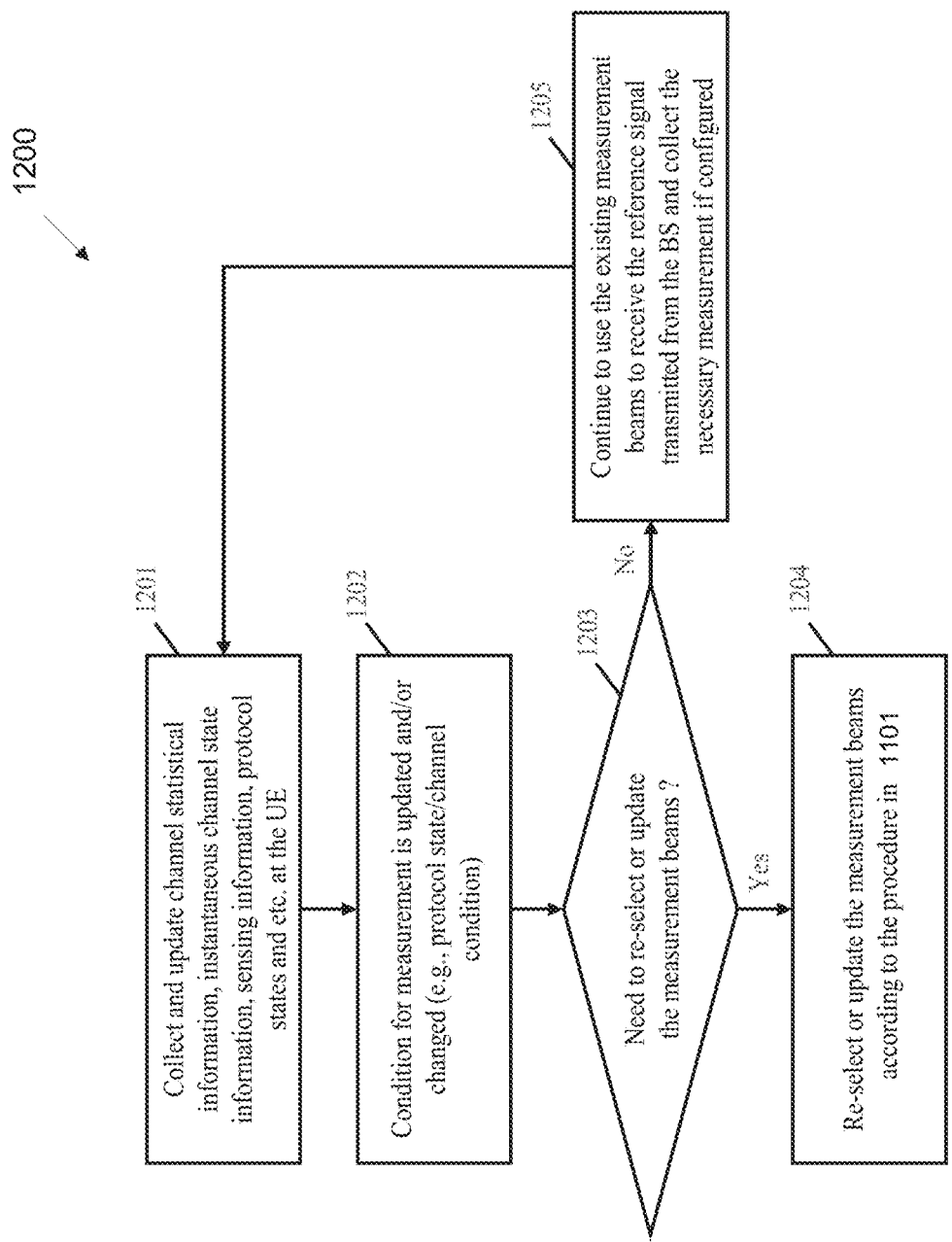
FIG. 12 illustrates a flow chart of a method for measurement beams selection according to embodiments of the present disclosure.

FIG. 12 illustrates a flow chart of a method 1200 for measurement beams selection according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

Based on the description of component 801, the selection of measurement beams is important in the provided interpolation based receive beam selection design. The accuracy of the interpolation result highly relies on the selected measurement beams and the corresponding measurement. In FIG. 12, an algorithm flow-chart is provided to explain the detailed procedure of configuring the measurement beams.

In step 1201, the UE uses the existing measurement beams to collect necessary measurement for future fine receive beam selection. The detailed procedure follows that described in 1102 as illustrated in FIG. 11.

In step 1202, the UE may update and/or change the protocol state based on the network indication. Note that different protocol states may result in different sets of measurement beams. Further, the channel condition and other design factors may also vary, which may require updating and/or changing the measurement beams. The impact of the update and/or change of the protocol state/channel condition on the measurement beams is characterized in steps 1203, 1204, and 1205.

In step 1203, a condition/triggering event for the UE to re-select or update the measurement beams is presented. The measurement beams re-selection or update can be realized in either periodic or aperiodic manner. For the periodic setting, the UE could update the measurement beams at given time-slots with a fixed interval between consecutive time-slots. The UE may change the interval between consecutive time-slots in the periodic method according to various practical implementation requirements.

For the aperiodic setting, the UE may dynamically trigger the measurement beams re-selection/update process as long as the measurement is no longer valid, or the final receive beam selection performance becomes unsatisfactory. For instance, if the received signal strengths on most of the measurement beams are below a predefined threshold, the UE may trigger the measurement beams re-selection process, and determine a new set of measurement beams following the procedure in step 1201.

For another example, the UE may change the measurement beams between different protocol states, such as inter-cell measurement, handover, initial access and TCI state switch as the measurement beams may have different link budgets and different requirements on the measurement beams. If the condition in step 1203 is not met, the UE continues to use the existing measurement beams, and waits for the next triggering event to decide whether to re-use the same set of beams or switch to a new set of beams for measurement. In step 1204, the UE selects a new set of measurement beams following the procedure in step 1101 as illustrated in FIG. 11.

Figure 13:
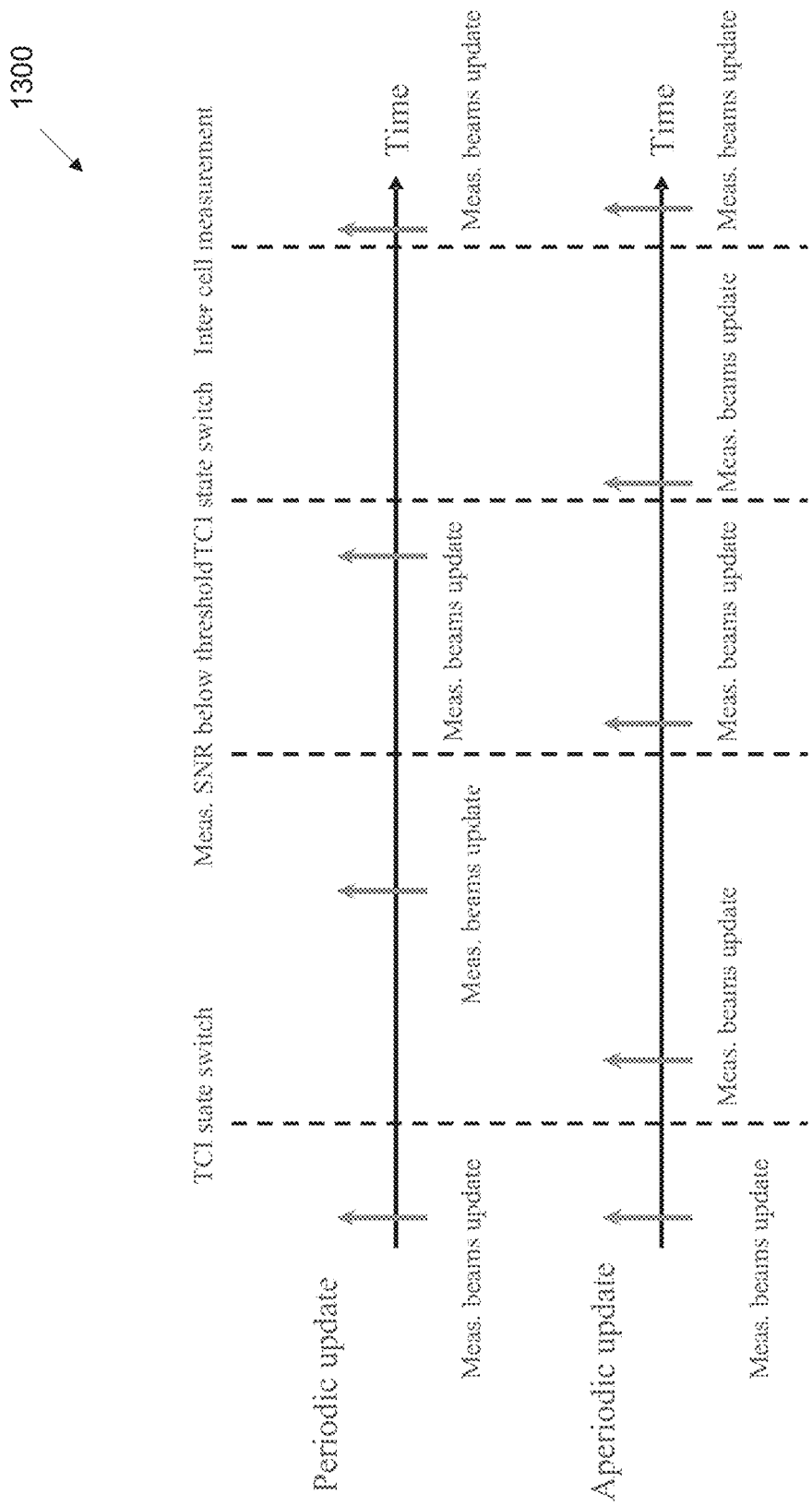
FIG. 13 illustrates an example periodic and aperiodic updates of measurement beams according to embodiments of the present disclosure.

FIG. 13 illustrates an example periodic and aperiodic updates of measurement beams 1300 according to embodiments of the present disclosure. An embodiment of the periodic and aperiodic updates of measurement beams 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, conceptual examples are provided to explicitly explain the difference between the periodic and aperiodic measurement beams selection strategies, and their relationships with various protocol states. It is evident from FIG. 13 that the interval between consecutive measurement beams updates in the periodic design is fixed, while the interval varies in the aperiodic setup. Further, it can be seen from FIG. 13 that the aperiodic update can have advantage over the periodic strategy because it is more adaptive to the changes of protocol states and channel condition.

For example, if the UE receives a TCI state switch command from the BS via a higher-layer signaling, the UE can trigger the measurement beams update to search for a new set of measurement beams that are most suited for the considered TCI state. For another example, if the measured SNR on the measurement beams is below a given threshold, the UE may also trigger the measurement beams update to search for a new set of measurement beams that would result in higher received SNR. The periodic update does not support the aforementioned operations and is not adaptive to protocol state changes and/or performance variations. The periodic update, however, may be easier to implement and/or may require less overhead than the dynamic aperiodic design.

TABLE 2

A bit map characterizes one or more possible combinations of receive beams uniformly distributed in the beam codebook; the rows in the bit map correspond to various protocol states and channel conditions

| Protocol states/channel conditions | RX beam #0 | RX beam #1 | RX beam #2 | RX beam #3 | RX beam #4 | ... | RX beam #K-2 | RX beam #K-1 |
|---|---|---|---|---|---|---|---|---|
| Inter-cell measurement type A | 1 | 0 | 1 | 0 | 1 | ... | 0 | 1 |
| Inter-cell measurement type B | 0 | 1 | 0 | 1 | 0 | ... | 1 | 0 |

TABLE 2-continued

A bit map characterizes one or more possible combinations of receive beams uniformly distributed in the beam codebook; the rows in the bit map correspond to various protocol states and channel conditions

| Protocol states/channel conditions | RX beam #0 | RX beam #1 | RX beam #2 | RX beam #3 | RX beam #4 | ... | RX beam #K-2 | RX beam #K-1 |
|---|---|---|---|---|---|---|---|---|
| TCI state switch type A | 1 | 0 | 0 | 1 | 0 | ... | 0/1 | 0/1 |
| TCI state switch type B | 0 | 0 | 1 | 0 | 0 | ... | 0/1 | 0/1 |
| ... | ... | ... | ... | ... | ... | ... | ... | ... |

In TABLE 2, another bit map example is used to further elaborate the relationship between various protocol states/channel conditions and the measurement beams selection. For example, different protocol states such as inter-cell measurement and TCI state switch may have different requirements on the number of measurement beams. The inter-cell measurement may require a relatively large number of measurement beams to ensure good coverage and link quality. The TCI state switch, however, may demand a smaller number of measurement beams because the TCI state switch is only used for intra-cell measurement.

As can be seen from TABLE 2, the inter-cell measurement related protocol states are mapped to the first and second rows in the bit map, which have the largest numbers of measurement beams in this example. The TCI state switch related operations are mapped to the third and fourth rows in the bit map, which contain less measurement beams. The same protocol state, e.g., the inter-cell measurement, may also be mapped to different rows in the bit map, and therefore, different combinations of measurement beams, depending on other UE-specific settings.

For instance, in the bit map given in TABLE 2, inter-cell measurement type-A and inter-cell measurement type-B are mapped to the first and second rows, respectively because it is assumed that inter-cell measurement type-A and type-B target at different angular coverage ranges. Similar assumptions are applied to TCI state switch type-A and type-B, which are mapped to the third and fourth rows in the bit map, respectively, due to their different target angular coverage ranges. Other mapping strategies between protocol states/channel conditions and combinations of measurement beams are also possible.

Figure 14:
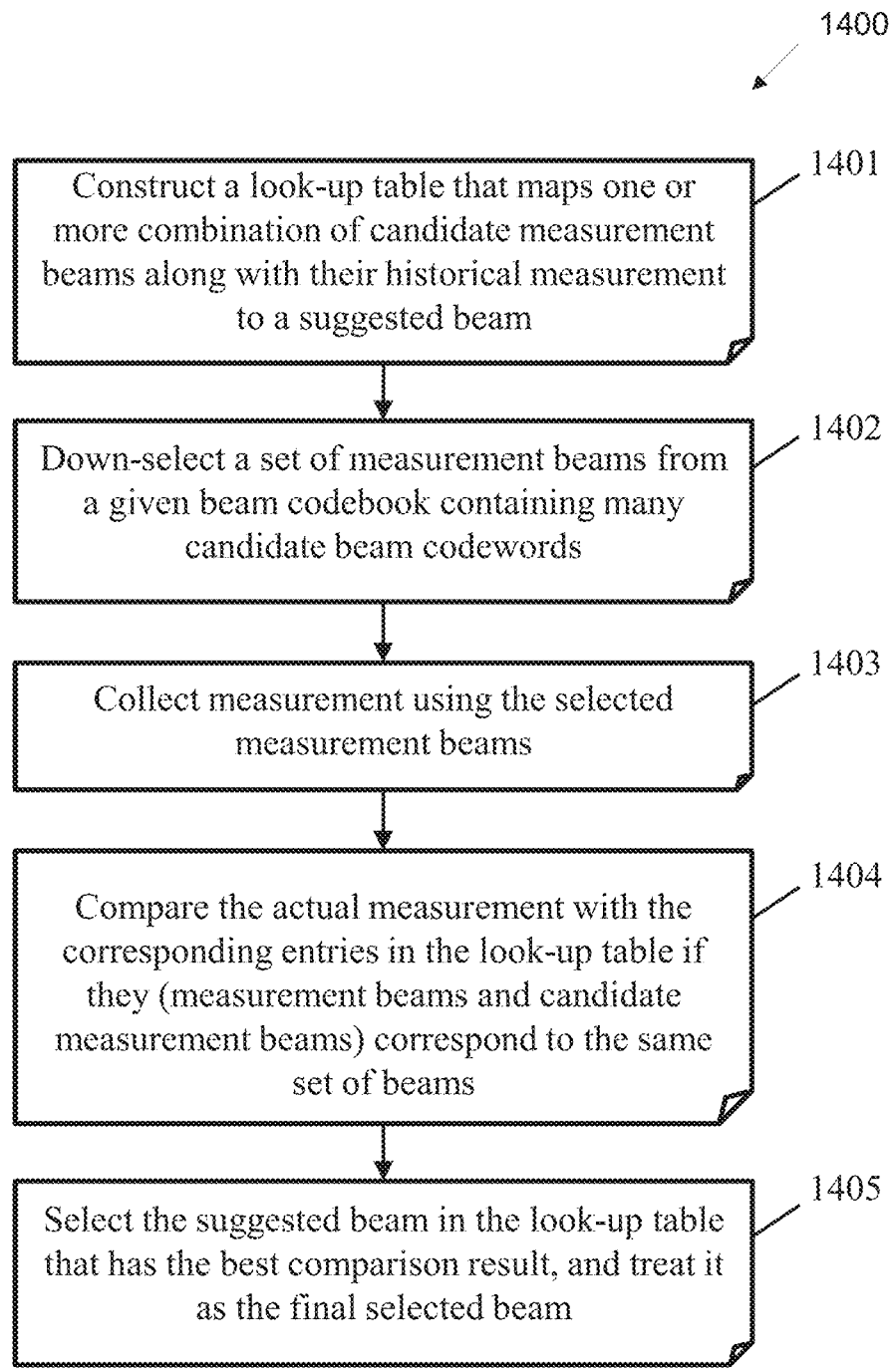
FIG. 14 illustrates a flow chart of a method for interpolation based receive beam selection executed at the UE using a look-up table according to embodiments of the present disclosure.

FIG. 14 illustrates a flow chart of a method 1400 for interpolation based receive beam selection executed at the UE using a look-up table according to embodiments of the present disclosure. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

In the present disclosure, the general design principle of the interpolation based receive beam selection strategy is provided. In FIG. 11, as highlighted in step 1103 that the interpolation operation can be implemented using either a look-up table or explicit interpolation function(s). In one embodiment, the UE can explicitly select a receive beam from a look-up table. In FIG. 14, an algorithm flow-chart is used to explain the components of the look-up table-based beam interpolation method. In this example, the output of the look-up table is a suggested beam index from the beam codebook. The detailed design procedure is provided as follows.

As illustrated in FIG. 14, in step 1401, the UE constructs a look-up table that captures one or more combinations of candidate measurement beams along with their historical measurement. The candidate measurement beams could be from a predefined beam codebook, and this beam codebook could also be used for selecting the actual measurement beams and the final receive beam. The exact historical measurement value could be based on received signal strengths, RSRPs, RSRQs, SNRs and SINRs, stored and updated by the UE based on previous measurement.

When explaining the detailed structure of the look-up table in TABLE 3, several examples are used to illustrate how to obtain this historical measurement. In this embodiment, each valid combination of candidate measurement beams along with their historical measurement is mapped to a single suggested receive beam. The suggested receive beam could belong to a predefined beam codebook, and this beam codebook could also be used for selecting the actual measurement beams, candidate measurement beams and the final receive beam. Note that it may also be possible that each valid combination of the candidate measurement beams along with their historical measurement corresponds to a set of suggested beams, selected from the given beam codebook.

The operations in 1402 and 1403 as illustrated in FIG. 14 are similar to those in 1101 and 1102 as illustrated in FIG. 11.

As illustrated in FIG. 14, in step 1404, the UE compares the actual measurement obtained from the measurement beams formed in step 1403 with the corresponding entries in the look-up table and obtains the comparison results. For instance, the UE may need to first identify the entries in the look-up table whose candidate measurement beams are the same as the actual measurement beams. The UE may then compute the comparison results by comparing the actual measurement with the corresponding historical measurement in the look-up table.

If the actual measurement and the historical measurement in the look-up table are based on the received signal powers, the comparison metric could be based on the Euclidean distance between the two received signal powers. Then, the final comparison result could be the sum of all Euclidean distance-based comparison metrics, or the average of all Euclidean distance-based comparison metrics. For another example, if the actual measurement and the historical measurement in the look-up table are simply the received signal samples, the comparison metric could be based on the squared error between the two received signals. In this case, the final comparison result could be the sum of all squared error-based comparison metrics, or the mean squared error-based comparison metrics.

As illustrated in FIG. 14, in step 1405, the UE selects the final receive beam based on the final comparison results. The UE configures the selection criterion based on the format, content or context of the final comparison result. For example, if the final comparison result corresponds to the sum of all Euclidean distance based comparison metrics, the average of all Euclidean distance based comparison metrics, the sum of all squared error based comparison metrics, or the mean squared error based comparison metrics, the UE may first select the minimum comparison result among all comparison results, and then select the suggested beam corresponding to the minimum comparison result as the final receive beam. Note that other selection criteria such as the maximum comparison result among all comparison results are also possible depending on the format, content or context of the final comparison result and other implementation issues.

the same set of beams (e.g., pattern #0, pattern #1 and pattern #2 in TABLE 3), the different patterns can be differentiated by their exact historical measurement entries, and the different pattern may correspond to, or the different pattern may be constructed under different protocol states.

Further, to avoid ambiguity, each pattern in the look-up table may correspond to a unique suggested receive beam. Further, a pattern in the look-up table could imply that the corresponding valid combination of candidate measurement beams (e.g., RX beam #0 and RX beam #1 for pattern #0) have been formed by the UE before to collect necessary measurement. If, e.g., RX beam #0 and RX beam #1 have never been formed by the UE before to collect necessary measurement, patterns #0, #1 and #2 in TABLE 3 may no longer be valid nor exist in the actual look-up table.

Based on the above definition of the pattern in the look-up table, it is elaborated on how to obtain the historical measurement using several examples in TABLE 3. For instance, consider pattern #0 in TABLE 3, and denote the received signal strengths on RX beam #0 and RX beam #1 by

TABLE 3

An example of look-up table implemented at the UE according to the procedure described in FIG. 14, "X" denotes no valid entry

| | RX beam #0 | RX beam #1 | RX beam #2 | ... | RX beam #K-2 | RX beam #K-1 | Suggested beam |
|---|---|---|---|---|---|---|---|
| Pattern #0 | pw_00 | pw_10 | pw_20 = 'X' | ... | pw_(K-2) (0) = 'X' | pw_(K-1) (0) = 'X' | RX beam #$a_0$ |
| Pattern #1 | pw_01 | pw_11 | pw_21 = 'X' | ... | pw_(K-2) (1) = 'X' | pw_(K-1) (1) = 'X' | RX beam #$a_1$ |
| Pattern #2 | pw_02 | pw_12 | pw_22 = 'X' | ... | pw_(K-2) (2) = 'X' | pw_(K-1) (2) = 'X' | RX beam #$a_2$ |
| Pattern #3 | pw_03 | pw_13 = 'X' | pw_23 | ... | pw_(K-2) (3) = 'X' | pw_(K-1) (3) = 'X' | RX beam #$a_3$ |
| . | . | . | . | . | . | . | . |
| Pattern #N-1 | pw_(0) (N-1) = 'X' | pw_(1) (N-1) = 'X' | pw_(2) (N-1) = 'X' | ... | pw_(K-2) (N-1) | pw_(K-1) (N-1) | RX beam #$a_{N-1}$ |

In TABLE 3, one example of the look-up table implemented at the UE is provided according to the procedure illustrated in 1401 in FIG. 14. The first row in TABLE 3 includes all candidate measurement beams, from RX beam #0 to RX beam #K−1. The patterns shown in the first column in TABLE 3 characterize all valid combinations of the candidate measurement beams.

For a given candidate measurement beam RX beam #1 (i∈ {0, 1, . . . , K−1}) and pattern #1 (j∈ {0, 1, . . . , K−1}), the corresponding entry pw_ij in the look-up table represents the historical measurement, measured as the received signal power in this example. The last column in the look-up table lists all the suggested beams. Each suggested beam is mapped to a pattern, which characterizes a valid combination of a plurality of candidate measurement beams along with their historical measurement. For instance, pattern #0 in TABLE 3 denotes a valid combination of RX beam #0 and RX beam #1 because only these two candidate measurement beams have valid historical measurement entries in this row, while the other beams do not have valid entries (denoted by 'X') in the same row.

For another example, pattern #3 in TABLE 3 denotes a valid combination of RX beam #0 and RX beam #2 because only these two candidate measurement beams have valid historical measurement entries in this row, while the other beams do not have valid entries (denoted 'X') in the same row. Note that though different patterns may correspond to pw_00(t) and pw_10(t) for the past measurement at time $t \in [t_{min}, t_{max}]$, where $t_{min}$ represents the latest time-slot, during which the UE collected the latest measurement, and $t_{max}$ denotes the farthest counterpart. In this example, the corresponding historical measurement pw_00 and pw_10 in the look-up table are determined as pw_00=pw_00(tmm) and pw_10=pw_10(tmm), i.e., the latest measurement.

For another example, consider pattern #3 in TABLE 3, and denote the received signal strengths on RX beam #0 and RX beam #2 by pw_03(t) and pw_23(t) for the past measurement at time $t \in [t_{min}, t_{max}]$, where $t_{min}$ represents the latest time-slot, during which the UE collected the latest measurement, and $t_{max}$ denotes the farthest counterpart. Here, the corresponding historical measurement pw_03 and pw_23 could be determined by the UE as $$pw\_03 = \frac{1}{t_{max} - t_{min}} \sum_{t=t_{min}}^{t_{max}} pw\_03(t) \text{ and } pw\_23 = \frac{1}{t_{max} - t_{min}} \sum_{t=t_{min}}^{t_{max}} pw\_23(t).$$

Note that other options to determine the historical measurement are also possible depending on practical settings.

Upon receiving the measurement, the UE first determines a plurality of patterns from the first column of the look-up table by simply matching the actual measurement beams with the valid combinations of the candidate measurement beams. The UE then obtains comparison results for the selected patterns by comparing the actual measurement with the historical measurement based on a predefined comparison metric. The UE finally selects the best comparison result, and therefore the corresponding suggested beam as the receive beam, based on a predefined selection criterion.

For instance, it is assumed that the actual measurement beams are {RX beam #0, RX beam #1}, and the corresponding actual measurement is {rx_pw_0, rx_pw_1}, which are the received signal powers on RX beam #0 and RX beam #1, respectively. As only patterns #0, #1 and #2 in TABLE 3 correspond to candidate measurement beams {RX beam #0, RX beam #1} and have valid historical measurement entries, the UE first selects these three patterns out of all patterns listed in the first column in TABLE 3. Because both the actual measurement and the historical measurement are based on the received signal powers, the UE considers the Euclidean distance as the comparison metric, and computes dis_ij=|rw_pw_i−pw_ij|.

In such example, the UE calculates the sum of the Euclidean distance-based comparison metrics as the comparison results, given as dis_j=dis_0j+dis_1j for j={0, 1, 2}. If dis_2=min{dis_0, dis_1, dis_2}, the UE selects pattern #2, and therefore the corresponding suggested beam RX beam #$a_2$ in TABLE 3 as the final receive beam.

Figure 15:
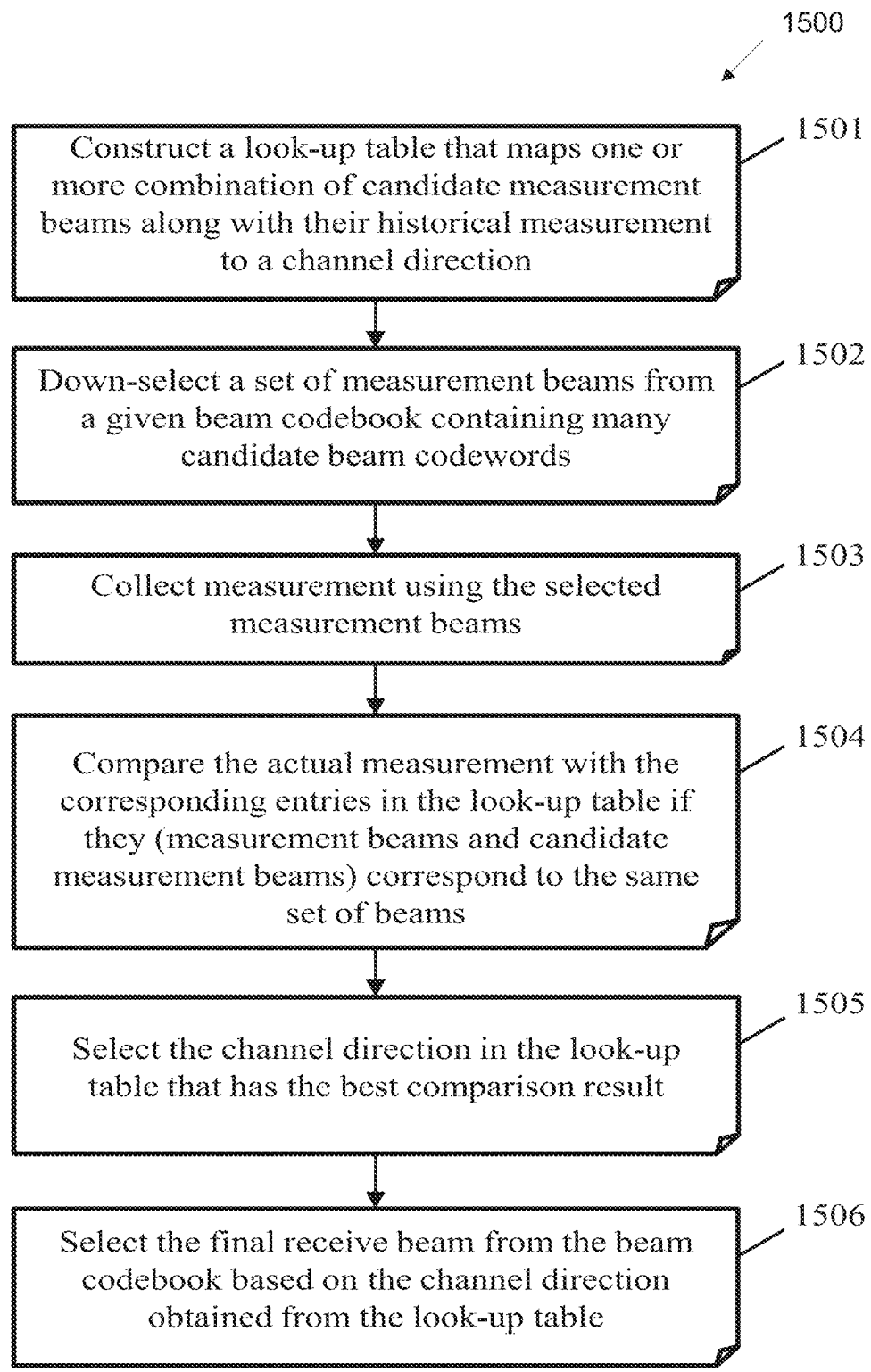
FIG. 15 illustrates another flow chart of a method for interpolation based receive beam selection executed at the UE using a look-up table according to embodiments of the present disclosure.

FIG. 15 illustrates another flow chart of a method 1500 for interpolation based receive beam selection executed at the UE using a look-up table according to embodiments of the present disclosure. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, the algorithm flow-chart of another look-up table aided interpolation based receive beam selection strategy is provided. Different from FIG. 14, the final output of the look-up table in FIG. 15 is a channel direction instead of an explicit receive beam index in the beam codebook. Most of the components in FIG. 15 have similar functionalities to those exhibited in FIG. 14. Below, the main differences between the two methods is highlighted.

As illustrated in FIG. 15, in step 1501, each combination of the candidate measurement beams and their historical measurement is mapped to a single channel direction, which is a suggested beam in step 1401. The channel direction could be an angular direction, channel direction information, and/or relative position with respect to the steering directions of the candidate measurement beams. In step 1505, the UE selects the best channel direction based on the comparison results. For example, if the comparison result corresponds to the sum of all Euclidean distance based comparison metrics, the average of all Euclidean distance based comparison metrics, the sum of all squared error based comparison metrics, or the mean squared error based comparison metrics, the UE may first select the minimum comparison result among all comparison results, and then select the channel direction corresponding to the minimum comparison result as the final output of the look-up table.

In contrast to FIG. 14, there is one more step in FIG. 15, i.e., 1506, during which the UE automatously chooses the final receive beam from the beam codebook according to the channel direction observed from the look-up table. For instance, the UE may select the receive beam in the beam codebook whose steering direction is the closest to the channel direction among all other beam codewords in the beam codebook. The UE can also directly compute each entry (both amplitude and phase) in the receive beamforming vector based on the channel direction observed from the look-up table, rather than restricting the final receive beam from a predefined beam codebook.

TABLE 4

An example of look-up table implemented at the UE according to the procedure described in FIG. 15; "X" denotes no valid entry

|  | RX beam #0 | RX beam #1 | RX beam #2 | ... | RX beam #K-2 | RX beam #K-1 | Channel direction |
|---|---|---|---|---|---|---|---|
| Pattern #0 | pw_00 | pw_10 | pw_20 = 'X' | ... | pw_(K-2) (0) = 'X' | pw_(K-1) (0) = 'X' | $b_0$ |
| Pattern #1 | pw_01 | pw_11 | pw_21 = 'X' | ... | pw_(K-2) (1) = 'X' | pw_(K-1) (1) = 'X' | $b_1$ |
| Pattern #2 | pw_02 | pw_12 | pw_22 = 'X' | ... | pw_(K-2) (2) = 'X' | pw_(K-1) (2) = 'X' | $b_2$ |
| Pattern #3 | pw_03 | pw_13 = 'X' | pw_23 |  ... | pw_(K-2) (3) = 'X' | pw_(K-1) (3) = 'X' | $b_3$ |
| . | . | . | . | . | . | . | . |
| . | . | . | . | . | . | . | . |
| . | . | . | . | . | . | . | . |
| Pattern #N-1 | pw_(0) (N-1) = 'X' | pw_(1) (N-1) = 'X' | pw_(2) (N-1) = 'X' | ... | pw_(K-2) (N-1) | pw_(K-1) (N-1) | $b_{N-1}$ |

In TABLE 4, another example of the look-up table implemented is provided according to the procedure illustrated in 1501 in FIG. 15. The last column in TABLE 4 lists one or more potential channel directions, estimated from the historical measurement of the candidate measurement beams. The example in TABLE 3 is considered, where the actual measurement beams probed by the UE are {RX beam #0, RX beam #1} with the actual measurement {rx_pw_0, rx_pw_1}. As dis_2=min{dis_0, dis_1, dis_2}, the UE selects pattern #2.

In TABLE 4, the UE then determines $b_2$ as the final output of the look-up table. If $b_2$ corresponds to the angular direction in the channel, and/or the relative position with respect to the steering directions of the candidate measurement beams, the UE selects the receive beam from the beam codebook whose steering direction is the closest to $b_2$ in terms of the Euclidean distance.

TABLE 5

An example of look-up table implemented at the UE using pre-processed historical measurement, and a bit map is used in this table to match between the actual measurement beams and the valid candidate measurement beams.

| | RX beam #0 | RX beam #1 | ... | RX beam #K-1 | Pre-processed historical measurement | Suggested beam/channel direction |
|---|---|---|---|---|---|---|
| Pattern #0 | 1 | 1 | ... | 0 | g(pw_00, pw_10, ..., pw(K-1)(0)) | RX beam #$a_0$/ $b_0$ |
| Pattern #1 | 1 | 1 | ... | 0 | g(pw_01, pw_11, ..., pw(K-1)(1)) | RX beam #$a_1$/ $b_1$ |
| Pattern #2 | 1 | 1 | ... | 0 | g(pw_02, pw_12, ..., pw(K-1)(2)) | RX beam #$a_2$/ $b_2$ |
| Pattern #3 | 1 | 0 | ... | 0 | g(pw_03, pw_13, ..., pw(K-1)(3)) | RX beam #$a_3$/ $b_3$ |
| . | . | . | . | . | . | . |
| . | . | . | . | . | . | . |
| . | . | . | . | . | . | . |
| Pattern #N-1 | 0 | 0 | ... | 1 | g(pw_(0) (N-1), pw_(1)(N-1), ..., pw(K-1)(N-1)) | RX beam #$a_{N-1}$/ $b_{N-1}$ |

In TABLE 5, another example of the look-up table implementation at the UE is provided to facilitate the receive beam selection. Different from the look-up tables constructed in TABLE 3 and 4, in which the historical measurement is directly used for comparing with the actual measurement, the pre-processed historical measurement is implemented in TABLE 5 and used for comparing with the actual (pre-processed) measurement. A bit map is implemented in the look-up table to help the UE determine appropriate patterns such that their corresponding candidate measurement beams with valid entries (indicated by '1' in this example) match with the actual measurement beams.

Further, g(.) in TABLE 5 represents the pre-processing function; the input to g(.) is the historical measurement from one or more candidate measurement beams (either having a valid value or not); the output of g(.) denotes the processed historical measurement prior to comparing with the actual measurement (pre-processing). The example in TABLE 3 may be re-used to explain the design procedure for TABLE 5. In this example, the processing function g(.) is defined as the sum of one or more inputs. Note that other processing functions are also possible. The UE applies the same processing function to the actual measurement as well to obtain the pre-processed measurement, i.e., g(rx_pw_0, rx_pw1)=rx_pw_0+rx_pw_1. The pre-processed historical measurement for pattern j (j=0, 1, 2) can be calculated as g(pw_0j, pw_1j)=pw_0j+pw_1j.

In such example, the UE considers the Euclidean distance as the comparison metric and computes the comparison result as dis_j=|g(rx_pw_0, rx_pw_1)−g(pw_0j, pw_1j)| for j={0, 1, 2}. Similar to the example discussed in TABLE 3, assume that dis_2=min{dis_0, dis_1, dis_2}, the UE selects pattern #2, and therefore the corresponding suggested beam RX beam #$a_2$ in TABLE 5 as the final receive beam. The UE also has the option to select the corresponding channel direction $b_2$ in TABLE 5 as the look-up table output, and automatously selects the receive beam from the beam codebook whose steering direction is the closest to $b_2$ in terms of the Euclidean distance as the final receive beam.

Figure 16:
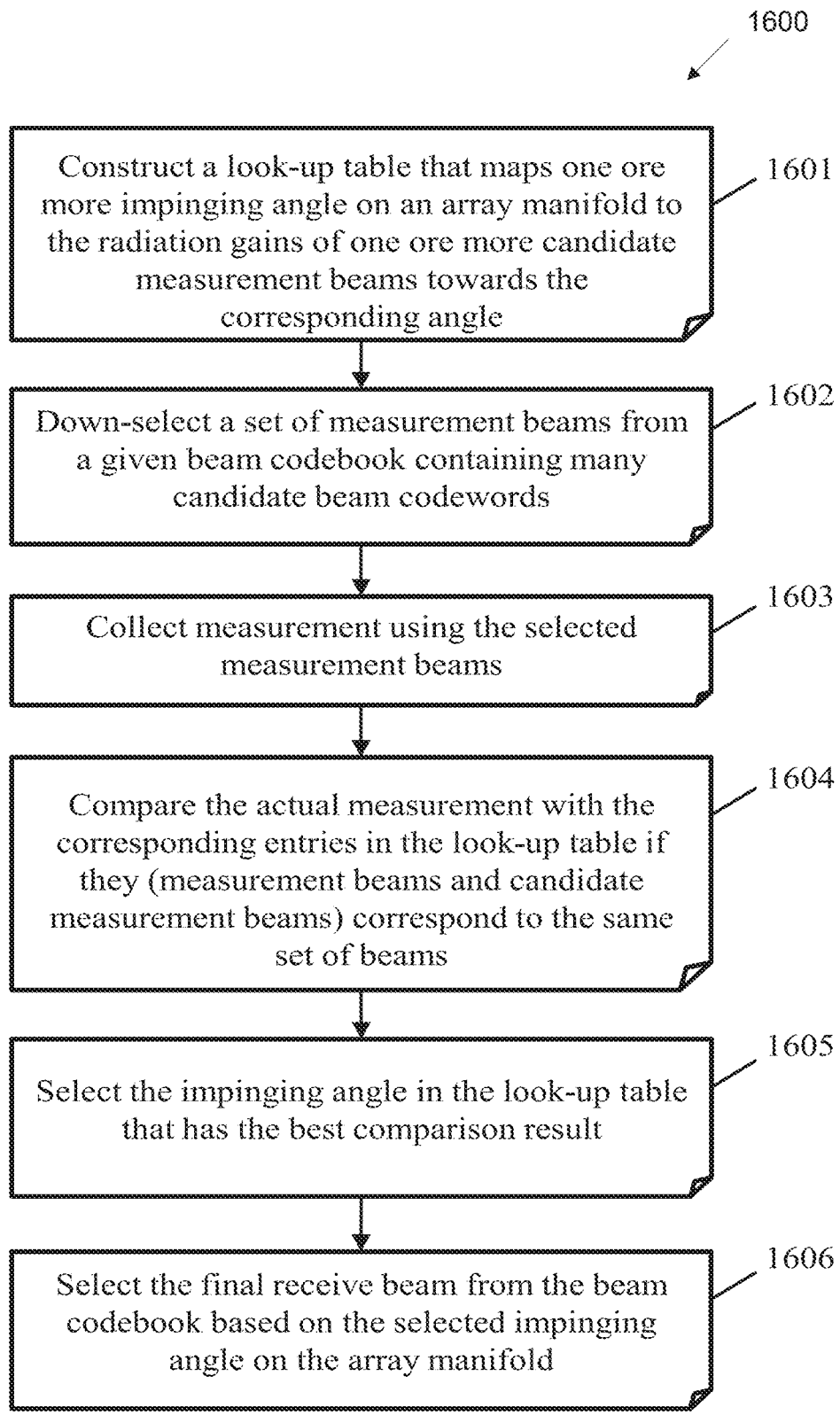
FIG. 16 illustrates yet another flow chart of a method for interpolation based receive beam selection executed at the UE using a look-up table according to embodiments of the present disclosure.

FIG. 16 illustrates yet another flow chart of a method 1600 for interpolation based receive beam selection executed at the UE using a look-up table according to embodiments of the present disclosure. An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

TABLE 6

An example of look-up table implemented at the UE that characterizes the relationship between a given impinging angle on the array manifold and the radiation gains of all candidate measurement beams towards the considered impinging angle

| RX beam #0 | RX beam #1 | RX beam #2 | ... | RX beam #K-2 | RX beam #K-1 | Impinging angle on the array manifold |
|---|---|---|---|---|---|---|
| rd_00 | rd_10 | rd_20 | ... | rd_(K-2)(0) | rd_(K-1)(0) | $d_0$ |
| rd_01 | rd_11 | rd_21 | ... | rd_(K-2)(1) | rd_(K-1)(1) | $d_1$ |
| rd_02 | rd_12 | rd_22 | ... | rd_(K-2)(2) | rd_(K-1)(2) | $d_2$ |
| rd_03 | rd_13 | rd_23 | ... | rd_(K-2)(3) | rd_(K-1)(3) | $d_3$ |
| . | . | . | . | . | . | . |
| . | . | . | . | . | . | . |
| rd_(0)(N-1) | rd_(1)(N-1) | rd_(2)(N-1) | ... | rd_(K-2)(N-1) | rd_(K-1)(N-1) | $d_{N-1}$ |

In FIG. 16 and TABLE 4 in the present disclosure, another look-up table assisted interpolation based receive beam selection strategy is provided. Different from the previous three look-up table based methods, in which the historical measurement values or their pre-processed counterparts are the entries in the tables, TABLE 6 captures the radiation gains of all the candidate measurement beams, which can be obtained via simulation and/or in-house measurement, and their mapping relationship with the impinging angles on the array manifold.

As illustrated in FIG. 16, in step 1601, a set of potential impinging angles on an array manifold are first determined. The array manifold can be a two-dimensional angular grid with each point on the grid representing a potential impinging angle. The array manifold can also be a three-dimensional sphere with each point on the sphere representing a potential imping angle. For a given impinging angle on the array manifold, the radiation gains, or the radiation pattern gains, or the beamforming gains, or the array gains of one or more candidate beams in the predefined beam codebook are obtained through computer simulation and/or in-house measurement. All the potential impinging angles and their corresponding radiation gains from all candidate beams are listed in the look-up table.

In step 1602 and 1603 as illustrated in FIG. 16, the UE performs similar operations to steps 1101 and 1102, as illustrated in FIG. 11, to select appropriate measurement beams, and use the selected measurement beams to collect necessary measurement.

In step 1604, the UE compares the actual measurement with the radiation gains in each row in the look-up table and finds the best comparison result. Specifically, for each row in the look-up table, the UE first locates the entries (radiation gains) whose corresponding candidate measurement beams are the same as the actual measurement beams. These beams are referred to as active beams in the look-up table. For a given row in the look-up table, the UE then computes a comparison metric between the measurement and the radiation gain for each active beam in the look-up table; further, the UE calculates a comparison result for the given row in the look-up table based on the comparison metrics from one or more active beams.

The UE finally selects the best comparison result among one or more comparison results obtained from all rows in the look-up table, and therefore the corresponding impinging angle as the output of the look-up table. The comparison metric could be the Euclidean distance between the measurement and the radiation gain, but other metrics are also possible. The comparison result could be the sum of all comparison metrics, the average of all comparison metrics and etc. if the comparison metric is calculated based on the Euclidean distance.

In step 1605, the UE selects the best comparison result among one or more comparison results. If the comparison metric, and therefore, the comparison result is obtained based on the Euclidean distance between the measurement and the radiation gain, the best comparison result could be the minimum comparison result among one or more comparison results. The UE chooses the impinging angle on the array manifold corresponding to the best comparison result as the final output of the look-up table.

In step 1606, the UE chooses the beam codeword from the beam codebook whose steering direction is the closest to the impinging angle selected in step 1605 as the final receive beam.

In TABLE 6, an example of the radiation gain based look-up table implementation at the UE side is provided. In the look-up table, rd_ij is the radiation gain of RX beam #i ($i \in \{0, 1, \ldots, K-1\}$) towards the impinging angle $d_j$ ($j \in \{0, 1, \ldots, K-1\}$) on the array manifold. For example, it is assumed that the actual measurement beams are {RX beam #0, RX beam #1}, and the corresponding actual measurement is {rx_pw_0, rx_pw_1}, which are the received signal powers on RX beam #0 and RX beam #1, respectively. For row j in TABLE 6, rd_0j and rd_1j are the comparison targets as their corresponding candidate measurement beams are {RX beam #0, RX beam #1}, which are the same as the actual measurement beams. If the Euclidean distance is used as the comparison metric, the UE first calculates dis_ij=|rx_pw_i−rd_ij| for i=0, 1 and j=0, 1, . . . , K−1.

For the j-th row in the look-up table, the UE computes the corresponding comparison result as dis_j=dis_0j+dis_1j, which is the sum of the Euclidean distance-based comparison metrics. The UE derives the minimum comparison result among all comparison results dis_j for all rows in the look-up table (j=0, 1, . . . , K−1). For instance, if dis_3=min{dis_j, j=0, 1, . . . , K−1}, dis_3 is the best comparison result, and the corresponding impinging angle $d_3$ on the array manifold is selected by the UE as the output of the look-up table. Based on the best comparison result, the UE searches over the given beam codebook and chooses the beam codeword whose steering direction is closest to $d_3$ as the final receive beam.

Figure 17:
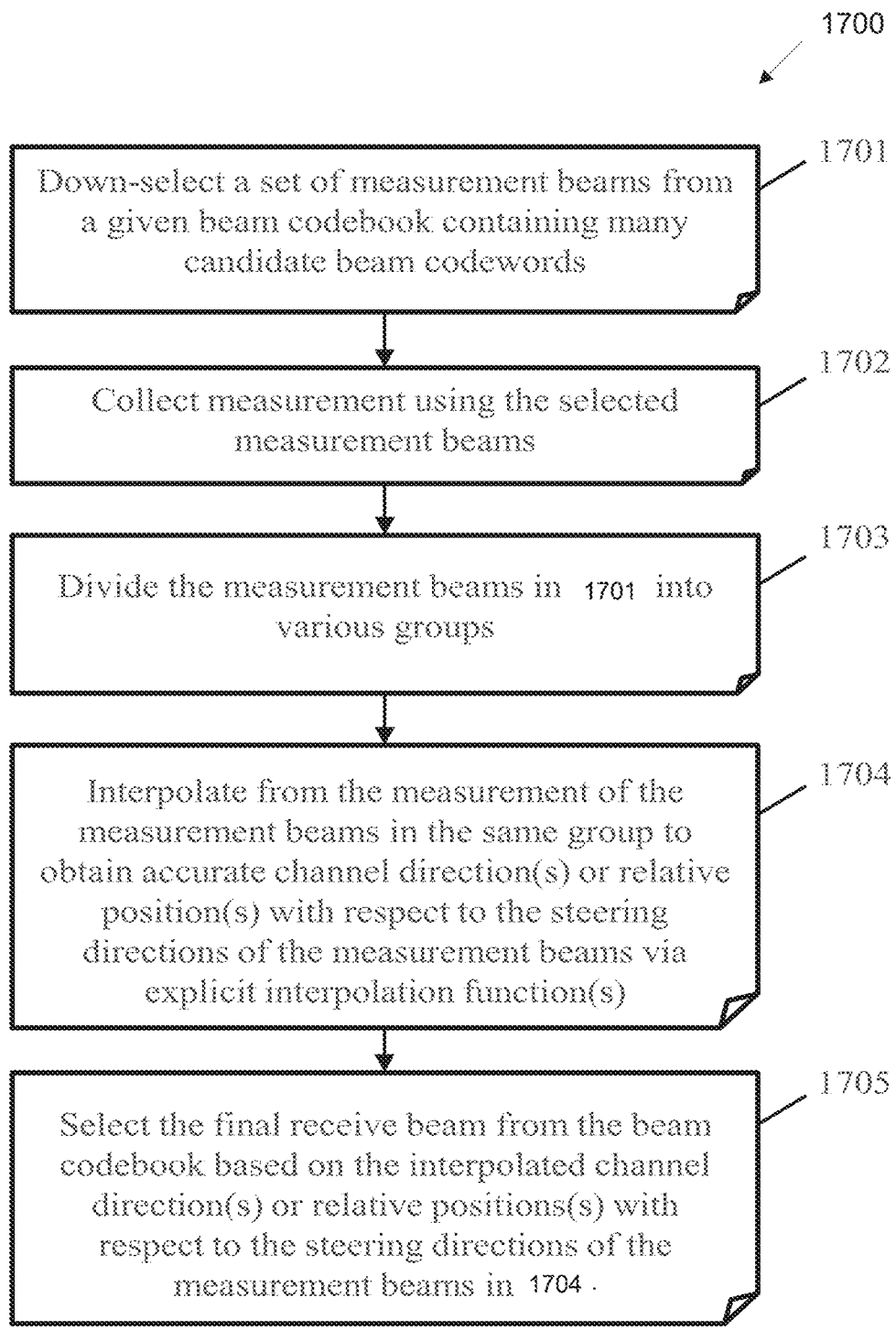
FIG. 17 illustrates a flow chart of a method for interpolation based receive beam selection executed at the UE using explicit interpolation function(s) according to embodiments of the present disclosure.

FIG. 17 illustrates a flow chart of a method 1700 for interpolation based receive beam selection executed at the UE using explicit interpolation function(s) according to embodiments of the present disclosure. An embodiment of the method 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

In another embodiment, the UE can formulate explicit interpolation function(s) to determine a receive beam from the limited measurement. In FIG. 17, an algorithm flowchart of explicit interpolation function(s) based receive beam selection design is presented. Most of the components in FIG. 17 have similar functionalities to those exhibited in FIG. 11. To facilitate the formulation of the interpolation function(s) and the corresponding interpolation operation, several additional steps are presented in steps 1703, 1704, and 1705 in FIG. 17 in contrast to FIG. 11.

As illustrated in FIG. 17, in steps 1701 and 1702, the UE executes similar operations to those in steps 1101 and 1102, as illustrated in FIG. 11, in terms of selecting the measurement beams and collecting necessary measurement using the formed measurement beams.

In step 1703, the UE divides the measurement beams into various groups. The UE can group the measurement beams following predefined strategies/patterns or based on the actual measurement. Note that different groups of measurement beams may not necessarily be disjoint such that one measurement beam may belong to different measurement beams groups.

Figure 18:
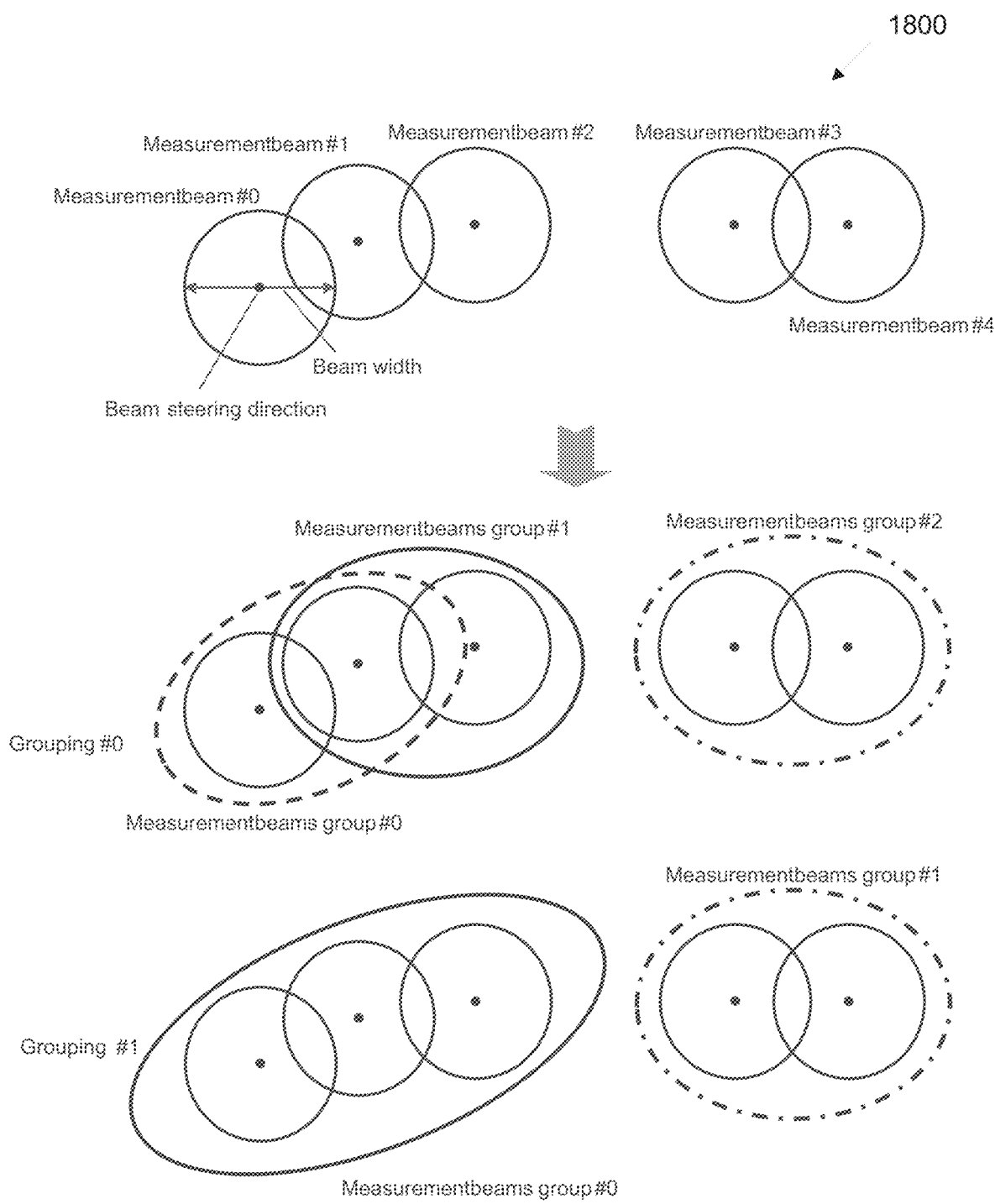
FIG. 18 illustrates an example conceptual examples of measurement beams grouping strategies according to embodiments of the present disclosure.

FIG. 18 illustrates an example conceptual examples 1800 of measurement beams grouping strategies according to embodiments of the present disclosure. An embodiment of the conceptual examples 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

As illustrated in FIG. 18, two conceptual examples are provided to illustrate the grouping strategies of the measurement beams. In these two examples (grouping #0 and grouping #1), the measurement beams are characterized by the bird's-eye views of their beam patterns. In this example, five measurement beams are considered, and the five measurement beams are measurement beams #0, #1, #2, #3 and #4. As can be seen from grouping #0, measurement beams #0 and #1 are grouped into measurement beams group #0, measurement beams #1 and #2 are grouped into measurement beams group #1, and measurement beams #3 and #4 are grouped into measurement beams group #2. For grouping #1, two measurement beams groups are formed, and the measurement beams comprise measurement beams #0, #1 and #2, and measurement beams #3 and #4, respectively.

In step 1704 as illustrated in FIG. 17, the UE leverages the well-defined interpolation function(s) and calculates the interpolation result with respect to each measurement beams group. The explicit interpolation function(s) can be formulated as functions of the received signal powers, RSRPs, RSRQs, SNRs, SINRs, and/or received signal samples collected by the measurement beams in the same measurement beams group. The formulated interpolation function(s) and the received signal powers, RSRPs, RSRQs, SNRs, SINRs, and/or received signal samples collected by the measurement beams in the same measurement beams group may need to have one-to-one correspondence. The interpolation result obtained from each measurement group may correspond to, but not limited to the channel directional information such as the angular direction(s) and/or the relative position(s) with respect to the steering directions of the measurement beams of interest.

In step 1705, the UE selects a receive beam based on the interpolation results obtained in step 1704. The UE needs to first decide the best interpolation result from one or more valid interpolation results. For instance, the UE can compute the average received signal power for each measurement beams group by averaging over the received signal powers on the corresponding measurement beams in the same group. The UE can then select the best measurement beams group with the highest average received signal power. The UE treats the interpolation result from the best measurement beams group as the best interpolation result.

If the interpolation result is the angular direction in the channel, and/or the relative position with respect to the steering directions of the measurement beams, the UE selects the receive beam from the beam codebook whose steering direction is the closest to the best interpolation result in terms of the Euclidean distance. Note that the UE may also select a set of receive beams instead of only one based on a plurality of interpolation results. Other metrics than the Euclidean distance can be exploited as well to find the final receive beam at the UE. The UE can also directly compute each entry (both amplitude and phase) in the receive beamforming vector based on the best interpolation result, rather than restricting the final receive beam from a predefined beam codebook.

Figure 19:
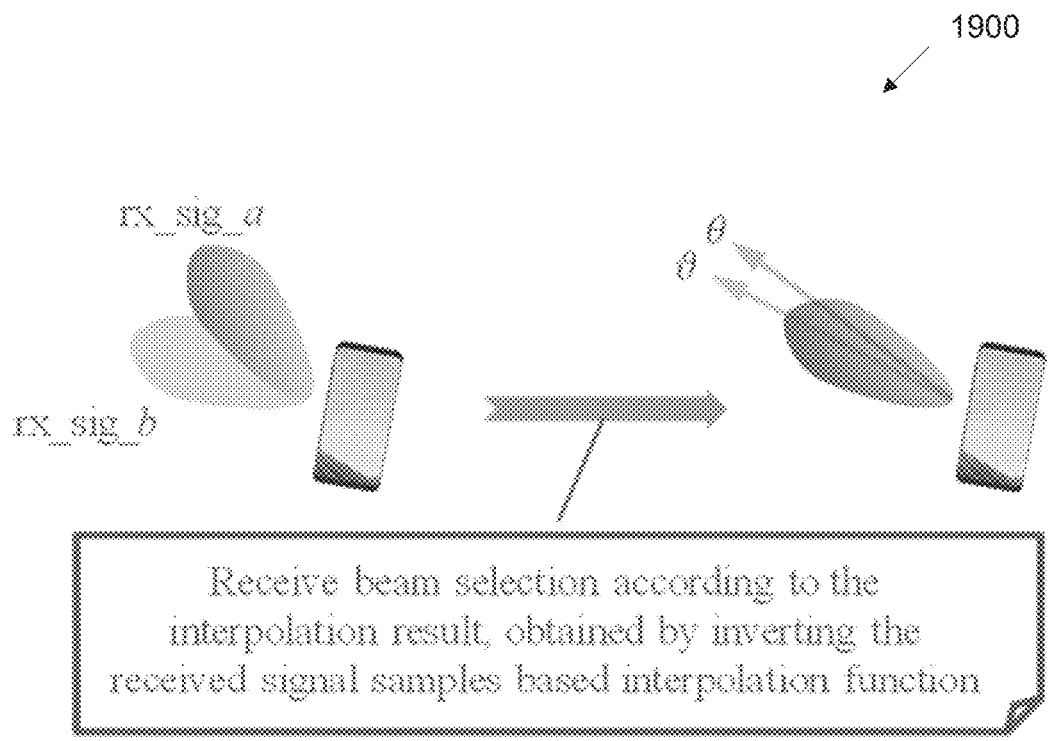
FIG. 19 illustrates an example receive beam selection based on the best interpolation result according to embodiments of the present disclosure.

FIG. 19 illustrates an example receive beam selection 1900 based on the best interpolation result according to embodiments of the present disclosure. An embodiment of the receive beam selection 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

FIG. 19 illustrates an example of receive beam selection based on the best interpolation result and the interpolation result can be obtained by inverting the corresponding interpolation function of the received signal samples As illustrated in FIG. 19, one measurement beams group containing two measurement beams is provided, denoted as measurement beam #a and measurement beam #b. Further, the structures of measurement beam #a and measurement beam #b are $$\frac{1}{\sqrt{N_t}}\left[1, \ldots, e^{-j\left(\frac{N_t}{2}-1\right)\mu}, e^{-j\left(\frac{N_t}{2}\right)\mu}, \ldots, e^{-j(N_t-1)\mu}\right]^T \text{ and}$$

$$\frac{1}{\sqrt{N_t}}\left[1, \ldots, e^{-j\left(\frac{N_t}{2}-1\right)\mu}, -e^{-j\left(\frac{N_t}{2}\right)\mu}, \ldots, -e^{-j(N_t-1)\mu}\right]^T,$$

where $N_t$ represents the total number of receive antenna elements, and $\mu$ is the steering direction.

The received signal samples on measurement beam #a and measurement beam #b as rx_sig_a and rx_sig_b are denoted. Based on the received signal samples, the UE can formulate the corresponding interpolation function as $f(\theta) = \Im\{rx\_sig\_a/rx\_sig\_b\}$, where $\theta$ is the actual channel angular direction, and $\Im\{x\}$ extracts the imaginary part of the input x. Based on the structures of measurement beam #a and measurement beam #b, the corresponding interpolation function can be further expressed as $$f(\theta) = \frac{\sin\left(\frac{N_t}{2}(\theta-\mu)\right)}{1-\cos\left(\frac{N_t}{2}(\theta-\mu)\right)} = \cot\left(\frac{N_t}{4}(\theta-\mu)\right).$$

The UE can then invert the interpolation function $f(\cdot)$ and obtain the corresponding interpolation result as $$\hat{\theta} = f^{-1}(\theta) = \mu + \frac{4}{N}\cos^{-1}\left(\frac{N_t}{4}(\theta-\mu)\right).$$

Based on the interpolation result, the UE can select a receive beam from the receive beam codebook such that the UE's steering direction $\partial$ is the closest to $\hat{\theta}$ among all other beams in the beam codebook.

Figure 20:
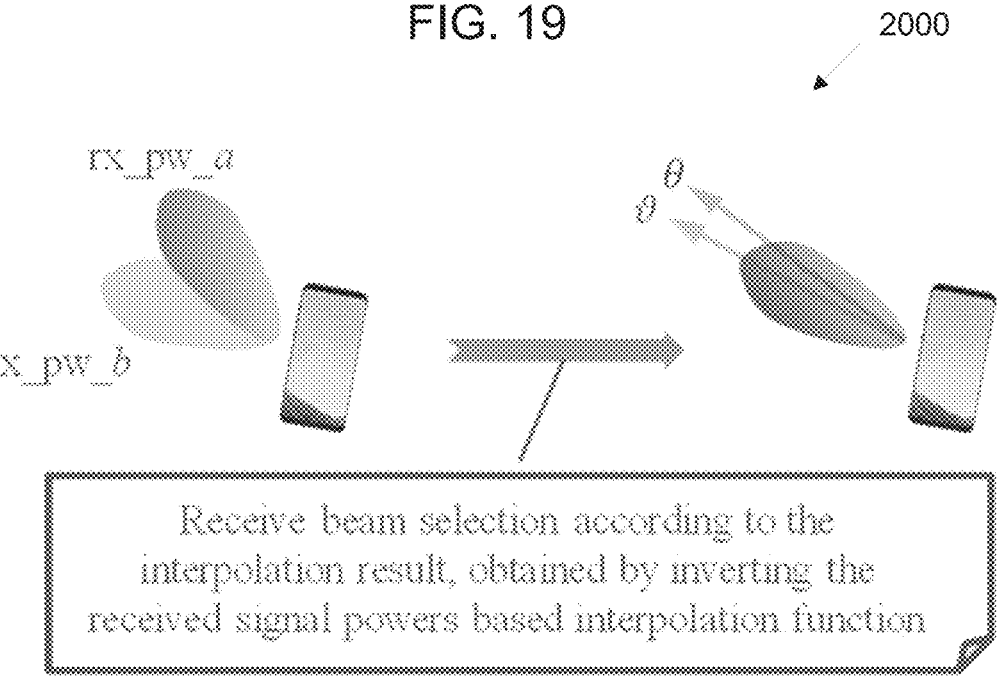
FIG. 20 illustrates another example receive beam selection based on the best interpolation result according to embodiments of the present disclosure.

FIG. 20 illustrates another example receive beam selection 2000 based on the best interpolation result according to embodiments of the present disclosure. An embodiment of the receive beam selection 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

FIG. 20 illustrates an example of receive beam selection based on the best interpolation result and the interpolation result can be obtained by inverting the corresponding interpolation function of the received signal powers.

As illustrated in FIG. 20, one measurement beams group containing two measurement beams is provided, denoted as measurement beam #a and measurement beam #b. Further, the structures of measurement beam #a and measurement beam #b are $$\frac{1}{\sqrt{N_t}}\left[1, e^{-j\mu_a}, \ldots, e^{-j\left(\frac{N_t}{2}-1\right)\mu_a}, e^{-j\left(\frac{N_t}{2}\right)\mu_a}, \ldots, e^{-j(N_t-1)\mu_a}\right]^T \text{ and}$$

-continued $$\frac{1}{\sqrt{N_t}}\left[1, e^{-j\mu_b}, \ldots, e^{-j\left(\frac{N_t}{2}-1\right)\mu_b}, e^{-j\left(\frac{N_t}{2}\right)\mu_b}, \ldots, e^{-j(N_t-1)\mu_b}\right]^T,$$

where $\mu_a$ and $\mu_b$ are the steering directions of beam #a and beam #b. The received signal powers on measurement beam #a and measurement beam #b as rx_pw_a and rx_pw_b are further denoted. Based on the received signal powers, the UE can formulate the corresponding interpolation function as $f(\theta)=(\text{rx\_pw\_a}-\text{rx\_pw\_b})/(\text{rx\_pw\_a}+\text{rx\_pw\_b})$, where $\theta$ is the actual channel angular direction. If $\mu_a=\mu-\delta$ and $\mu_b=\mu+\delta$, the interpolation function can be rewritten as $$f(\theta) = -\frac{\sin(\theta-\mu)\sin(\delta)}{1-\cos(\theta-\mu)\cos(\delta)}.$$

The UE can then invert the interpolation function $f(.)$ and obtain the corresponding interpolation result as $$\hat{\theta} = f^{-1}(\theta) = \mu - \sin^{-1}\left(\frac{f(\theta)\sin(\delta)-f(\theta)\sqrt{1-f^2(\theta)}\sin(\delta)\cos(\delta)}{\sin^2(\delta)+f^2(\theta)\cos^2(\delta)}\right).$$

Based on the interpolation result, the UE can select a receive beam from the receive beam codebook such that the UE's steering direction ∂ is the closest to $\hat{\theta}$ among all other beams in the beam codebook.

In the examples shown in FIGS. 19 and 20, the measurement beams groups of interest contain only two measurement beams. Note that the measurement beams group can include more than two measurement beams. Further, the explicit interpolation function(s) may have different forms from those derived in the previous two examples. The exact form of the interpolation function(s) may also depend on the beam pattern, radiation pattern, antenna array structure, the size of the measurement beams group, and other design requirements.

For instance, the explicit interpolation function(s) can be constructed by exploiting the manifold separation technique (MST). The MST exploits the wave-filed modeling formalism to model the steering vector of any array configurations as the product of a sampling matrix and a Vandermonde-structured angular vector. Hence, the MST is capable of applying the provided explicit interpolation function(s) for uniform linear array (such as the examples presented in FIG. 19 and FIG. 20) to arbitrary array configurations and beam patterns. To summarize, the MST based interpolation function(s) construction is very useful in selecting the appropriate receive beam for many practical implementation scenarios such as non-uniform arbitrary array configurations, non-DFT-type arbitrary beam patterns, phase and amplitude impaired beam patterns, and other types of impaired beam patterns due to hardware imperfection.

In the following, three application scenarios of the provided interpolation based fast receive beam selection methods are provided.

In one example of application scenario 1, a fast receive beam selection under unknown TCI state switch is provided.

Figure 21:
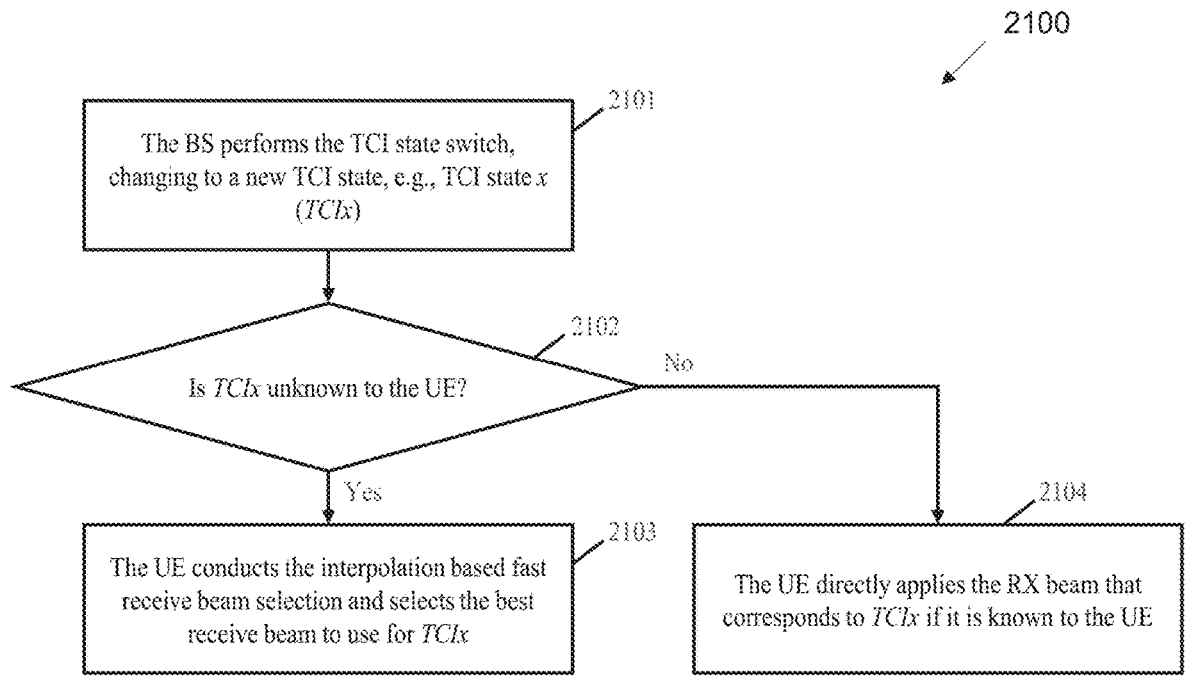
FIG. 21 illustrates a flow chart of a method for interpolation based fast receive beam selection to better support unknown TCI state switch according to embodiments of the present disclosure.

FIG. 21 illustrates a flow chart of a method 2100 for interpolation based fast receive beam selection to better support unknown TCI state switch according to embodiments of the present disclosure. An embodiment of the method 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions.

Due to sudden link failure, blockage and etc., the BS or the network may change the TCI state, and send the corresponding command to the UE to inform the UE about the switched TCI state. If the switched TCI state is unknown to the UE such that the UE has never measured the switched TCI state before, or the last measurement is completely obsolete, the UE may have to perform a full receive beam sweep to find a receive beam for the switched TCI state. To reduce the search complexity, access delay, and outage rate, the provided interpolation based fast receive beam selection strategy can be applied here.

The aforementioned procedure is characterized by the algorithm flow-chart shown in FIG. 21. As illustrated in FIG. 21, in 2101, the BS switches the TCI state to a new TCI state, say, TCI state x (TCIx). In step 2102, the UE checks whether the switched TCI state, i.e., TCIx, is known. If TCIx is known to the UE, the UE directly applies the receive beam corresponding to TCIx for communication. If TCIx is unknown to the UE, the UE would perform the provided interpolation-based beam search method to quickly find a receive beam for TCIx.

In one example of application scenario 2, a fast receive beam selection during initial access is provided.

Figure 22:
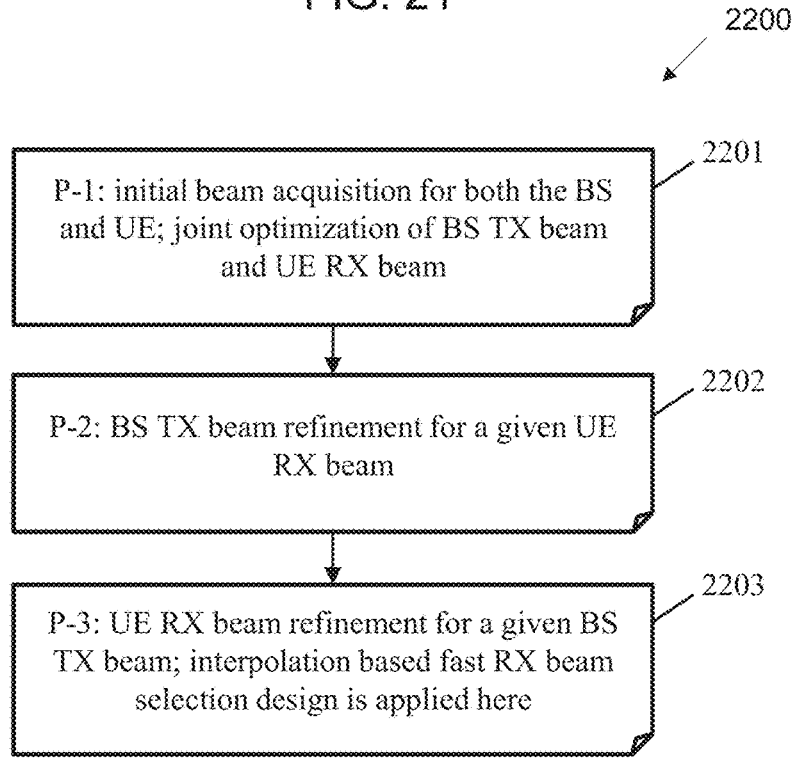
FIG. 22 illustrates a flow chart of a method for interpolation based fast receive beam selection strategies according to embodiments of the present disclosure.

FIG. 22 illustrates a flow chart of a method 2200 for interpolation based fast receive beam selection strategies according to embodiments of the present disclosure. An embodiment of the method 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

FIG. 22 illustrates interpolation based fast receive beam selection strategies provided in this disclosure can be applied to P-3 in the initial access, i.e., receive beam refinement for a given BS transmit beam In the third phase during the initial access process (p-3), the UE refines the receive beam by means of receive beam sweep/search over the given angular space. By implementing the provided interpolation based fast receive beam search strategy at the UE, the receive beam refinement in p-3 can be facilitated, and the corresponding initial access delay can be reduced.

In FIG. 22, the overall procedure of the initial access process is presented. In step 2201, which corresponds to p-1 in the initial access process, the BS and UE conducts the initial TX and RX beams alignment. In step 2202, which corresponds to p-2 in the initial access process, the BS refines the transmit beam for a given receive beam. Note that the operations conducted in step 2201 and step 2202 by either the BS or the UE follow those defined in the 3 GPP specifications and/or prior art. In step 2203 in FIG. 22, the propose interpolation based receive beam selection strategies are applied to facilitate the UE RX beam refinement process.

In one example of application scenario 3, a directional beamforming based inter-cell measurement for handover, RRC re-connection, RRC re-establishment and etc. is provided.

To perform the inter-cell measurement for many mobility configurations such as handover, RRC re-connection and RRC re-establishment, the UE may need to form narrow measurement beams to ensure sufficient link quality. Especially when the target cell/target cell's TCI state is unknown to the UE, a relatively large number of narrow measurement beams may be needed to cover the entire angular range, and help the UE identify the best target cell/target cell's TCI state to connect or camp on. Sweeping over all the narrow measurement beams may be time and power consuming and may also introduce additional access delay. Obviously, the provided interpolation based fast beam selection strategy can be applied here as well to facilitate the inter-cell measurement process.

Figure 23:
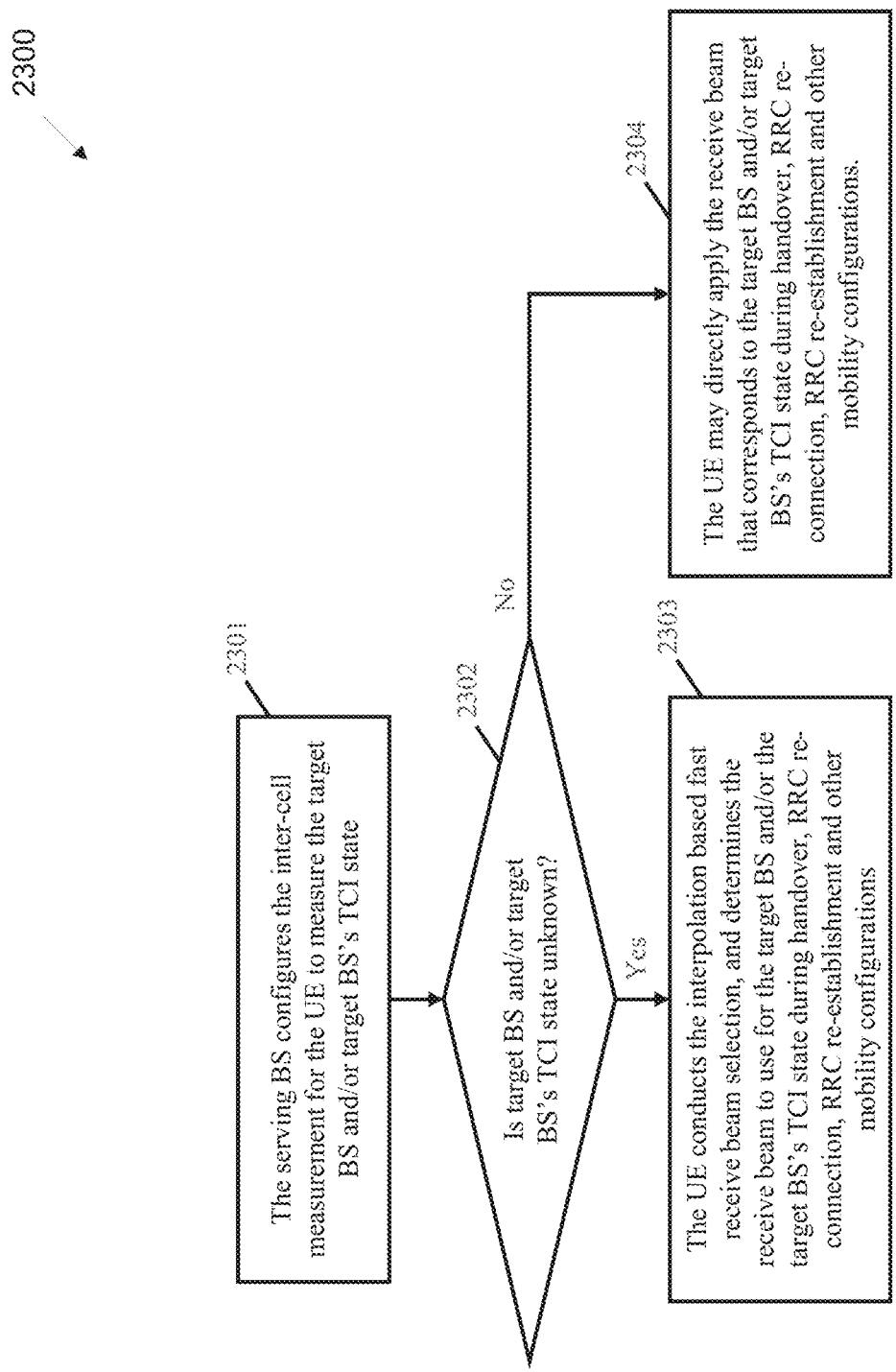
FIG. 23 illustrates a flow chart of a method for interpolation based fast receive beam selection to better support inter-cell measurement for handover, RRC re-connection, RRC re-establishment and other mobility configurations according to embodiments of the present disclosure.

FIG. 23 illustrates a flow chart of a method 2300 for interpolation based fast receive beam selection to better support inter-cell measurement for handover, RRC re-connection, RRC re-establishment and other mobility configurations according to embodiments of the present disclosure. An embodiment of the method 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions.

As illustrated in FIG. 23, an algorithm flow-chart is presented to better illustrate the interpolation based receive beam selection for the inter-cell measurement. In strep 2301, the serving BS sends certain inter-cell measurement command to the UE; upon receiving the command, the UE conducts the inter-cell measurement for the target BS and/or target BS's TCI state. In step 2302, the UE checks whether the target BS and/or the target BS's TCI state is known or unknown to the UE.

By unknown, the target BS and/or the target BS's TCI state may not be measured by the UE before, or the last measurement is outdated. If the target BS and/or the target BS's TCI state is unknown to the UE (as illustrated in step 2303), the UE could apply the interpolation based method to quickly identify the receive beam to use for the target BS and/or target BS's TCI state during handover, RRC re-connection, RRC re-establishment and other mobility configurations. Otherwise (as illustrated in step 2304), the UE could directly apply the correspondence receive beam to the known target BS and/or target BS's TCI state during handover, RRC re-connection, RRC re-establishment and other mobility configurations.

In step 1101 as illustrated in FIG. 11, the measurement beams are uniformly selected from the given beam codebook without exploiting prior knowledge of the channel, past measurement and etc. In the second embodiment of this disclosure, it is assumed that the measurement beams can also be selected based on some prior knowledge of the channel condition, past measurement, protocol states and etc. For instance, if the UE detects or obtains information that the channel has strong line-of-sight components towards certain angular directions, the UE may form more measurement beams towards these directions to acquire more accurate channel directional information with satisfactory link quality, which may be useful in quickly identifying the appropriate receive beam(s) for data communication in a later phase.

Such prior knowledge of the channel condition, past measurement, protocol states and etc. includes but not limited to, channel covariance matrix, average channel gain, time-frequency selectivity of the channel, the exact time of the last measurement, reference channel direction and reference beam derived from the past measurement. For instance, the UE could apply the steering direction of the receive beam for the past TCI state as the reference direction, surrounding which the new measurement beams can be formed to help the UE select the appropriate receive beam for the new TCI state, which may not even be measured before. For another example, the UE could also form a set of measurement beams surrounding the current receive beam to measure and/or track the channel direction/angle variations and selects the appropriate receive beam steering towards the tracked channel direction/angle.

Also, in the aforementioned embodiment, the look-up table used in the beam interpolation methods (as illustrated in FIGS. 14, 15, and 16) could be updated in a dynamic or semi-static manner. Dynamically or semi-statistically updating the look-up table may be necessary because (i) the UE may dynamically change the employed beam codebook according to the deployment scenario, protocol state and other design factors, and (ii) the measurement beams and the final selected receive beam may not necessarily come from the same beam codebook.

An alternative to dynamically or semi-statically updating the look-up table is to generate and store multiple look-up tables at the terminal for various deployment scenarios. For instance, the UE may implement all the look-up tables (as shown in TABLES 3, 4, 5, and 6) derived in the first embodiment of this disclosure. If the employed beam codebook is updated or changed very often by the UE (e.g., because the channel significantly varies), the UE may use TABLE 4 to first determine the best angular direction of the channel, and then select a receive beam that matches the best channel direction the most from the (new) beam codebook.

Otherwise, the UE may use TABLE 3 to directly output a receive beam, which may have a lower processing complexity. The UE may also implement multiple versions of a given look-up table (e.g., TABLE 3) derived in the first embodiment of this disclosure. For instance, the UE may have implemented a beam codebook with multiple tiers with each tier having a set of beams, and different tiers may correspond to different beamwidths. In this case, different look-up tables may be constructed for different tiers of beam codewords (and therefore, different beamwidths), though the look-up tables follow the same look-up table structure (e.g., TABLE 3). For relatively low received SNR, the UE may search for the receive beam with relatively small beamwidth. In this case, the look-up table constructed using narrow candidate measurement beams could be used to help the UE interpolate a receive beam.

Figure 24:
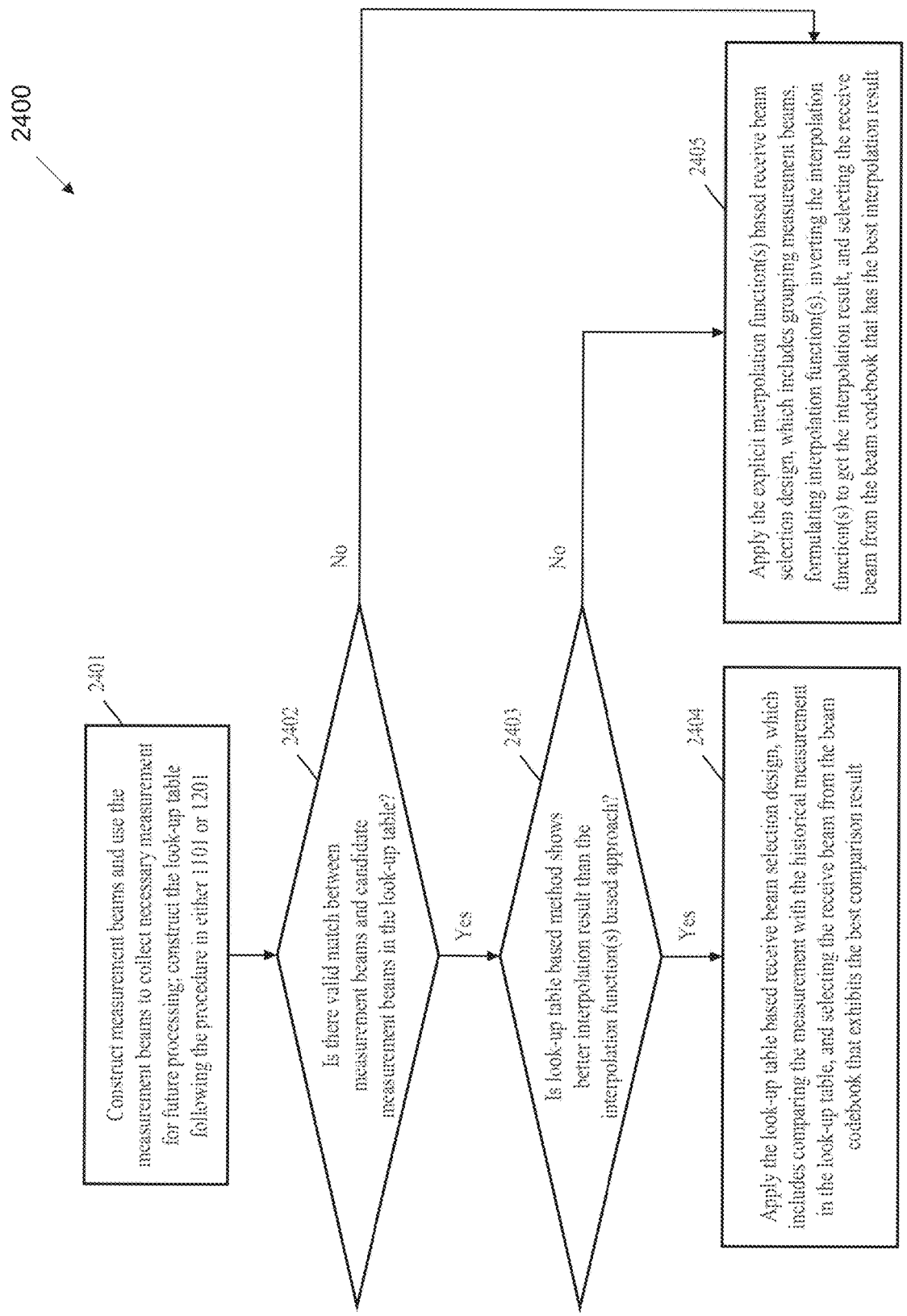
FIG. 24 illustrates a flow chart of a method for hybrid look-up table based and explicit interpolation function(s) based receive beam selection strategy according to embodiments of the present disclosure.

FIG. 24 illustrates a flow chart of a method 2400 for hybrid look-up table based and explicit interpolation function(s) based receive beam selection strategy according to embodiments of the present disclosure. An embodiment of the method 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions.

FIG. 24 illustrates an algorithm flow-chart of a hybrid look-up table based and explicit interpolation function(s) based receive beam selection strategy and the UE is able to choose between the look-up table and explicit function(s) based methods based on various design criteria In the aforementioned embodiment, the UE can choose between the look-up table-based interpolation method and the explicit interpolation function(s) based interpolation strategy according to various design criteria and practical implementation requirements. In FIG. 24, the algorithm flow-chart of the provided hybrid receive beam selection strategy is presented.

As illustrated in FIG. 24, in step 2401, the UE forms the measurement beams and collect necessary measurement by using the measurement beams. This part of procedure is similar to those presented in step 1101, 1102, 1601, and 1602, as illustrated in FIGS. 11 and 16, respectively. Further, the UE also constructs the look-up table that maps each valid combination of candidate measurement beams along with their historical measurement to a suggested receive beam or a channel direction. This part of procedure is similar to those discussed in step 1301 and 1501, as illustrated in FIGS. 13 and 15, respectively.

As illustrated in FIG. 24, in step 2402, the UE checks whether all of the candidate measurement beams corresponding to the actual measurement beams have valid entries in the look-up table. For instance, assume that the actual measurement beams are {RX beam #4, RX beam #6} selected from the beam codebook. If any of the candidate measurement beams {RX beam #4, RX beam #6} does not have valid entry in the look-up table (e.g., "X" in TABLE 1 and TABLE 2), the UE would apply the explicit interpolation function(s) based receive beam selection design (step 2405 in FIG. 24). Note that the UE may also apply other conditions in step 2402 to check whether the look-up table is valid for selecting the final receive beam based on the actual measurement. If all the conditions in step 2402 are met, i.e., the look-up table has valid entries and can be used for selecting the receive beam, the UE then checks the conditions in step 2403 and proceeds to the rest of the algorithm procedure.

In step 2403, the UE decides between the look-up table-based interpolation method and the explicit function(s) based interpolation design to select the final receive beam. For one example, the UE compares the average received signal power over all measurement beams with a predetermined threshold. If the average received signal power is larger than the threshold, the UE may choose to formulate explicit interpolation function(s) of the measurement, and use the best interpolation result to select the receive beam (step 2405).

Otherwise, the UE may rely on the look-up table to select a receive beam (step 2404). For another example, it may become difficult to ensure the one-to-one correspondence between the interpolation function and the channel direction, or even formulate the interpolation function because of the impairment in the beam pattern, radiation pattern, and/or antenna array architecture. In this case, the UE would choose the look-up table-based interpolation method to select a receive beam.

Detailed design procedure of the look-up table based and the explicit interpolation function(s) based design approaches (steps 2404 and 2405) can be found in FIGS. 14, 15, and 16.

In one example of use case 1, a fast receive beam selection under unknown TCI state switch is provided.

Due to a sudden link failure, blockage and etc., the BS or the network may change the TCI state, and send the corresponding command to the UE to inform the UE about the switched TCI state. If the switched TCI state is unknown to the UE such that the UE has never measured the switched TCI state before, or the last measurement is completely obsolete, the UE may have to perform a full receive beam sweep to find a receive beam for the switched TCI state. To reduce the search complexity, access delay, and outage rate, the provided interpolation based fast receive beam selection strategy can be applied here.

In one example of use case 2, a fast receive beam selection during initial access is provided.

In the third phase during the initial access process (p-3), the UE refines the receive beam by means of receive beam sweep/search over the given angular space. By implementing the provided interpolation based fast receive beam search strategy at the UE, the receive beam refinement in p-3 can be greatly facilitated, and the corresponding initial access delay can be significantly reduced.

In one embodiment of use case 3, a directional beam-forming based inter-cell measurement is provided.

To perform the inter-cell measurement, the UE may need to form narrow measurement beams to ensure sufficient link quality. A relatively large number of narrow measurement beams may be needed to cover the entire angular range. Sweeping over all the narrow measurement beams may be time and power consuming and may introduce additional delay. Obviously, the provided interpolation based fast beam selection strategy can be applied here as well to facilitate the inter-cell measurement process.

In one embodiment of use case 4, a beam search in several mobility scenarios such as handover, RRC re-connection and RRC re-establishment is provided.

In many mobility configurations such as handover and RRC re-connection/re-establishment, receive beam search is usually executed at the UE to find the best cell/beam to connect or camp on. If the target cell or target frequency is unknown to the UE such that the target cell or the target frequency is never measured by the UE before or the last measurement is completely obsolete, full receive beam search may be needed to properly handle various mobility conditions. Hence, the provided interpolation based receive beam search algorithm can be used here to better support the UE beam operation under various mobility scenarios.

The provided interpolation-based method can support fast and accurate receive beam search, which is one of the components to realize the beam operation/management at the UE. The provided algorithm is easy to implement and can be used in various deployment scenarios and protocol states. Hence, it is highly likely that the provided design approach would be implemented in the Samsung mobile terminal to enable better beam optimization performance at higher frequencies.

In the present disclosure, several new and effective analog receive beam operation methods are provided for the terminal by exploiting a plurality of digital domain signal processing techniques. In the provided strategies, the UE first forms a set of analog measurement beams to collect necessary measurement such as the received signal samples (first-level processing). The UE then digitally processes the said measurement and generates one or more digital outputs (second-level processing). The digital output may correspond to an estimate of the channel state information, such as the channel angle information (or the signal's angle of arrival). The digital output, or the digital domain processing gain, in turn, is exploited by the UE to further optimize the beam operation/management process/procedure in the analog domain (third-level processing) for various deployment settings.

In the present disclosure, the UE uses few analog measurement beams with each of them having a relatively wide beamwidth to scan a given angular space/range and collect necessary measurement. For instance, the measurement beams could be selected from a low-resolution beam codebook predetermined by the UE. Further, multiple radio frequency (RF) chains and/or multiple antenna panels are equipped at the UE.

Figure 25:
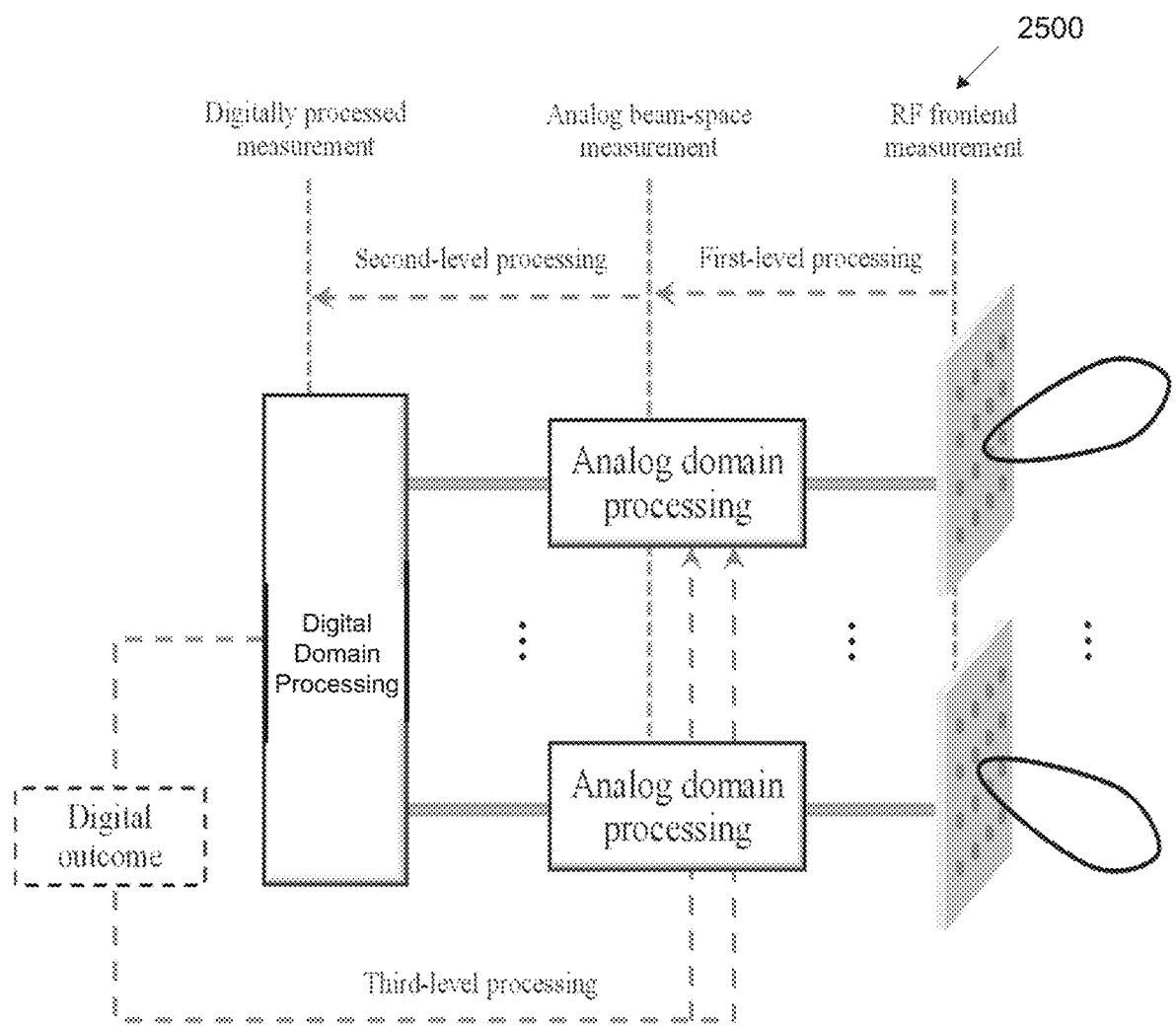
FIG. 25 illustrates an example digital domain processing assisted analog domain beam operation/management according to embodiments of the present disclosure.

FIG. 25 illustrates an example digital domain processing 2500 assisted analog domain beam operation/management according to embodiments of the present disclosure. An embodiment of the digital domain processing 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions.

It can be seen from FIG. 25 that multiple analog measurement beams can be simultaneously formed by the UE using multiple RF chains/antenna panels. Using FIG. 25, the basic design procedure of the provided algorithms is provided as follows. At first, the RF frontend measurement is processed by the simultaneously probed analog receive beams, resulting in analog beam-space measurement. The analog beam-space measurement is then processed by a plurality of digital processing units/modules, generating necessary performance indicator(s)/metric(s) such as high-resolution channel estimate, which is referred to as the digital output/outcome in the present disclosure.

The digital output/outcome can also be interpreted as the digital domain processing gain because the digital domain processing can be executed by the UE much faster than the counterpart in the analog domain, and it is not limited by the phase and amplitude quantization resolutions. The UE exploits the digital domain processing gain to optimize the analog beam operation strategies for various deployment scenarios. Different from the conventional analog receive beam operation/management methods, the provided algorithms in this disclosure incorporate a new feedback channel between the digital and analog domains (as illustrated in FIG. 25), conveying the new digital output/outcome. By exploiting the new feedback channel, and therefore, the additional digital domain processing gain, it is expected that a better analog beam operation/management performance such as improved analog beam tracking accuracy with reduced latency can be achieved at the terminal.

Note that in the provided methods, the access delay and implementation complexity are still mainly from sweeping the analog measurement beams during the first-level processing, though an additional second-level digital domain processing is introduced for performance enhancement. As the provided methods are able to use relatively wide analog measurement beams to scan a given angular range and collect necessary measurement, the methods can significantly reduce the corresponding power consumption, access delay and/or other implementation complexity relative to the conventional beam search strategies, meanwhile providing promising beam operation/management performance for various application scenarios.

Further, all the provided embodiments/methods in this disclosure can be equally applied/extended to the base station for the network side beam operation/management optimization. For instance, the base station could first form few analog measurement beams in the uplink to receive the SRS sent from the UE and collect the necessary RF frontend measurement. The base station then computes the corresponding analog beam-space measurement and processes the said analog beam-space measurement in the digital domain with predefined digital signal processing algorithm(s).

The corresponding digital output obtained from the digital domain processing is exploited by the base station or the network controller to further optimize the analog beam operation/management procedure. For instance, if the digital output corresponds to a high-resolution angle estimate of the uplink channel, the base station may select the beam codeword whose steering direction is the closest to the estimated angle from the predetermined beam codebook as the downlink beamforming vector to transmit the data signals to the UE.

In the present disclosure, several receive beam selection and operation strategies are provided, targeting at finding one or more analog receive beams for the UE under a variety of settings meanwhile reducing the access delay and computational complexity. The UE forms a set of relatively wide analog receive beams, e.g., selected from a low-resolution beam codebook, to collect necessary measurement, e.g., received signal samples, for further processing. The UE processes the said measurement, i.e., the analog beam-space measurement, in the digital domain using one or more digital signal processing techniques, and outputs a digital outcome.

The digital outcome may correspond to a high-resolution estimate of the channel and/or other necessary performance metrics/indicators and may be exploited by the UE in a later phase to further optimize the beam operation/management strategies in the analog domain for various application scenarios. As discussed extensively before, the provided beam selection and operation strategies here at the terminal side can be equally applied/extended to the base station or the network side for their analog beam operation/management optimization.

Figure 26:
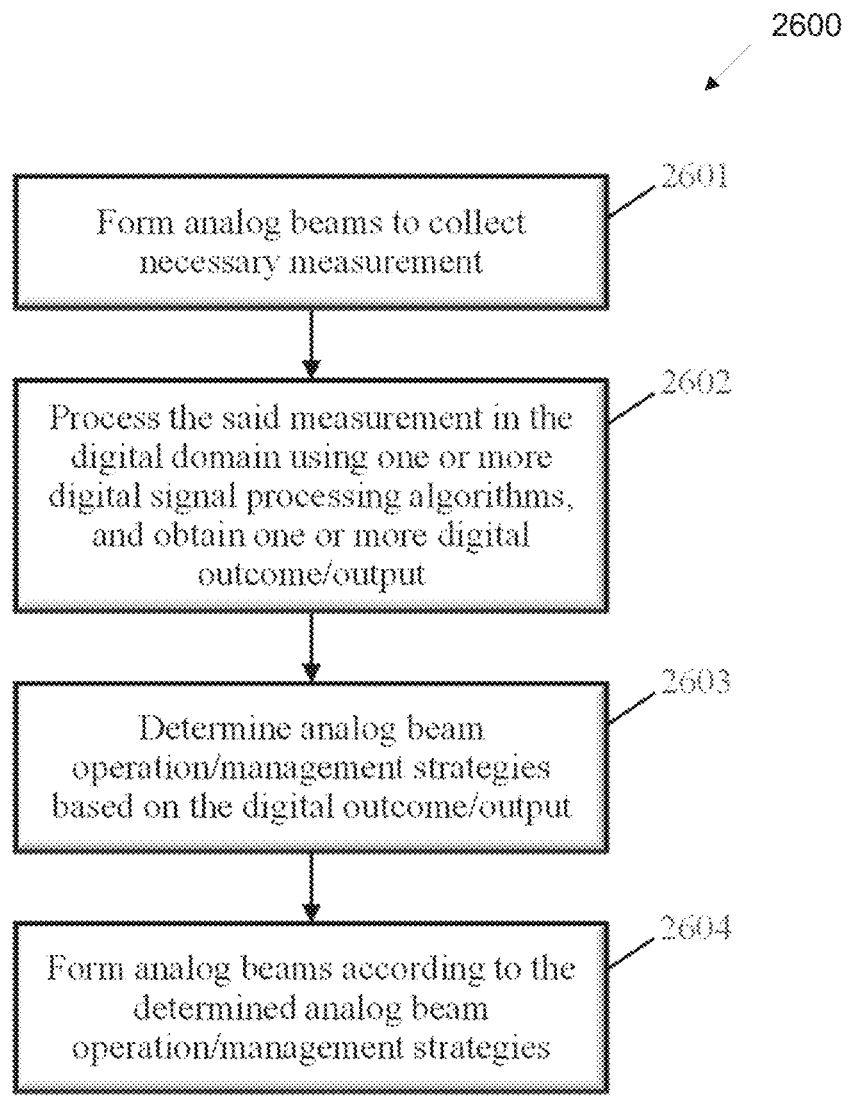
FIG. 26 illustrates a flow chart of a method for analog beam measurement, measurement processing using digital signal processing algorithms, and digital domain processing assisted analog domain beam operation/management according to embodiments of the present disclosure.

FIG. 26 illustrates a flow chart of a method 2600 for analog beam measurement, measurement processing using digital signal processing algorithms, and digital domain processing assisted analog domain beam operation/management according to embodiments of the present disclosure. An embodiment of the method 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions.

In one embodiment, a sequence of operations illustrated in FIG. 26 are performed by the UE to obtain one or more analog receive beams. The components of the provided algorithm include forming analog receive beams to collect necessary measurement, digitally processing the analog beam-space measurement to obtain the digital output/outcome, deciding the analog beam operation/management strategies based on the digital output and the deployment scenario, and forming one or more analog beams according to the beam operation/management strategies.

As illustrated in FIG. 26, in step 2601, the UE constructs a set of measurement beams in the analog domain. The measurement beams can be chosen from a given beam codebook, selected as a subset of beams from a plurality of beams, or dynamically configured (both amplitudes and phases) by the UE according to certain design criteria. For example, without any prior knowledge of the channel condition, the measurement beams could correspond to all the beam codewords in the given analog beam codebook, or the measurement beams could be uniformly selected from the given beam codebook.

For instance, the UE may apply the beam codewords with even beam indices in the beam codebook as the measurement beams. The UE could also apply the beam codewords with odd beam indices in the beam codebook as the measurement beams, depending on practical requirement. One or more combinations of the beams in the beam codebook can be used by the UE as the measurement beams as well. The distribution of the measurement beams may not necessarily be uniform within the beam codebook even assuming no prior knowledge of the channel condition.

For example, the UE could randomly choose the measurement beams from the given beam codebook. For another example, the UE could simply select the first half or the second half of the beam codewords in the beam codebook as the measurement beams targeting at different angular ranges. For another example, the UE could select the measurement beams in a sequential manner such that the UE first forms one or more measurement beams to collect necessary measurement, and then forms one or more measurement beams based on the measurement from the previously formed one or more measurement beams. The overall computational complexity of the provided algorithm may highly depend on the number of analog measurement beams used to scan the given angular space/range, and therefore, the beamwidth (wide or narrow) of the analog measurement beams.

Also, in step 2601, the UE uses the analog measurement beams to receive necessary data and/or reference signal transmitted from the base station. The measurement beams may be formed by the UE in a time-division multiplexing (TDM) manner. If multiple RF chains and/or antenna panels are equipped at the UE, multiple analog measurement beams may be simultaneously formed by the UE for a given time instant. Upon receiving the data and/or reference signal transmitted from the base station, the UE may compute the received signal strengths, reference signal received powers (RSRPs), reference signal received qualities (RSRQs), signal-to-noise ratio (SNR), signal-to-interference-plus-noise ratio (SINR) and etc., and treats one of them, several of them, or all of them as the necessary measurement for further processing. The UE may also simply treat the received signal samples across all analog measurement beams as the necessary measurement for further processing. In the present disclosure, the received signal samples over all analog measurement beams are referred to as the analog beam-space measurement.

In step 2602, the UE processes the analog beam-space measurement obtained in step 2601 using digital domain signal processing techniques. One design target of the digital processing in this disclosure is to assist the analog domain beam operation/management optimization in the third-level processing. The digital domain processing techniques include but are not limited to, matched filtering and maximum ratio combining. In this disclosure, the digitally processed measurement could be referred to as digital output or digital outcome. The digital output/outcome may correspond to high-resolution channel estimate such as the channel angle information estimate, error rate prediction, throughput and etc. Note that the digital processing could be executed much faster by the UE than the counterpart in the analog domain, which may have marginal impact on the overall implementation complexity and latency performances.

In step 2603, the UE exploits the digital output/outcome from step 2602 to optimize the analog beam operation/management for various deployment scenarios. For instance, the digital output from step 2602 could be one or more angle estimates of the channel, and the corresponding analog beam operation/management strategy could be selecting the analog beams, say, from a given beam codebook, whose steering directions are the closest to the estimated angles, to receive the payload data. Given the angle estimates of the channel, the analog beam operation/management strategy could also be forming a cluster of analog beams, e.g., selected from a given beam codebook, surrounding the estimated channel angles to collect more necessary measurement for further processing.

For another example, the analog beam operation/management strategy could be adjusting the beamwidth of the analog beams according to the digital output/outcome. For analog receive beam tracking under mobility, by exploiting the digital output, the UE could be able to adjust their tracking frequency to better tradeoff the link quality and tracking overhead/latency. Note that other analog beam operation/management strategies are also possible for various deployment scenarios such as initial access, inter-cell measurement, TCI state switch and etc., depending on the explicit content of the digital output.

In step 2604, the UE forms one or more analog beams following the decision of the analog beam operation/management in step 2603. The UE could use the formed analog beams to receive the payload data from the base station. The UE could also apply the formed analog beams to receive the reference signal transmitted from the base station and collect any necessary measurement for further processing. Note that the formed analog beams in step 2604 may serve other purposes depending on the deployment scenario.

Figure 27:
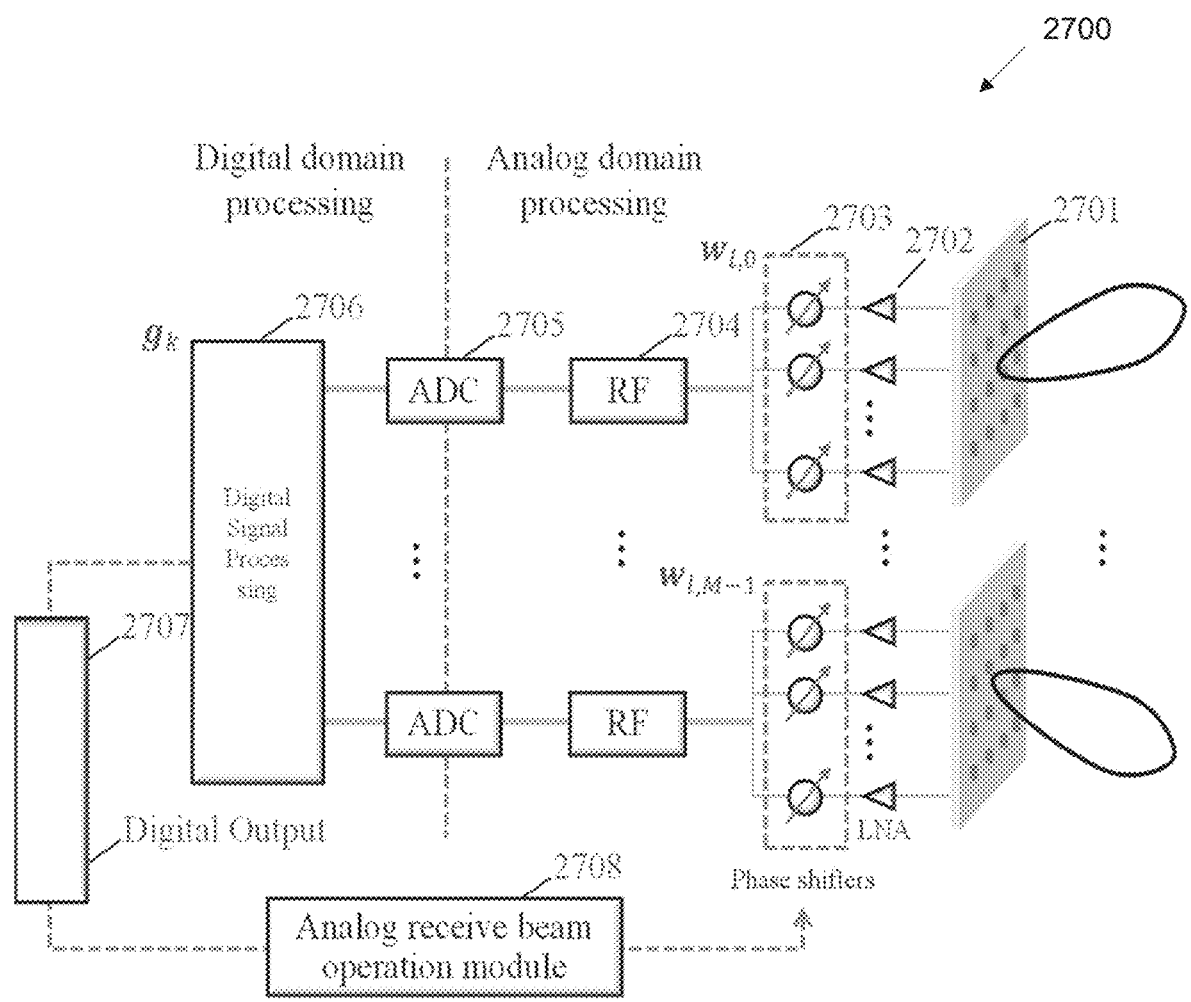
FIG. 27 illustrates an example receiver architecture of analog beam measurement and digital domain measurement processing according to embodiments of the present disclosure.

FIG. 27 illustrates an example receiver architecture of analog beam measurement and digital domain measurement processing 2700 according to embodiments of the present disclosure. An embodiment of the receiver architecture of analog beam measurement and digital domain measurement processing 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions.

As illustrated in FIG. 27, a general receiver architecture comprising of both analog domain and digital domain processing modules/units is presented. Multiple RF chains/antenna panels (M) are used to simultaneously form multiple analog beams to collect necessary measurement. In this example, the analog beams are generated by adjusting the weights of the phase shifters, which in practice, are usually quantized with limited resolution (e.g., 5 bits quantization). The digital domain processing, however, is not limited by either the phase or amplitude quantization resolution and can be executed much faster than the counterpart in the analog domain.

In block 2701, multiple antenna arrays/panels are equipped at the receiver. Each antenna array/panel contains multiple antenna elements with each of them separating apart with a certain distance d, which may correspond to half of the wavelength of a given carrier frequency. The antenna elements may be cross-polarized and used to cover both the elevation and azimuth domains. In this example, uniform linear arrays (ULAs) are assumed with co-polarized antenna elements.

Note that the provided solutions in this disclosure can be generalized to uniform planar arrays (UPAs) with cross-polarized antenna elements, or arbitrary array structures with moderate modifications. Further, the antenna panels could be placed at various positions in a mobile terminal. For instance, the antenna arrays/panels could be placed close to each other such that their boresights are separated by dN, where N represents the number of antenna elements on each antenna panel/array in either the azimuth or elevation domain.

In block 2702, a cluster of low noise amplifiers (LNPs) are deployed to increase the power of the signal without significantly degrading the SNR. Note that the provided design approaches in this disclosure could be applied to the case where the antenna modules are placed far apart from each other such that the distance between their boresights is larger than dN. In this case, the analog beam operation/management performance may be subject to: (i) the distance between their boresights; and (ii) whether the simultaneously probed analog measurement beams corresponding to the identical beam codeword or different beam codewords in the given beam codebook.

In block 2703, M clusters of phase shifters are equipped at the UE with each cluster corresponding to a separate RF chain and/or antenna panel, as depicted in FIG. 27. The analog beams could be generated by adjusting the weights of the phase shifters. In practical implementation, the phase shifters are usually quantized with limited resolution. For instance, assuming a 5-bit resolution for uniform quantization, a total of 32 candidate phases uniformly distributed within a given range could be generated and applied by each of the phase shifter. The exact phases used by the phase shifters in the same set could be different. In some settings, the exact phases used by the phase shifters in the same set could be identical (e.g., to generate discrete Fourier transform (DFT) type analog beams).

As ULAs with co-polarized antenna elements are assumed in this example, the analog beam $w_{l,m} \in \mathbb{C}^{N \times 1}$ generated by the m-th RF chain can be expressed as $$w_{l,m} = \frac{1}{\sqrt{N}} \left[ a_{l,m,0}, a_{l,m,1} e^{j \frac{2\pi}{\lambda} d \sin \theta_{l,m,1}}, \ldots, a_{l,m,N-1} e^{j \frac{2\pi}{\lambda} (N-1) d \sin \theta_{l,m,N-1}} \right]^T,$$

where $a_{l,m,n}$ and $\theta_{l,m,n}$ denote the amplitude and phase generated by the n-th phase shifter in the m-th cluster of phase shifters, corresponding to the n-th antenna element on the m-th antenna array/panel, and $l=0, 1, \ldots, L-1$ denotes the index of analog processing operation. For the DFT-type analog beams with constant modulus, $a_{l,m,0} = a_{l,m,1} = \ldots = a_{l,m,N-1} = 1$ and $\theta_{l,m,0} = \theta_{l,m,1} = \ldots = \theta_{l,m,N-1} = \theta_{l,m}$, where $\theta_{l,m}$ is a common quantized phase value for the m-th cluster of phase shifters and l-th analog processing operation.

The RF module in block 2704 includes necessary RF components other than LNA, phase shifter and analog-to-digital converter (ADC) such as mixer, filter, attenuator, detector and etc.; and the ADCs in block 2705 operate with sampled analog signals, and convert them to digital signals for further processing. Hence, in FIG. 27, the analog domain processing part and the digital domain processing part are separated by the ADCs, but other separations are also possible depending on specific setup.

In block 2706, the UE treats the output from the analog domain processing (i.e., after the ADCs) as the input to the digital domain processing, and processes the output using certain digital signal processing techniques. In this example, a digital combining vector $g_k = [g_{k,0}, g_{k,1} \ldots, g_{k,M-1}]^T$ is used to represent the digital domain processing, where $k=0, 1, \ldots, K-1$ is the index of the digital processing and $g_{k,m}$ is a complex number.

Note that different from the analog combining vectors formed in block 2703 using quantized phase shifters, the entries of the digital combining vector are unquantized. As optimizing $g_k$ is a digital domain processing, the latency for determining the digital combining vector is negligible in contrast to that for computing the analog beams. Further, the exact entries of $g_k$ depends on specific digital processing algorithms such as matched filtering and MRC. Also in block 2706, for a given analog processing index l and digital processing index k, the UE could formulate a predefined metric as $f(g_k, w_{l,0}, \ldots, w_{l,M-1})$. Depending on the specific application scenario, the metric $f(.)$ may be configured as the received signal strength, SNR, SINR, throughput, error rate or other link quality indicators.

For instance, this metric may be physical channel and/or reference signal (RS) channel specific. It is evident that the PDCCH and the PDSCH could correspond to different performance metrics as the former requires high reliable radio link (characterized by error rate) while the latter targets at capacity enhancement (characterized by throughput). Similarly, the SSB and the CSI-RS channels may also have different metrics. The metric here also serves as the optimization objective function. By optimizing the objective function under certain constraint(s), the UE obtains the digital output (block 2707), which could be used to determine appropriate analog receive beam operation/management procedure (block 2708).

In block 2707, the UE derives the digital output by optimizing the performance metric determined in block 2706. In this example, the digital output/outcome may correspond to the channel estimate such as the angle estimate, error rate prediction, throughput prediction and etc.; for instance, the digital output could be a high-resolution channel angle estimate computed by the UE based on $f(g_{k'}, w_{l',0}, \ldots, w_{l',M})$, where $f(.)$ computes the received signal power for given digital and analog processing operations; $g_{k'}$ and $\{w_{l',0}, \ldots, w_{l',M-1}\}$ are the digital and analog combing vectors that maximize the received signal power metric, and the digital and analog combing vectors are formed by the UE during the k'-th analog processing ($k' \in \{0, 1, \ldots, K-1\}$) and l'-th digital processing ($l' \in \{0, 1, \ldots, L-1\}$).

In block 2708, the UE decides appropriate analog receive beam operation/management procedure according to the digital output. The operations in block 2708 are similar to those in step 2603 as illustrated in FIG. 26. For instance, if the digital output/outcome is a high-resolution angle estimate, the UE may select one or more analog beams from the beam codebook whose steering directions are the closest to the estimated angle to receive the payload data.

Figure 28:
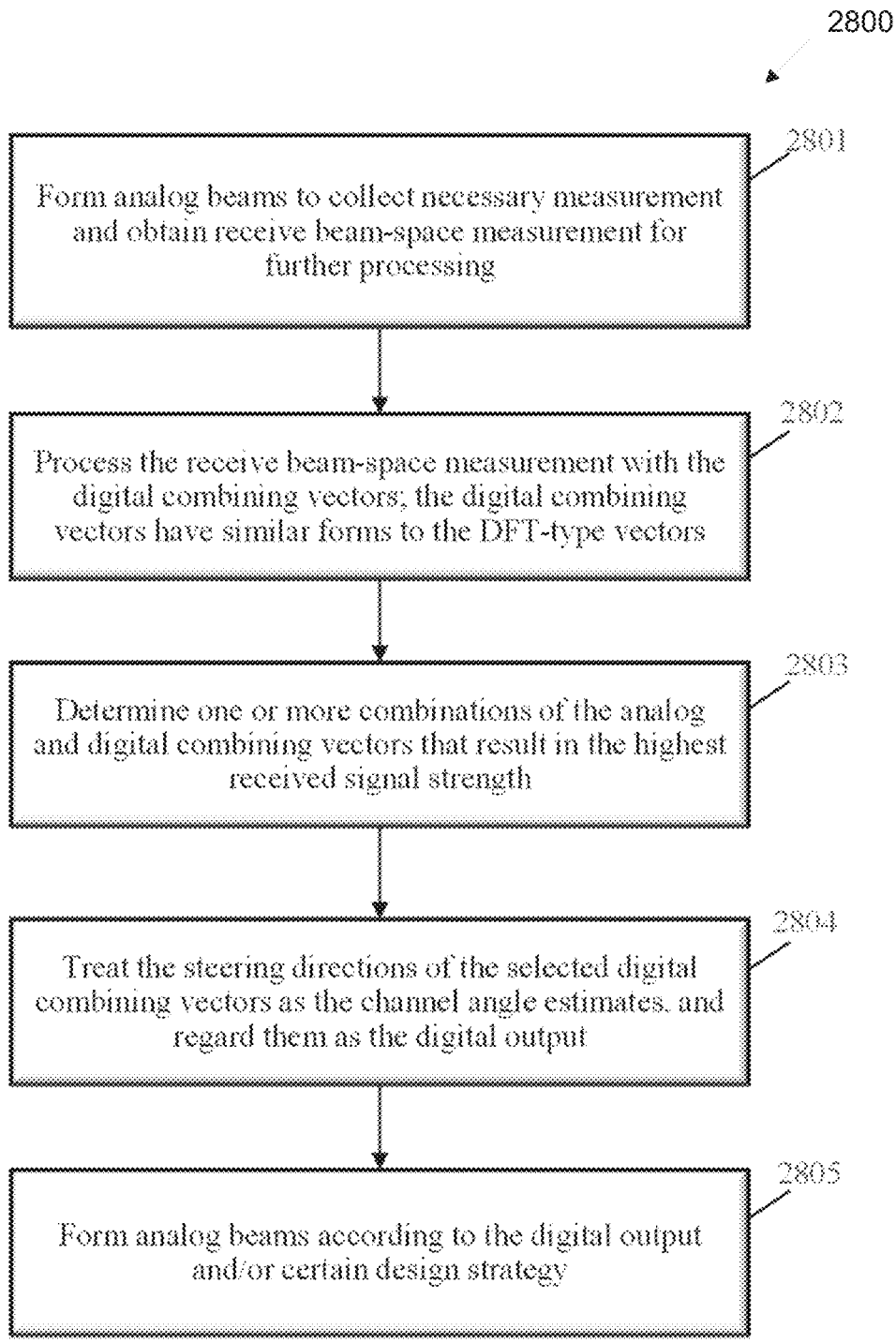
FIG. 28 illustrates a flow chart of matched filter based digital processing assisted analog beam operation/management according to embodiments of the present disclosure.

FIG. 28 illustrates a flow chart of a method 2800 for matched filter based digital processing assisted analog beam operation/management according to embodiments of the present disclosure. An embodiment of the method 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions.

FIG. 28 illustrates an algorithm flow-chart of matched filter based digital processing assisted analog beam operation/management. In this example, the digital output/outcome corresponds to the channel angle estimate.

As illustrated in FIG. 28, an algorithm flowchart of matched filter based digital domain processing assisted analog beam operation/management is presented. In this example, the analog receive beams for measurement are identical across all RF chains/antenna panels, the digital combining vectors exhibit similar structures to the DFT-type vectors, the received signal strength is used to select the best combinations of the digital and analog beams, and the digital output corresponds to one or more channel angle estimates.

Note that the provided algorithm here can be extended to the setting where the simultaneously probed analog measurement beams across all RF chains/antenna panels are arbitrarily selected from the given beam codebook. One special case of this setting could be that the analog receive beams for measurement across all RF chains/antenna panels correspond to completely different beam codewords in the given beam codebook. In this example, the receiver structure in FIG. 27 is equipped at the terminal side. Detailed design procedure is presented in the following.

As illustrated in FIG. 28, in step 2801, the UE simultaneously forms M analog receive beams using M clusters of quantized phase shifters with each cluster corresponding to a separate RF chain/antenna panel. In this example, the M analog receive beams are identical across all M RF chains/antenna panels. For example, the M analog receive beams may correspond to the same beam codeword selected from the given beam codebook such that the M analog receive beams steer towards the same angular direction. For the receiver structure in FIG. 27, $w_{l,0} = w_{l,1} = \ldots = w_{l,M-1} = w_l$.

If a DFT-type beam codebook is used by the UE, $$w_l = \frac{1}{\sqrt{N}}\left[1, e^{i\frac{2\pi}{\lambda}d \sin \theta_l}, \ldots, e^{i\frac{2\pi}{\lambda}(N-1)d \sin \theta_l}\right]^T \ldots \quad (1)$$

Note that other types of beam codebooks can be used in the provided algorithms as well with moderate modifications. Denoting $$\mu_l = \frac{2\pi}{\lambda}d \sin \theta_l$$

as the spatial frequency, where the analog processing index $l \in \{0, 1, \ldots, L-1\}$ and the antenna element index $n \in \{0, 1, \ldots, N-1\}$, the analog combing vector can be rewritten as $$w(\mu_l) = \frac{1}{\sqrt{N}}\left[1, e^{i\mu_l}, \ldots, e^{i(N-1)\mu_l}\right]^T \ldots \quad (2)$$

Denote the received signal samples at the receive RF frontend by $h(\partial, \varphi) \in C^{MN \times 1}$, where $\partial$ and $\varphi$ denote the channel's azimuth and elevation angle information. In this example, it is assumed that (i) ULAs are equipped at the terminal, (ii) only the azimuth domain is considered so that $h(\partial, \varphi)$ can be simplified as $h(\partial)$, and (iii) the antenna panels/arrays are placed side by side, and the boresights of the neighboring two arrays are dN apart.

For illustrative purpose, it is further assumed that the received signal samples at the receive RF frontend only contain a receive array response vector with a single azimuth angle-of-arrival (AoA) $\partial$ and a complex path gain, given as
$h(\partial) = \alpha[1, e^{i\partial}, \ldots, e^{i(MN-1)\partial}]^T \ldots \quad (3)$ Note that the provided design approaches in this disclosure can be applied to other forms of the received signal samples at the RF frontend and array geometries with moderate modifications. After combining the RF frontend measurement in the analog domain, $r(\mu_l, \partial) =$ $$\begin{bmatrix} w^*(\mu_l) & \ldots & 0_{1 \times N} \\ \vdots & \ddots & \vdots \\ 0_{1 \times N} & \ldots & w^*(\mu_l) \end{bmatrix} h(\vartheta) \in C^{M \times 1} \ldots \quad (4),$$

which is referred to as the analog beam-space measurement. Based on (2) and (3), the analog beam-space measurement in (4) can be further expressed as $$r(\mu_l, \vartheta) = \frac{\alpha}{\sqrt{N}}\left[\sum_{n=0}^{N-1} e^{in(\vartheta - \mu_l)}, e^{iN\vartheta}\sum_{n=0}^{N-1} e^{in(\vartheta - \mu_l)}, \ldots, e^{i(M-1)N\vartheta}\sum_{n=0}^{N-1} e^{in(\vartheta - \mu_l)}\right]^T = \quad (5)$$

$$\frac{\alpha}{\sqrt{N}}\sum_{n=0}^{N-1} e^{in(\vartheta - \mu_l)}\left[1, e^{iN\vartheta}, e^{i2N\vartheta}, \ldots, e^{i(M-1)N\vartheta}\right]^T \ldots$$

The receive beam-space measurement in (5), i.e., the output from the analog processing part, is then directly input to the digital domain for further processing without any quantization loss, attenuation and other types of distortions by assuming, e.g., infinite-resolution ADCs.

As illustrated in FIG. 28, in 2802, the UE processes the receive beam-space measurement in the digital domain with digital combining vectors $g_k$'s, $k=0, 1, \ldots, K-1$. In this example, the digital combining vectors are custom designed as matched filters for the analog beam-space measurement, and the digital combining vectors exhibit similar forms to the DFT-type vectors.

Denoting the steering direction of the digital receive combining vector for the digital processing index k by $\tau_k$, $$g(\tau_k) = \frac{1}{\sqrt{P}}\left[1, e^{iN\tau_k}, e^{i2N\tau_k}, \ldots, e^{i(M-1)N\tau_k}\right]^T, \ldots \quad (6),$$

where $1/\sqrt{P}$ represents a power scaling factor. The UE digitally combines $r(\mu_l, \partial)$ with $g(\tau_k)$, and obtains $$c(\tau_k, \mu_l, \vartheta) = g^*(\tau_k)r(\mu_l, \vartheta) = \quad (7),$$

$$\frac{\alpha}{\sqrt{PN}}\sum_{n=0}^{N-1} e^{in(\vartheta - \mu_l)}\left[1, e^{-iN\tau_k}, e^{-i2N\tau_k}, \ldots, e^{-i(M-1)N\tau_k}\right]\left[1, e^{iN\vartheta}, e^{i2N\vartheta}, \ldots, e^{i(M-1)N\vartheta}\right]^T =$$

$$\frac{\alpha}{\sqrt{PN}}\sum_{n=0}^{N-1} e^{in(\vartheta - \mu_l)}\sum_{n=0}^{M-1} e^{imN(\vartheta - \tau_k)}, \ldots$$

which can be referred to as digitally processed measurement.

For a total of K digital processes and L analog processes, the total number of digitally processed measurement is KL.

The UE then computes the received signal strength $|c(\tau_k, \mu_l, \partial)|^2$, and regards the received signal strength $|c(\tau_k, \mu_l, \partial)|^2$ as the performance metric to be optimized.

In step 2803, the UE determines one or more combinations of the analog and digital processes, and therefore, the corresponding analog and digital receive beams, that maximize the received signal strength. Based on (7), the optimization problem can be formulated as $$(\tau_{opt}, \mu_{opt}) = \underset{\substack{\tau_k \in A, \mu_l \in B \\ k=0,1,\ldots,K-1 \\ l=0,1,\ldots,L-1}}{\operatorname{argmax}} |c(\tau_k, \mu_l, \partial)|^2, \ldots \quad (8)$$

where $A=\{a_0, a_1, \ldots, a_{N_A-1}\}$ and $B=\{b_0, b_1, \ldots, b_{N_B-1}\}$ contain all possible spatial frequencies for forming the digital and analog combining vectors.

The corresponding digital and analog beam codebooks may be constructed as $F_g=\{g(a_0), g(a_1), \ldots, g(a_{N_A-1})\}$ and $F_w=\{w(b_0), w(b_1), \ldots, w(b_{N_B-1})\}$ with $g(\tau_{opt}) \in F_g$ and $w(\mu_{opt}) \in F_w$.

Figure 29:
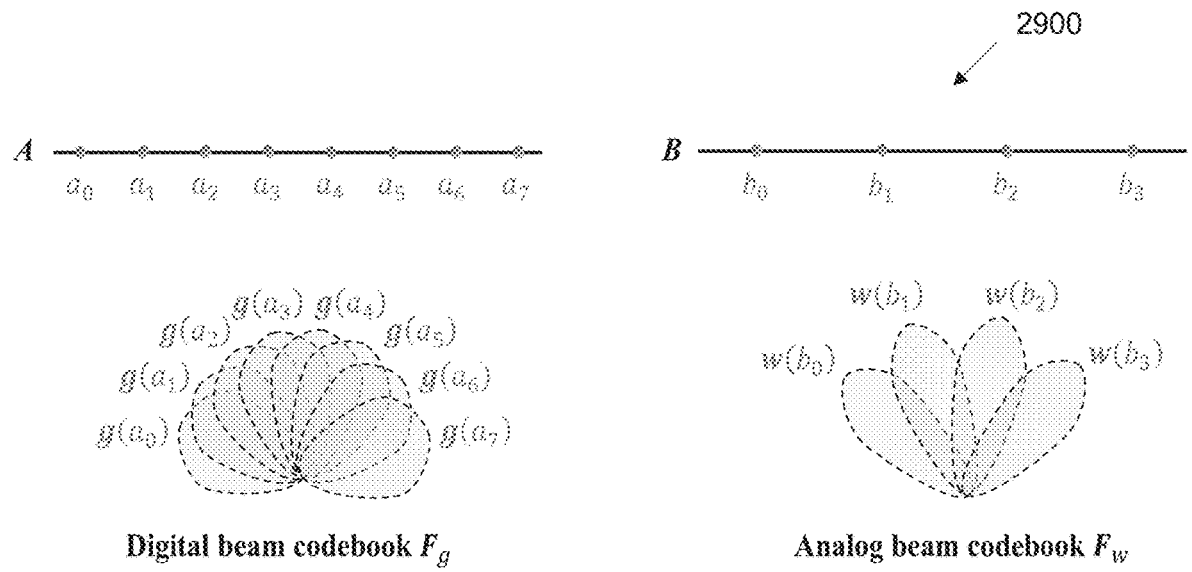
FIG. 29 illustrates an example digital and analog spatial frequencies and their corresponding beam codebooks according to embodiments of the present disclosure.

FIG. 29 illustrates an example digital and analog spatial frequencies and their corresponding beam codebooks 2900 according to embodiments of the present disclosure. An embodiment of the digital and analog spatial frequencies and their corresponding beam codebooks 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions.

In FIG. 29, two conceptual examples depicting the digital and analog spatial frequencies along with their corresponding analog and digital beam codebooks are illustrated. It is evident from FIG. 29 that the digital beam codewords in $F_g$ exhibit larger beamwidth than the analog beam codewords in $F_w$ because M is usually much smaller than N. Further, in this example, the total number of candidate digital spatial frequencies, or the size of the digital beam codebook, is much larger than the total number of candidate analog spatial frequencies, and therefore, the size of the analog beam codebook, to cover the same range/space.

This setup may be beneficial in reducing the power consumption and access latency for the mobile terminal because it is mainly resulted from the analog beam search/measurement process. Note that the size of the analog beam codebook could also be identical or even larger than that of the digital beam codebook. In this case, to reduce the overall power consumption and access delay, the total number of analog processes L could be configured as a much smaller value than the total number of digital processes K.

Note that besides the DFT-type digital and analog combining vectors, a similar optimization problem can be formulated and solved for other types of digital and analog beam structures (generally denoted as $g_k$ and $w_l$), given as $$(g_{opt}, w_{opt}) = \underset{\substack{g_k \in F_g, w_l \in F_w \\ k=0,1,\ldots,K-1 \\ l=0,1,\ldots,L-1}}{\operatorname{argmax}} \left| g_k^* \begin{bmatrix} w_l^* & \cdots & 0_{1 \times N} \\ \vdots & \ddots & \vdots \\ 0_{1 \times N} & \cdots & w_l^* \end{bmatrix} h(\partial) \right|^2, \ldots \quad (9)$$

and now, $F_g=\{g_0, g_1, \ldots, g_{N_A-1}\}$ and $F_w=\{w_0, w_1, \ldots, w_{N_B-1}\}$ with $g_{opt} \in F_g$ and $w_{opt} \in F_w$.

In this case, the UE may still need to obtain the steering direction of $g_{opt}$ and/or $w_{opt}$, which may not be obvious, but could be estimated via various strategies. For one implementation, the radiation patterns of each of the beam codeword in $F_g$ and $F_w$ could be first obtained by the UE. For a given digital/analog beam, e.g., $g_{opt}/w_{opt}$, the UE could choose an angular direction, towards which their radiation patterns result in the largest power/energy, as the corresponding digital/analog steering direction/spatial frequency. For certain settings, it may still be difficult to extract the steering direction/spatial frequency of the selected analog and digital beams. In this case, the selected analog and digital receive combining vectors could be directly used by the UE as the digital output in step 2804.

In step 2804, the UE determines the channel angle estimate(s) based on the selected digital and/or analog spatial frequencies, and/or the selected digital and/or analog combining vectors/beams in step 2803. For instance, if the steering directions of the digital and analog beams are obtained in step 2803, e.g., $\tau C_{opt}$ and $\tau_{opt}$, the channel angle estimate can be computed as $\hat{\partial}=\tau_{opt}$ or $\hat{\partial}=\mu_{opt}$. Note that treating the digital spatial frequency $\tau_{opt}$ as the channel angle estimate $\hat{\partial}$ may be preferable under many conditions because the digital beams could largely oversample the given angular space with negligible delay (see FIG. 27), which may result in high-resolution angle estimate.

Further, as the digital domain combining is executed after the analog domain combining, selecting appropriate receive beam-space measurement to process, e.g., that obtained on $w(\mu_{opt})$ or $w_{opt}$, is also essential to ensure satisfactory link margin/array gain. The UE may also be able to choose between the digital spatial frequency $\tau_{opt}$ and the analog spatial frequency $\mu_{opt}$ as the channel angle estimate, depending on various implementation conditions and/or deployment scenarios. Finally, the UE treats the high-resolution angle estimate as the digital output, and inputs them to the analog beam operation/management module for further processing. As have been discussed in step 2803, for certain settings, the UE could treat the selected analog and digital receive beams in step 2803 as the digital output as well.

In step 2805, the UE determines appropriate analog beam operation/management procedure according to the digital output, e.g., the channel angle estimate(s). For instance, the UE could form one or more analog receive beams towards the estimated channel angle(s) for data communications with the BS. Here, the analog receive beams could also be selected from a given analog beam codebook such that their steering directions are the closest to the estimated channel angle(s) among all candidate beam codewords.

The above receive beam operation procedure can be mathematically expressed as $$\breve{w}(\breve{\mu}_{opt}) = \underset{\substack{\breve{w}(\breve{\mu}) \in F_{\breve{w}} \\ \breve{\mu}=c_0, c_1, \ldots, c_{N_c-1}}}{\operatorname{argmin}} \left| \breve{\mu} - \hat{\partial} \right|^2, \ldots \quad (10)$$

where $F_{\breve{w}}=\{\breve{w}(c_0), \breve{w}(c_1), \ldots, \breve{w}(c_{N_c-1})\}$ represents the analog receive beam codebook for data communications. Assume DFT-type receive beam codebook $F_{\breve{w}}$, $$\breve{w}(c_v) = \frac{1}{\sqrt{\breve{N}}} \left[ 1, e^{jc_v}, \ldots, e^{j(\breve{N}-1)c_v} \right]^T$$

with $v=0, 1, \ldots, N_c-1$. Note that the analog receive beam codebook in 2805 for data communications could be different from that in step 2801 (i.e., $F_w$) for measurement.

Figure 30:
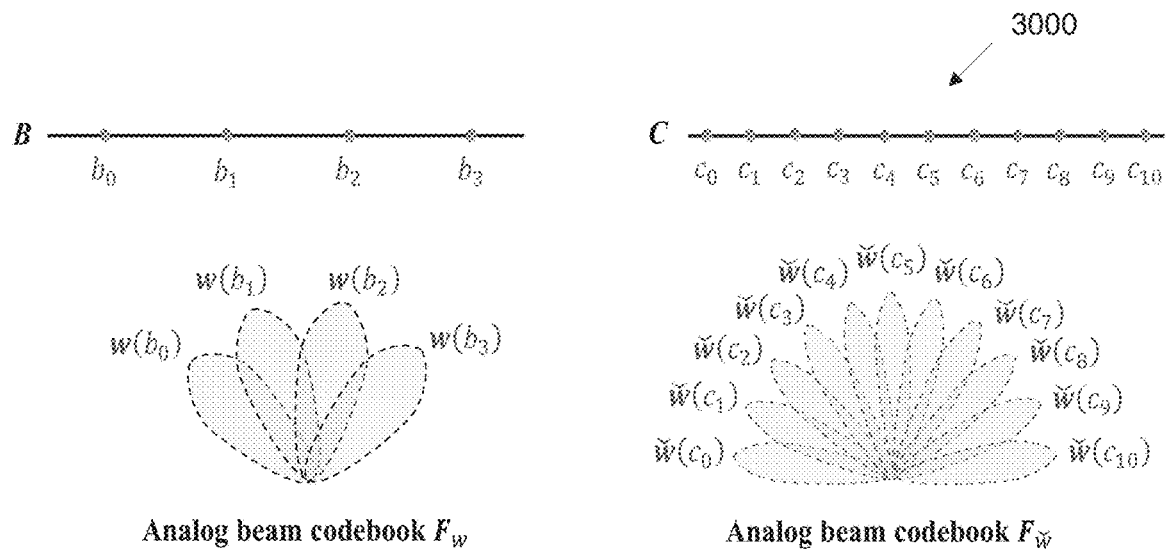
FIG. 30 illustrates an example analog receive beam codebooks designed for measurement and data communications according to embodiments of the present disclosure.

FIG. 30 illustrates an example analog receive beam codebooks designed for measurement and data communications 3000 according to embodiments of the present disclosure. An embodiment of the analog receive beam codebooks designed for measurement and data communications 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions.

As illustrated in FIG. 30, two conceptual examples are presented comparing the two analog receive beam codebook designs. It is evident from the conceptual examples shown in FIG. 30 that the number of candidate beam codewords in $F_{\check{w}}$ could be much larger than that in $F_w$, and the beams in $F_{\check{w}}$ could also be much narrower than those in $F_w$ to better support high-rate data communications.

Figure 31:
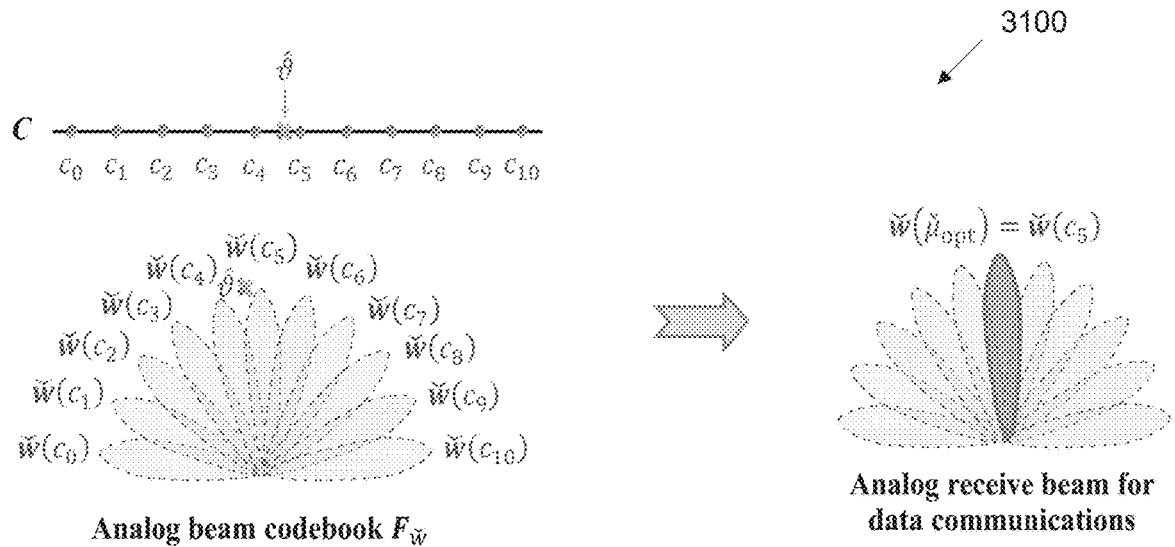
FIG. 31 illustrates an example analog receive beam selection for data communications based on the estimated channel angle information according to embodiments of the present disclosure.

FIG. 31 illustrates an example analog receive beam selection for data communications 3100 based on the estimated channel angle information according to embodiments of the present disclosure. An embodiment of the analog receive beam selection for data communications 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions.

As illustrated in FIG. 31, the above described analog receive beam selection strategy is depicted. In this conceptual example, $\check{\mu}_{opt}=c_5$ so that $\check{w}(c_5)$ from the beam codebook is used for data communications.

Note that $\check{N}$ may correspond to N, MN or other feasible values depending on specific system setup. For instance, if $\check{N}=N$ and all M RF chains/antenna panels are activated to form the analog receive beams, $$\check{w}(\check{\mu}_{opt}) = \frac{1}{\sqrt{N}}\left[1, e^{j\check{\mu}_{opt}}, \ldots, e^{j(N-1)\check{\mu}_{opt}}\right]^T,$$

and the overall analog combining matrix becomes $$\check{W}(\check{\mu}_{opt}) = \begin{bmatrix} \check{w}^*(\check{\mu}_{opt}) & \cdots & 0_{1 \times N} \\ \vdots & \ddots & \vdots \\ 0_{1 \times N} & \cdots & \check{w}^*(\check{\mu}_{opt}) \end{bmatrix} \cdots \quad (11)$$

For another example, if $\check{N}=MN$ and all M RF chains/antenna panels are activated to form the analog receive beams, $$\check{w}(\check{\mu}_{opt}) = \frac{1}{\sqrt{MN}}\left[1, e^{j\check{\mu}_{opt}}, \ldots, e^{j(MN-1)\check{\mu}_{opt}}\right]^T,$$

and the overall analog combining matrix becomes $$\check{W}(\check{\mu}_{opt}) = \begin{bmatrix} [\check{w}^*(\check{\mu}_{opt})]_{1:N} & \cdots & 0_{1 \times N} \\ \vdots & \ddots & \vdots \\ 0_{1 \times N} & \cdots & [\check{w}^*(\check{\mu}_{opt})]_{(M-1)N:MN-1} \end{bmatrix}, \cdots \quad (12)$$

where $[a]_{p:q}$ contains elements p, p+1, ..., q of a vector a. Similar results to (11) and (12) can be obtained for $\check{M}$ ($\check{M}<M$) activated RF chains/antenna panels.

If the digital output from step 2804 only contains the digital and analog beams selected in step 2803, i.e., the channel angle information is unavailable, the best analog receive beam can be determined by solving the following optimization problem assuming that $\check{N}=N$ and all M RF chains/antenna panels are activated, $$\check{w}_{opt} = \underset{\check{w} \in F_{\check{w}}}{\arg\max} \left| g_{opt}^* \begin{bmatrix} \check{w}^* & \cdots & 0_{1 \times N} \\ \vdots & \ddots & \vdots \\ 0_{1 \times N} & \cdots & \check{w}^* \end{bmatrix} h(\vartheta) \right|^2, \cdots \quad (13)$$

where $F_{\check{w}}=\{\check{w}_0, \check{w}_1, \ldots, \check{w}_{N_c-1}\}$. In this case, the final analog combining matrix can be expressed as $$\check{W}_{opt} = \begin{bmatrix} \check{w}_{opt} & \cdots & 0_{1 \times N} \\ \vdots & \ddots & \vdots \\ 0_{1 \times N} & \cdots & \check{w}_{opt} \end{bmatrix} \cdots \quad (14)$$

For $\check{N}=MN$ and assuming that all M RF chains/antenna panels are activated, the corresponding optimization problem can be formulated as $$\check{w}_{opt} = \underset{\check{w} \in F_{\check{w}}}{\arg\max} \left| g_{opt}^* \check{w}^* h(\vartheta) \right|^2, \cdots \quad (15)$$

and now, $\check{w}_{opt}, \check{w}_0, \check{w}_1, \ldots, \check{w}_{N_c-1} \in C^{MN \times 1}$. The final analog combining matrix for this setup can then be obtained as $$\check{W}_{opt} = \begin{bmatrix} [\check{w}_{opt}]_{1:N} & \cdots & 0_{1 \times N} \\ \vdots & \ddots & \vdots \\ 0_{1 \times N} & \cdots & [\check{w}_{opt}]_{(M-1)N:MN-1} \end{bmatrix} \cdots \quad (16)$$

Similar results to (14) and (16) can be obtained for $\check{M}$ ($\check{M}<M$) activated RF chains/antenna panels.

Figure 32:
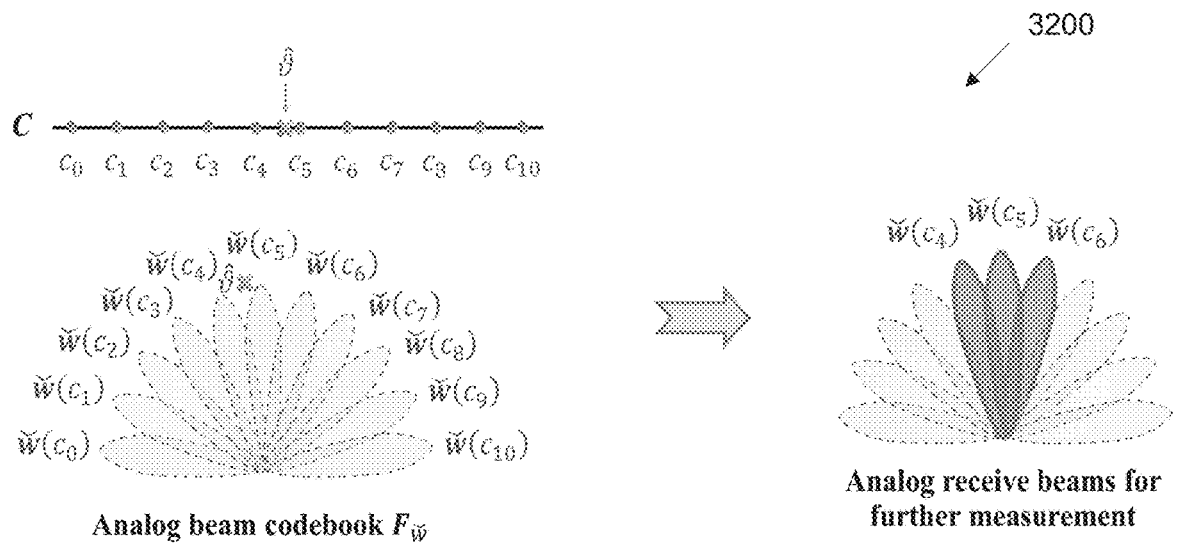
FIG. 32 illustrates an example analog measurement beams selection based on the estimated channel angle information according to embodiments of the present disclosure.

FIG. 32 illustrates an example analog measurement beams selection 3200 based on the estimated channel angle information according to embodiments of the present disclosure. An embodiment of the analog measurement beams selection 3200 shown in FIG. 32 is for illustration only. One or more of the components illustrated in FIG. 32 can be implemented in specialized circuitry configured to perform the noted functions or one or more of the components can be implemented by one or more processors executing instructions to perform the noted functions.

Another beam operation implementation could be selecting a set of beams from the given beam codebook to collect necessary measurement for further processing. With the knowledge of the channel angle information, the analog measurement beams needed to cover a confined angular space (e.g., surrounding the estimated channel angle) could be less than those in step 2801, which may scan the entire angular space of interest. For instance, the beam codewords whose steering directions are the closest to the estimated angle among all beam codewords in the beam codebook could be selected as the analog measurement beams at this stage.

In FIG. 32, a conceptual example of the provided analog measurement beams selection assuming the knowledge of the channel angle information is presented. In this example, $c_4$, $c_5$ and $c_6$ are the closest to $\hat{\theta}$ if a total of three measurement beams are needed. Hence, $\check{w}(c_4)$, $\check{w}(c_5)$ and $\check{w}(c_6)$ from the beam codebook are chosen by the UE to collect further measurement.

The solutions to (8) or (9) may also depend on the probing order of the analog and digital beams and the relationship between the analog and digital beams/combining vectors. For instance, the analog measurement beams and the digital combining vectors can be formed by the UE in a sequential TDM manner. For another example, a hierarchical relationship between the first-tier analog beams and the second-tier digital beams can be established such that a given analog beam may correspond to one or more unique digital beams from the digital beam codebook.

Figure 33:
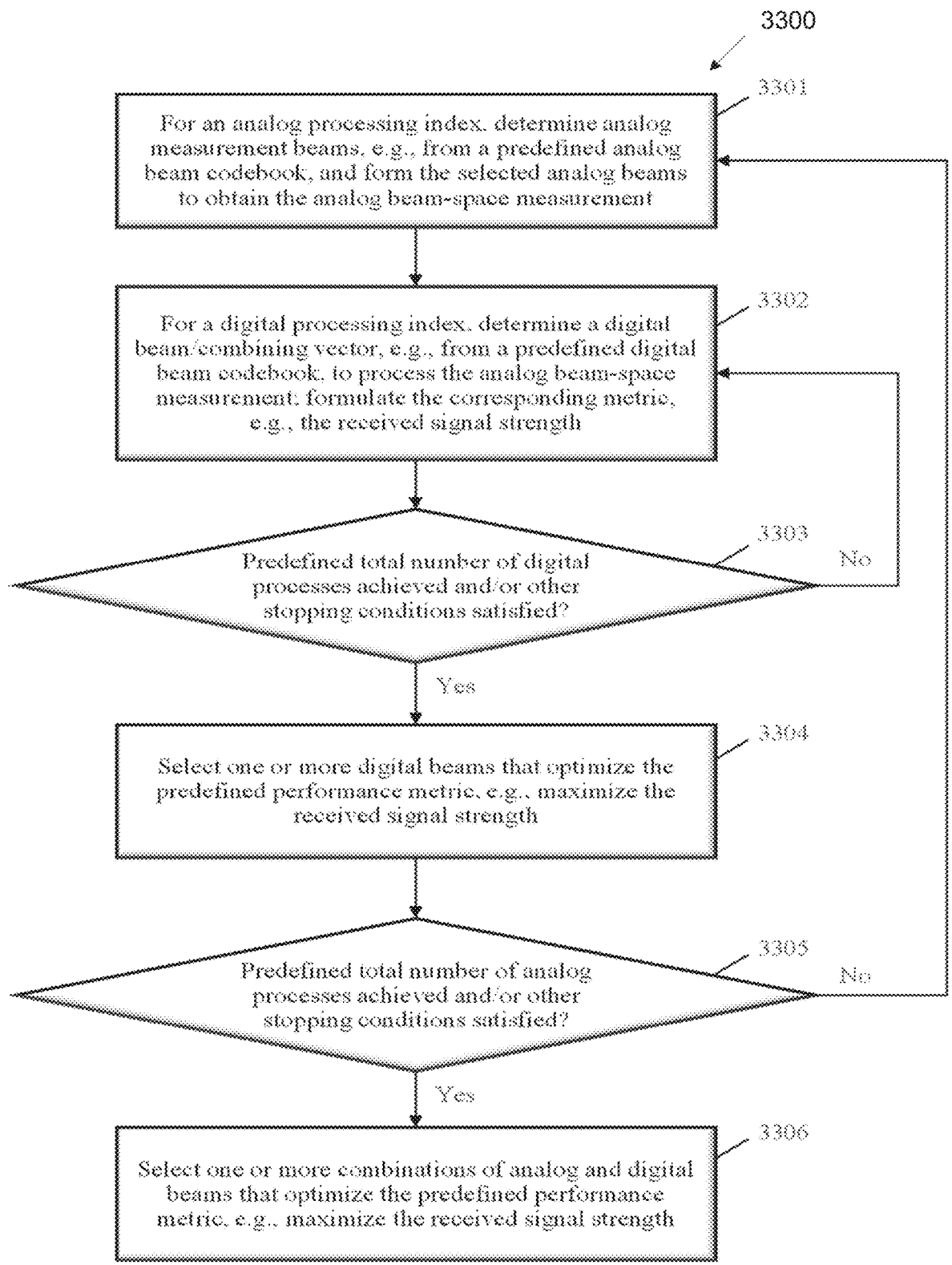
FIG. 33 illustrates a flow chart of a method for concurrent analog and digital combining in determining predefined performance metrics and best combination(s) of analog and digital beams according to embodiments of the present disclosure.

FIG. 33 illustrates a flow chart of a method 3300 for concurrent analog and digital combining in determining predefined performance metrics and best combination(s) of analog and digital beams according to embodiments of the present disclosure. An embodiment of the method 3300 shown in FIG. 33 is for illustration only. One or more of the components illustrated in FIG. 33 can be implemented in specialized circuitry configured to perform the noted functions or one or more of the components can be implemented by one or more processors executing instructions to perform the noted functions.

In FIG. 33, an algorithm flow-chart characterizing a concurrent analog and digital combining method is provided. By concurrent, all the digital combining operations of interest are executed by the UE after one analog combining operation, i.e., using M analog measurement beams to obtain an analog beam-space measurement. In later embodiments, a sequential analog and digital combining strategy is provided, in which all the analog combining operations are executed by the UE first, and then the digital combining is performed by the UE based on the best analog combining results. Note that all the notations used in this example are identically defined to those in FIGS. 27 through 32 unless otherwise specified.

As illustrated in FIG. 33, in 3301, the UE simultaneously forms M analog beams using M RF chains/antenna panels to collect necessary measurement, which is referred to as one analog processing in this disclosure. The analog measurement beams could be selected from a predetermined analog beam codebook, and the selected M analog beams may steer towards the same angular direction, i.e., the selected M analog beams may correspond to the same beam codeword in the beam codebook. After combining the RF frontend measurement with the analog beams, the analog beam-space measurement can be obtained by the UE and may be further processed in the digital domain. The operations in step 3301 are similar to those in block 2701.

In step 3302, the UE uses a digital combining vector to process the analog receive beam-space measurement obtained in step 3301, which is referred to as one digital processing in this disclosure. For instance, the digital combining vector could be customized as the matched filter for the analog beam-space measurement, which may exhibit a DFT-type structure for certain system setup. Further, a performance metric, e.g., the received signal strength, can also be formulated here for the combination of the analog beams in 1401 and the digital beam in step 3302.

For example, for the l-th analog processing in step 3301 (l=0, 1, ..., L−1) and the k-th digital processing in step 3302 (k=0, 1, ..., K−1), the corresponding received signal strength can be computed as $$p_{k,l}(\vartheta) = \left| g_k^* \begin{bmatrix} w_l^* & \cdots & 0_{1 \times N} \\ \vdots & \ddots & \vdots \\ 0_{1 \times N} & \cdots & w_l^* \end{bmatrix} h(\vartheta) \right|^2 \cdots \quad (17)$$

In step 3303, the UE checks whether the predefined number of digital processing operations has been achieved or other necessary stopping conditions for step 3302 have been satisfied. The predefined number of digital processing operations may correspond to the total number of digital processing operations, which is K in this example. In later embodiments, the predefined number of digital processes could be smaller than the total number, depending on practical implementation. If the predefined number of digital processing operations has been achieved, the algorithm may proceed to step 3304; otherwise, the algorithm may go back to step 3302 to test the remaining digital beams. Further, the UE may also check other conditions such as comparing the received signal strength with a predefined threshold. For instance, if $p_{k,l}(\vartheta)$ is beyond the given threshold, the algorithm may proceed to step 3304; otherwise, the algorithm may go back to step 3302 to test the remaining digital beams.

In step 3304, based on the performance metrics, e.g., the received signal strengths, collected so far, the UE determines one or more digital beams/combining vectors for the currently in-use analog measurement beams in step 3301. For instance, the UE may choose the digital beam that result in the largest received signal strength for the l-th analog processing, expressed as $$g_{opt}^{(l)} = \operatorname*{argmax}_{\substack{g_k \in F_g \\ k=0,1,\ldots,K-1}} \left| g_k^* \begin{bmatrix} w_l^* & \cdots & 0_{1 \times N} \\ \vdots & \ddots & \vdots \\ 0_{1 \times N} & \cdots & w_l^* \end{bmatrix} h(\vartheta) \right|^2, \ldots \text{ and} \quad (18)$$

$$p_{opt}^{(l)}(\vartheta) = \left| (g_{opt}^{(l)})^* \begin{bmatrix} w_l^* & \cdots & 0_{1 \times N} \\ \vdots & \ddots & \vdots \\ 0_{1 \times N} & \cdots & w_l^* \end{bmatrix} h(\vartheta) \right|^2 \cdots \quad (19)$$

In step 3305, the UE checks whether the predefined number of analog processing operations has been achieved or other necessary stopping conditions for step 3301 through 3304 have been satisfied. The predefined number of analog processing operations may correspond to the total number of analog processing operations, which is L in this example. In later embodiments, the predefined number of analog processes could be smaller than the total number, depending on practical implementation. If the predefined number of analog processing operations has been achieved, the algorithm may proceed to step 3306; otherwise, the algorithm may go back to step 3301 to test the remaining analog processes, and therefore, their corresponding digital combining operations.

Further, the UE may also check other conditions such as comparing the largest received signal strength for the current analog processing with a predefined threshold. For instance, for the l-th analog processing, if $p_{opt}^{(l)}(\vartheta)$ is beyond the given threshold, the algorithm may proceed to step 3306; otherwise, the algorithm may go back to step 3301 to test the remaining analog processes, and therefore, their corresponding digital combining operations.

In step 3306, the UE selects one or more combinations of the analog and digital beams based on the performance metrics computed for all the combinations of the analog and digital combining operations throughout step 3301 and 3305. For instance, the performance metric may correspond to the largest received signal strength determined in step 3304 for each analog processing of interest. In this example, the UE may maximize the largest received signal strengths among all analog processing operations of interest such that $$w_{opt} = w_{l'} \underset{\substack{w_l \in F_w \\ l=0,1,\ldots,L-1}}{\operatorname{argmax}} \left| \left(g_{opt}^{(l)}\right)^* \begin{bmatrix} w_l^* & \ldots & 0_{1 \times N} \\ \vdots & \ddots & \vdots \\ 0_{1 \times N} & \ldots & w_l^* \end{bmatrix} h(\vartheta) \ldots \right|^2 \quad (20)$$

Based on the results in (20), the UE determines $w_{opt}$ and $g_{opt}^{(l')}$ as the selected combination of analog and digital beams. The UE may be able to extract the channel angle information from $g_{opt}^{(l')}$ and/or $w_{opt}$, and treat the channel angle information as the digital output as discussed in step 3304. The UE may also directly use $g_{opt}^{(l')}$ and/or $w_{opt}$ as the digital output to assist the analog receive beam operation/management in the third-level processing.

The concurrent analog and digital combining method depicted in FIG. 33 assumes that a given analog processing operation i.e., a given combination of analog beams from the analog beam codebook, corresponds to all digital processing operations, e.g., all digital beams from the digital beam codebook. For practical implementation, a given analog processing operation, and therefore, a given combination of analog beams from the analog beam codebook, may correspond to a limited set of digital combining vectors, and different sets of digital combining vectors may or may not be disjoint.

For instance, assume the total numbers of digital beams in the digital beam codebook and candidate combinations of M analog beams selected from the analog beam codebook as $N_A$ and $\overline{N}_B$. Denote $z = \lfloor N_A/\overline{N}_B \rfloor$, where $\lfloor x \rfloor$ rounds x to the nearest integer. In this example, for the $\overline{n}_b$-th combination of analog beams from the analog beam codebook ($\overline{n}_b = 0, 1, \ldots, \overline{N}_B - 2$), their corresponding digital beams are indexed from $\overline{n}_b z$ to $(\overline{n}_b+1)z-1$ in the digital beam codebook. For the $(\overline{N}_B-1)$-th analog beams combination, their corresponding digital beams are indexed from $(\overline{N}_B-1)z$ to $N_A$.

Figure 34:
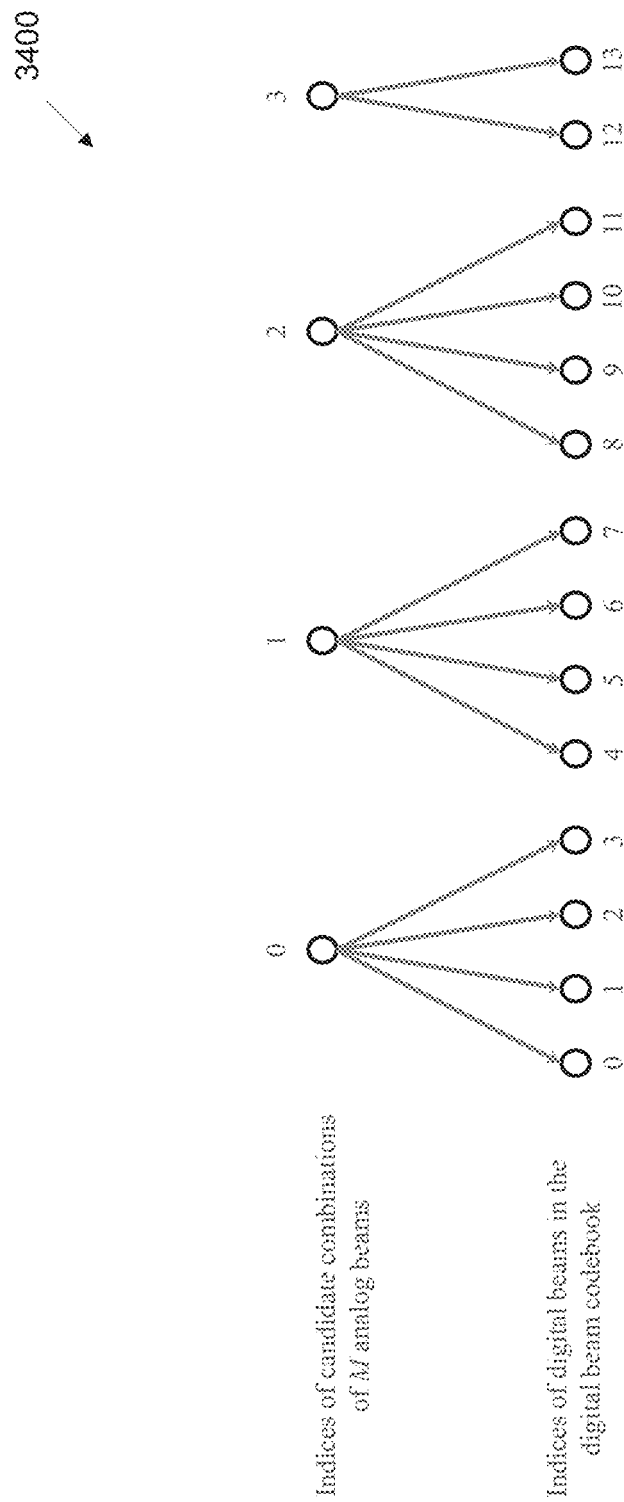
FIG. 34 illustrates an example hierarchical relationship between the first-tier candidate combinations of M analog beams from the analog beam codebook and the second-tier digital beams from the digital beam codebook according to embodiments of the present disclosure.

FIG. 34 illustrates an example hierarchical relationship 3400 between the first-tier candidate combinations of M analog beams from the analog beam codebook and the second-tier digital beams from the digital beam codebook according to embodiments of the present disclosure. An embodiment of the hierarchical relationship 3400 shown in FIG. 34 is for illustration only. One or more of the components illustrated in FIG. 34 can be implemented in specialized circuitry configured to perform the noted functions or one or more of the components can be implemented by one or more processors executing instructions to perform the noted functions.

In FIG. 34, a conceptual example depicting the above described hierarchical structure between the first-tier analog beams combinations and the second-tier digital beams is presented assuming $\overline{N}_B=4$ and $N_A=14$. In this example, $z = \lfloor 14/4 \rfloor = 4$. As can be seen from FIG. 34, the digital combining vectors with the indices {0, 1, 2, 3}, {4, 5, 6, 7}, {8, 9, 10, 11} and {12, 13} in the digital beam codebook belong to the analog beams combinations $\overline{n}_b=0, 1, 2, 3$, respectively. Recall that the M simultaneously probed analog beams during one analog processing operation (one of the analog beams combinations) may correspond to the same beam codeword in the analog beam codebook. In this case, each node in the first-tier in FIG. 34 is also implicitly related to one analog beam codeword in the analog beam codebook.

FIG. 34 illustrates a conceptual example of the hierarchical relationship between the first-tier candidate combinations of M analog beams from the analog beam codebook and the second-tier digital beams from the digital beam codebook Denote the number of digital processing operations for the l-th analog process by $dp_l$ ($l=0, 1, \ldots, L-1$). For step 3303 in FIG. 33, the UE checks whether a predefined number of digital processing operations has been achieved. The predefined number of digital processing operations for the l-th analog processing operation then corresponds to $dp_l$ in this case, where $l=0, 1, \ldots, L-1$. If the predefined number of digital processing operations has been achieved, the algorithm may proceed to step 3304; otherwise, the algorithm may go back to step 3302 to test the remaining digital beams. For the example shown in FIG. 34, $dp_0=dp_1=dp_2=z=4$ and $dp_3=2$ assuming that the analog beams combinations 0, 1, 2 and 3 are used during the analog processing operations l=0, 1, 2 and 3, respectively.

Different from the algorithm procedures discussed in FIGS. 33 and 34, the analog and digital combining operations can also be executed by the UE in a sequential manner. In this case, the UE could first conduct all predefined analog processing operations in the TDM manner and select one or more analog processing operations according to certain design criterion. For the selected one or more analog processes, the UE applies the digital combining vectors to process the corresponding analog beam-space measurement. In this case, all digital beams in the digital beam codebook or certain digital beams having the hierarchical relationship with the selected analog beams combinations could be used by the UE. Similar to FIG. 33, an algorithm flow-chart characterizing the provided sequential analog and digital combining method is provided in FIG. 35.

Figure 35:
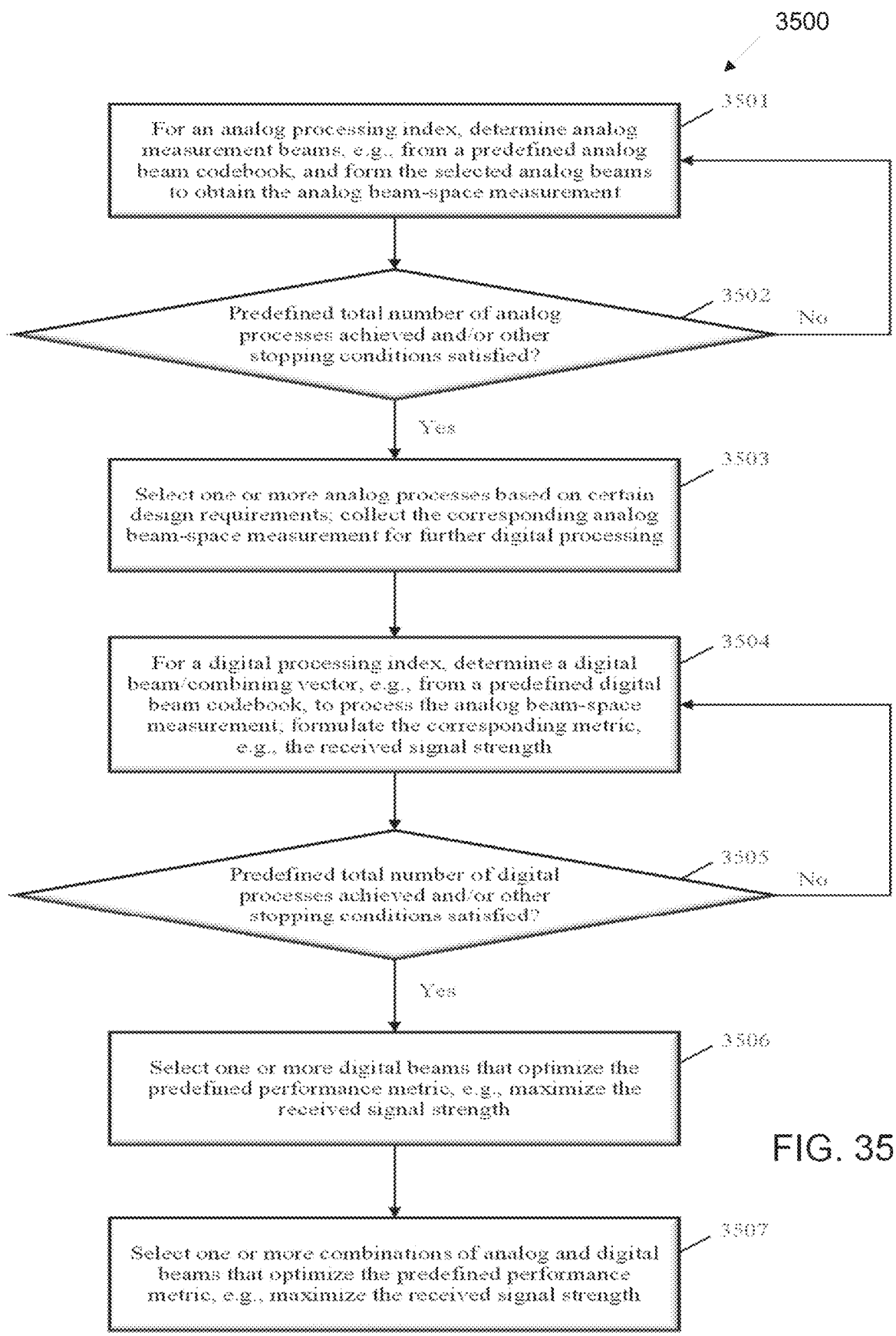
FIG. 35 illustrates a flow chart of a method for sequential analog and digital combining in determining predefined performance metrics and best combination(s) of analog and digital beams according to embodiments of the present disclosure.

FIG. 35 illustrates a flow chart of a method 3500 for sequential analog and digital combining in determining predefined performance metrics and best combination(s) of analog and digital beams according to embodiments of the present disclosure. An embodiment of the method 3500 shown in FIG. 35 is for illustration only. One or more of the components illustrated in FIG. 35 can be implemented in specialized circuitry configured to perform the noted functions or one or more of the components can be implemented by one or more processors executing instructions to perform the noted functions.

As illustrated in FIG. 35, in 3501, the UE performs similar operations to those in 3301 in FIG. 33.

In step 3502, the UE checks whether the predefined number of analog processing operations has been achieved or other necessary stopping conditions for step 3501 have been satisfied. The predefined number of analog processing operations may correspond to the total number of analog processing operations, which is denoted by L in this disclosure. The predefined number of analog processes may also be smaller than the total number (i.e., less than L), depending on practical implementation.

If the predefined number of analog processing operations has been achieved, the algorithm may proceed to step 3503; otherwise, the algorithm may go back to step 3501 to test the remaining analog processes, and therefore, their corresponding analog beams (or analog beams combination). Further, the UE may also check other conditions such as comparing the largest received signal strength for the current analog processing with a predefined threshold. For instance, for the l-th analog processing, denote by $$q_l(\partial) = \left\| \begin{bmatrix} w_l^* & \cdots & 0_{1 \times N} \\ \vdots & \ddots & \vdots \\ 0_{1 \times N} & \cdots & w_l^* \end{bmatrix} h(\partial) \right\|^2 \cdots \quad (21)$$

If $q_l(\ominus)$ is beyond a predefined threshold, the algorithm may proceed to step 3503; otherwise, the algorithm may go back to step 3501 to test the remaining analog processes, and therefore, their corresponding analog combining vectors.

In step 3503, the UE selects one or more analog processes according to certain design criteria. Based on the selected one or more analog processes, the UE prepares the corresponding analog beam-space measurement for further processing and optimization in the digital domain. In this example, maximizing the Frobenius norm is considered as the design criterion, and the UE only determines the best analog beam. Hence, the corresponding optimization problem can be formulated and solved as $$w_{opt} = w_{l'} \underset{\substack{w_l \in F_w \\ l=0,1,\ldots,L-1}}{\operatorname{argmax}} \left\| \begin{bmatrix} w_l^* & \cdots & 0_{1 \times N} \\ \vdots & \ddots & \vdots \\ 0_{1 \times N} & \cdots & w_l^* \end{bmatrix} h(\partial) \right\|^2 \cdots \quad (22),$$

where l' represents the index of the selected analog processing operation, and the corresponding analog beam-space measurement can be expressed as $$r_{l'}(\partial) = \begin{bmatrix} w_{l'}^* & \cdots & 0_{1 \times N} \\ \vdots & \ddots & \vdots \\ 0_{1 \times N} & \cdots & w_{l'}^* \end{bmatrix} h(\partial) \cdots \quad (23)$$

In step 3504, the UE processes the analog beam-space measurement obtained in step 3503 with a digital combining vector for the given digital processing operation. Similar to step 3302 in FIG. 33, the digital combining vector here could also be customized as the matched filter for the analog beam-space measurement, which may exhibit a DFT-type structure for certain system setup. Further, the received signal strength is computed here for the combination of the analog beams selected in step 3503 and a given digital beam. For example, for the l'-th analog processing determined in step 3503 and the k-th digital processing (k=0, 1, ..., K−1), the corresponding received signal strength can be computed as $$p_{k,l'}(\partial) = \left| g_k^* \begin{bmatrix} w_{l'}^* & \cdots & 0_{1 \times N} \\ \vdots & \ddots & \vdots \\ 0_{1 \times N} & \cdots & w_{l'}^* \end{bmatrix} h(\partial) \right|^2 \cdots \quad (24)$$

In step 3505, the UE performs similar operations to those in step 3303 such that the UE check whether the predefined number of digital processing operations has been achieved or other necessary stopping conditions have been satisfied. The predefined number of digital processing operations may correspond to the total number of digital processing operations, which is denoted by K in this disclosure. The pre-defined number of digital processes could also be smaller than K, the total number, depending on practical implementation requirements.

For instance, considering the hierarchical structure between the first-tier analog beams or analog beams combinations and the second-tier digital beams, the predefined number of the digital processing operations correspond to $dp_{l'}$, if the l'-th analog process is selected in step 3503. If the predefined number of digital processing operations has been achieved, the algorithm may proceed to step 3506; otherwise, the algorithm may go back to step 3504 to test the remaining digital processing operations, and therefore, their corresponding digital beams.

Further, the UE may also check other conditions such as comparing the received signal strength with a predefined threshold. For instance, if $p_{k,l'}(\ominus)$ is beyond the given threshold, the algorithm may proceed to step 3506; otherwise, the algorithm may go back to step 3504 to test the remaining digital processes/beams.

In step 3506, the UE selects one or more digital beams based on the performance metrics computed from all the executed digital processing operations in step 3505. For instance, the performance metric may correspond to the received signal strength determined in step 3504 for each digital processing operation under the l'-th analog process selected in step 3503. In this example, the UE may maximize the received signal strengths among all digital processing operations of interest such that $$g_{opt}^{(l')} = \underset{\substack{g_k \in F_g \\ k=0,1,\ldots,K-1}}{\operatorname{argmax}} \left| g_k^* \begin{bmatrix} w_{l'}^* & \cdots & 0_{1 \times N} \\ \vdots & \ddots & \vdots \\ 0_{1 \times N} & \cdots & w_{l'}^* \end{bmatrix} h(\partial) \right|^2 \quad (25)$$

In step 3507, the UE determines $w_{opt}$ and $g_{opt}^{(l')}$ as the selected combination of analog and digital beams. The UE may be able to extract the channel angle information from $g_{opt}^{(l')}$ and/or $w_{opt}$, and treat the channel angle information as the digital output as discussed in step 2804 as illustrated in FIG. 28. The UE may also directly use $g_{opt}^{(l')}$ and/or $w_{opt}$ as the digital output to assist the analog receive beam operation/management.

In the previous examples, for a given analog processing operation, the simultaneously probed analog beams from all antenna panels are identical, e.g., the simultaneously probed analog beams may correspond to a single beam codeword from a given analog beam codebook. In this disclosure, the analog measurement beams probed during a given analog process could be different from each other such that the analog measurement beams may correspond to different analog beam codewords in the given analog beam codebook to facilitate the analog measurement beam sweeping process.

In this setup, after combining the RF frontend measurement with the analog measurement beams, the corresponding analog beam-space measurement for the l-th analog process becomes $$r(M_l, \partial) = \begin{bmatrix} w^*(\mu_{l,0}) & \cdots & 0_{1 \times N} \\ \vdots & \ddots & \vdots \\ 0_{1 \times N} & \cdots & w^*(\mu_{l,M-1}) \end{bmatrix} h(\partial) \in C^{M \times 1} \cdots \text{ where} \quad (26),$$

$$M_l = \{\mu_{l,0}, \ldots, \mu_{l,M-1}\} \text{ and } w(\mu_{l,m}) = \quad (27)$$

-continued $$\frac{1}{\sqrt{N}}\left[1, e^{i\mu_{l,m}}, \ldots, e^{i(N-1)\mu_{l,m}}\right]^T \in F_w \ldots$$

Based on (27), the analog beam-space measurement in (26) can be further expressed as $$r(M_l, \vartheta) = \frac{\alpha}{\sqrt{N}}\left[\sum_{n=0}^{N-1}e^{in(\vartheta-\mu_{l,0})}, e^{iN\vartheta}\sum_{n=0}^{N-1}e^{in(\vartheta-\mu_{l,1})}, \ldots, e^{i(M-1)N\vartheta}\sum_{n=0}^{N-1}e^{in(\vartheta-\mu_{l,M-1})}\right]^T \quad (28)$$

A similar form to (5) may not be obtained from (28) due to the use of different beams (steering towards different directions) across the M antenna panels for a given analog processing operation. The receive beam-space measurement in (28), i.e., the output from the analog processing part, can still be directly input to the digital domain for further processing without any quantization loss, attenuation and other types of distortions by assuming, e.g., infinite-resolution ADCs.

Similar to the operations in step 2802, the UE then combines $r(M_l, \vartheta)$ with $g(\tau_k)$, and obtains the digitally processed measurement as $$c(\tau_k, M_l, \vartheta) = \quad (29)$$
$$g^*(\tau_k)r(M_l, \vartheta) = \frac{a}{\sqrt{PN}}\left[1, e^{-iN\tau_k}, e^{-i2N\tau_k}, \ldots, e^{-i(M-1)N\tau_k}\right] \times$$
$$\left[\sum_{n=0}^{N-1}e^{in(\vartheta-\mu_{l,0})}, e^{iN\vartheta}\sum_{n=0}^{N-1}e^{in(\vartheta-\mu_{l,1})}, \ldots, e^{i(M-1)N\vartheta}\sum_{n=0}^{N-1}e^{in(\vartheta-\mu_{l,M-1})}\right]^T =$$
$$\frac{a}{\sqrt{PN}}\sum_{m=0}^{M-1}\left(\sum_{n=0}^{N-1}e^{in(\vartheta-\mu_{l,m})}e^{imN(\vartheta-\tau_k)}\right) \ldots$$

For a total of K digital processes and L analog processes, the total number of digitally processed measurement is KL. The UE then computes the received signal strength $|c(\tau_k, M_l, \vartheta)|^2$, and regards the received signal strength $|c(\tau_k, M_l, \vartheta)|^2$ as the performance metric to be optimized.

Similar to the operations in step 2803, the UE determines one or more combinations of the analog and digital processes, and therefore, the corresponding analog and digital receive beams, that maximize the received signal strength.

Based on (29), the optimization problem can be formulated and solved as $$(\tau_{opt}, M_{opt}) = \underset{\substack{\tau_k \in A, M_l = \{\mu_{l,0},\ldots,\mu_{l,M-1}\} \in \bar{B} \\ k=0,1,\ldots,K-1 \\ l=0,1,\ldots,L-1}}{\text{argmax}} |c(\tau_k, M_l, \vartheta)|^2 \ldots \quad (30),$$

where $M_l = M_{opt} = \{\mu_{l',0}, \ldots, \mu_{l',M-1}\}$ and $\bar{B} = \{\{\mu_{0,0}, \ldots, \mu_{0,M-1}\}, \ldots, \{\mu_{L-1,0}, \ldots, \mu_{L-1,M-1}\}\}$.

The UE conducts similar operations to those in 904 to determine the digital output based on the selection of analog and digital beams in (30). For instance, based on (30), the channel angle estimate can be computed as $\hat{\vartheta} = \tau_{opt}$ or $$\hat{\vartheta} = \frac{1}{M}\sum_{m=0}^{M-1}\mu_{l',m}.$$

As have been discussed before, treating the digital spatial frequency $\tau_{opt}$ as the channel angle estimate $\hat{\vartheta}$ may be preferable under many conditions because the digital beams could largely oversample the given angular space with negligible delay (see FIG. 27), which may result in high-resolution angle estimate.

The UE can then exploit this digital output to optimize the analog receive beam operation/management process, similar to those discussed in step 2805 in FIG. 28. For instance, based on $\hat{\vartheta}$, the final analog receive beam can be generated by the UE according to (10), and the final analog combining matrix can be formed by the UE according to either (11) or (12), depending on the actual antenna array configuration. Further, (3) is obtained by assuming DFT-type receive beam structure.

For other types of receive beams than the DFT-type vectors, the corresponding optimization problem can be formulated and solved as $$(g_{opt}, \overline{W}_{opt}) = \quad (31)$$
$$\underset{\substack{g_k \in F_g, \overline{W}_l = \{w_{l,0},\ldots,w_{l,M-1}\} \in \overline{F}_w \\ k=0,1,\ldots,K-1 \\ l=0,1,\ldots,L-1}}{\text{argmax}} \left|g_k^*\begin{bmatrix} w_{l,0}^* & \cdots & 0_{1\times N} \\ \vdots & \ddots & \vdots \\ 0_{1\times N} & \cdots & w_{l,M-1}^* \end{bmatrix}h(\vartheta)\right|^2 \ldots$$

where, $\overline{F}_w = \{\{w_{0,0}, \ldots, w_{0,M-1}\}, \ldots, \{w_{L-1,0}, \ldots, w_{L-1,M-1}\}\}$ contains all candidate combinations of analog measurement beams for all the analog processing operations. The UE can directly regard $g_{opt}$ and $\overline{W}_{opt}$ as the digital output and use the output to determine appropriate analog beam operation/management strategy.

For instance, based on $g_{opt}$ in (31), the UE could calculate the final analog receive beam and the corresponding analog combining matrix following (13), (14), (15) and (16) in this disclosure, depending on the exact antenna array/panel configuration. Similar to the use of different analog measurement beams across different antenna arrays/panels, the final analog receive beams across different antenna panels could also be different from each other, such that the final analog receive beams may correspond to different beam codewords in $F_{\bar{w}}$.

In this case, the optimization problem can be formulated and solved as $$\{\check{w}_0^{opt}, \ldots, \check{w}_{M-1}^{opt}\} = \underset{\substack{\check{w}_m \in F_{\check{w}} \\ m=0,\ldots,M-1}}{\operatorname{argmax}} \left| g_{opt}^* \begin{bmatrix} \check{w}_0^* & \cdots & 0_{1 \times N} \\ \vdots & \ddots & \vdots \\ 0_{1 \times N} & \cdots & \check{w}_{M-1}^* \end{bmatrix} h(\vartheta) \right|^2 \ldots \text{or} \quad (32)$$

$$\{\check{w}_0^{opt}, \ldots, \check{w}_{M-1}^{opt}\} = \underset{\{\check{w}_0, \ldots, \check{w}_{M-1}\} \in (F_{\check{w}})^M}{\operatorname{argmax}} \left| g_{opt}^* \begin{bmatrix} \check{w}_0^* & \cdots & 0_{1 \times N} \\ \vdots & \ddots & \vdots \\ 0_{1 \times N} & \cdots & \check{w}_{M-1}^* \end{bmatrix} h(\vartheta) \right|^2 \ldots \quad (33),$$

and the corresponding final analog combining matrix can be constructed as $$\check{W}_{opt} = \begin{bmatrix} \check{w}_0^{opt} & \cdots & 0_{1 \times N} \\ \vdots & \ddots & \vdots \\ 0_{1 \times N} & \cdots & \check{w}_{M-1}^{opt} \end{bmatrix} \ldots \quad (34)$$

The UE could determine the final analog beams in a sequential iterative manner by solving (32), or an exhaustive manner by solving (33) such that $(F_{\check{w}})^M$ includes all possible combinations of any M beam codewords in $F_{\check{w}}$.

There are many implementation options to determine $\overline{B}=\{\{\mu_{0,0}, \ldots, \mu_{0,M-1}\}, \ldots, \{\mu_{L-1,0}, \ldots, \mu_{L-1,M-1}\}\}$ in (30) and $F_w=\{\{w_{0,0}, \ldots, w_{0,M-1}\}, \ldots, \{w_{L-1,0}, \ldots, w_{L-1,M-1}\}\}$ in (31) for a given beam codebook. For instance, for a given analog processing operation $l \in \{0, 1, \ldots, L-1\}$, $\{w(\mu_{l,0}), \ldots, w(\mu_{l,M-1})\}$ or $\{w_{l,0}, \ldots, w_{l,M-1}\}$ could be selected as M neighboring codewords in the beam codebook. In this case, $$\mu_{l,0} \approx \ldots \approx \mu_{l,M-1} \overset{\Delta}{=} \mu_l$$

achieved, and (28) could be approximated as (5) in the present disclosure.

Figure 36:
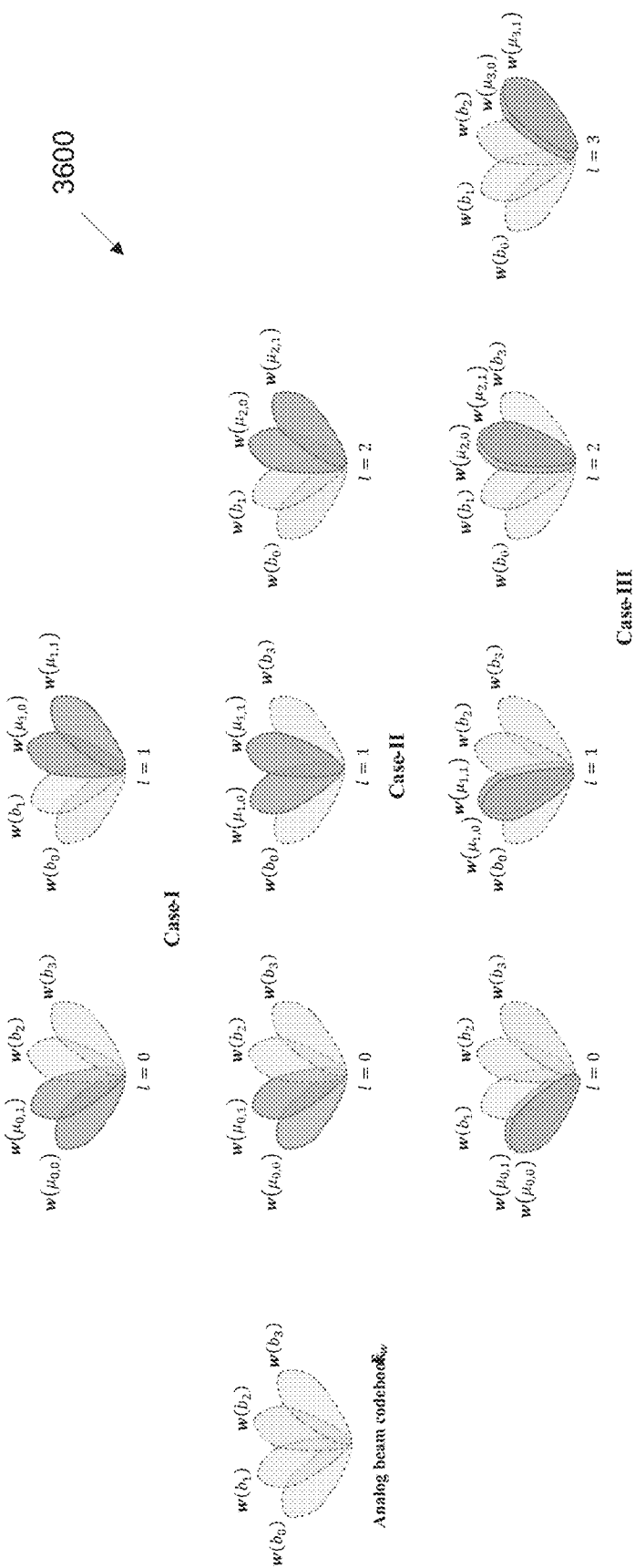
FIG. 36 illustrates an example analog measurement beams selection strategy assuming M=2 antenna panels and given beam codebook Fw according to embodiments of the present disclosure.

FIG. 36 illustrates an example analog measurement beams selection strategy 3600 assuming M=2 antenna panels and given beam codebook Fw according to embodiments of the present disclosure. An embodiment of the analog measurement beams selection strategy 3600 shown in FIG. 36 is for illustration only. One or more of the components illustrated in FIG. 36 can be implemented in specialized circuitry configured to perform the noted functions or one or more of the components can be implemented by one or more processors executing instructions to perform the noted functions.

As illustrated in FIG. 36, three conceptual examples (case-I, case-II and case-III) are presented to illustrate various analog measurement beams selection strategies from the beam codebook for all active RF chains. In these examples, M=2. In case-III, all analog measurement beams simultaneously probed from M antenna panels correspond to the same beam codeword in F. It is evident from FIG. 36 that case-I results in the least number of analog processing operations (L=2) among the three cases, and case-III results in the largest latency for processing the RF frontend measurement in the analog domain (L=4) in contrast to case-I and case-II (L=3). Note that other analog measurement beams selection methods than those provided in FIG. 36 are also possible, depending on practical requirements.

FIG. 36 illustrates conceptual examples of analog measurement beams selection strategies assuming M=2 antenna panels and given beam codebook $F_w$.

The provided concurrent and sequential analog and digital combining methods can be executed by the UE to determine the digital output regardless of whether different or identical analog measurement beams are simultaneously probed from all active antenna arrays/panels. Further, the provided digital domain processing assisted analog domain beam operation/management methods can be applied to other antenna array settings or configurations, such as "shared" antenna array architecture (all phase shifters are jointly controlled by all active RF chains), planar/circular array covering both azimuth and elevation domains, cross/dual-polarized antenna elements, and etc. with moderation modifications, though such extensions are not explicitly discussed in this disclosure.

In one embodiment, the provided digital processing assisted analog beam operation design is used in P-3 during the initial access phase to facilitate the receive beam refinement at the terminal.

Figure 37:
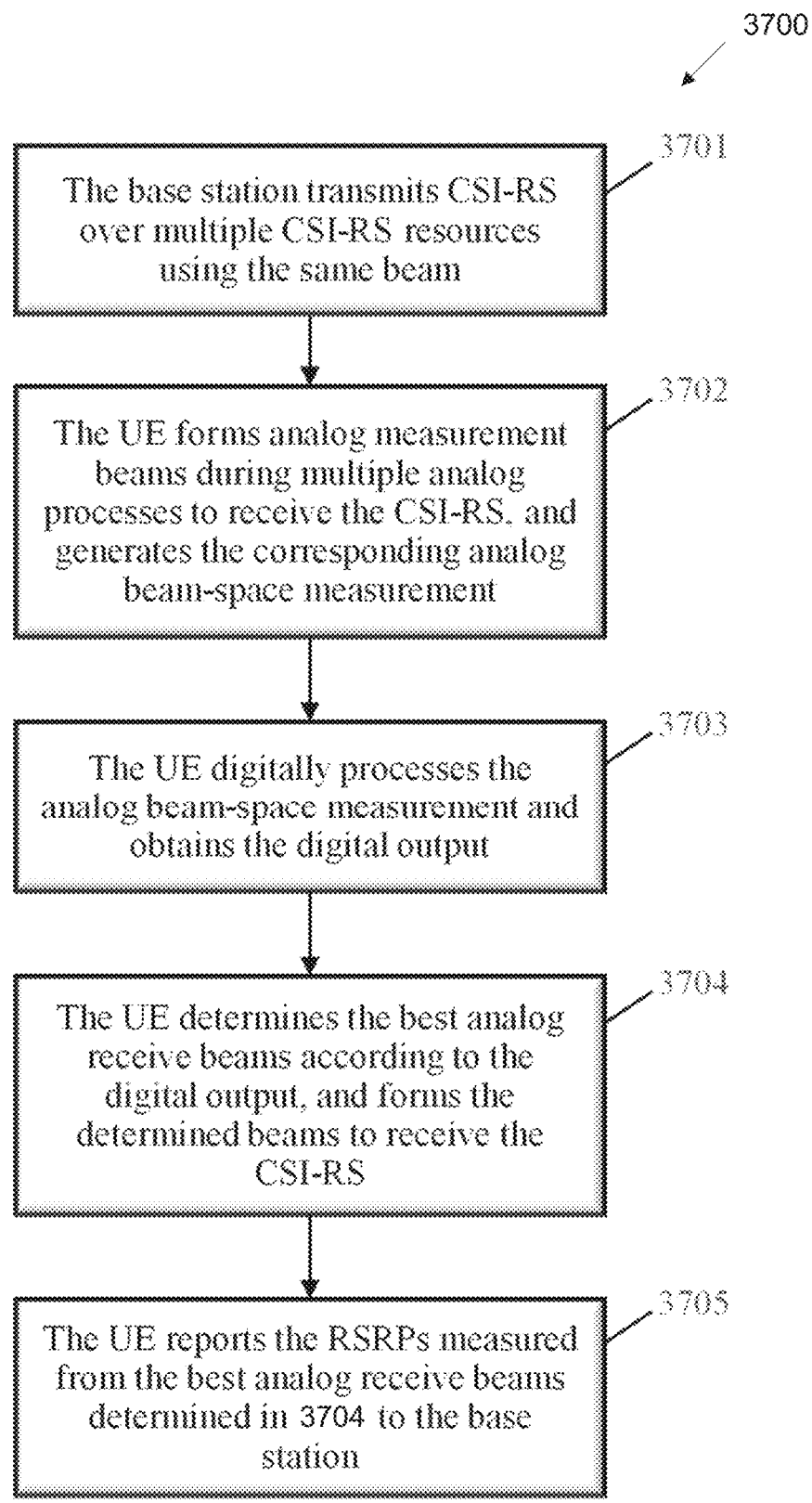
FIG. 37 illustrates a flow chart of a method for digital processing assisted analog receive beam refinement during initial access according to embodiments of the present disclosure.

FIG. 37 illustrates a flow chart of a method 3700 for digital processing assisted analog receive beam refinement during initial access according to embodiments of the present disclosure. An embodiment of the method 3700 shown in FIG. 37 is for illustration only. One or more of the components illustrated in FIG. 37 can be implemented in specialized circuitry configured to perform the noted functions or one or more of the components can be implemented by one or more processors executing instructions to perform the noted functions.

In FIG. 37, an algorithm flow-chart characterizing the provided design approach is provided. In contrast to the conventional exhaustive beam search based refinement, the UE is able to exploit the digital output, and therefore, the digital processing gain, to quickly identify the best analog receive beam(s) with high accuracy in the provided approach. The detailed design procedure is presented in the following along with some discussion regarding the RSRP measurement and reporting.

As illustrated in FIG. 37, in step 3701, the base station transmits the channel state information reference signal (CSI-RS) across multiple CSI-RS resources in a CSI-RS resource set using the same transmit beam. The CSI-RS resources in the resource set are multiplexed in the TDM manner with repetition such that the UE does not expect different values for the following parameters across the CSI-RS resources within a resource set, which are (i) transmission periodicity, and (ii) number of antenna ports. Note that UE is able to change their analog receive beams among different CSI-RS resources.

In step 3702, the UE forms analog measurement beams during multiple analog processes to receive the CSI-RS transmitted from the base station. Here, one analog process corresponds to one CSI-RS resource in the resource set. Consider a total of L analog processing operations conducted by the terminal. For the l-th analog process ($l \in \{0, 1, \ldots, L-1\}$), the UE uses M RF chains to simultaneously probe M analog measurement beams to process the RF frontend measurement and generate the analog beam-space measurement. The simultaneously probed M analog measurement beams may correspond to either the same beam codeword or difference beam codewords in the analog beam codebook, depending on the performance requirement. In general, the UE performs similar operations to those descripted in FIGS. 18, 33, and 35 to acquire the analog beam-space measurement.

FIG. 37 illustrates an algorithm flowchart of digital processing assisted analog receive beam refinement during initial access In step 3703, the UE processes the analog beam-space measurement obtained in step 3702 with customized digital combining vectors and obtains the digital output/outcome from the digitally processed measurement. The digital output may correspond to the channel estimate, or simply the best combination of the analog and digital beams that result in the largest received signal strength. As have been discussed in the previous embodiments, the UE is able to execute the digital processing operations much faster than their counterparts in the analog domain without any constraints on the phase and amplitude quantization resolutions. Hence, high-resolution digital output, and therefore, additional digital processing gain, can be obtained and exploited by the UE to further optimize the following analog beam operation/management procedure if needed.

Further, the analog processing operations in step 3702 and the digital processing operations in step 3703 could be executed by the UE in either a concurrent or sequential manner with or without the hierarchical structure between the first-tier analog beams and the second-tier digital beams. In general, the UE performs similar operations to those described in FIGS. 18, 33, and 35 to acquire the digital output for further processing.

In step 3704, the UE selects one or more analog receive beams based on the digital output from step 3703. The selected analog receive beams could be from a predefined analog beam codebook different from that used for selecting the analog measurement beams in step 3702. In another embodiment, the selected analog beams in step 3704 could be from the same beam codebook for selecting the analog measurement beams in step 3702, but the selected analog beams may correspond to different tiers of beam codewords if a hierarchical structure is implemented in the beam codebook.

For instance, if the digital output is the channel angle estimate, the UE may select one or more analog beams from the given beam codebook, whose steering directions are the closest to the estimated angle(s), as the final analog beam refinement results in P-3. If the digital output is the best combination of analog and digital beams from steps 3702 and 3703, the UE may execute similar operations to those in (13)-(16) or (32)-(34) in this disclosure to acquire the best analog beam(s). Note that the selected analog beams in 1804 may not belong to the analog measurement beams in step 3702. Under certain settings, the UE may also need to actually form the selected analog beams to receive the CSI-RS and obtain the necessary measurement statistics such as the RSRPs.

In step 3705, the UE forms the selected analog beams to receive the CSI-RS transmitted from the base station. The UE then reports the RSRPs measured from the best analog beams determined in step 3704 to the base station. Note that the RSRPs measurement and reporting in step 3705 may not be mandatory for the UE to implement.

In another embodiment, the UE uses the provided digital processing aided analog beam operation/management strategy to select one or more receive beams from the beam codebook that are best suited for a target transmission configuration indicator (TCI) state. Due to link blockage, link failure, change of channel condition and other design limitations, the BS or the network may have to switch or change the TCI state to maintain a good link quality.

In some cases, the switch or change of the TCI state may result in a switch or change of the transmit beam at the BS. Upon receiving the TCI state switch command from the network via higher-layer signaling, the UE may also need to change the employed receive beam, e.g., switch to a new receive beam, to establish the correspondence with the new TCI state/transmit beam. Depending on whether the new TCI state is known or unknown to the UE, the UE may execute different receive beam selection strategies to determine a receive beam or a plurality of receive beams for the target TCI state.

According to the definition in 3GPP standard specification, a TCI state is considered to be known to the UE if: (i) the UE has reported the measurement of the target TCI state to the network at least once before, (ii) the last measurement of the target TCI state was reported by the UE no more than, say, Xms ago, and (iii) the SNR for the target TCI state is above a predefined threshold Th_0, e.g., Th_0=−3 dB, during the TCI state switching period. If any of the above conditions does not hold, the target TCI state is considered to be unknown to the UE. If the switched TCI state is unknown to the UE, the UE may have to reselect one or more receive beams from the beam codebook that are best suited for the target TCI state to re-establish the communication link.

Figure 38:
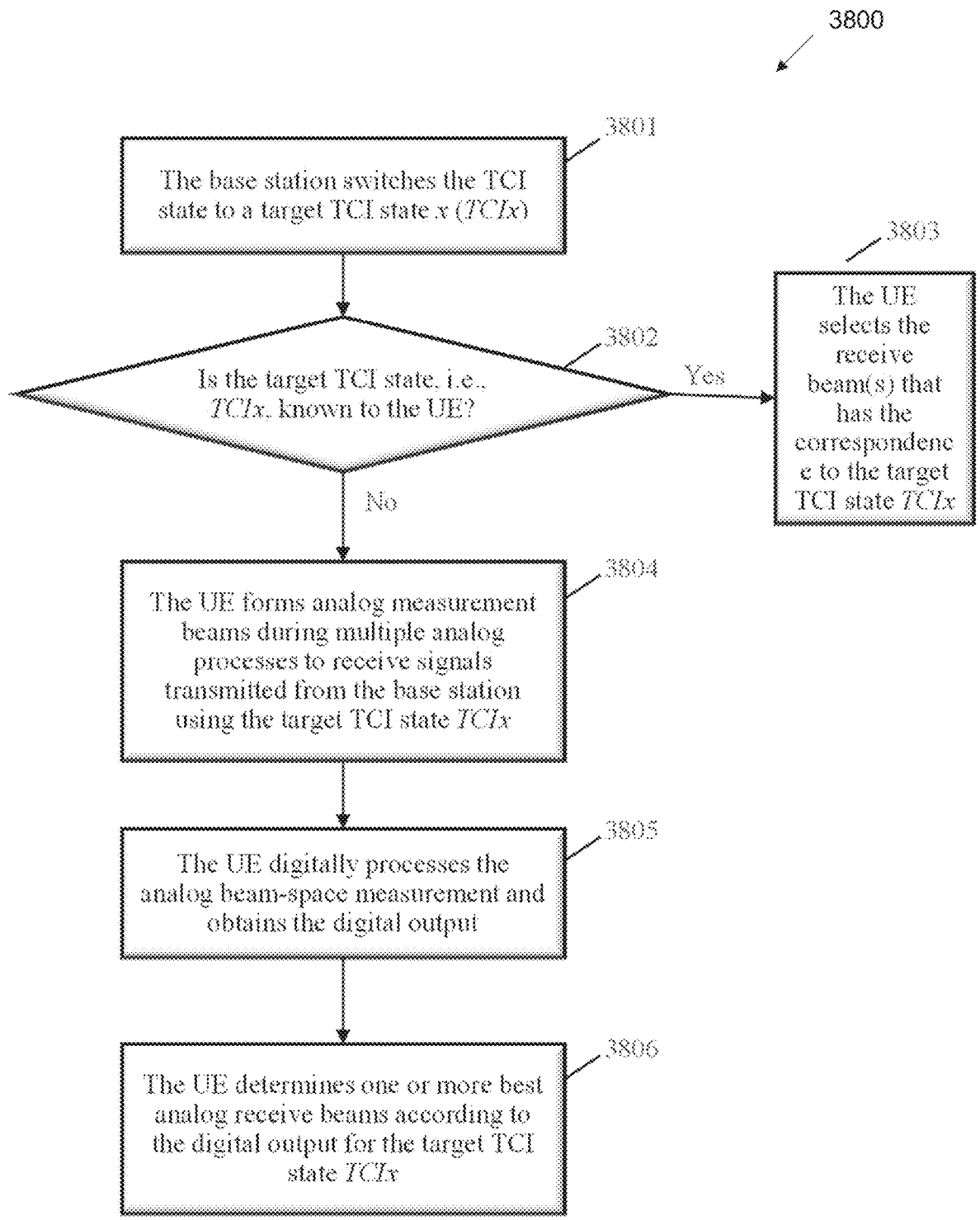
FIG. 38 illustrates a flow chart of a method for digital processing assisted analog receive beam selection for unknown transmission configuration indicator (TCI) state switch according to embodiments of the present disclosure.

FIG. 38 illustrates a flow chart of a method 3800 for digital processing assisted analog receive beam selection for unknown transmission configuration indicator (TCI) state switch according to embodiments of the present disclosure. An embodiment of the method 3800 shown in FIG. 38 is for illustration only. One or more of the components illustrated in FIG. 38 can be implemented in specialized circuitry configured to perform the noted functions or one or more of the components can be implemented by one or more processors executing instructions to perform the noted functions.

In step 3801, the BS or the network switches from the current TCI state to a new TCI state, say, TCI state x (TCIx). The TCI state switch can be triggered by various factors such as link blockage and link failure. The BS or the network can send the corresponding TCI state switch command to the UE via RRC, MAC CE for PDCCH and DCI for PDSCH. For the MAC CE based TCI state indication procedure for PDCCH, the BS or the network first configures a list of $M_0$ (e.g., 128) TCI states via RRC parameter PDSCH-config. For a given control resource set (CORESET), the network or the BS configures a set of $M_1$ (e.g., 64) candidate TCI states from the list of $M_0$ TCI states via RRC parameter ControlResourceSet.

Finally, the network or the BS sends the indication of the selected TCI state to the UE via MAC CE. Further, the network or the BS can configure a new TCI state from the list of $M_1$ TCI states via the MAC CE indication command to the UE for the corresponding CORESET. It is worth noting that the UE may not monitor the status of all $M_1$ TCI states in ControlResourceSet. Hence, the switched TCI state can be unknown to the UE. For the DCI enabled TCI state indication/switch for PDSCH, the network or the BS first configures a list of $M_0$ (e.g., 128) TCI states via RRC parameter PDSCH-config. Then, via the UE-specific PDSCH MAC CE, 8 TCI states out of the total Mo TCI states are activated.

The network or the BS informs the UE regarding the target/switched TCI state (one of the eight active TCI states) via DCI. The UE is capable of monitoring the eight active TCI states, and in this case, the target/switched TCI state can be considered as known to the UE. If the UE is only capable of monitoring some of the eight active TCI states, and the switched/target TCI state indicated by the BS is out of the monitoring set of the active TCI states, the target/switched TCI state may then be considered as unknown to the UE.

In step 3802, the UE checks whether the target TCI state, e.g., TCIx, is known or unknown to the UE based on a set of predefined conditions. The known conditions of a TCI state to the UE are: (i) the TCI state of interest has been measured by the UE (at least once) before, (ii) the last measurement of the TCI state of interest is less than Xms ago, and (iii) the SNR of the switched/target TCI state is larger than a given threshold Th_0. If the switched/target TCI state is known to the UE, the UE would proceed to step 3803. If any of the conditions (i), (ii) and (iii) does not hold, the switched/target TCI state is considered to be unknown to the UE, and the algorithm would proceed to steps 3804, 3805, and 3806 to optimize the corresponding receive beam selection strategies.

In step 3803, the UE knows the receive beam(s) to use for the switched/target TCI state. This correspondence between the receive beam(s) and the known TCI state may be established during the last measurement(s). The UE can therefore directly apply the receive beam(s) that has the correspondence to the target/switched TCI state when the target/switched TCI state becomes in effect.

In step 3804, the UE forms analog measurement beams during multiple analog processes to receive the (reference) signals transmitted from the base station with the switched/target TCI state. In general, the UE performs similar operations to those in step 3702. The analog beam-space measurement obtained in step 3804, is then input to step 3805 for further processing in the digital domain.

In step 3805, the UE applies customized digital combining vectors to process the analog beam-space measurement acquired in step 3804 and obtain the digitally processed measurement. The UE then extracts the digital output from the digitally processed measurement following similar procedures discussed in the previous embodiments and in step 3703 in FIG. 37. In this example, the digital output may also correspond to the channel angle estimate, or the best combinations of analog and digital beams determined in steps 3804 and 3805.

In step 3806, the UE selects one or more analog receive beams from a predetermined analog beam codebook based on the digital output from step 3805. For example, if the digital output is the channel angle estimate, the UE may select one or more analog beams from the given beam codebook, whose steering directions are the closest to the estimated angle(s), to re-establish the radio link with the switched/target TCI state.

In general, the UE performs similar operations to those in 3704 and in the previous embodiments to optimize the analog beam operation procedure. Different from step 3704, the selected analog beams in step 3806 are no longer used by the terminal to collect any further measurement such as the RSRP. It is expected that by exploiting the digital output, and therefore, the corresponding digital domain processing gain, the UE is able to quickly identify the best analog receive beams for the target (unknown) TCI state, which is beneficial in reducing the power consumption of the UE and the overall latency for the terminal to access to the network.

In another embodiment, the UE exploits the digital output, and therefore, the corresponding digital domain processing gain, to decide when and how to execute the analog receive beam change to track the channel variations. More specifically, the UE first uses the digital output to determine whether to trigger the analog receive beam change/tracking. The UE then leverages the digital output to update/change the analog receive beam(s) to track the channel variations and uses them to receive the data transmitted from the base station to achieve a better radio link quality.

Figure 39:
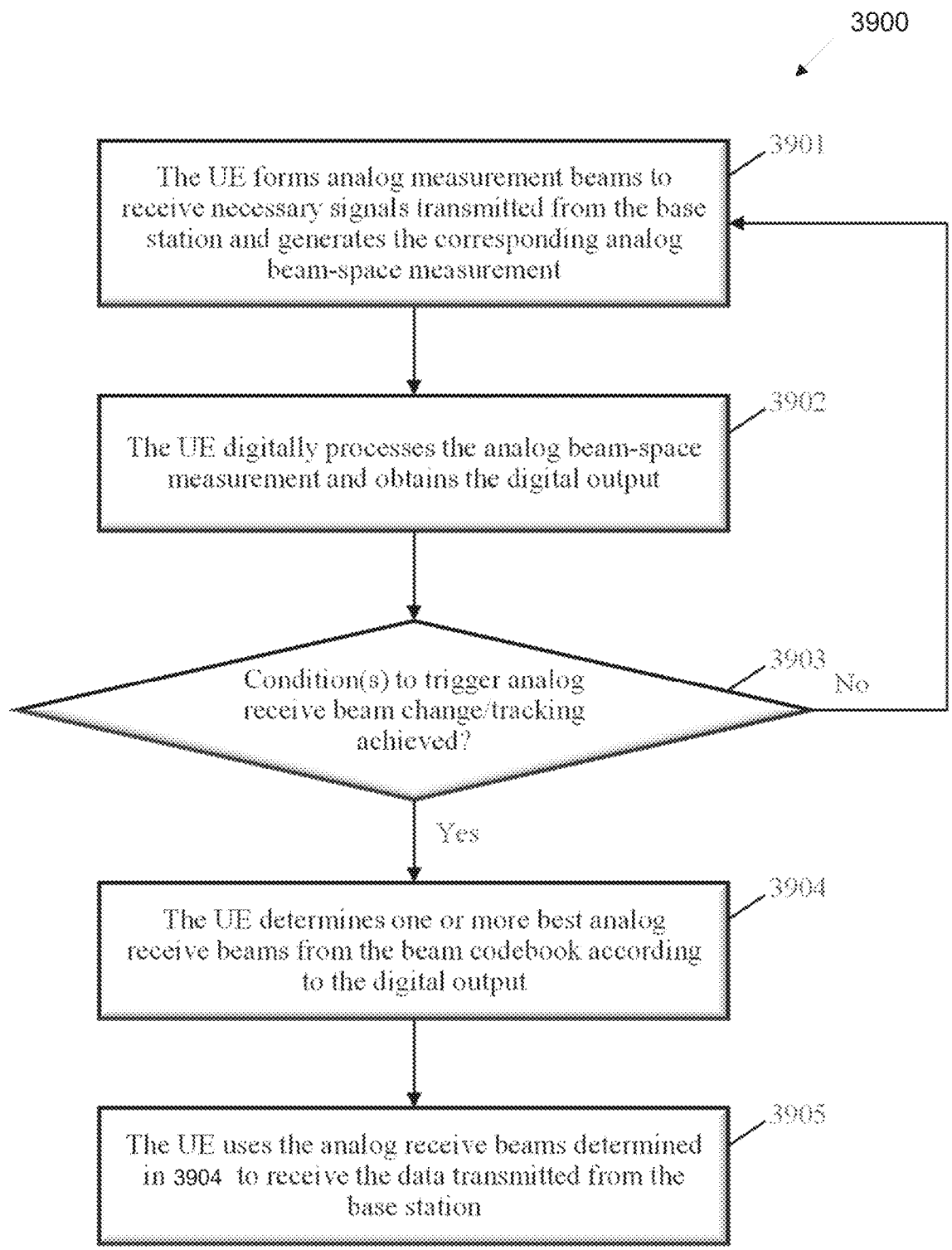
FIG. 39 illustrates a flow chart of a method for digital processing assisted analog receive beam tracking/change according to embodiments of the present disclosure.

FIG. 39 illustrates a flow chart of a method 3900 for digital processing assisted analog receive beam tracking/change according to embodiments of the present disclosure. An embodiment of the method 3900 shown in FIG. 39 is for illustration only. One or more of the components illustrated in FIG. 39 can be implemented in specialized circuitry configured to perform the noted functions or one or more of the components can be implemented by one or more processors executing instructions to perform the noted functions.

In FIG. 39, an algorithm flow-chart depicting the provided digital domain processing assisted analog beam tracking design is presented.

In step 3901, the UE forms analog measurement beams to process the RF frontend measurement and obtains the analog beam-space measurement. In this example, the UE may automatously form the analog measurement beams to constantly monitor the channel variations. The UE may also form the analog measurement beams following the network's configurations. In general, the UE executes similar operations to those in 3702 as illustrated in FIGS. 37 and 3804 as illustrated in FIG. 38.

In step 3902, the UE processes the analog beam-space measurement obtained in step 3901 in the digital domain, with customized digital combining vectors. The main target of digitally processing the analog beam-space measurement is to obtain the high-resolution digital output, which could be exploited by the UE in a later phase to further optimize the analog beam operation/management procedure. Similar to the previous examples, the digital output here may correspond to the channel angle estimate; under certain settings, the digital output may also be a combination of analog and digital beams determined in steps 3901 and 3902. In general, the UE executes similar operations to those in steps 3703 and 3805. Further, a processing cycle is defined here which includes all the analog processing operations in step 3901 and the digital processes in step 3902 to obtain a single digital output.

In step 3903, the UE leverages the high-resolution digital output obtained in step 3902 to decide whether to trigger the receive beam change/tracking. For instance, the UE may compare the current digital output and that derived from the previous processing cycle. If the digital output corresponds to the channel angle estimate, this comparison could be calculating the absolute difference between the current digital output and that derived from the previous processing cycle.

The UE may then compare the angle estimate difference with a predefined threshold. If the difference between the angle estimates is beyond the given threshold, it may imply that the propagation channel may significantly vary between the considered processing cycles, and there is a need to update the analog receive beam(s) to ensure good radio link quality. Otherwise, if the angle estimate difference is below the threshold, it may imply that the considered processing cycles are still within the coherence time of the propagation channel, and the UE may continue to use the current analog receive beam to receive the payload data from the base station. Other conditions exploiting the explicit content of the digital output to determine whether the analog receive beam change or tracking is needed are also possible. If the UE decides not to trigger the receive beam update, the algorithm goes back to step 3901 to test the next processing cycle. Otherwise, if the UE decides to change the analog receive beam, the algorithm proceeds to step 3904.

In step 3904, the UE determines one or more analog receive beams from the beam codebook based on the exact digital output. Similar to the UE's operations in step 3704 and 3806 in FIGS. 37 and 38, respectively, if the digital output corresponds to the channel angle estimate, the UE may select the beam codewords in the beam codebook whose steering directions are the closest to the angle estimate as the new or updated receive beams for data communications. It is expected that by exploiting the digital output, and therefore, the corresponding digital domain processing gain, the UE is able to quickly update the analog receive beams to use for the current channel condition, which may significantly improve the radio link quality under high mobility without introducing additional latency for the terminal to access to the network.

In step 3905, the UE probes the analog receive beams determined in step 3904 to receive the data transmitted from the base station. The analog receive beams here could be selected from a beam codebook different from that used for choosing the analog measurement beams in step 3901. Note that the analog receive beams determined in step 3904 and the analog measurement beams determined in step 3901 could also be from the same beam codebook. Under certain settings and assumptions, the analog measurement beams may also correspond to different tiers of beam codewords, though the analog measurement beams are selected from the same beam codebook.

For instance, if the analog receive beams determined in step 3904 may still be used by the UE to track the channel variations and collect necessary measurement, the analog receive beams may be chosen from the same set of candidate beam codewords used for selecting the analog measurement beams in step 3901. For another example, if the analog receive beams determined in step 3904 may be used by the UE to receive the payload data, the analog receive beams may be chosen from a different set of candidate beam codewords (e.g., different beam codebooks or different tiers of beam codewords in the same beam codebook) from that used for selecting the analog measurement beams in step 3901. The analog beams used for receiving the payload data usually have smaller beamwidth than those used for collecting the measurement.

Figure 40:
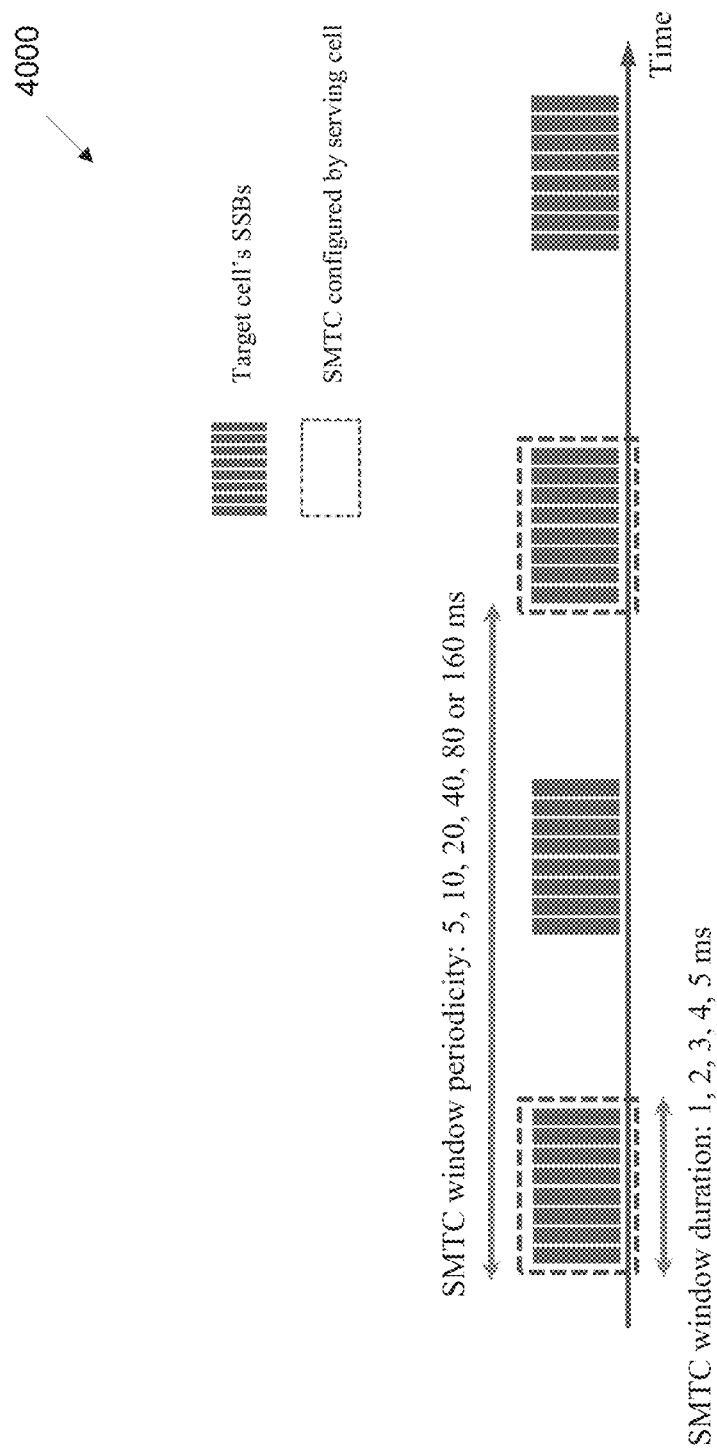
FIG. 40 illustrates an example synchronization signal block (SSB) measurement timing configuration (SMTC) for inter-cell radio resource measurement according to embodiments of the present disclosure.

FIG. 40 illustrates an example synchronization signal block (SSB) measurement timing configuration (SMTC) 4000 for inter-cell radio resource measurement according to embodiments of the present disclosure. An embodiment of the synchronization signal block (SSB) measurement timing configuration (SMTC) 4000 shown in FIG. 40 is for illustration only. One or more of the components illustrated in FIG. 40 can be implemented in specialized circuitry configured to perform the noted functions or one or more of the components can be implemented by one or more processors executing instructions to perform the noted functions.

In another embodiment, the provided digital domain processing assisted analog beam operation strategy is applied in the inter-cell radio resource measurement design. In FIG. 40, conceptual examples of target cell's synchronization signal block (SSB) and SSB measurement timing configuration (SMTC) configured by the serving cell are presented. The serving cell or the serving base station periodically sets the SMTCs for the UE to measure the received signal quality of the target cell through the target cell's SSBs.

As can be seen from FIG. 40, the SMTC's duration could be 1, 2, 3, 4, or 5 ms, and the periodicity of the SMTC could be configured by the network as 5, 10, 20, 40, 80, or 160 ms following the 3GPP standard specifications. During one SMTC, the UE forms analog measurement beams to collect necessary measurement from the target cell. Note that during the SMTC, the serving cell may enforce a scheduling restriction for the UE of interest to avoid interfering the inter-cell measurement. The measurement of the target cell's signal quality during the SMTCs may be used by the UE or the network in a later phase to facilitate the handover process if needed.

It is evident from FIG. 40 that two consecutive SMTC windows could be set far apart in time to avoid significant serving cell's rate loss due to the scheduling restriction. In this case, it may become essential for the UE to quickly collect any necessary measurement of the target cell using limited SMTC resources to avoid significant delay if handover occurs.

Figure 41:
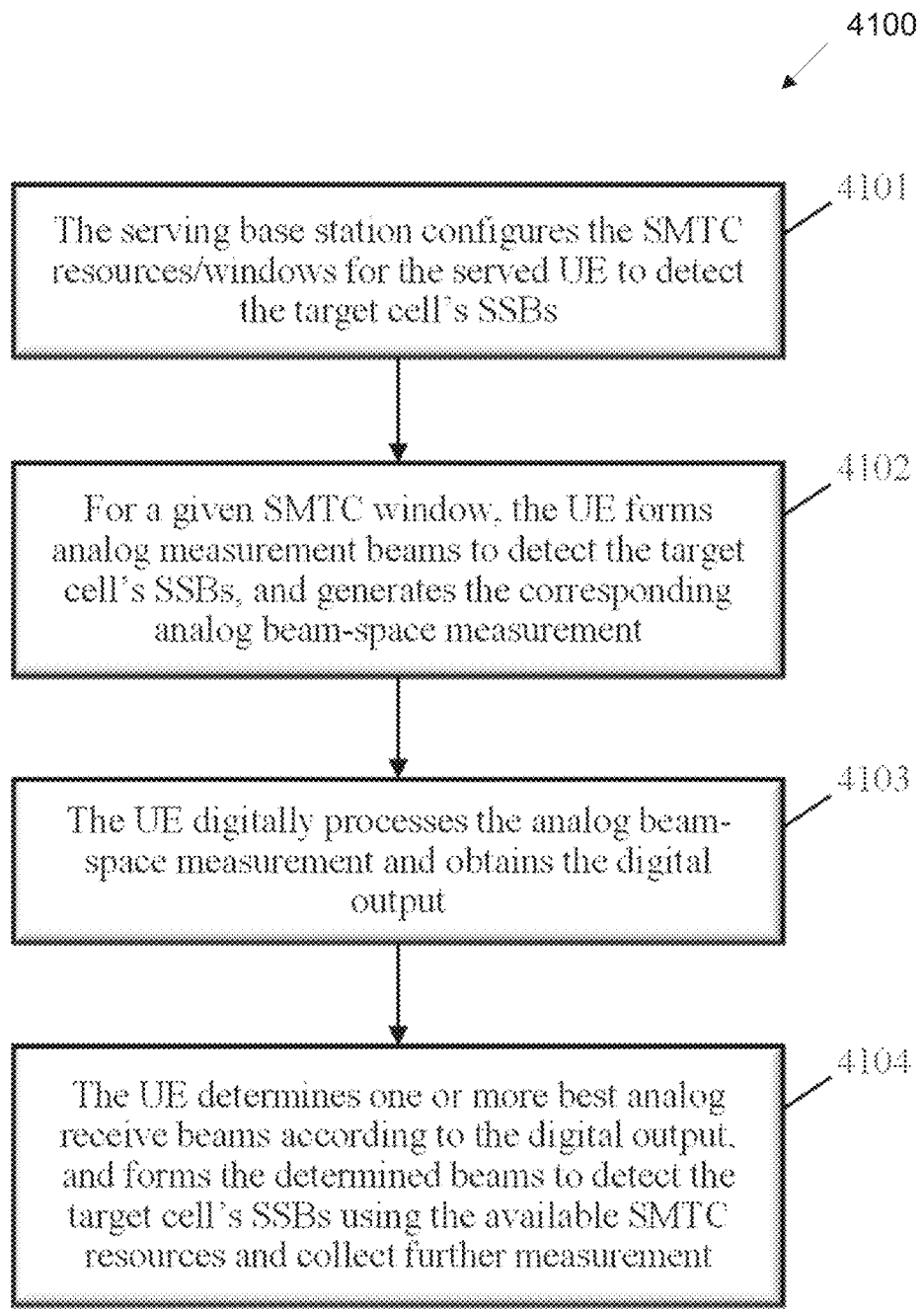
FIG. 41 illustrates a flow chart of a method for digital processing assisted analog receive beam operation/management for the inter-cell measurement according to embodiments of the present disclosure.

FIG. 41 illustrates a flow chart of a method 4100 for digital processing assisted analog receive beam operation/management for the inter-cell measurement according to embodiments of the present disclosure. An embodiment of the method 4100 shown in FIG. 41 is for illustration only. One or more of the components illustrated in FIG. 41 can be implemented in specialized circuitry configured to perform the noted functions or one or more of the components can be implemented by one or more processors executing instructions to perform the noted functions.

In FIG. 41, an algorithm flow-chart depicting the provided digital processing aided analog beamforming based inter-cell measurement is presented. In step 4101, the base station configures the SMTC resources/windows for the serving UEs to detect the target cell's SSBs. As have been discussed in FIG. 40, the SMTCs are configured by the serving base station in a periodic manner. To avoid significant delay during, e.g., handover, it may be beneficial for the UE to obtain as much information as possible of the target cell (e.g., the fine timing information) from limited SMTC resources.

In step 4102, for a given SMTC window, the UE forms analog measurement beams during multiple analog processes to detect the target cell's SSBs. In this example, one analog processing operation may correspond to a single SSB beam probed by the target base station. The UE then generates the corresponding analog beam-space measurement, which will be used in a later phase to derive the digital output. Here, the UE performs similar operations to those in step 3701 in FIG. 37. Different from step 3701, in which the UE detects the CSI-RS sent from the serving base station during P-3 in the initial access, the UE in this example detects the SSBs sent from the target base station for the inter-cell measurement.

In step 4103, the UE conducts similar operations to those in steps 3703, 3805, and 3904, obtaining the digital output from the analog beam-space measurement. Note that in this example, the digital output is obtained based on the channel between the target base station and the UE of interest. In the previous examples, e.g., FIGS. 37, 38, and 39, the digital output is obtained based on the channel between the serving base station and the UE of interest.

In step 4104, the UE selects one or more analog beams from the predetermined beam codebook according to the digital output. Similar to steps 3704, 3806, and 3905 in FIGS. 37, 38, and 39, if the digital output is the channel angle estimate, the UE may select the beam codewords from the given beam codebook, whose steering directions are the closest to the estimated angle, as the final receive beams. The UE then forms the determined analog receive beams over the available SMTC resources to detect the target cell's SSBs and collect further measurement/information. Because of the high-resolution digital output, the analog measurement beams formed in step 4104 could have a much smaller beamwidth than those formed in step 4102.

Having narrow beams for the inter-cell measurement is beneficial because the additional array gain can well compensate for the large path-loss between the target base station and the UE. Further, by exploiting the high-resolution digital output, a relatively small number of analog processes may be needed in step 4102 to obtain the necessary analog beam-space measurement. This implies that the UE may be able to quickly extract the necessary system information such as the fine timing of the target cell using a relatively small amount of SMTC resources, which may avoid potential significant access delay for the UE of interest if a sudden handover occurs for them. Note that in addition to handover, the provided strategy can be applied in other mobility related scenarios such as RRC reconnection and re-establishment.

Figure 42:
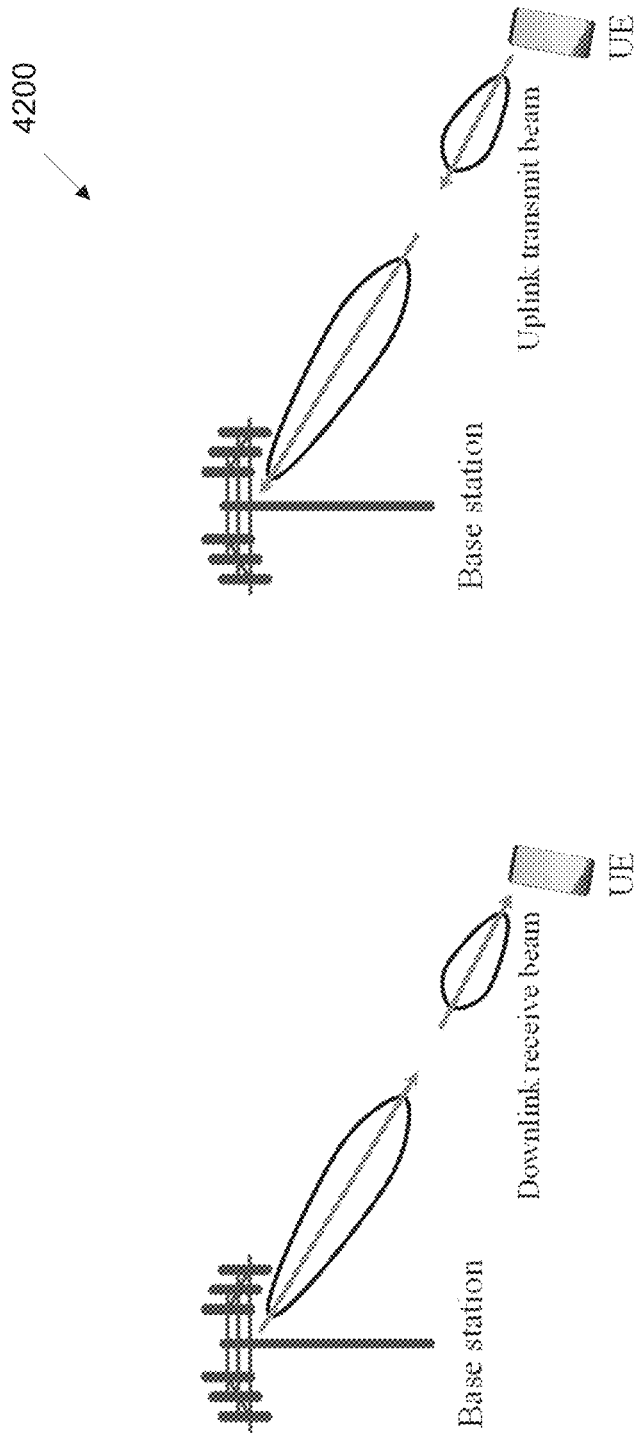
FIG. 42 illustrates an example digital domain processing aided analog domain beam operation/management for both downlink receive combining and uplink transmit beamforming at the terminal according to embodiments of the present disclosure.

FIG. 42 illustrates an example digital domain processing aided analog domain beam operation/management 4200 for both downlink receive combining and uplink transmit beamforming at the terminal according to embodiments of the present disclosure. An embodiment of the digital domain processing aided analog domain beam operation/management 4200 shown in FIG. 42 is for illustration only. One or more of the components illustrated in FIG. 42 can be implemented in specialized circuitry configured to perform the noted functions or one or more of the components can be implemented by one or more processors executing instructions to perform the noted functions.

In the aforementioned embodiments/examples, the analog receive beam operation/management mainly focuses on the downlink receive beam optimization at the terminal (shown on the left-hand-side in FIG. 42). For instance, the algorithm shown in FIG. 37 about the analog receive beam refinement in P-3 during the initial access by exploiting the high-resolution digital output, and therefore, the corresponding digital domain processing gain. For another example, the algorithm provided in FIG. 38 considers selecting one or more analog beams based on the digital output to receive the downlink payload data transmitted from the base station.

Figure 43:
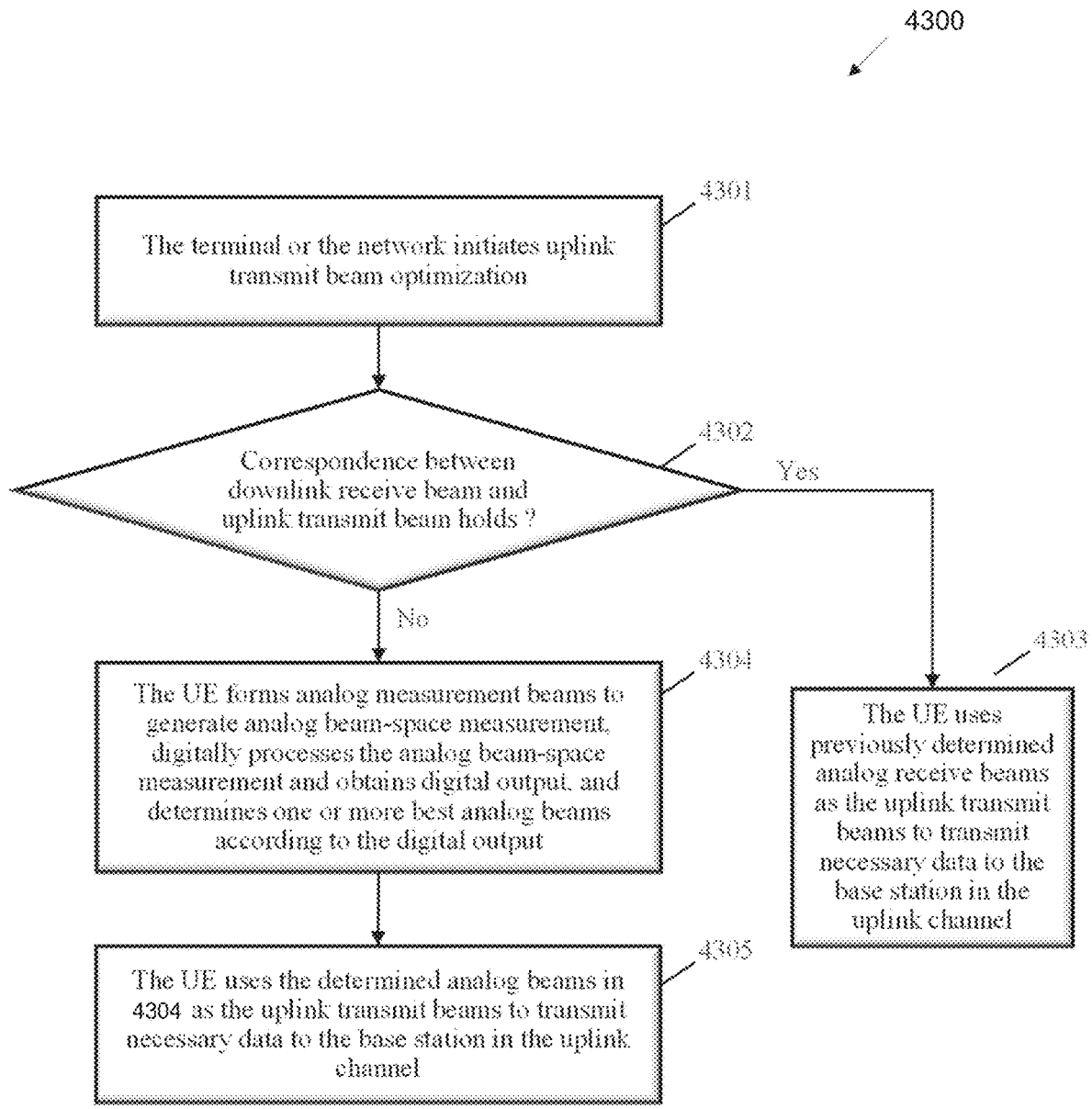
FIG. 43 illustrates a flow chart of a method for digital domain processing assisted analog transmit beam optimization for the uplink channel according to embodiments of the present disclosure.

In practice, optimizing the uplink transmit beam at terminal is also important to enhance the coverage, reduce the power consumption, improve the radio link quality and etc. On the right-hand-side in FIG. 42, a conceptual example of the uplink transmit beamforming at the terminal is presented. In FIG. 43, the key components of the provided digital processing assisted uplink transmit beam optimization are provided.

FIG. 43 illustrates a flow chart of a method 4300 for digital domain processing assisted analog transmit beam optimization for the uplink channel according to embodiments of the present disclosure. An embodiment of the method 4300 shown in FIG. 43 is for illustration only. One or more of the components illustrated in FIG. 43 can be implemented in specialized circuitry configured to perform the noted functions or one or more of the components can be implemented by one or more processors executing instructions to perform the noted functions.

In step 4301 as illustrated in FIG. 43, the uplink transmit beam optimization is initiated by either the UE or the network. The uplink beam here may correspond to or may be used in various uplink channels including but not limited to PUCCH, PUSCH and SRS. For example, the UE may use multiple SRS resources without repetition to determine the best analog beam(s) for the uplink transmission. Especially at cell edge, the UE may need to use relatively narrow beams to transmit the uplink data to the base station to ensure good link quality and coverage.

In step 4302, the UE checks whether the beam correspondence holds between the downlink receive beam and the uplink transmit beam. In this example, if the correspondence between the transmit and receive beams holds at the terminal, it implies that the UE may be able to directly apply the previously determined receive beams as the transmit beams for the uplink transmission. For instance, in the time division duplex (TDD) systems, if the UE initiates the uplink transmit beam optimization (step 4301) within Xms after the downlink receive beam selection, where X is less the channel's coherence time, the UE may directly use the selected analog receive beams as the analog transmit beams to communicate with the base station in the uplink. In this case, i.e., the correspondence between the transmit and receive beams holds, the algorithm proceeds to step 4303. Otherwise, the algorithm proceeds to step 4304.

In step 4303, the UE simply applies the previously determined receive beams or receive spatial filters as the transmit beams or transmit spatial filters for the uplink transmission. The downlink analog receive beams in this example could be determined by the UE using the provided digital domain processing assisted analog beam operation/management strategies extensively discussed in the previous embodiments/examples in this disclosure.

In step 4304, the UE determines one or more analog transmit beams for the uplink transmission based on the UE's downlink measurement and how the UE processes the said measurement. In this example, the UE exploits the digital output (and therefore, the digital domain processing gain) and performs similar downlink measurement and processing operations to those used for determining the analog receive beams for the downlink reception in the previous examples/embodiments in this disclosure.

Specifically, the UE forms multiple analog measurement beams across multiple analog processes to receive the downlink data and/or reference signal probed by the base station. The UE then generates the corresponding analog beam-space measurement, and digitally processes the analog beam-space measurement to obtain the corresponding digital output. The digital output may correspond to the high-resolution estimate of the channel angel information. The UE may then select the beam codewords from the predefined beam codebook whose steering directions are the closest to the estimated channel angel as the uplink transmit beams.

In step 4305, the UE forms the determined analog beams in step 4304 to transmit the necessary data to the base station in the uplink channel. Note that the uplink analog transmit beams formed in step 4305 may have smaller beamwidths than those used for the downlink reception, to ensure the uplink coverage performance.

The most important use cases have been extensively discussed in FIGS. 37 through 43 in this disclosure, which include applying the provided methods in various application scenarios such as analog receive beam refinement in P-3 during the initial access, receive beam operation for unknown TCI state switch, receive beam tracking due to mobility, inter-cell measurement and uplink analog transmit beam optimization.

In this disclosure, several digital processing assisted analog beam operation/management strategies are provided under various practical settings. Many design options and details are incorporated into this disclosure and revealed that the provided methods can be implemented at the terminal with arbitrary beam patterns except the DFT-type beam codebooks. In this disclosure, many essential deployment scenarios are provided such as the receive beam refinement during the initial access phase, analog receive beam tracking, uplink transmit beamforming and etc., who benefited the most from the digital processing gain obtained in the provided methods.

In this disclosure, several situation-aware analog beam operation and management strategies are custom designed for the terminal, targeting at optimizing various performance metrics such as throughput, latency, power consumption, and etc., under different criteria/conditions such as traffic type, buffer status, channel state and etc., for different deployment scenarios including but not limited to inter-cell measurement, receive beam refinement during initial access and receive beam tracking under mobility.

In this disclosure, a set of potential analog beam search/selection methods are first provided and implemented at the terminal side. It is expected that different analog beam selection methods would exhibit different performances (e.g., beam estimation/prediction accuracy and beam search delay) under different settings. Hence, in this case, the UE is able to identify the best beam selection strategy among all the candidate solutions for a given specific configuration, or switch among all the customized beam selection methods for different application scenarios to achieve the best overall performance In this disclosure, seven different analog beam selection strategies are implemented at the terminal, which can be further grouped into four types. Note that other analog beam selection methods than those implemented in this disclosure can also be incorporated into the provided general analog beam operation/management design with moderate modifications.

The candidate analog beam search strategies considered in this disclosure are summarized as follows.

In one example of Type-I, exhaustive search-based beam selection at terminal is provided. In such example, Type-I(a) is determined that both beam search and final beam selection are performed using the first tier of beam codewords, and Type-I(b) is determined that both beam search and final beam selection are performed using the second tier of beam codewords.

In one example of Type-II, hierarchical search-based beam selection at terminal is provided.

In one example of Type-III, beam prediction-based beam selection at terminal is provided. In such example, Type-III(a) is determined that beam search, beam prediction and final beam selection are performed using the first tier of beam codewords. In such example, Type-III(b) is determined that beam search, beam prediction and final beam section are performed using the second tier of beam codewords In one example of Type-IV, hierarchical beam prediction-based beam selection at terminal is provided. In such example, Type-IV(a) is determined that beam search is performed using both the first tier and second tier beam codewords, beam prediction is performed using the first tier of beam codewords, and final beam selection is performed using the second tier of beam codewords. In such example, Type-IV(b): is determined that beam search and beam prediction are performed using both the first tier and second tier of beam codewords, and the final beam selection is performed using the second tier of beam codewords.

If executed, different types of analog beam search methods are expected to result in different performances under various configurations. For instance, assume that the beam codebook equipped at the terminal side has two tiers of beam codewords with four (4) wide beams in the first tier, twelve (12) narrow beams in the second tier, and each beam in the first tier uniquely corresponding to three beams in the second tier (see FIG. 44). It is evident that for the Type-I(a) beam selection method, the UE needs to search over four beams to identify the best beam(s), while for the Type-I(b), this number becomes to twelve.

Figure 44:
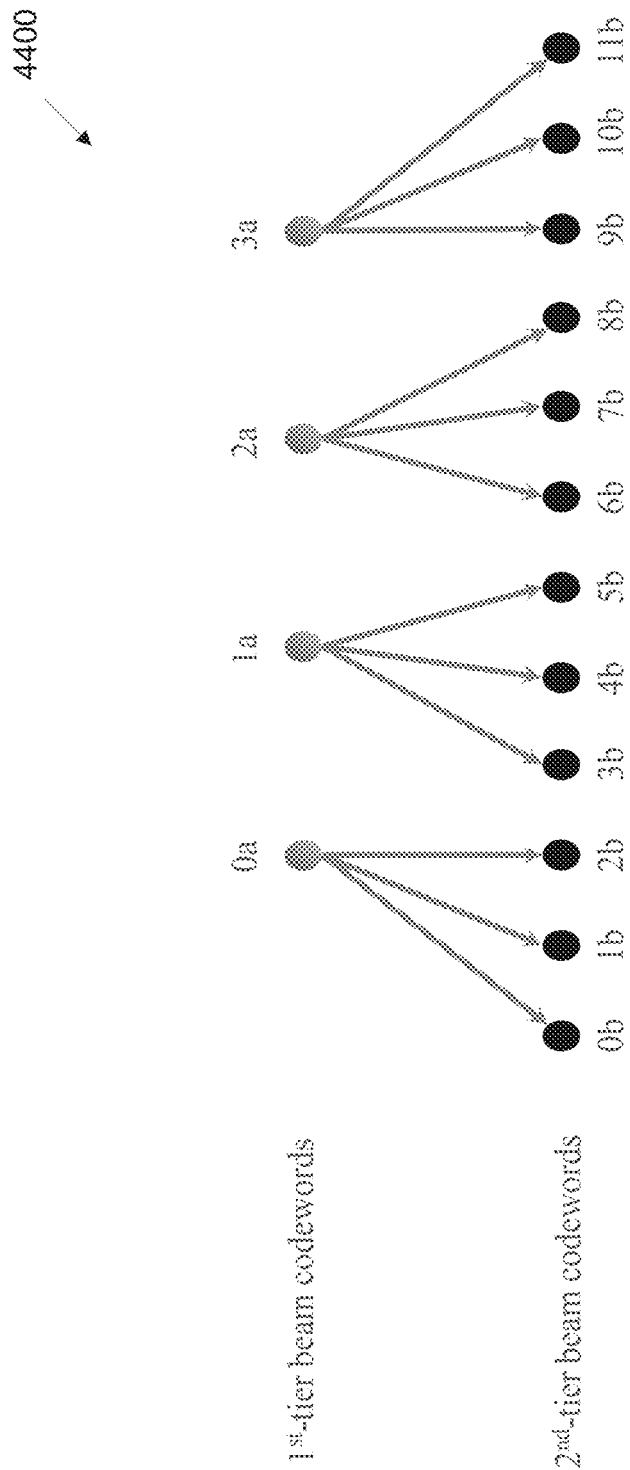
FIG. 44 illustrates an example beam codebook having a hierarchical structure of two tiers of beam codewords according to embodiments of the present disclosure.

FIG. 44 illustrates an example beam codebook 4400 having a hierarchical structure of two tiers of beam codewords according to embodiments of the present disclosure. An embodiment of the beam codebook 4400 shown in FIG. 44 is for illustration only. One or more of the components illustrated in FIG. 44 can be implemented in specialized circuitry configured to perform the noted functions or one or more of the components can be implemented by one or more processors executing instructions to perform the noted functions.

This implies that the Type-I(b) beam selection strategy may require three times more time-frequency resources than those needed by the Type-I(a) beam selection method to determine the best beam(s), which may result in significant delay for the UE to access to the network. Note that the Type-I(b) selection may result in a better array gain performance, and therefore, a better radio link quality performance, than the Type-I(a) beam selection strategy. This is mainly because the Type-I(b) method selects narrow beam(s) from the second tier of beam codewords, while the Type-I(a) method selects relatively wide beam(s) from the first tier of beam codewords in the beam codebook.

Different deployment scenarios may have different requirements on the beam search latency and beam selection accuracy performances. For instance, for bursty traffic with small-size packet, and/or low-latency traffic, and/or high SNR/SINR condition, the UE may need to determine the appropriate beam(s) to use as quick as possible to avoid potential rate loss if the beam search is triggered at the terminal side. Similarly, if the UE has a relatively small amount of data in their buffer to be processed, and/or that the data is of low latency requirement, and/or that the SNR/SINR condition is sufficiently high, and the beam search is triggered, it is more beneficial for the UE to quickly identify the appropriate analog beam(s) to use from the beam codebook to reduce the potential delay.

In this case, the Type-I(a) beam selection strategy can be applied to facilitate the overall beam search process. For another example, if the propagation channel condition is already very good (e.g., the channel has a strong line-of-sight (LOS) component), it may be unnecessary for the terminal to execute, say, Type-I(b) like exhaustive search over many narrow beams to further improve the array gain. Quite opposite, the UE could simply select one or more wide beams following the Type-I(a) selection procedure to communicate with the base station. If there is a need to further improve the radio link quality during the beam search/measurement phase meanwhile reducing the beam search overhead as much as possible, e.g., during the inter-cell measurement depicted in FIG. 7, the UE may perform the beam selection in a hierarchical manner, e.g., following the Type-II strategy, to better tradeoff the beam estimation accuracy and beam search latency performances.

In this disclosure, many possible conditions, design criteria and their combinations are explicitly defined for the terminal to optimize the analog beam search/selection procedures, and therefore, to better support the situation-aware analog beam operation/management design. For many essential application scenarios in the 5G new radio (NR) such as receive beam refinement during the initial access and receive beam tracking under mobility, the corresponding analog beam operation strategies and their algorithm flows are customized, e.g., switching among various beam search methods, to achieve better performance tradeoffs among many metrics such as beam estimation/prediction accuracy, beam search latency, power consumption and etc. It is expected that by implementing the provided methods at the terminal, the UE is capable of flexibly adjusting their beam operation/management strategies for different network settings, configurations and channel conditions to achieve the key performance indicators required by the 5G deployment.

In this disclosure, optimizing the overall analog beam operation/management design is provided such that it is capable of determining appropriate analog beam search/selection methods for various network configurations, settings and channel conditions. Seven different analog beam search/selection strategies are explicitly defined and categorized into four types with each of them exhibiting different performance tradeoffs between beam selection accuracy and beam search latency. Note that other beam search/selection strategies than those discussed in this disclosure can also be implemented at the terminal side.

Further, a beam codebook having two tiers of beam codewords is assumed in this disclosure. In the considered beam codebook, the second tier has more candidate beam codewords than those in the first tier, and the beams in the first tier has a broader width (e.g., in terms of the 3 dB beamwidth) than those in the second tier. One conceptual example of the considered beam codebook has been presented in FIG. 44.

Note that other beam codebook structures, e.g., the one has more than two tiers of beam codewords, can also be supported and implemented at the terminal side. Further in this disclosure, many conditions, design criteria and their combinations are provided for the UE so that they can one of the seven predefined beam selection strategies for a specific setup, or switch among all of the seven predefined beam selection strategies for various scenarios to optimize the given performance metrics. Also, in this disclosure, it is explicitly explained on how to apply the provided situation-aware analog beam operation/management design to many essential 5G NR deployment scenarios such as directional initial access, beamforming based inter-cell measurement, beam tracking under mobility and etc.

Figure 45A:
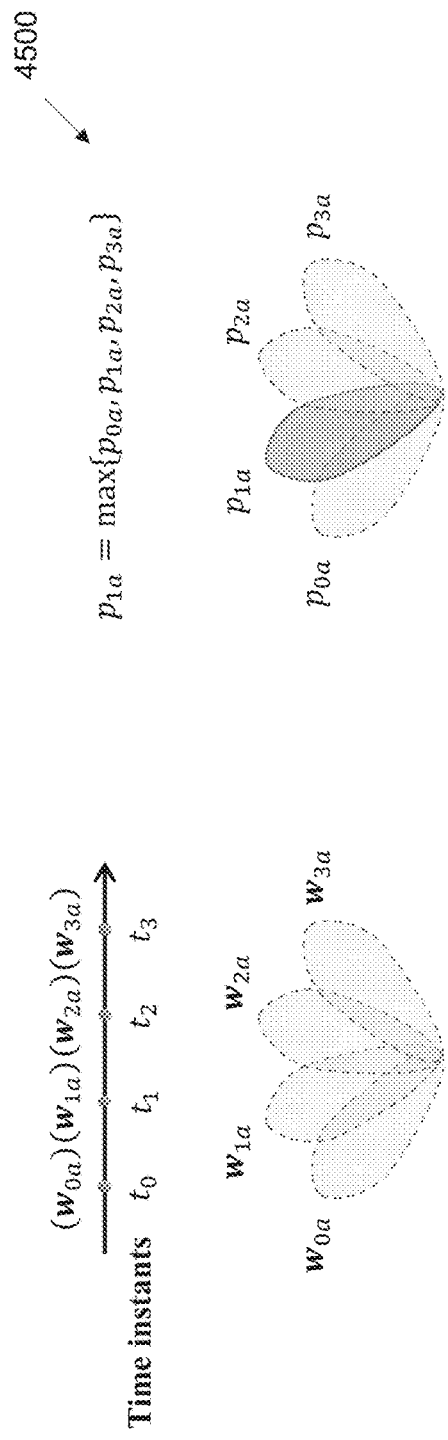
FIG. 45A illustrates an example first tier beam codewords and the corresponding Type-I(a) based exhaustive beam search/selection method according to embodiments of the present disclosure.

FIG. 45A illustrates an example first tier beam codewords and the corresponding Type-I (a) based exhaustive beam search/selection method 4500 according to embodiments of the present disclosure. An embodiment of the first tier beam codewords and the corresponding Type-I (a) based exhaustive beam search/selection method 4500 shown in FIG. 45A is for illustration only. One or more of the components illustrated in FIG. 45A can be implemented in specialized circuitry configured to perform the noted functions or one or more of the components can be implemented by one or more processors executing instructions to perform the noted functions.

Figure 45A:
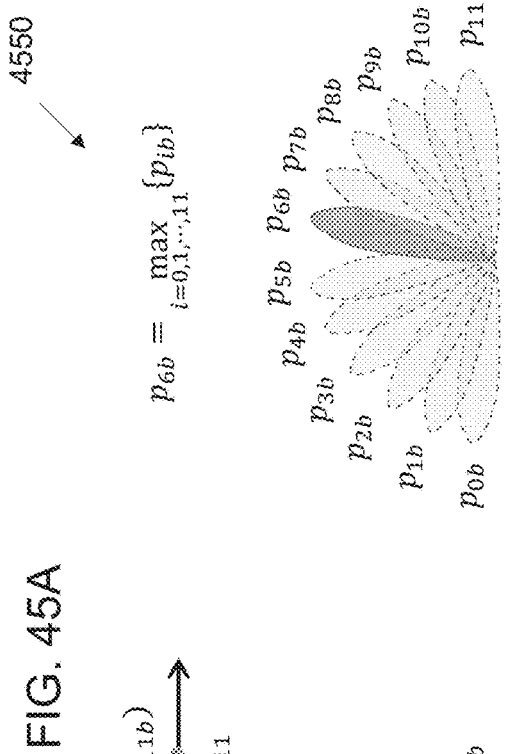
Figure 45B:
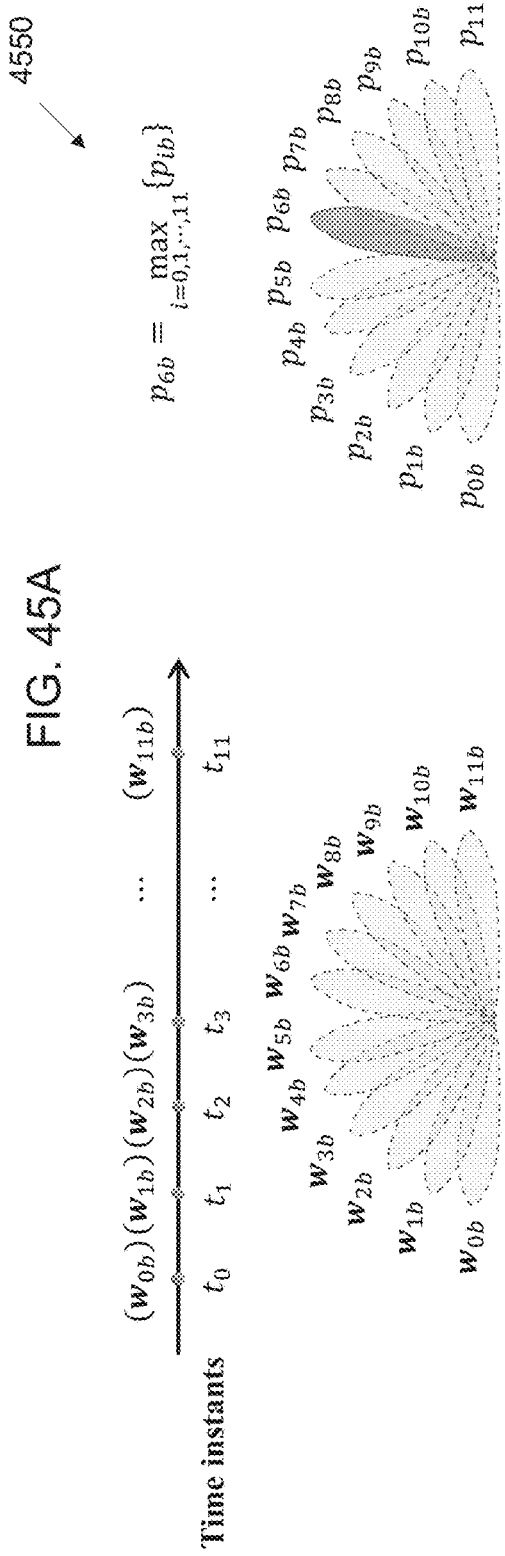
FIG. 45B illustrates an example first tier beam codewords and the corresponding Type-I(b) based exhaustive beam search/selection method according to embodiments of the present disclosure.

FIG. 45B illustrates an example first tier beam codewords and the corresponding Type-I (b) based exhaustive beam search/selection method 4550 according to embodiments of the present disclosure. An embodiment of the first tier beam codewords and the corresponding Type-I (b) based exhaustive beam search/selection method 4550 shown in FIG. 45B is for illustration only. One or more of the components illustrated in FIG. 45B can be implemented in specialized circuitry configured to perform the noted functions or one or more of the components can be implemented by one or more processors executing instructions to perform the noted functions.

As illustrated in FIGS. 45A and 45B, conceptual examples of the two tiers of beam codewords in the considered beam codebook are provided. It is evident from FIGS. 45A and 45B that the first tier has four candidate beams ($w_{0a}$, $w_{1a}$, $w_{2a}$ and $w_{3a}$), the second tier has twelve candidate beams ($w_{0b}$, $w_{1b}$, $w_{2b}$, $w_{3b}$, $w_{4b}$, $w_{5b}$, $w_{6b}$, $w_{7b}$, $w_{8b}$, $w_{9b}$, $w_{10b}$ and $w_{11b}$), and the beams in the first tier are broader than those in the second tier in terms of, say, the 3 dB beamwidth. Further, the time instants $t_i$'s (i=0, 1, ... ) are also depicted in FIGS. 45A and 45B with each of them corresponding to one or more OFDM symbols. In this disclosure, the UE forms a single analog beam at a given time instant, and all analog beams across multiple time instants in a time division multiplexing (TDM) manner. Note that it may be possible for the UE to simultaneously probe multiple beams at a given time instant.

In Type-I(a) based beam search/selection strategy, the UE uses the beam codewords in the first tier in the beam codebook to collect the necessary measurement, and also selects the best beams from the first tier of beam codewords based on the measurement results. For example, the UE may form the beams $w_{0a}$, $w_{1a}$, $w_{2a}$ and $w_{3a}$ from tier-1 (shown in FIG. 45A) at time instants $t_0$, $t_1$, $t_2$ and $t_3$ in the TDM manner.

Note that it is also possible for the UE to probe the beams $w_{0a}$, $w_{1a}$, $w_{2a}$ and $w_{3a}$ in a different order from the one described above. At time instants $t_0$, $t_1$, $t_2$ and $t_3$, the UE collects the necessary measurements $p_{0a}$, $p_{1a}$, $p_{2a}$ and $p_{3a}$ using the beams $w_{0a}$, $w_{1a}$, $w_{2a}$ and $w_{3a}$. In this example, the beam-space measurements $p_{0a}$, $p_{1a}$, $p_{2a}$ and $p_{3a}$ correspond to the received signal powers. By beam search here, the UE compares all the beam-space measurements $p_{0a}$, $p_{1a}$, $p_{2a}$ and $p_{3a}$, and selects one or more beams from the first tier of beam codewords that correspond to the largest received signal powers.

In the example depicted in FIG. 45A, the final beam selected by the UE is $w_{1a}$ because $p_{1a}=\max\{p_{0a}, p_{1a}, p_{2a}, p_{3a}\}$. Note that the beam-space measurement could correspond to other metrics such as RSRP, RSRQ, SNR, SINR and etc., and the corresponding final beam selection criteria could be different from maximizing the received signal powers. The UE then uses the final selected beams to communicate with the base station, by either collecting more measurement or transmitting/receiving the payload data.

In Type-I(b) based exhaustive beam search/selection strategy, the UE uses the beam codewords in the second tier in the beam codebook to collect the necessary measurement, and also selects the best beams from the second tier of beam codewords based on the measurement results. Other beam search/selection procedures in Type-I(b) are similar to those in Type-I(a) based method.

For instance, in FIG. 45B, the UE probes the analog beams $w_{0b}$, $w_{1b}$, $w_{2b}$, $w_{3b}$, $w_{4b}$, $w_{5b}$, $w_{6b}$, $w_{7b}$, $w_{8b}$, $w_{9b}$, $w_{10b}$ and $w_{11b}$ from the beam codebook at time instants $t_0$, $t_1$, $t_2$, $t_3$, $t_4$, $t_5$, $t_6$, $t_7$, $t_8$, $t_9$, $t_{10}$ and $t_{11}$ in the TDM manner to collect the necessary measurements $p_{0b}$, $p_{1b}$, $p_{2b}$, $p_{3b}$, $p_{4b}$, $p_{5b}$, $p_{6b}$, $p_{7b}$, $p_{8b}$, $p_{9b}$, $p_{10b}$ and $p_{11b}$, which correspond to the received signal powers. In this example, as $$p_{6b} = \max_{i=0,1,\ldots,11} \{p_{ib}\},$$

the UE selects $w_{6b}$ as the final beam to communicate with their serving base station.

It is evident from FIGS. 45A and 45B that the Type-I(b) based search would take more (three times in this example) time-frequency resources than the Type-I(a) based method to determine the best beam(s), though the best beam(s) determined by the Type-I(b) search exhibits better array gain performance and better suits for the current channel state.

Figure 46:
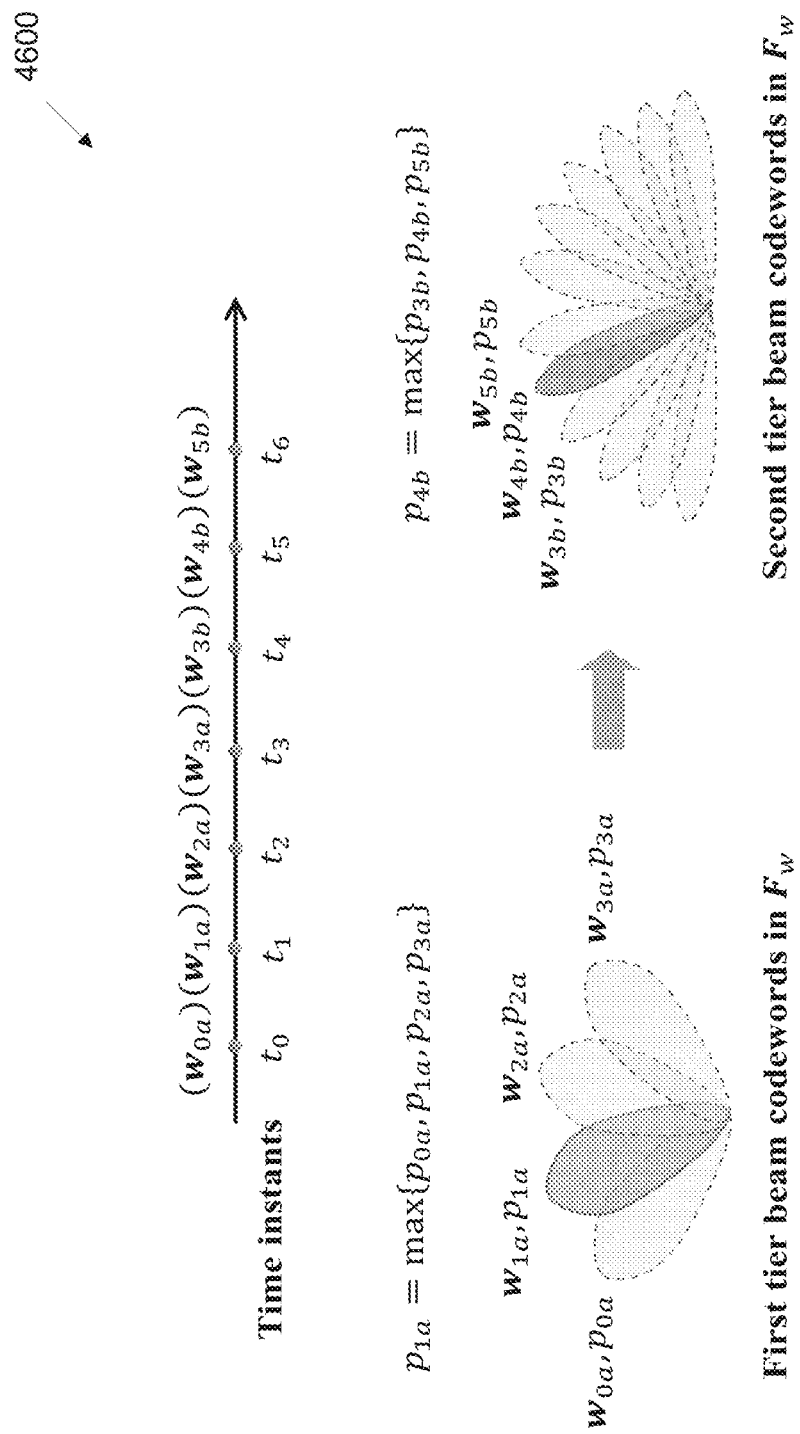
FIG. 46 illustrates an example Type-II hierarchical beam search/selection method exploiting both tiers of beam codewords in the beam codebook according to embodiments of the present disclosure.

FIG. 46 illustrates an example Type-II hierarchical beam search/selection method 4600 exploiting both tiers of beam codewords in the beam codebook according to embodiments of the present disclosure. An embodiment of the Type-II hierarchical beam search/selection method 4600 shown in FIG. 46 is for illustration only. One or more of the components illustrated in FIG. 46 can be implemented in specialized circuitry configured to perform the noted functions or one or more of the components can be implemented by one or more processors executing instructions to perform the noted functions.

In Type-II based method, the UE performs the beam search/selection in a hierarchical manner exploiting both tiers of beam codewords in the beam codebook and their inherent mapping relationships. In this example, the hierarchical structure shown in FIG. 44 is used to map the first tier of beam codewords to the second tier of beam codewords. As have been discussed before, other hierarchical structures or mapping relationships between different tiers of beam codewords are also possible.

The general hierarchical beam search procedure is described as follows: the UE first performs an exhaustive search over the first tier of beam codewords and determines one or more beams. This procedure is similar to that provided in the Type-I(a) based search strategy.

According to the predefined hierarchical structure, the UE then identifies the second tier beam codewords that have correspondence to the selected one or more beams from the first tier codewords. The UE forms the corresponding second tier beams to collect necessary measurements and determines one or more beams from the second tier of beam codewords that result in the best measurement results. The UE uses the selected beams from the second tier codewords as the final beams to communicate with their serving base station.

As illustrated in FIG. 46, conceptual examples of the considered hierarchical beam search strategy are provided. As can be seen from FIG. 46, the UE first determines $w_{1a}$ from the first tier of beam codewords following the same procedure described in FIG. 45A. According to the hierarchical structure depicted in FIG. 44, the beam codeword $w_{1a}$ in the first tier corresponds to beam codewords $w_{3b}$, $w_{4b}$ and $w_{5b}$ in the second tier.

Hence, the UE forms $w_{3b}$, $w_{4b}$ and $w_{5b}$ at time instants $t_4$, $t_5$ and $t_6$ ($t_0$, $t_1$, $t_2$ and $t_3$ are used for probing $w_{0a}$, $w_{1a}$, $w_{2a}$ and $w_{3a}$) to collect the received signal samples and generate the beam-space measurements $p_{3b}$, $p_{4b}$ and $p_{5b}$. For instance, if $p_{4b}=\max\{p_{3b}, p_{4b}, p_{5b}\}$ the UE determines $w_{4b}$ as the final selected beam to transmit/receive signals to/from the base station, which is also shown in FIG. 46.

It is evident from FIG. 46 that, the Type-II hierarchical beam search/selection requires less time-frequency resources than the Type-I(b) based method, and more time-frequency resources than the Type-I(a) based strategy. In terms of the beam selection accuracy, the Type-II hierarchical search/selection may be inferior relative to the Type-I(b) based method, but better than the Type-I(a) based strategy.

Figure 47:
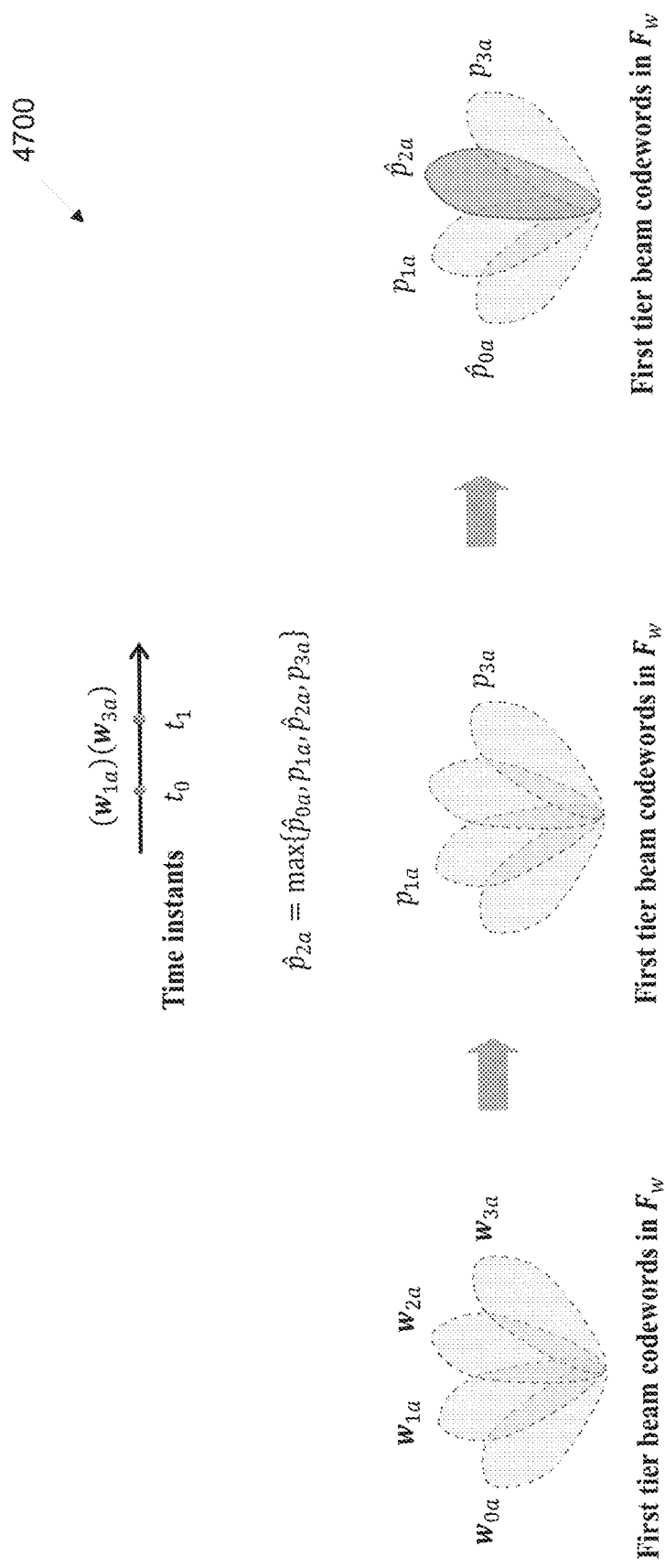
FIG. 47 illustrates an example Type-III (a) beam prediction-based beam search/selection method over the first tier of beam codewords in the beam codebook according to embodiments of the present disclosure.

FIG. 47 illustrates an example Type-III (a) beam prediction-based beam search/selection method 4700 over the first tier of beam codewords in the beam codebook according to embodiments of the present disclosure. An embodiment of the Type-III (a) beam prediction-based beam search/selection method 4700 shown in FIG. 47 is for illustration only. One or more of the components illustrated in FIG. 47 can be implemented in specialized circuitry configured to perform the noted functions or one or more of the components can be implemented by one or more processors executing instructions to perform the noted functions.

In FIG. 47, a conceptual example of the provided Type-III(a) beam prediction-based beam search/selection strategy is presented assuming that the first tier beam codewords are used by the terminal. The general beam prediction based design approach is described as follows: (1) the UE selects one or more beams from a set of candidate beams, e.g., the first tier of beam codewords in the given beam codebook; the selected beams are a subset of all candidate beams; (2) the UE probes the selected beams in the TDM manner to collect the necessary measurement and generate the corresponding performance metrics; (3) the UE exploits the performance metrics calculated from the measurement beams and predicts the performance metrics for other beams in the candidate beams set that are not selected for measurement; and (4) the UE compares the performance metrics obtained from both measurement and prediction, and selects one or more beams from the candidate beams set that result in the best performance metrics to communicate with the base station.

For the example shown in FIG. 47, the UE first selects $w_{1a}$ and $w_{3a}$ from the first tier beam codewords $\{w_{0a}, w_{1a}, w_{2a}, w_{3a}\}$ in the beam codebook $F_w$ as the measurement beams. Note that other choices of the measurement beams from the candidate beams set are also possible. The UE then forms $w_{1a}$ and $w_{3a}$ to process the received signal samples and generates the corresponding beam-space measurements $p_{1a}$ and $p_{3a}$. Similar to FIGS. 45 and 46, the beam-space measurements in this example correspond to the received signal powers.

The UE predicts the received signal powers $P_{0a}$ and $P_{2a}$ for beams $w_{0a}$ and $w_{2a}$ by exploiting the actual beam-space measurements $p_{1a}$, $p_{3a}$, and the inherent correlations among the first tier of beam codewords $\{w_{0a}, w_{1a}, w_{2a}, w_{3a}\}$ though the beams $w_{0a}$ and $w_{2a}$ are not selected by the terminal to collect any measurements. The UE then compares the received signal powers from both measurement ($p_{1a}$ and $p_{3a}$) and prediction ($\hat{p}_{0a}$ and $\hat{p}_{2a}$), and since $P_{2a}=\max\{\hat{p}_{0a}, p_{1a}, \hat{p}_{2a}, p_{3a}\}$, the UE selects $w_{2a}$ from the first tier of beam codewords as the final beam to transmit/receive the signals to/from their serving base station, though $w_{2a}$ is never selected by the terminal for measurement.

It is evident from FIG. 47 that only two time instants, i.e., $t_0$ and $t_1$, are needed for the UE to probe the beams $w_{1a}$ and $w_{3a}$. In contrast to the Type-I(a) exhaustive beam search/selection strategy, the Type-III(a) beam prediction-based search/selection method further reduces the required time-frequency resources, and therefore, the beam search latency by half. The beam selection/estimation accuracy of the provided Type-III(a) based approach, however, is subject to many factors such as the correlation relationships among all the candidate beams, the explicit beam prediction algorithms, the exact beam patterns and etc.

Figure 48:
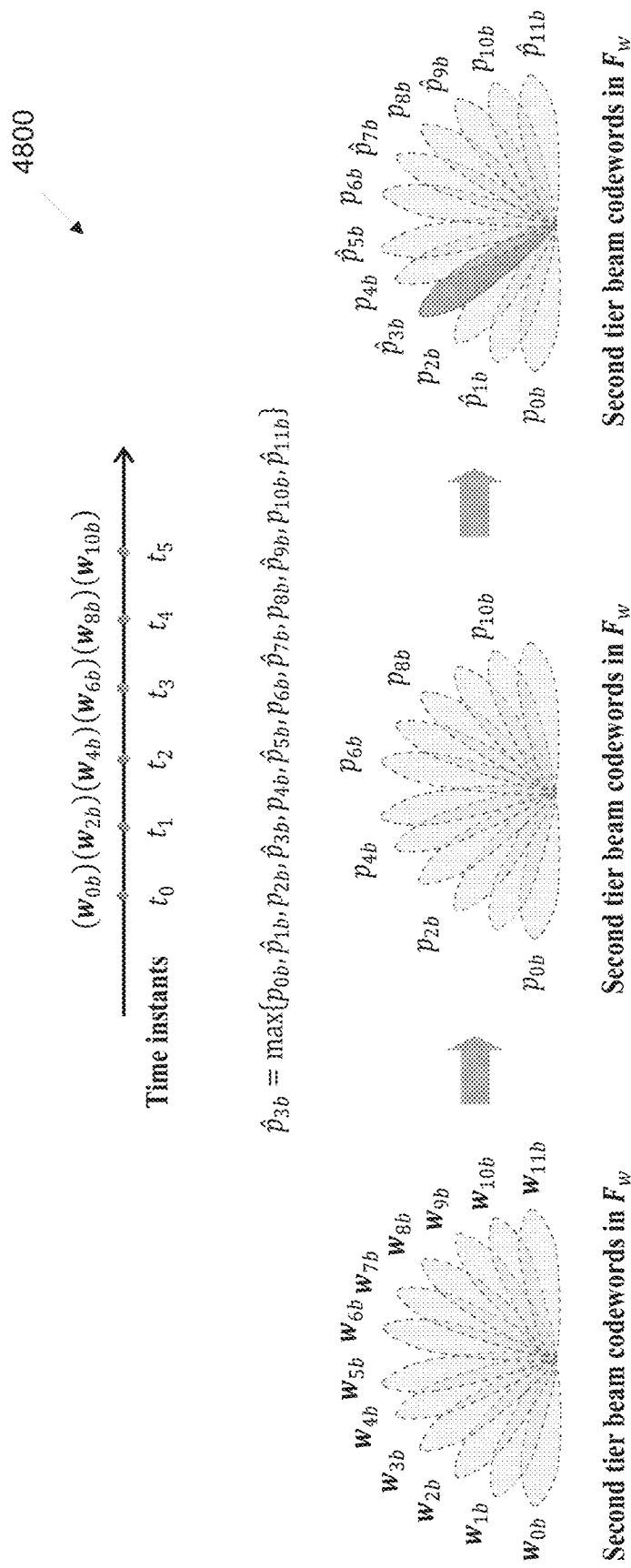
FIG. 48 illustrates an example Type-III (b) beam prediction-based beam search/selection method over the second tier of beam codewords in the beam codebook according to embodiments of the present disclosure.

FIG. 48 illustrates an example Type-III (b) beam prediction-based beam search/selection method 4800 over the second tier of beam codewords in the beam codebook according to embodiments of the present disclosure. An embodiment of the Type-III (b) beam prediction-based beam search/selection method 4800 shown in FIG. 48 is for illustration only. One or more of the components illustrated in FIG. 48 can be implemented in specialized circuitry configured to perform the noted functions or one or more of the components can be implemented by one or more processors executing instructions to perform the noted functions.

In FIG. 48, a conceptual example of the Type-III(b) beam prediction-based beam search/selection method over the second tier of beam codewords in the beam codebook is presented. Similar to the design principle of the Type-III(a) based method over the first tier beam codewords shown in FIG. 47, in the Type-III(b) based strategy, the UE only forms a few beams selected from the second tier of beam codewords to collect any necessary measurement and generate the corresponding performance metrics, such as the received signal powers.

By exploiting the inherent correlation among the second tier beams, the UE uses the performance metrics derived from the actual measurement to predict the corresponding performance metrics for the beams in the second tier that are not applied by the UE for measurement. Finally, the UE selects the beams from the second tier that result in the best performance metrics, e.g., the highest received signal powers, to communicate with the base station.

In the example shown in FIG. 48, the measurement beams probed by the UE are $w_{0b}$, $w_{2b}$, $w_{4b}$, $w_{6b}$, $w_{8b}$ and $w_{10b}$ at time instants $t_0$, $t_1$, $t_2$, $t_3$, $t_4$ and $t_5$ with the received signal power metrics and $p_{0b}$, $p_{2b}$, $p_{4b}$, $p_{6b}$, $p_{8b}$ and $p_{10b}$. Further, the predicted receive signal power metrics for beams $w_{1b}$, $w_{3b}$, $w_{5b}$, $w_{7b}$, $w_{9b}$ and $w_{11b}$ are Derived from their Measured counterparts, and are denoted by $\hat{p}_{1b}$, $\hat{p}_{3b}$, $\hat{p}_{5b}$, $\hat{p}_{7b}$, $\hat{p}_{9b}$ and $\hat{p}_{11b}$. The UE then selects $w_{3b}$ as the final beam to transmit/receive the data signals to/from the base station because $\hat{p}_{3b}=\max\{p_{0b}, \hat{p}_{1b}, p_{2b}, \hat{p}_{3b}, p_{4b}, \hat{p}_{5b}, p_{6b}, \hat{p}_{7b}, p_{8b}, \hat{p}_{9b}, p_{10b}, \hat{p}_{11b}\}$ assumed in this example.

In contrast to the Type-III(a) beam search example presented in FIG. 47, the Type-III(b) based method in FIG. 48 requires more time-frequency resources to collect the necessary measurement and identify the final beam(s). The selected final transmit/receive beams in the Type-III(b) based method, however, are narrower than those selected in the Type-III(a) based strategy, resulting in larger array gain, and therefore, better link quality during practical implementation. Similar conclusions can be drawn by comparing the Type-III(b) based search method with Type-I(a), Type-I(b) and Type-II based design approaches.

Figure 49:
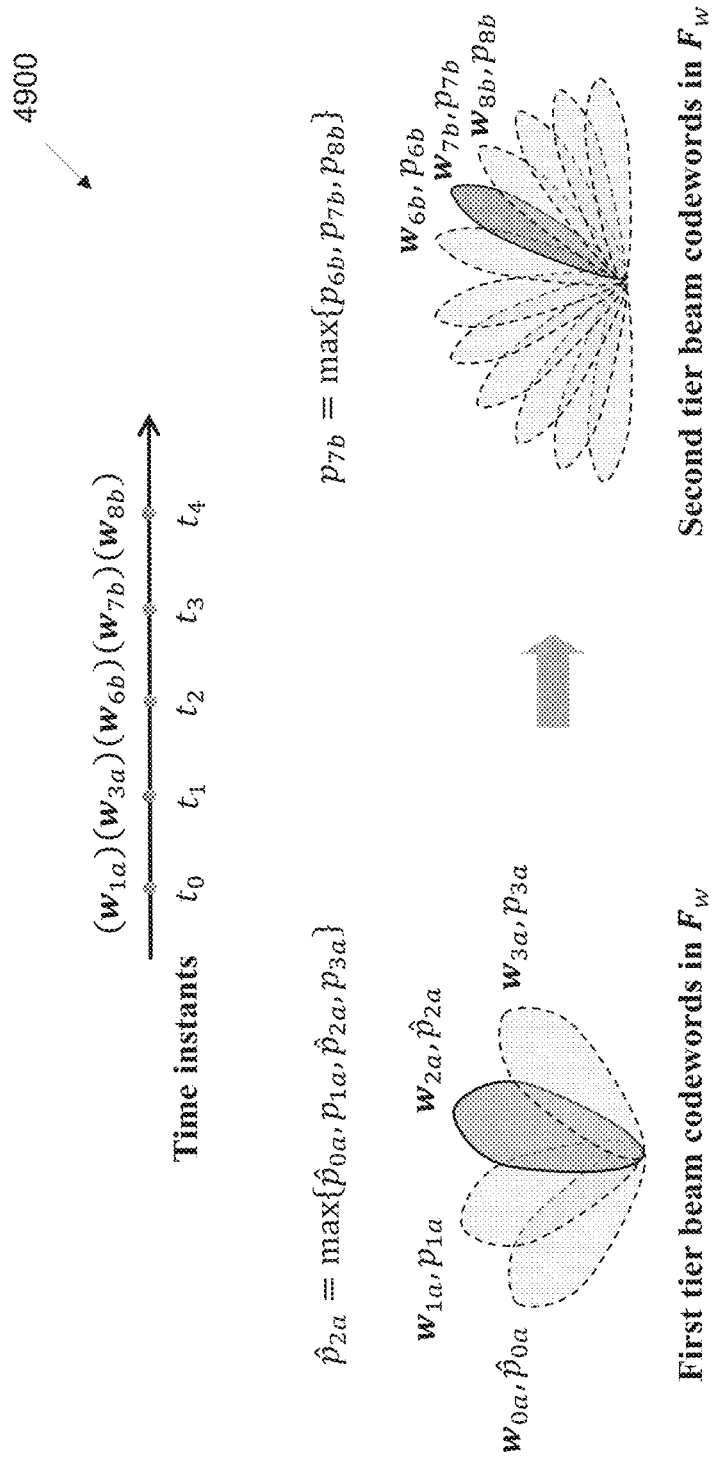
FIG. 49 illustrates an example the Type-IV (a) beam prediction-based beam search/selection method according to embodiments of the present disclosure.

FIG. 49 illustrates an example Type-IV(a) beam prediction-based beam search/selection method 4900 according to embodiments of the present disclosure. An embodiment of the Type-IV(a) beam prediction-based beam search/selection method 4900 shown in FIG. 49 is for illustration only. One or more of the components illustrated in FIG. 49 can be implemented in specialized circuitry configured to perform the noted functions or one or more of the components can be implemented by one or more processors executing instructions to perform the noted functions.

FIG. 49 illustrates a conceptual example of the Type-IV (a) beam prediction based beam search/selection method and the beam prediction is executed over the first tier beam codewords, while the beam selection is performed on the second tier of beam codewords in the given beam codebook in a hierarchical manner.

The provided Type-IV(a) hierarchical beam prediction based method can be considered as a hybrid design of the Type-III(a) based beam prediction strategy over the first tier of beam codewords and the Type-II based hierarchical beam search/selection method.

The general design procedure of the Type-IV(a) based approach can be described as follows: (i) the UE forms a few measurement beams selected from the first tier of beam codewords to collect necessary measurement and compute the corresponding performance metrics, e.g., the received signal powers; the UE then predicts the performance metrics for other beam in the first tier not selected for measurement following a similar procedure to that in the Type-III(a) based strategy; the UE then selects one or more first tier beams that result in the best performance metrics among all the performance metrics obtained from both the measurement and prediction; (ii) based on the selected one or more first tier beams in (i), the UE first identifies their corresponding second tier of beams in the beam codebook according to the predefined hierarchical relationship between the first tier and second tier of beam codewords in the beam codebook; the UE probes the said second tier beams to collect necessary measurement and derive the corresponding performance metrics; finally, the UE selects one or more second tier beams that result in the best performance metrics to communicate with the base station.

In accordance with the example shown in FIG. 49, the measurement beams in (i) are $w_{1a}$ and $w_{3a}$ formed by the UE at time instants $t_0$ and $t_1$. The measured received signal powers are denoted by $p_{1a}$ and $p_{3a}$, and the predicted signal powers for beams $w_{0a}$ and $w_{2a}$ are $\hat{p}_{0a}$ and $\hat{p}_{2a}$. Further, the beam selected by the UE in (i) is $w_{2a}$ because $\hat{p}_{2a}=\max\{\hat{p}_{0a}, p_{1a}, \hat{p}_{2a}, p_{3a}\}$ is assumed here. Based on the hierarchical beam codebook structure exhibited in FIG. 44, the second tier beam codewords correspond to the first tier beam $w_{2a}$ determined by the UE in (i) are $w_{6b}$, $w_{7b}$ and $w_{8b}$.

At time instants $t_2$, $t_3$ and $t_4$, the UE forms $w_{6b}$, $w_{7b}$ and $w_{8b}$ to collect the measurement and derives the corresponding received signal powers $p_{6b}$, $p_{7b}$ and $p_{8b}$. As in this example, $p_{7b}=\max\{p_{6b}, p_{7b}, p_{8b}\}$ is assumed, the UE finally selects the second tier beam $w_{7b}$ as the beam to transmit/receive the signals to/from their serving base station.

Figure 50:
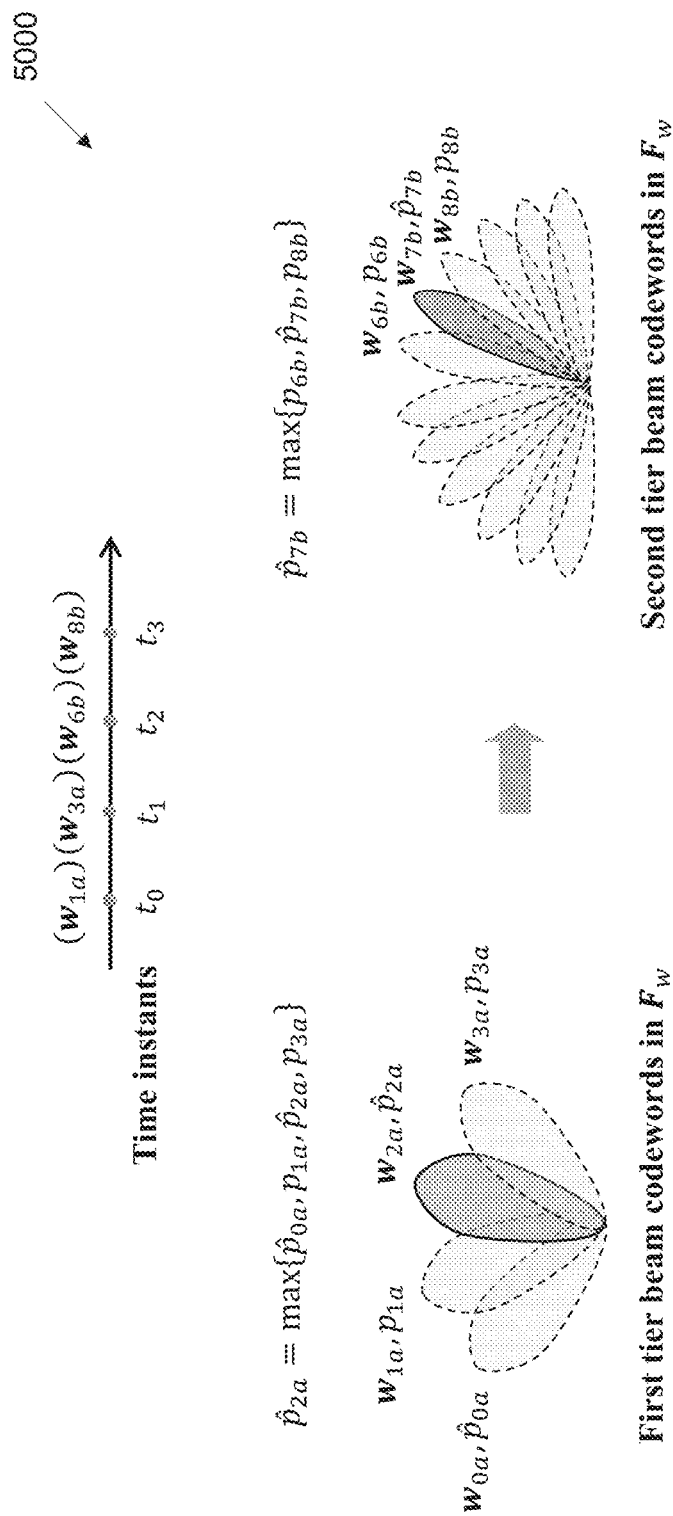
FIG. 50 illustrates an example Type-IV (b) beam prediction-based beam search/selection method according to embodiments of the present disclosure.

FIG. 50 illustrates an example Type-IV(b) beam prediction-based beam search/selection method 5000 according to embodiments of the present disclosure. An embodiment of the Type-IV(b) beam prediction-based beam search/selection method 5000 shown in FIG. 50 is for illustration only. One or more of the components illustrated in FIG. 50 can be implemented in specialized circuitry configured to perform the noted functions or one or more of the components can be implemented by one or more processors executing instructions to perform the noted functions.

In FIG. 50, a conceptual example depicting the provided Type-IV(b) based beam search/selection method is presented. The general design procedure in the Type-IV(b) based strategy is similar to that in the Type-IV(a) based design. The main difference between them is: in the Type-IV(b) based method, the UE performs beam prediction and selection over the second tier candidate beam codewords, while in the Type-IV(a) based design, the UE simply conducts exhaustive search over the second tier candidate beam codewords and selects the one that results in the best performance metric.

It is evident from the example shown in FIG. 50 that the UE first determines $w_{2a}$ as the selected first tier beam. The corresponding prediction and selection procedures are similar to those described in FIG. 49. For the second tier beam codewords that have the correspondence to $w_{2a}$ ($w_{6b}$, $w_{7b}$ and $w_{8b}$ in this example), the UE only probes $w_{6b}$ and $w_{8b}$ to collect the measurement and computes $p_{6b}$ and $p_{8b}$. Following certain predefined beam prediction algorithms and exploiting the inherent correlations among $w_{6b}$, $w_{7b}$ and $w_{8b}$, the UE predicts the receive signal power $\hat{p}_m$ for beam $w_{7b}$ using $p_{6b}$ and $p_{8b}$, though beam $w_{7b}$ is never formed by the UE for measurement. Since $\hat{p}_{7b}=\max\{p_{6b}, \hat{p}_{7b}, p_{8b}\}$ in this example, the UE selects $w_{7b}$ as the final beam to communicate with their serving base station.

It is evident from the examples shown in FIG. 49 and FIG. 50 that, the provided Type-IV(b) based algorithm can further reduce the time-frequency resources required for beam measurement in contrast to the provided Type-IV(a) based strategy. This in turn, may result in a smaller delay for the UE to access to the network.

FIG. 50 illustrates a conceptual example of the Type-IV (b) beam prediction based beam search/selection method; the beam prediction is executed over both the first tier and second tier beam codewords, while the beam selection is performed on the second tier of beam codewords in the given beam codebook in a hierarchical manner.

Note that for all the provided beam search/selection methods that exploit the beam codebook hierarchical structure such as the Type-II, Type-IV(a) and Type-IV(b) based solutions, the final beam(s) selection accuracy performance may be highly subject to the first tier wide beam(s) selection accuracy. Hence, during the actual beam search/selection process executed by the terminal, the UE may first select two or more first tier wide beams, and then conduct the beam search/selection over their corresponding second tier beam codewords following the inherent hierarchical relationship, e.g., that defined in FIG. 44.

This design procedure can be referred to as soft decision based first tier beam search/selection, and is different from those shown in FIGS. 46, 49, and 50, in which only a single first tier wide beam from the beam codebook is selected (referred to as hard decision based first tier beam search/selection). It is evident that the soft decision-based method may outperform the hard decision-based strategy in terms of the beam selection accuracy, but the latter may exhibit a lower beam search latency. Note that all the examples discussed in this disclosure can be applied to both the soft decision and the hard decision-based methods.

In this disclosure, several situation-aware analog beam operation/management strategies are provided, targeting at achieving good tradeoff among many performance metrics such as beam search latency, beam estimation/prediction accuracy, power consumption, and etc. In one embodiment, the UE may switch among many candidate beam search/selection methods e.g., the seven strategies provided in the previous parts in this disclosure, based on the variations of a given metric, e.g., the change in the channel condition from NLOS to LOS.

In another embodiment, the UE may determine different analog beam search/selection strategies from many candidate beam search/selection methods, say, the seven strategies provided in the previous parts in this disclosure, to best suit for different system configurations. For instance, the UE may use one type of beam search/selection methods, e.g., Type-I(a) and Type-I(b), to select the best beams for certain traffic conditions; the UE may use a different type of beam search/selection methods, e.g., Type-III(a) and Type-III(b), to select the best beams for given buffer status of the UE.

Figure 51:
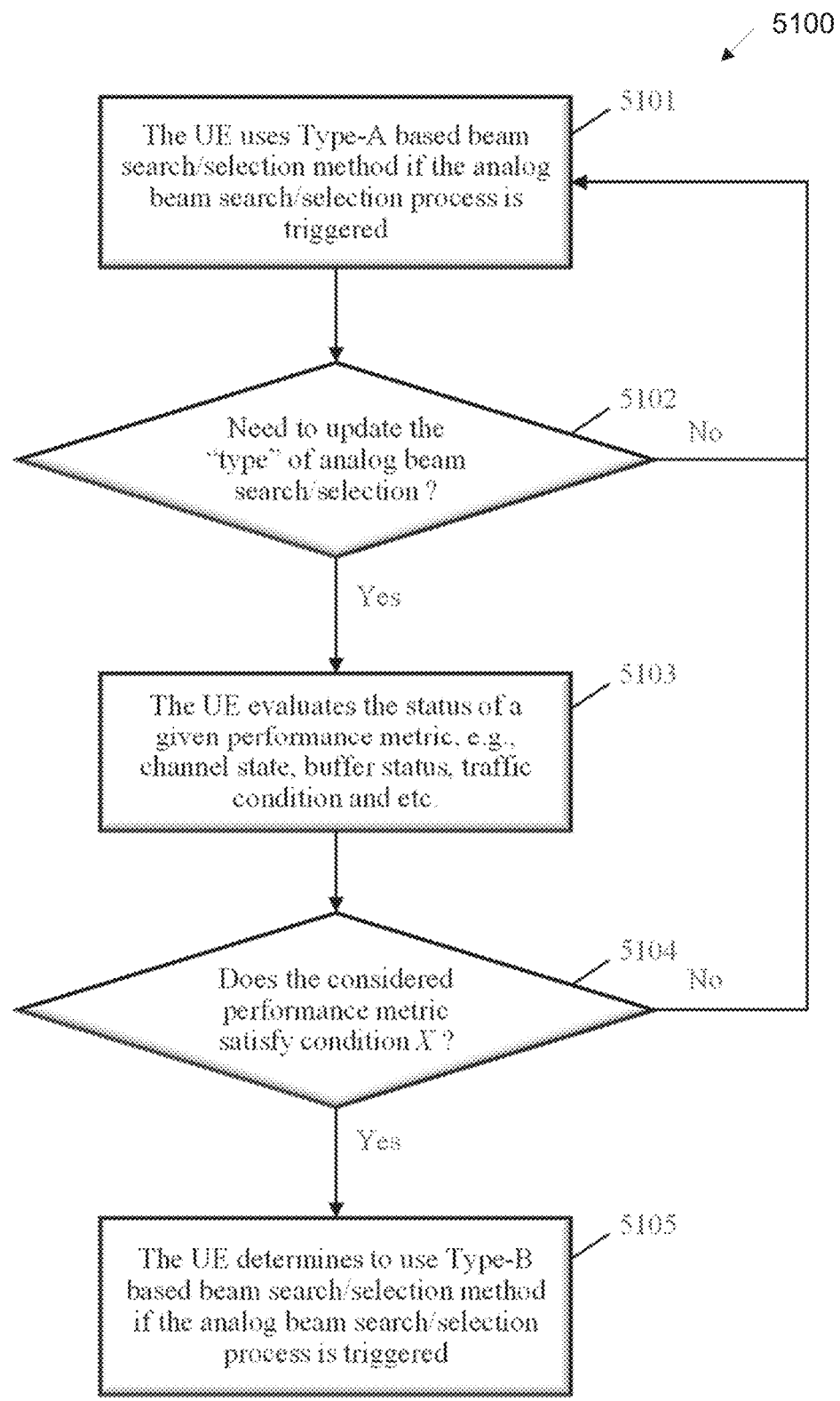
FIG. 51 illustrates a flow chart of a method for switching among candidate beam search/selection strategies (Type-A and Type-B in this example) according to embodiments of the present disclosure.

FIG. 51 illustrates a flow chart of a method 5100 for switching among candidate beam search/selection strategies (Type-A and Type-B in this example) according to embodiments of the present disclosure. An embodiment of the method 5100 shown in FIG. 51 is for illustration only. One or more of the components illustrated in FIG. 51 can be implemented in specialized circuitry configured to perform the noted functions or one or more of the components can be implemented by one or more processors executing instructions to perform the noted functions.

FIG. 51 illustrates an algorithm flow-chart of switching among candidate beam search/selection strategies (Type-A and Type-B in this example) according to the status of a given performance metric, which could be the channel state, traffic condition, UE's buffer status, and etc.

In FIG. 51, an algorithm flow-chart characterizing the general procedure of a provided analog beam operation/management strategy is presented. Specifically, in this example, a given performance metric is considered, which may correspond to a channel state, traffic condition, UE's buffers status and etc. in practical systems. The variations of the considered performance metric are exploited by the UE to optimize their beam operation/management procedure. For example, the UE may switch among many candidate analog beam search/selection methods to adapt to the variations of the considered performance metric.

As illustrated in FIG. 51, in step 5101, the UE uses Type-A based beam search/selection method to determine the best analog beam(s) to transmit/receive the signals to/from their serving base station. The Type-A based strategy may correspond to one of the seven beam search/selection methods (Type-I(a), Type-I(b), Type-II, Type-III (a), Type-III(b), Type-IV(a) and Type-IV(b)) provided in the previous sections in this disclosure, or other beam search/selection designs than the provided ones. The Type-A based beam search/selection method may be determined by the terminal based on the past status of the considered performance metric.

In step 5102, the UE checks whether it is time to update the "type" of the current in-use analog beam search/selection strategy, which is Type-A in this example. The timer for updating the "type" of the current in-use beam search/selection strategy could be configured by the network or the UE automatously in either a periodic manner or an aperiodic manner. For instance, the base station may a periodically send the triggering command to the terminal to update their beam search/selection strategy, based on the measurement report collected by the base station from the terminal or other network information. If it is not the time to update the "type" of the current in-use analog beam search/selection strategy, which is Type-A here, the algorithm goes back to step 5101. Otherwise, the algorithm would proceed to step 5103.

In step 5103, the UE evaluates the status, or the variations of a given performance metric. For instance, if the performance metric is the received signal strength, the UE may average all the received signal strengths obtained during the past measurement processes and compares the averaged result with a given threshold in a later phase, e.g., in step 5104.

For another example, the UE could also compute the difference between the received signal strength obtained at time t with that obtained at t-T to characterize the channel variation over the time period T. The UE may then compare the difference between the received signal strengths with a given threshold in a later phase, e.g., in step 5104 in FIG. 51, to optimize the analog beam operation/management procedure.

If the performance metric corresponds to the uplink buffer status, the UE may simply log out their current uplink buffer information such as the buffer size for further processing in 1304. The UE, however, may not know their exact downlink buffer status from their MAC, which is only available at the base station. The UE may still be able to implicitly identify their downlink buffer status from their application layer and/or higher layers. For instance, the UE may consider the UE's downlink buffer size as large if the UE keeps downloading large-size files from the network.

In step 5104, the UE checks whether the evaluation result of the considered performance metric satisfies condition X, where the evaluation result is obtained in step 5103. That is, if the evaluation result of the considered performance metric satisfies condition X, the algorithm would proceed to step 5105. Otherwise, the algorithm would go back to step 5101 such that the UE would continue to use Type-A based beam search/selection strategy to find the best beam(s) to communicate with their serving base station if the beam search/selection process is triggered.

For instance, if the evaluation result is the received signal strength difference over a certain period of time, the UE may compare this evaluation result with a predetermined threshold. If the evaluation result, or the received signal strength difference is beyond the given threshold, it may imply that the channel condition significantly varies during the considered time period, and it may be necessary to change the "type" of the employed analog beam search/selection design. If the evaluation result, or the received signal strength difference is below the given threshold, the UE may keep using the previous analog beam search/selection strategy.

The above procedure can be mathematically expressed as follows. Denote the received signal strength of the current serving beam at time t by $p_t$. If the beam search/selection process is triggered at time t, the terminal would execute the Type-A based method to find the best beam(s) to communicate with the base station. Denote the received signal strength of the current serving beam at time t+T by $p_{t+T}$.

Denote the instantaneous received signal strength difference between t and t+T by $\Delta p_T$ such that $\Delta p_T = |p_{t+T} - p_t|$, which can be used to characterize the channel variation status during the considered time period T. If the beam search/selection process is triggered at time t+T, either the Type-A or the Type-B based method would be executed by the terminal depending on the relationship between the difference $\Delta p_T$ and a predetermined threshold $\tau_p$. As discussed above, $\Delta p_T < \tau_p$ may imply that the considered time period T may still be within the channel coherence time, and in this case, the terminal may continue to use the Type-A based beam search/selection method once the Type-A based beam search/selection method is triggered.

On the contrary, if $\Delta p_T > \tau_p$, the channel may have varied significantly from t to t+T, and the Type-B based beam search/selection method may be executed by the terminal if the beam search/selection process is triggered at time t+T. In addition to the received signal strength difference between two-time instants, other metrics that can characterize the channel variation status can be formulated as the evaluation result as well. Note that in practice, the overall beam search/selection performance may depend on the exact thresholds, and the UE may configure different thresholds to switch among all the candidate beam search/selection strategies to better tradeoff the beam selection/estimation accuracy and the beam search latency for the performance metric of interest.

In step 5105, the UE determines to use the Type-B based beam search/selection method based on the output from step 5104. Note that the Type-B based strategy may correspond to one of the provided seven beam search/selection strategies in the previous parts other than the Type-A based strategy used in step 5101, or other beam search/selection methods than the provided ones in this disclosure.

Figure 52A:
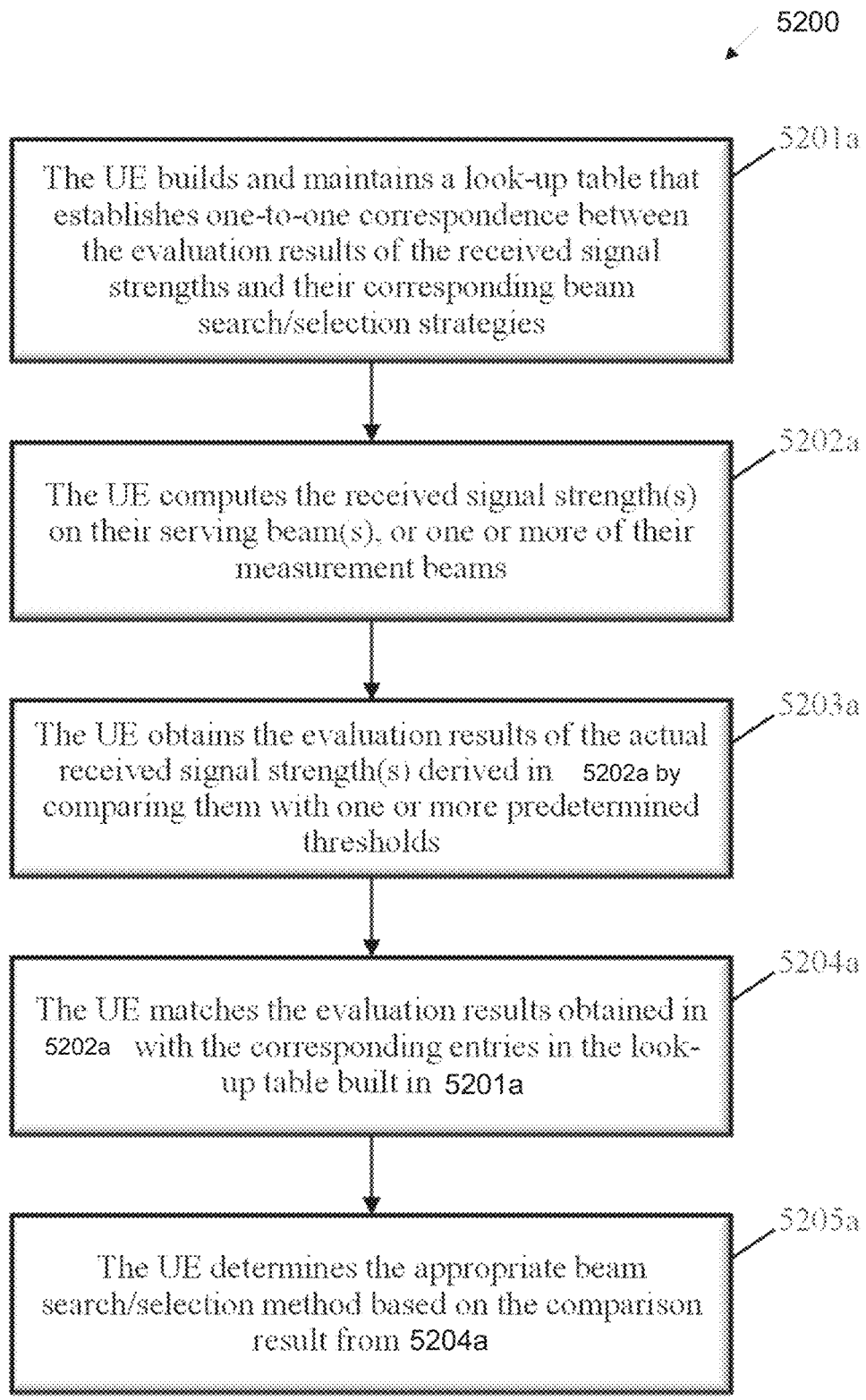
FIG. 52A illustrates a flow chart of a method for implementation option of using the received signal strength (channel condition) to determine appropriate beam search/selection strategies according to embodiments of the present disclosure.

FIG. 52A illustrates a flow chart of a method 5200 for implementation option of using the received signal strength (channel condition) to determine appropriate beam search/selection strategies according to embodiments of the present disclosure. An embodiment of the method 5200 shown in FIG. 52A is for illustration only. One or more of the components illustrated in FIG. 52A can be implemented in specialized circuitry configured to perform the noted functions or one or more of the components can be implemented by one or more processors executing instructions to perform the noted functions.

Figure 52B:
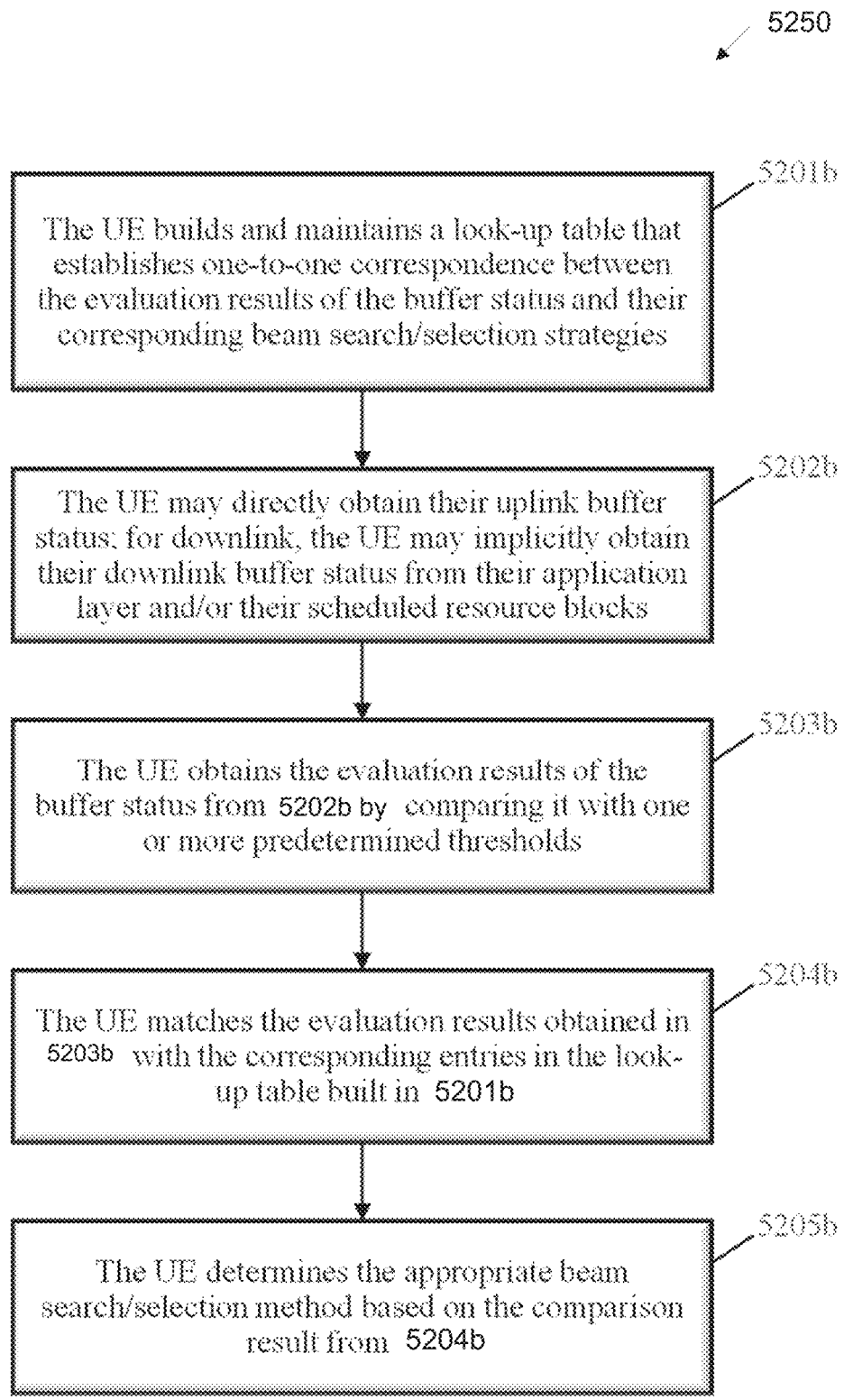
FIG. 52B illustrates a flow chart of a method for implementation option of using UE's buffer status to determine appropriate beam search/selection strategies according to embodiments of the present disclosure.

FIG. 52B illustrates a flow chart of a method 5250 for implementation option of using UE's buffer status to determine appropriate beam search/selection strategies according to embodiments of the present disclosure. An embodiment of the method 5250 shown in FIG. 52B is for illustration only. One or more of the components illustrated in FIG. 52B can be implemented in specialized circuitry configured to perform the noted functions or one or more of the components can be implemented by one or more processors executing instructions to perform the noted functions.

Figure 52C:
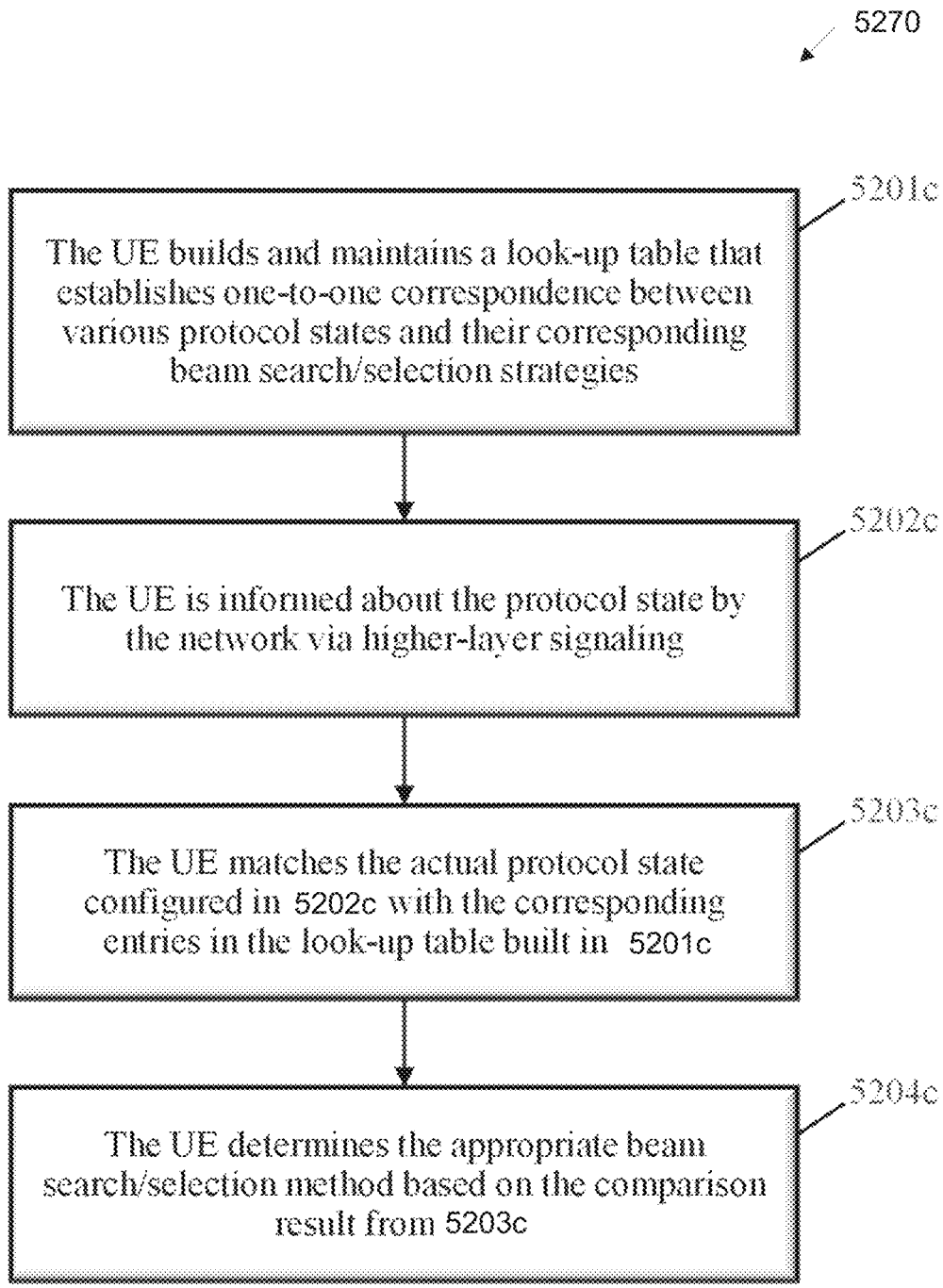
FIG. 52C illustrates a flow chart of a method for implementation option of using network informed (via higher layer signaling) protocol state to determine appropriate beam search/selection strategies according to embodiments of the present disclosure.

FIG. 52C illustrates a flow chart of a method 5270 for implementation option of using network informed (via higher layer signaling) protocol state to determine appropriate beam search/selection strategies according to embodiments of the present disclosure. An embodiment of the method 5270 shown in FIG. 52C is for illustration only. One or more of the components illustrated in FIG. 52C can be implemented in specialized circuitry configured to perform the noted functions or one or more of the components can be implemented by one or more processors executing instructions to perform the noted functions.

Building on the general algorithm framework depicted in FIG. 51 (especially steps 5103, 5104, and 5105), detailed implementation procedures of how the UE can execute different beam search/selection methods are provided according to their channel condition, buffer status and protocol state in FIGS. 52A, 52B, and 52C.

The algorithms provided in FIGS. 52A, 52B, and 52C correspond to over-the-air measurement based, self-measurement based and higher-layer signaling based beam operation/management designs. Note that later in this disclosure, the embodiments discussed in FIGS. 53 through 63 are further examples of realizing the methods provided in FIGS. 52A, 52B, and 52C with simplified settings (e.g., a single level to define large or small buffer size).

In FIG. 52A, the key algorithm components of exploiting the received signal strength (or the channel condition) to determine appropriate beam search/selection algorithms are provided. In 5201a, the UE first constructs a look-up table and/or a mapping rule to establish one-to-one correspondence between the evaluation results of the received signal strengths/signal powers and the candidate beam search/selection methods. The received signal strengths/signal powers can be in terms of RSRP. Other metric is also possible such as RSRQ, SNR, SINR, their averaged counterparts and etc.

Here, by evaluation results, the signal powers are compared with one or more predetermined thresholds, and used to characterize different channel conditions/variations. One conceptual look-up table is presented in TABLE 7. In this example, three predetermined thresholds are used to categorize the signal powers into three groups. As can be seen from TABLE 7, each group corresponds to a beam search/selection strategy. For instance, if the received signal strength is within $(\tau_1, \tau_2]$, from TABLE 7, the UE may choose the Type-II based beam search/selection method once the beam search/selection process is triggered or needs to be updated as described in step 5102 in FIG. 51.

TABLE 7

A conceptual look-up table that maps the evaluation results of the signal powers to their corresponding beam search/selection strategies

| Signal power range | Beam search/selection strategy |
|---|---|
| $(\tau_0, \tau_1]$ | Type-I(b) |
| $(\tau_1, \tau_2]$ | Type-II |
| $(\tau_2, \infty]$ | Type-I(a) |

In step 5202a, the UE calculates the received signal strength(s) using the received signal samples on their current serving beam(s), or one or more of their measurement beams. The received signal strength may correspond to the RSRP, RSRQ, SNR, SINR, their averaged counterparts and etc.

In step 5203a, the UE evaluates the received signal strength(s) obtained in step 5202a and derives the corresponding evaluation results. By evaluation here, the UE compares the received signal strength(s) with one or more predetermined thresholds. In the look-up table example shown in TABLE 7, three thresholds $\tau_0, \tau_1, \tau_2$ are used to characterize the received signal strength. Denote the received signal strength obtained in step 5202a by $p_\tau$. The UE compares $p_\tau$ with $\tau_0, \tau_1$ and $\tau_2$, and if, e.g., $p_\tau \in (\tau_0, \tau_1]$, then $p_\tau \in (\tau_0, \tau_1]$ would be regarded as the evaluation result of $p_\tau$ and input to step 5204a.

In step 5204a, the UE maps the evaluation result(s) obtained from step 5203a to the corresponding entries in the look-up table built in step 5201a. Consider the conceptual examples depicted in steps 5201a and 5203a. As the evaluation result obtained from step 5203a is $p_\tau \in (\tau_0, \tau_1]$, the UE maps the evaluation result to the first row in the look-up table example shown in step 5201a. This mapping result is then input to step 5205a for further processing.

In step 5205a, the UE picks the appropriate beam search/selection strategy based on the mapping result(s) obtained from step 5204a. Once the beam search/selection process is triggered or needs to be updated as described in step 5102 in FIG. 51, the UE would execute the chosen beam search/selection method here to find the best beam(s) to communicate with their serving base station.

Based on the previous example, the evaluation result $p_\tau \in (\tau_0, \tau_1]$ is mapped to the first row of the look-up table in step 5201a. Hence, according to the look-up table, the UE would select the Type-I(b) based beam search/selection method. Note that in this example, $p_\tau \in (\tau_0, \tau_1]$ may imply that the channel condition is not favorable such that the channel may contain many NLOS components and/or deep fading components. In this case, it may become necessary to use the fine beam search/selection strategy such as the Type-I(b) based design approach to ensure good link quality. Similarly, if the received signal strength $p_\tau$ is beyond the threshold $\tau_2$, it may imply that the channel condition is favorable with strong LOS components. In this case, low-complexity low-latency beam search/selection strategy such as the Type-I(a) based method would be used to minimize the access delay brought by the beam search.

Note that other metrics than the received signal strength that can better characterize the channel condition can be exploited as well to design the algorithm. For instance, instead of characterizing the channel as either "good" or "bad" by comparing the received signal strength with one or more predetermined thresholds, the difference between the received signal strengths at two time instants can be computed and used to reveal the channel variation status within the considered time period. Further, the provided algorithm procedures in FIG. 52A can be applied to other over-the-air measurement-based beam search/selection designs with moderate modifications in steps 5201a, 5202a, and 5203a.

In FIG. 52B, the key algorithm components of exploiting the UE's buffer status to determine appropriate beam search/selection algorithms are provided. Here, the UE's buffer status is characterized by their buffer size, corresponding to a number of packets waiting in the buffer to be processed. Here, the buffer could be either the uplink buffer or the downlink buffer.

Similar to 5201a, a look-up table is built in 5201b to establish one-to-one correspondence between the evaluation results of the UE's buffer status/size and their corresponding beam search/selection strategies. In TABLE 8, a conceptual example of such a look-up table is provided. Similar to TABLE 7, three levels, denoted by $l_0, l_1, l_2$, are used to categorize the buffer size into three conditions, corresponding to small buffer size, medium buffer size and large buffer size respectively.

As can be seen from TABLE 8, each row corresponds to a beam search/selection strategy. For instance, if the UE's buffer size is within $(l_1, l_2]$, from TABLE 8, the UE may choose the Type-II based beam search/selection method once the beam search/selection process is triggered or needs to be updated as described in step 5102 in FIG. 51.

TABLE 8

A conceptual look-up table that maps the evaluation results of the UE's buffer size to their corresponding beam search/selection strategies

| Buffer size range | Beam search/selection strategy |
|---|---|
| $(l_0, l_1]$ | Type-I(a) |
| $(l_1, l_2]$ | Type-II |
| $(l_2, \infty]$ | Type-I(b) |

In step 5202b, the UE obtains their buffer status/size at a given time instant. The UE may be able to directly obtain their uplink buffer status/size, but not their downlink buffer status/size as such information may only be available at the network side. The UE, however, may be able to implicitly obtain their downlink buffer status/size from their application layer and/or allocated resource blocks for the downlink communication. For instance, if the network allocates a large amount of resources to the UE of interest, it may imply that the UE's downlink buffer size is also large. Note that other implementation options to obtain the UE's buffer status/size are also possible.

In step 5203b, the UE evaluates their buffer status/size obtained in step 5202b and derives the corresponding evaluation results. By evaluation here, the UE compares their buffer size with one or more predetermined levels. In the look-up table example shown in TABLE 8, three levels $l_0$, $l_1$, $l_2$ are used to characterize the buffer size. Denote the UE's buffer size obtained in step 5202*b* by $b_f$. The UE compares $b_f$ with $l_0$, $l_1$ and $l_2$, and if, e.g., $b_f \in (l_0, l_1]$, then $b_f \in (l_0, l_1]$ would be regarded as the evaluation result of the buffer size $b_f$ and input to step 5204*b*.

In step 5204*b*, the UE maps the evaluation result(s) obtained from step 5203*b* to the corresponding entries in the look-up table built in step 5201*b*. Consider the conceptual examples depicted in steps 5201*b* and 5203*b*. As the evaluation result obtained from step 5203*b* is $b_f \in (l_0, l_1]$, the UE maps the evaluation result to the first row in the look-up table example shown in step 5201*b*. This mapping result is then input to step 5205*b* for further processing.

In step 5205*b*, the UE selects the appropriate beam search/selection strategy based on the mapping result(s) obtained from step 5204*b*. Once the beam search/selection process is triggered or needs to be updated as described in step 5102 in FIG. 51, the UE would execute the chosen beam search/selection method here to find the best beam(s) to communicate with their serving base station. Based on the previous example, the evaluation result $b_f \in (l_0, l_1]$ is mapped to the first row of the look-up table in step 5201*b*. Hence, according to the look-up table, the UE would select the Type-I(a) based beam search/selection method. Note that in this example, $b_f \in (l_0, l_1]$ may imply that the UE's buffer size is relatively small such that there may be only a few packets in the buffer to be processed. In this case, it may become beneficial to use the coarse beam search/selection strategy such as the Type-I(a) based design approach to avoid significant beam search delay, and therefore, rate loss.

Note that other buffer status metrics than the buffer size can be exploited as well to design the algorithm. Further, the provided algorithm procedures in FIG. 52B can be applied to other self-measurement-based beam search/selection designs with moderate modifications in steps 5201*b*, 5202*b*, and 5203*b*. As will be elaborated in later embodiments in this disclosure, other self-measurement metrics than the buffer status may be the UE's battery life, operating temperature, folding state if the terminal is foldable and etc.

Similar to the over-the-air measurement and self-measurement based beam search/selection strategies shown in FIG. 52A and FIG. 52B, another implementation option of choosing appropriate beam search/selection methods is provided in FIG. 52C, in which the protocol state, informed from the network side via certain higher-layer signaling, is used to determine the appropriate beam search/selection method. The protocol state may correspond to a TCI state change, handover, initial access, random access and etc. The higher-layer signaling may correspond to RRC configuration/reconfiguration, MAC-CE, DCI, and etc.

Similar to step 5201*a* in FIG. 52A and 5201*b* in FIG. 52B, in 5201*c* in FIG. 52C, different protocol states such as TCI state change, handover, initial access, random access and etc. are mapped to their corresponding beam search/selection methods such as the Type-I(a), Type-I(b), Type-II and etc. based design approaches in a look-up table. If the UE is informed of a new protocol state, or a protocol state change/update (as in step 5202*c*) from the network via certain higher-layer signaling such as RRC configuration/reconfiguration, MAC-CE, DCI and etc., the UE would locate the corresponding entries in the look-up table built in step 5201*c* that match the actual protocol state configured in step 5202*c* the best. Based on the matching result obtained from step 5203*c*, the UE can then determine the appropriate beam search/selection strategy in step 5204*c* and apply the appropriate beam search/selection strategy once the beam search/selection process is triggered, or needs to be updated as indicated in step 5102 in FIG. 51.

Figure 53A:
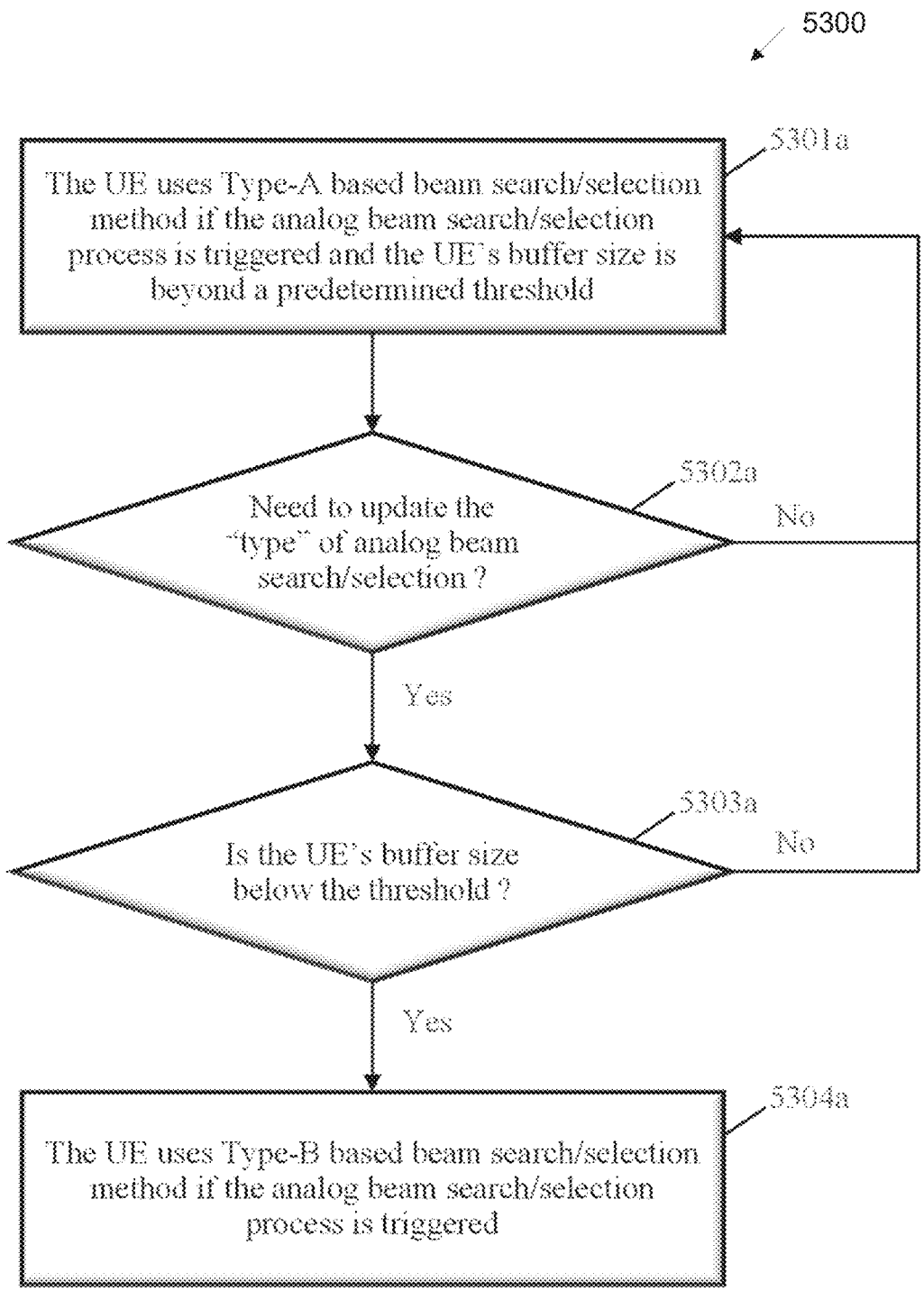
FIG. 53A illustrates a flow chart of a method for beam search/selection method based on variations of the UE's buffer status according to embodiments of the present disclosure.

FIG. 53A illustrates a flow chart of a method 5300 for beam search/selection method based on variations of the UE's buffer status according to embodiments of the present disclosure. An embodiment of the method 5300 shown in FIG. 53A is for illustration only. One or more of the components illustrated in FIG. 53A can be implemented in specialized circuitry configured to perform the noted functions or one or more of the components can be implemented by one or more processors executing instructions to perform the noted functions.

In FIG. 53A, an algorithm flow-chart characterizing one of the provided analog beam search/selection methods is presented based on the UE's buffer status, or more specifically, the UE's buffer size. If the UE's buffer size is relatively small, the UE may not need to execute a full search over a large number of narrow beams to avoid potential access delay and rate loss. On the contrary, if the UE's buffer size is relatively large, it may be necessary for the UE to select the best beam(s) that would result in the best array gain, and therefore, the best link quality to communicate with their serving base station.

Note that different implementation procedures of the provided buffer status enabled beam search/selection method are also possible depending on practical setup. For instance, if the UE's buffer size is relatively large and keeps increasing (e.g., beyond a given threshold), it may become necessary to quickly process the packets in the UE's buffer, e.g., employing low-complexity beam search/selection approach such as the Type-I(a) based strategy to identify the best beam(s), rather than executing a full search over a large number of narrow beams to ensure a certain link quality.

Note that the UE knows the UE's uplink buffer status, but the UE may not know exact downlink buffer status from the MAC, which is available at the base station. The UE, however, may still be able to implicitly identify their downlink buffer status from their application layer and/or higher layers. For instance, the UEs may consider their downlink buffer size as large if the UEs keep downloading large-size files from the network. With this knowledge, the UE may be able to determine appropriate beam search/selection method that can better tradeoff the beam selection accuracy and beam search latency performances.

As illustrated in FIG. 53A, the UE performs similar procedures in steps 5301*a* and 5302*a* to those described in steps 5101 and 5102 in FIG. 51. The main difference between steps 5301*a* and 5101 is that the use of the Type-A based beam search/selection method in step 5301*a* also depends on the UE's buffer status, e.g., the UE's buffer size is beyond a given threshold.

In step 5303*a*, the UE checks whether the UE's buffer size is below the given threshold. If the UE's buffer size is still beyond the threshold, the algorithm would go back to step 5301*a* such that the UE continues to use the Type-A based beam search/selection strategy. Otherwise, the algorithm would proceed to step 5304*a*. Note that the condition in step 5303*a* (i.e., below the threshold) depends on whether the Type-A based approach in step 5301*a* is determined by the terminal assuming that the buffer size is beyond the threshold. If the Type-A based strategy in 5301*a* is configured by assuming that the UE's buffer size is below the predetermined threshold, the corresponding condition in 5303*a* would be checking whether the UE's buffer size is beyond the threshold. Further, multiple thresholds could be set by the UE to determine the appropriate beam search/selection strategies depending on the UE's buffer status.

In step 5304*a*, the UE decides to use the Type-B based beam search/selection method based on the output from step 5303*a*. The algorithm procedure in step 5304*a* is similar to that in 5105 in FIG. 51.

Figure 53B:
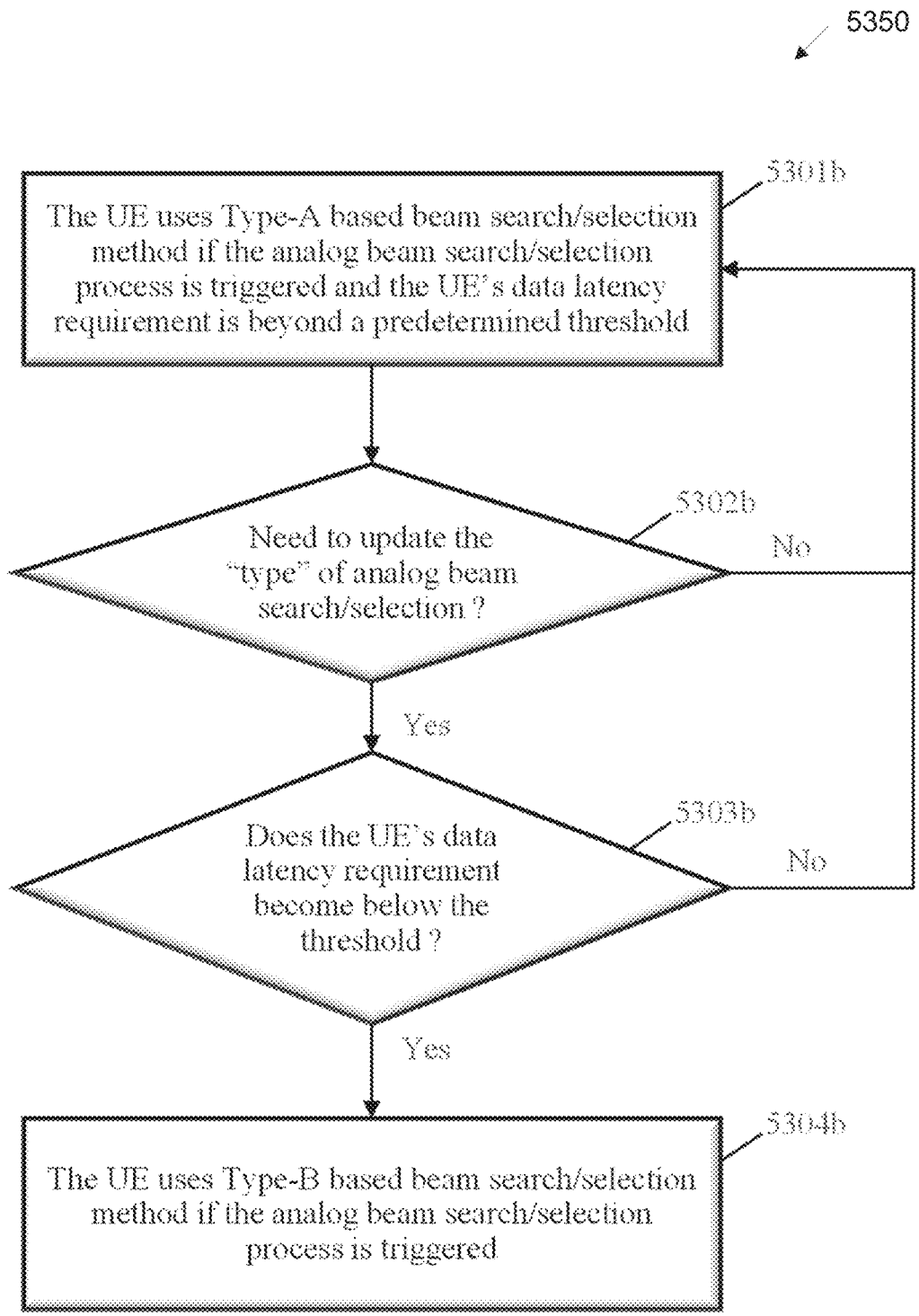
FIG. 53B illustrates an example beam search/selection method based on variations of the UE's data QoS requirement such as the latency requirement according to embodiments of the present disclosure.

FIG. 53B illustrates an example beam search/selection method 5350 based on variations of the UE's data QoS requirement such as the latency requirement according to embodiments of the present disclosure. An embodiment of the beam search/selection method 5350 shown in FIG. 53B is for illustration only. One or more of the components illustrated in FIG. 53B can be implemented in specialized circuitry configured to perform the noted functions or one or more of the components can be implemented by one or more processors executing instructions to perform the noted functions.

As illustrated in FIG. 53B, an algorithm flow-chart characterizing one of the provided analog beam search/selection methods is presented based on the UE's data latency requirement. In practice, different types of data may have different requirements regarding the processing delay, error rate performance, and etc. For instance, ultra-reliable low-latency communication may have stringent requirements on both the latency and error rate performances of the data processing such that they ought to be arbitrarily small. On the contrary, low-rate machine-type communication may not have any requirement on the data processing delay. Hence, for a given terminal, if their data latency and/or error rate requirements vary over time, it may become necessary to adopt different beam search/selection methods to suit for different QoS requirements.

In the example shown in FIG. 53B, if the required data latency is small, the UE may not want to execute a full search over a large number of narrow beams. On the contrary, if the data latency requirement is relatively loose, e.g., larger than a threshold, it may be necessary for the UE to select the best beam(s) that would result in the best array gain, and therefore, the best link quality to communicate with their serving base station without caring much for the data processing delay.

As illustrated in FIG. 53B, the UE performs similar procedures in steps 5301*b* and 5302*b* to those described in steps 5301*a* and 5302*a* in FIG. 53A, and 5101 and 5102 in FIG. 51. The main difference between steps 5301*a* and 5301*b* is that the use of the Type-A based beam search/selection method in step 5301*b* depends on the UE's data latency requirement, while the UE relies on the UE's buffer status in step 5301*a*.

In step 5303*b*, the UE checks whether the UE's current data latency requirement is below the given threshold. If the UE's data latency requirement is still beyond the threshold, the algorithm would go back to step 5301*b* such that the UE continues to use the Type-A based beam search/selection strategy. Otherwise, the algorithm would proceed to step 5304*b*. Note that the condition in step 5303*b* (i.e., below the threshold) depends on whether the Type-A based approach in step 5301*b* is determined by the terminal assuming that the data latency requirement is beyond the threshold.

If the Type-A based strategy in step 5301*b* is configured by assuming that the UE's data latency requirement is below the predetermined threshold, the corresponding condition in step 5303*b* would be checking whether the UE's data latency requirement is beyond the threshold. Further, multiple thresholds could be set by the UE to determine the appropriate beam search/selection strategies depending on the UE's data latency requirement.

In step 5304*b*, the UE decides to use the Type-B based beam search/selection method based on the output from step 5303*b*. The algorithm procedure in step 5304*b* is similar to that in step 5105 in FIGS. 51 and 5304*a* in FIG. 53A. Note that similar algorithm procedures to those described in FIG. 53B can be applied to determine appropriate beam search/selection methods to suit for other UE's QoS requirements than the data latency requirement such as the data error rate requirement.

Figure 54:
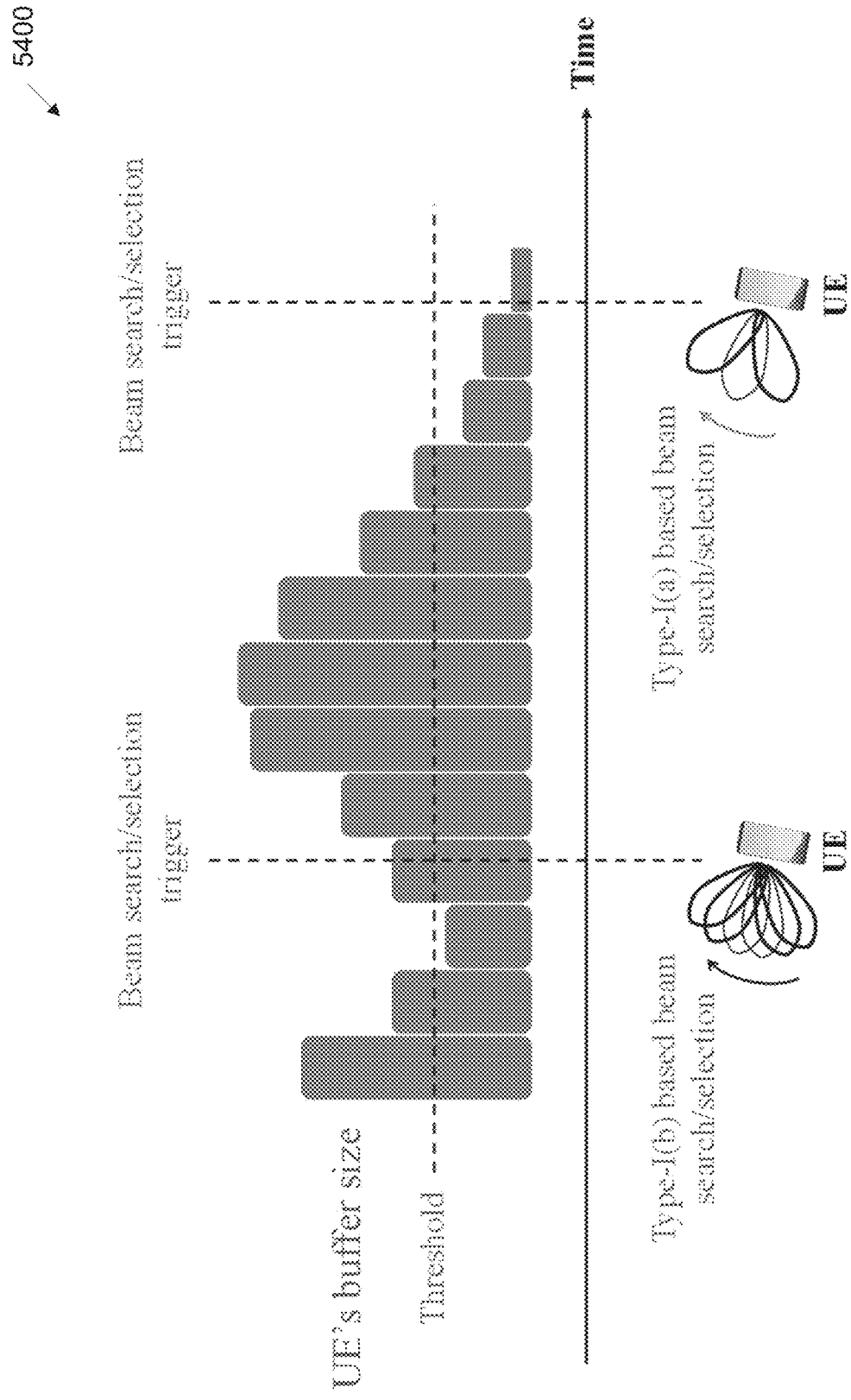
FIG. 54 illustrates an example selection between the Type-I (a) and Type-I (b) based beam search/selection strategies according to variations of the UE's buffer size according to embodiments of the present disclosure.

FIG. 54 illustrates an example selection between the Type-I(a) and Type-I(b) based beam search/selection strategies 5400 according to variations of the UE's buffer size according to embodiments of the present disclosure. An embodiment of the selection between the Type-I(a) and Type-I(b) based beam search/selection strategies 5400 shown in FIG. 54 is for illustration only. One or more of the components illustrated in FIG. 54 can be implemented in specialized circuitry configured to perform the noted functions or one or more of the components can be implemented by one or more processors executing instructions to perform the noted functions.

As illustrated in FIG. 54, a conceptual example of the provided buffer status enabled beam search/selection method in FIG. 53A is presented. In this example, the Type-I(a) and Type-I(b) based beam search/selection methods are considered as the candidate beam search/selection approaches. As discussed before, if triggered, the Type-I(a) based method would exhibit lower beam search complexity, and therefore smaller beam selection delay, than the Type-I(b) based strategy. In terms of the beam selection accuracy, the Type-I(b) based method would show better performance than the Type-I(a) based approach because the UE searches over many narrow beams in the Type-I(b) based strategy to cover a given angular space.

In the example shown in FIG. 54, the UE's buffer size varies over time depending on the traffic condition and the channel state. A predetermined threshold to characterize the UE's buffer size as "small" and "large" is also defined and presented in FIG. 54. There could be many implementation options to determine the said threshold. For instance, the threshold may correspond to one half of the size of the buffer for the UE of interest. It is evident from FIG. 54 that if the beam search/selection process is triggered and the UE's buffer size is beyond the given threshold, the UE would execute the Type-I(b) based method because now, the beam selection accuracy, and therefore, the link quality is the design focus.

If the beam search/selection process is triggered and the UE's buffer size is below the given threshold, the UE may prefer to quickly identify the beam(s) to use for communicating with the base station, rather than achieve promising radio link quality. In this case, the UE may use the Type-I(a) based method for the beam search and selection as shown in FIG. 54. In this example, the UE would switch between Type-I(a) and Type-I(b) based methods to adapt to the variations of the UE's buffer status. Note that other types of beam search/selection methods than Type-I(a) and Type-I(b) can be implemented and executed by the UE in a similar fashion to that presented in FIG. 54. Note that similar design principles to those described in FIG. 54 can be applied to determine appropriate beam search/selection methods to suit for various UE's QoS requirements such as the data latency requirement depicted in FIG. 53B.

Figure 55:
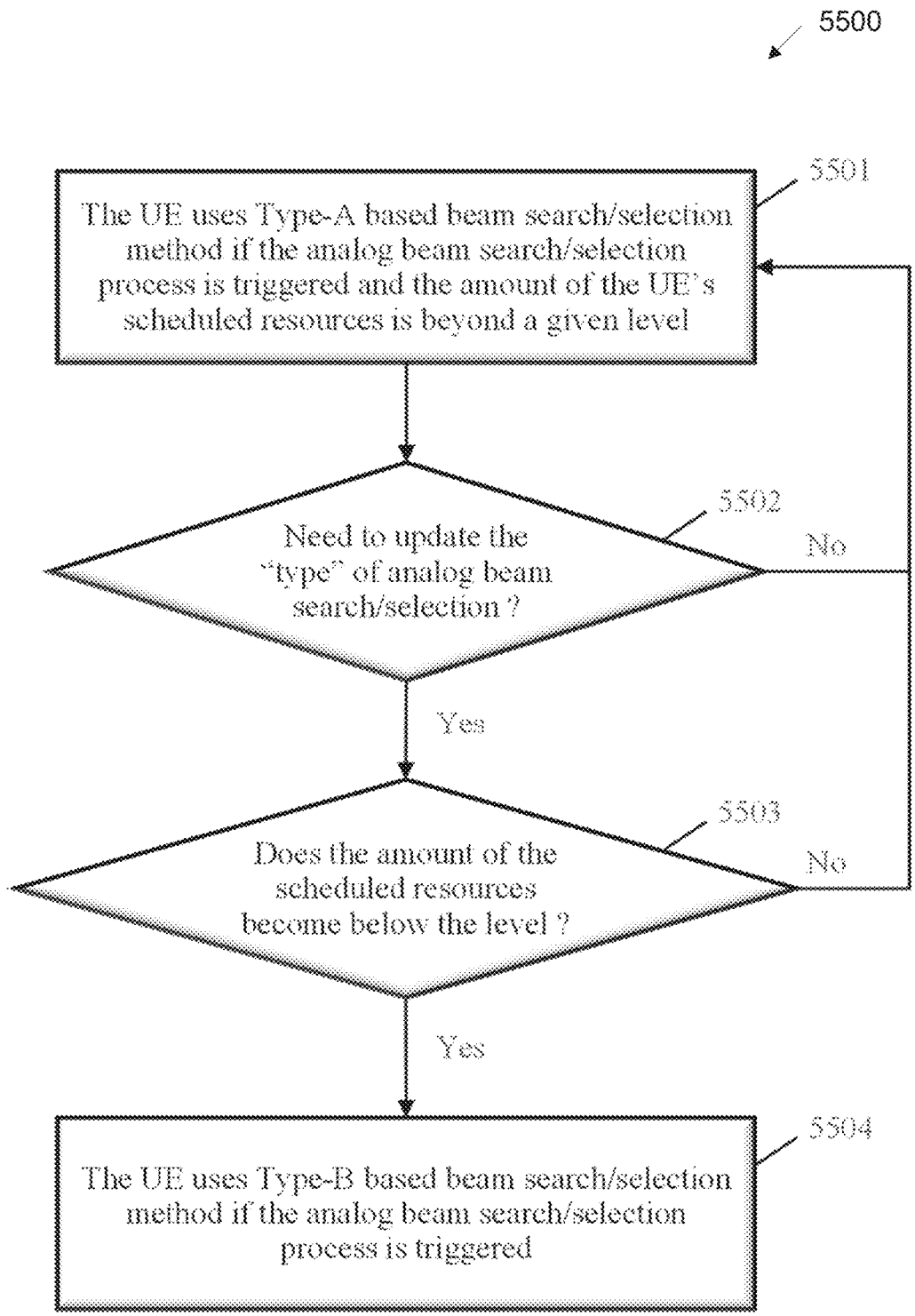
FIG. 55 illustrates a flow chart of a method for beam search/selection method based on the amount of the scheduled resources for the UE according to embodiments of the present disclosure.

FIG. 55 illustrates a flow chart of a method 5500 for beam search/selection method based on the amount of the scheduled resources for the UE according to embodiments of the present disclosure. An embodiment of the method 5500 shown in FIG. 55 is for illustration only. One or more of the components illustrated in FIG. 55 can be implemented in specialized circuitry configured to perform the noted functions or one or more of the components can be implemented by one or more processors executing instructions to perform the noted functions.

As illustrated in FIG. 55, an algorithm flow-chart characterizing one of the provided analog beam search/selection methods is presented based on the amount of the scheduled resources for the UE of interest. The amount of the scheduled resources for the UE may not only reveal their channel condition, but also imply their undergoing traffic condition. For instance, if the amount of the scheduled time-frequency resources for the terminal is relatively large, the UE is probably transmitting/receiving mobile broadband data with large file size. If the amount of the scheduled time-frequency resources for the terminal is relatively small, the UE is probably experiencing a bursty traffic with small packet size.

One or more thresholds can be implemented at the terminal to evaluate whether the amount of the scheduled resources is large or small. Further, by configuring one or more proper thresholds, the UE would be able to differentiate between the impacts of the channel condition and the traffic type on the amount of the assigned resources so that the UE can optimize their beam operation/management strategies accordingly.

In FIG. 55, it is assumed that the traffic condition is the sole factor that affects the amount of the scheduled resources, and one threshold/level is configured at the terminal for simplicity. Note that other metrics than the amount of time-frequency resources scheduled for the UE can be implemented as well if the other metrics are able to characterize the traffic condition and variation. Similar to the considerations of the UE's buffer status (FIGS. 53A and 53B, and FIG. 54), if the amount of the scheduled resources for the UE is larger than the given threshold, implying, say, the mobile broadband traffic, the UE may need to ensure a certain level of array gain, and therefore, a good link quality to efficiently process the data. This can be achieved by using the fine beam search/selection methods, such as the Type-I(b), Type-II and Type-IV(a) based strategies in this disclosure.

On the contrary, if the amount of the scheduled time-frequency resources for the UE of interest is below the given threshold, the UE may not need to perform the fine beam search/selection, but rather, quickly identify the best beam(s) following the design procedures in the Type-I(a) or Type-III(a) based approaches, to avoid significant delay and rate loss.

FIG. 55 illustrates a flow chart of a method 5500 for beam search/selection method based on the amount of the scheduled resources for the UE according to embodiments of the present disclosure. An embodiment of the method 5500 shown in FIG. 55 is for illustration only. One or more of the components illustrated in FIG. 55 can be implemented in specialized circuitry configured to perform the noted functions or one or more of the components can be implemented by one or more processors executing instructions to perform the noted functions.

As illustrated in FIG. 55, the UE performs similar procedures in step 5501, 5502, 5503, and 5504 to those in steps 5401, 5402, 5403, and 5404 in FIG. 54. Different from the algorithm procedure provided in FIG. 54, the UE determines the appropriate beam search/selection method in FIG. 55 according to the traffic condition, which is characterized by their scheduled resources for transmitting/receiving the data to/from the base station.

As illustrated in FIG. 55, in step 5501, the UE uses the Type-A based beam search/selection method assuming that the amount of the UE's scheduled resources for data communications is larger than a predefined level. Here, the Type-A based strategy may correspond to the Type-I(b), Type-II or Type-IV(a) based fine beam search/selection methods defined in this disclosure. This is because in this example, a relatively large amount of resources (beyond the predetermined threshold) implies that the UE undergoes the mobile broadband traffic with large packet size. It is therefore preferable for the terminal to use narrow beams that exhibit the highest radio link quality to efficiently process the large-size packet/file sent from the network.

In step 5502, the UE checks whether it is time to update the "type" of the beam search/selection strategy, which is Type-A here. There could be many conditions configured by either the network or the UE to trigger the said updating process, and these conditions/configurations have been extensively discussed in 5102 in FIG. 51.

If the output of step 5502 is yes, the algorithm would proceed to step 5503. Otherwise, the algorithm goes back to step 5501, and the Type-A based beam search/selection strategy would be used by the terminal once the next beam search/selection process is triggered.\

In step 5503, the UE checks whether the amount of the scheduled resources becomes lower than the given threshold. If the amount of the UE's scheduled time-frequency resources is still beyond the threshold, the algorithm would go back to step 5501 such that the UE continues to use the Type-A based beam search/selection strategy once the beam search/selection process is triggered. Otherwise, the algorithm would proceed to step 5504.

Note that the condition in step 5503 (i.e., below the threshold/level) depends on whether the Type-A based approach in step 5501 is determined by the terminal assuming that the amount of the scheduled resources is beyond the threshold. If the Type-A based strategy in step 5501 is configured by assuming that the amount of the UE's scheduled resources is smaller than the predetermined threshold, the corresponding condition in step 5503 would be checking whether the amount of the UE's scheduled resources is beyond the threshold. Further, multiple thresholds could be set by the UE to determine the appropriate beam search/selection strategies depending on the UE's traffic condition.

In step 5504, the UE decides to use the Type-B based beam search/selection method based on the output from step 5503. The algorithm procedure in step 5504 is similar to that in steps 5304*a* and/or 5304*b* in FIGS. 53A and 53B, respectively. Here, the Type-B based strategy may correspond to the Type-I(a) or Type-III(a) based coarse beam search/selection methods. This is because in this example, the relatively small amount of scheduled resources for the UE implies that the terminal undergoes the bursty traffic with small packet size, and under this scenario, it is more preferable for the UE to identify the best beam(s) to communicate with the network as quick as possible to avoid significant delay and rate loss at the cost of potential radio link quality degradation.

Figure 56:
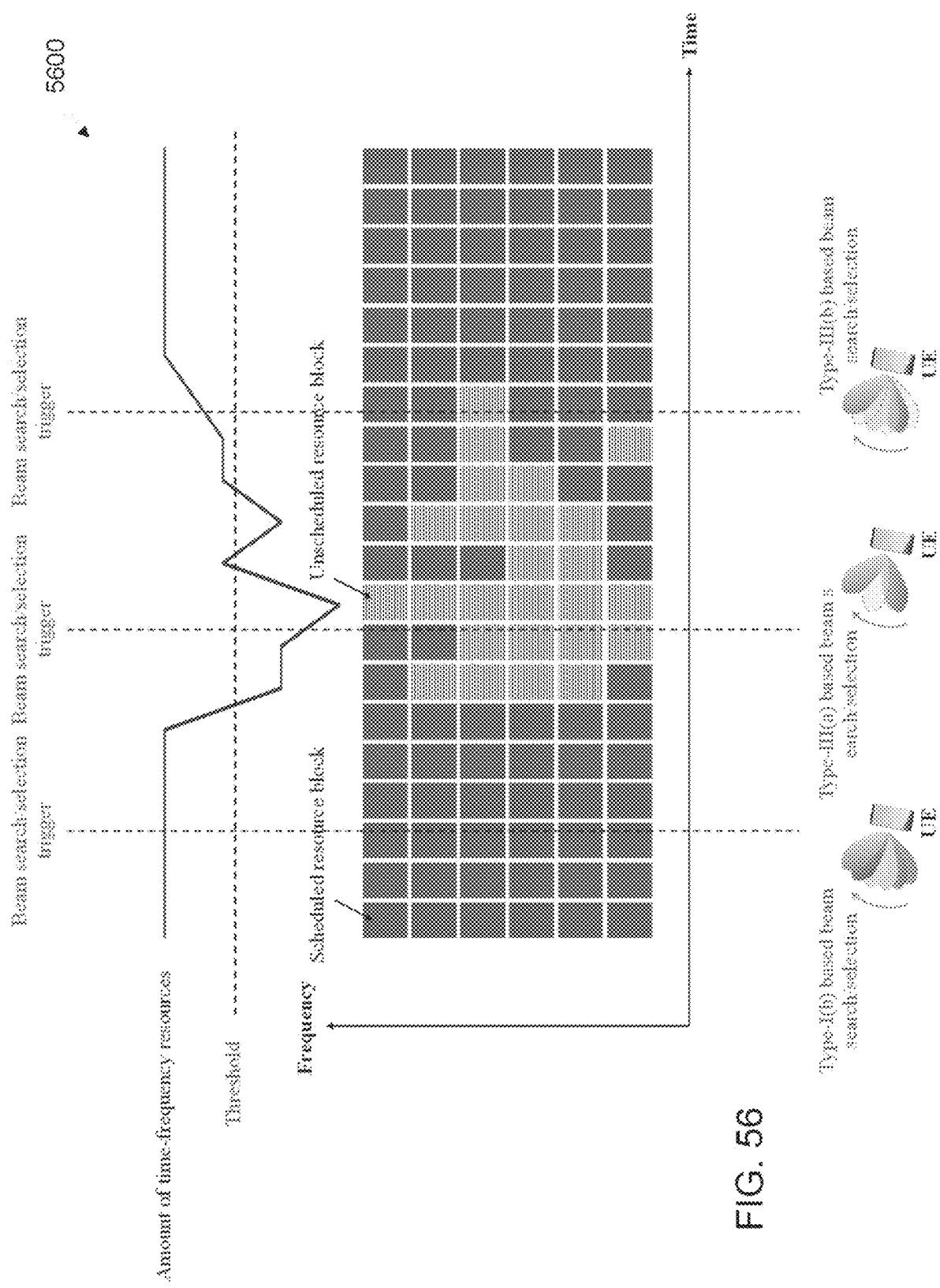
FIG. 56 illustrates an example switching among the Type-I (b), Type-III (a) and Type-III (b) based beam search/selection strategies according to embodiments of the present disclosure.

FIG. 56 illustrates an example switching among the Type-I(b), Type-III(a) and Type-III(b) based beam search/selection strategies 5600 according to embodiments of the present disclosure. An embodiment of the switching among the Type-I(b), Type-III(a) and Type-III(b) based beam search/selection strategies 5600 shown in FIG. 56 is for illustration only. One or more of the components illustrated in FIG. 56 can be implemented in specialized circuitry configured to perform the noted functions or one or more of the components can be implemented by one or more processors executing instructions to perform the noted functions.

As illustrated in FIG. 56, a conceptual example characterizing the provided traffic condition enabled beam operation/management optimization at the terminal is presented. In this example, the UE switches among various beam search/selection strategies based on the amount of the scheduled time-frequency resources for them, and here, the amount of the scheduled time-frequency resources directly relates to the traffic condition.

It is evident from FIG. 56 that if the beam search/selection process is triggered and the current amount of the scheduled time-frequency resources for the UE of interest is beyond the predetermined threshold, the UE would use the fine beam search/selection methods such as the Type-I(b) and Type-III(b) based designs. Note that the Type-I(b) and Type-III(b) based beam search/selection methods may result in different beam search/selection delays, though the methods may exhibit similar beam selection accuracy performance.

To determine which one to use, the UE may first compute the difference between the amount of the assigned time-frequency resources and the corresponding threshold, and then compare the difference with another threshold. For instance, if the difference is beyond the other threshold, the UE may use Type-I(b) based method; otherwise, if the difference is below the other threshold, the UE may use Type-III(b) based strategy to identify the best beam(s). Besides computing and comparing the said difference, multiple thresholds can be implemented at the terminal to choose the beam search/selection strategy among many candidates that is best suited for the current traffic condition.

Further, it is shown in FIG. 56 that if the amount of the scheduled time-frequency resources is below the given threshold, it may be unnecessary for the UE to search over a relatively large set of narrow beams and select the best beam(s) (e.g., Type-I(b) based strategy), but instead, the UE may simply apply coarse beam search/selection method such as Type-III(a) based design to identify the best beam(s) to communicate with the base station as quick as possible to avoid significant delay and potential rate loss.

FIG. 56 illustrates a conceptual example of switching among the Type-I(b), Type-III(a) and Type-III(b) based beam search/selection strategies according to the amount of the scheduled time-frequency resources, and therefore, the corresponding traffic condition in this example.

As have been discussed above, the amount of the time-frequency resources scheduled for the UE of interest may not only imply their undergoing traffic condition, but also reveal their experienced channel state. For instance, less amount of time-frequency resource blocks may be assigned to the UE of interest if the channel condition between them and the base station is poor with many NLOS paths and/or deep fading. On the contrary, if the channel condition is good, the network may assign a relatively large number of resource blocks to the UE to boost their throughput.

For a relatively poor channel condition, the UE may need to perform fine beam search/selection to identify one or more best beam(s) to further improve the link quality. For a relatively good channel condition, it may be unnecessary for the UE to further enhance the link quality performance, but instead, it may be more beneficial for the UE to further reduce the beam search delay by using, say, Type-I(a) or Type-III(a) based strategies. It is evident from the above discussions that if the amount of the time-frequency resources scheduled for the UE relates to the channel condition, the corresponding beam search/selection strategies are quite opposite to those assuming that the amount of the scheduled time-frequency resources is based on the traffic condition.

Hence, the UE may need to differentiate the impacts of the channel condition and the traffic type on the amount of their scheduled time-frequency resources by, say, configuring multiple thresholds for comparison, to better optimize their beam operation/management strategies for various settings. In addition to the number of scheduled resource blocks, other metrics that can better characterize the propagation channel condition can be implemented at the terminal as well to optimize their beam operation/management strategies.

Figure 57:
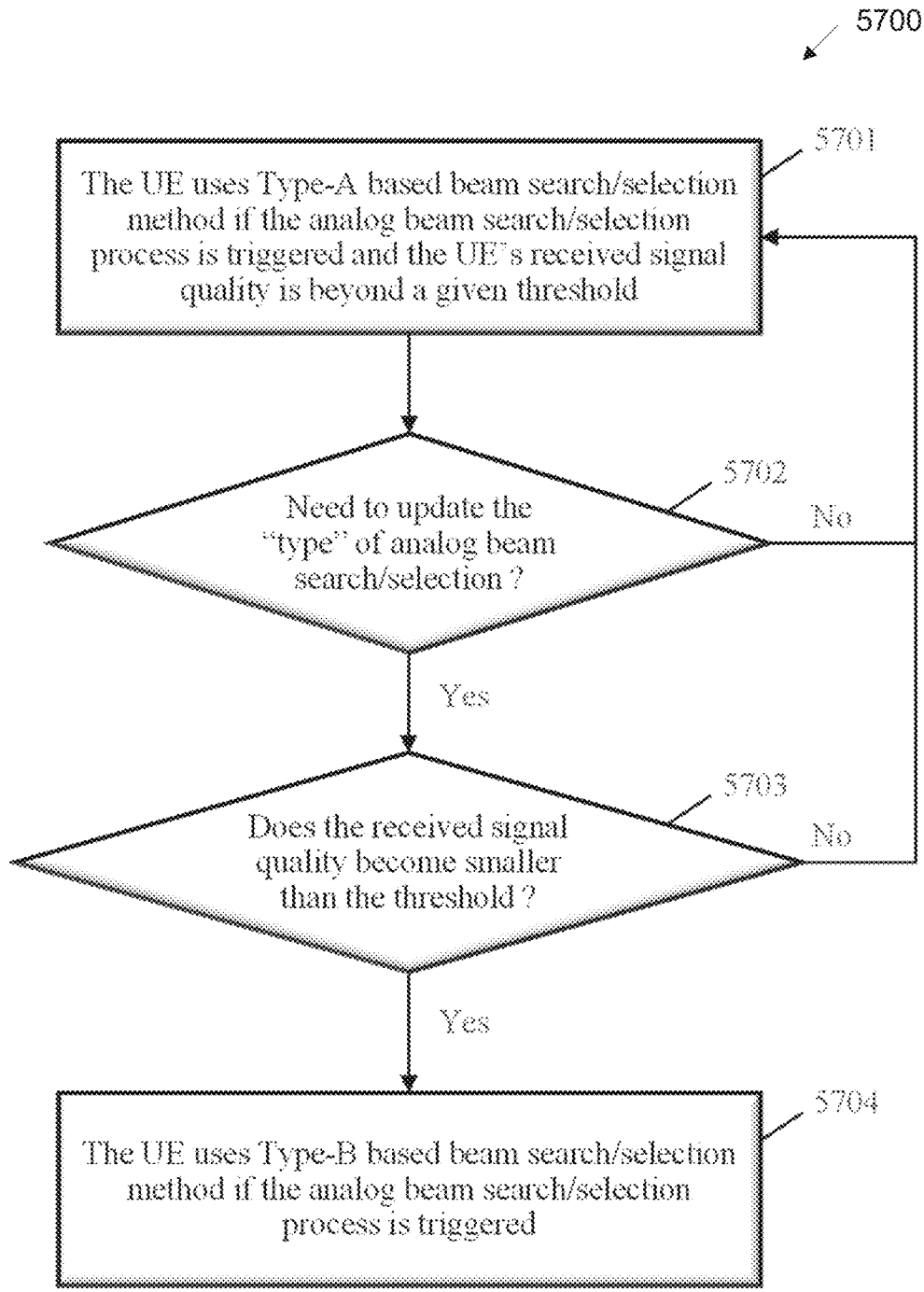
FIG. 57 illustrates a flow chart of a method for beam search/selection method based on the UE's received signal quality according to embodiments of the present disclosure.

FIG. 57 illustrates a flow chart of a method 5700 for beam search/selection method based on the UE's received signal quality according to embodiments of the present disclosure. An embodiment of the method 5700 shown in FIG. 57 is for illustration only. One or more of the components illustrated in FIG. 57 can be implemented in specialized circuitry configured to perform the noted functions or one or more of the components can be implemented by one or more processors executing instructions to perform the noted functions.

FIG. 57 illustrates an algorithm flow-chart of beam search/selection method based on the UE's received signal quality, which may correspond to the received signal strength, receive SNR, SINR, RSRP, RSRQ and etc.

As illustrated in FIG. 57, an algorithm flow-chart exhibiting one of the provided beam operation/management strategies is presented assuming that the UE determines the "type" of the beam search/selection method according to the received signal quality. In this disclosure, the received signal quality could correspond to the received signal power, receive SNR, SINR, RSRP, RSRQ, their averaged counterparts, and/or their combinations.

In practical systems, the received signal quality implicitly indicates the channel condition experienced by the terminal. For instance, if the average received signal power observed at the UE is beyond a given threshold/level, the channel condition between the UE and their serving base station may be good. On the contrary, if the average received signal power observed at the terminal is below the threshold, the channel condition between the UE and their serving base station may be poor, and additional beamforming/array gain may be needed to enhance the radio link quality.

In general, the UE conducts similar procedures in steps 5701, 5702, 5703, and 5704 to those in step 5501, 5502, 5503, and 5504 in FIG. 55, or steps 5301a/b, 5302a/b, 5303a/b, and 5304a/b in FIGS. 53A and 53B. Different from the algorithms provided in FIG. 53A and 53B, and FIG. 55, the algorithm provided in FIG. 57 focuses on optimizing the sequence of switching among many candidate beam search/selection methods based on the received signal quality.

As illustrated in FIG. 57, in step 5701, the UE uses Type-A based beam search/selection method because the received signal quality is beyond the predetermined threshold, which may also imply that the channel condition is good. For a good channel condition, it may become unnecessary for the terminal to perform the fine beam search/selection, but instead, the UE may leverage the good channel quality to reduce the beam search delay by performing the coarse beam search/selection strategies such as the Type-I (a), Type-III(a) and Type-IV(b) based methods.

In step 5702, the UE checks whether it is time to reconfigure the "type" of the beam search/selection strategy, and the corresponding procedure is identical to those described in step 5302a/b in FIGS. 53A and 53B, and 5502 in FIG. 55.

In step 5703, the UE compares the current received signal quality such as the received signal power, receive SNR, RSRP, RSRP, their averaged counterparts or one or more of their combinations with the given threshold again. If the received signal quality is still beyond the threshold/level, the algorithm would go back to step 5701, and the UE would continue to use Type-A based beam search/selection approach once the next beam search/selection process is triggered. Otherwise, if the received signal quality becomes smaller than the threshold/level, the algorithm would proceed to 1804 to update the "type" of the beam search/selection strategy.

In step 5705, the UE decides to use Type-B based fine beam search/selection method such as the Type-I(b) and Type-III(b) based strategies defined in this disclosure. Using fine beam search/selection method here could be beneficial to enhance the link quality at the cost of increased beam search complexity and latency.

Figure 58:
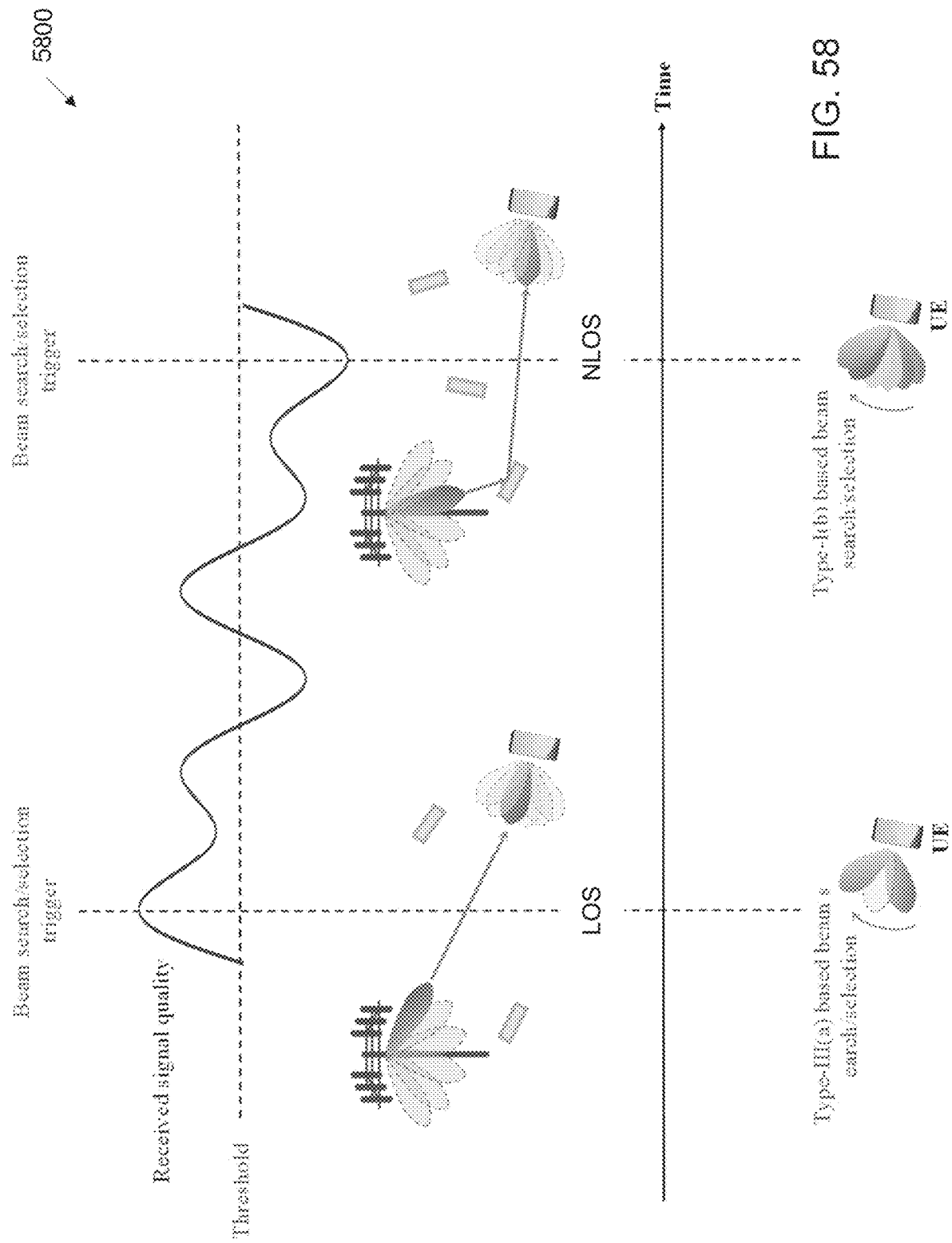
FIG. 58 illustrates an example switching between the Type-I (b) and Type-III (a) based beam search/selection strategies according to embodiments of the present disclosure.

FIG. 58 illustrates an example switching between the Type-I(b) and Type-III(a) based beam search/selection strategies 5800 according to embodiments of the present disclosure. An embodiment of the switching between the Type-I(b) and Type-III(a) based beam search/selection strategies 5800 shown in FIG. 58 is for illustration only. One or more of the components illustrated in FIG. 58 can be implemented in specialized circuitry configured to perform the noted functions or one or more of the components can be implemented by one or more processors executing instructions to perform the noted functions.

FIG. 58 illustrates a conceptual example of switching between the Type-I(b) and Type-III(a) based beam search/selection strategies according to the received signal quality, which characterizes the channel condition (LOS or NLOS in this example) between the UE and their serving base station.

In FIG. 58, a conceptual example depicting the received signal quality, and therefore, the channel condition (LOS or NLOS) enabled beam operation/management optimization is provided. In this example, the UE switches between the Type-III(a) based coarse beam search/selection strategy and the Type-I(b) based fine beam search/selection strategy by comparing the received signal quality such as the received signal power, RSRP, and etc. with the predetermined threshold/level. A good received signal quality, e.g., larger than the given threshold, may imply a good channel condition.

In the example shown in FIG. 58, a good channel condition corresponds to the case where there exists a strong LOS component/path between the UE and their serving base station. If the channel condition/quality is already good, it may be unnecessary for the terminal to further improve the link quality by searching over many narrow beams in an exhaustive manner to identify one or more best beams to communicate with the base station. Instead, reducing the beam search delay and complexity ought to be the design focus in this case.

It is evident from FIG. 58 that if the beam search/selection process is triggered assuming that the received signal quality is beyond the given threshold, the UE uses the Type-III(a) based method to find the best beam(s). In the provided Type-III(a) based method, the UE measures the received signal qualities of a few wide beams selected from the first tier beam codewords in the beam codebook, predicts the received signal qualities of the other unmeasured first tier beams in the beam codebook, and selects one or more best beams to communicate the base station.

It is evident from this process that the Type-III(a) based method has a strong potential to minimize the beam search delay and complexity. On the contrary, if the received signal quality becomes lower than the threshold, implying a bad channel condition such as the NLOS scenario shown in FIG. 58, the terminal may perform the Type-I(b) based fine beam search/selection overall the second tier narrow beams in the beam codebook to improve the radio link quality and ensure the link budgets.

In another embodiment, in addition to the wireless communications related performance metrics such as the UE's buffer status, the traffic type and the propagation channel condition discussed through FIGS. 51 through 58, many other important performance indicators for the terminal such as the battery life and the temperature can also be used by the UE to determine the appropriate beam search/selection methods.

For instance, if the UE has a low battery and wants to save the energy when the beam search/selection process is triggered, the UE may simply execute the least complex beam search method to select one or more beams to communicate with the network, maintaining the connection with the minimum radio link quality.

Figure 59:
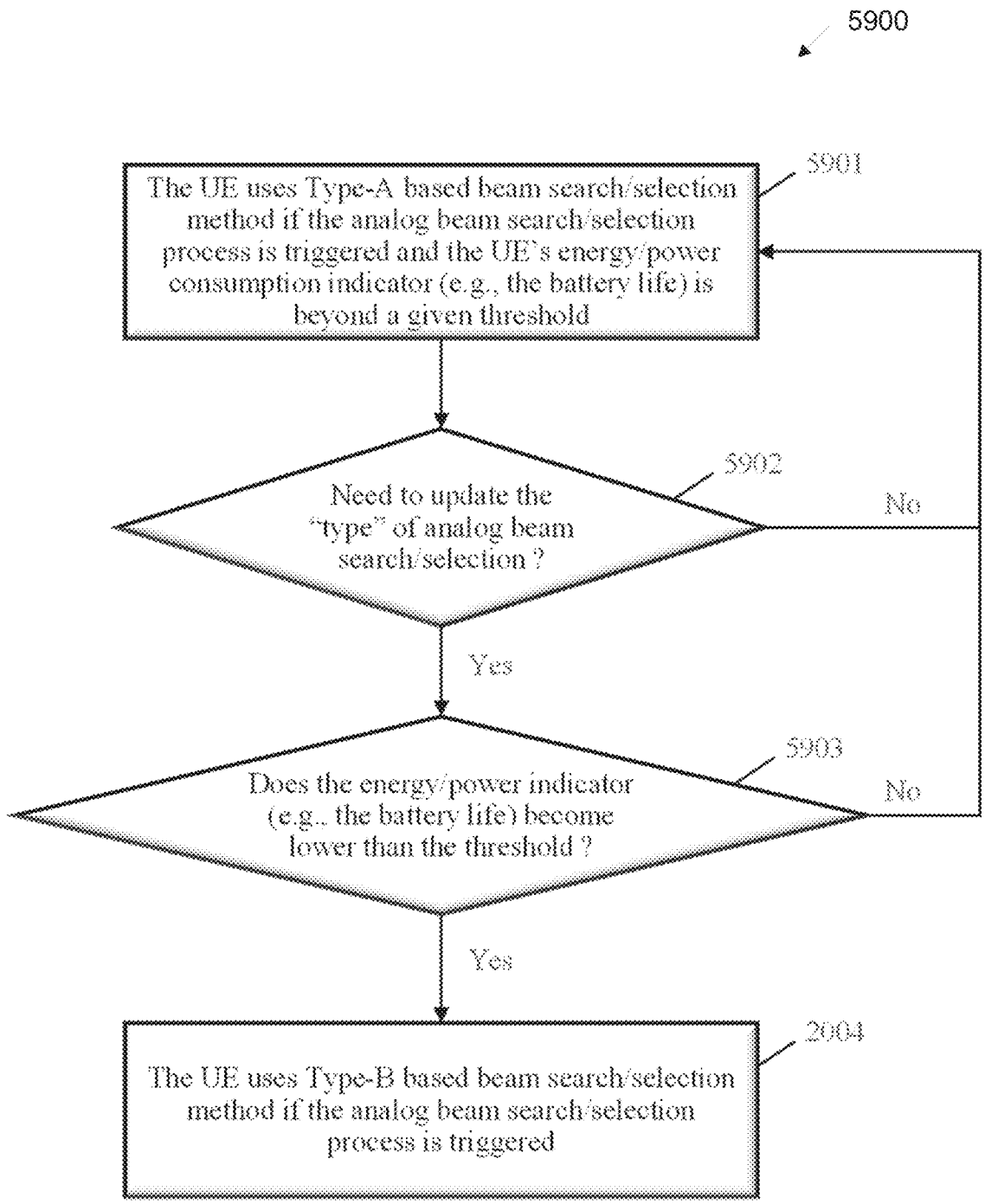
FIG. 59 illustrates a flow chart of a method for beam search/selection method based on the UE's power/energy consumption status according to embodiments of the present disclosure.

FIG. 59 illustrates a flow chart of a method 5900 for beam search/selection method based on the UE's power/energy consumption status according to embodiments of the present disclosure. An embodiment of the method 5900 shown in FIG. 59 is for illustration only. One or more of the components illustrated in FIG. 59 can be implemented in specialized circuitry configured to perform the noted functions or one or more of the components can be implemented by one or more processors executing instructions to perform the noted functions.

As illustrated in FIG. 59, an algorithm flow-chart depicting the provided power/energy aware beam search/selection strategy is presented. The UE performs similar procedures in steps 5901, 5902, 5903, and 5904 to those in steps 5701, 5702, 5703, and 5704 in FIG. 57, steps 5501, 5502, 5503, and 5504 in FIG. 55, and 5301a/b, 5302a/b, 5303a/b, and 5304a/b in FIGS. 53A and 53B.

The main difference of the algorithm presented in FIG. 59 from those in FIGS. 53A and 53B, FIG. 55 and FIG. 57 is that the UE uses their power/energy consumption status to determine the appropriate beam search/selection strategy. The general design principle is described as follows: if the battery life of the terminal is low, the UE may need to perform the least complex, and therefore, the least power consuming beam search/selection method once the beam search/selection process is triggered to save the energy. If the battery life of the terminal is relatively high, e.g., higher than a given threshold, the terminal may be able to choose the fine beam search/selection strategy to determine one or more best beams to use for communicating with their serving base station.

In FIG. 59, the fine beam search/selection method corresponds to Type-A based strategy in step 5901, which may be the Type-I(b) or the Type-III(b) based algorithms presented in this disclosure. If, e.g., the UE's battery life (or other power/energy consumption indicators) is below the given threshold/level, the UE would execute Type-B based beam search/selection strategy in step 5904 to save the power/energy once the beam search/selection process is triggered. Here, the Type-B based strategy may correspond to the Type-I(a), Type-III(a) or Type-IV(b) based coarse beam/selection methods presented in this disclosure.

FIG. 59 illustrates an algorithm flow-chart of beam search/selection method based on the UE's power/energy consumption status and the power/energy consumption indicator may correspond to the battery life of the terminal.

Figure 60:
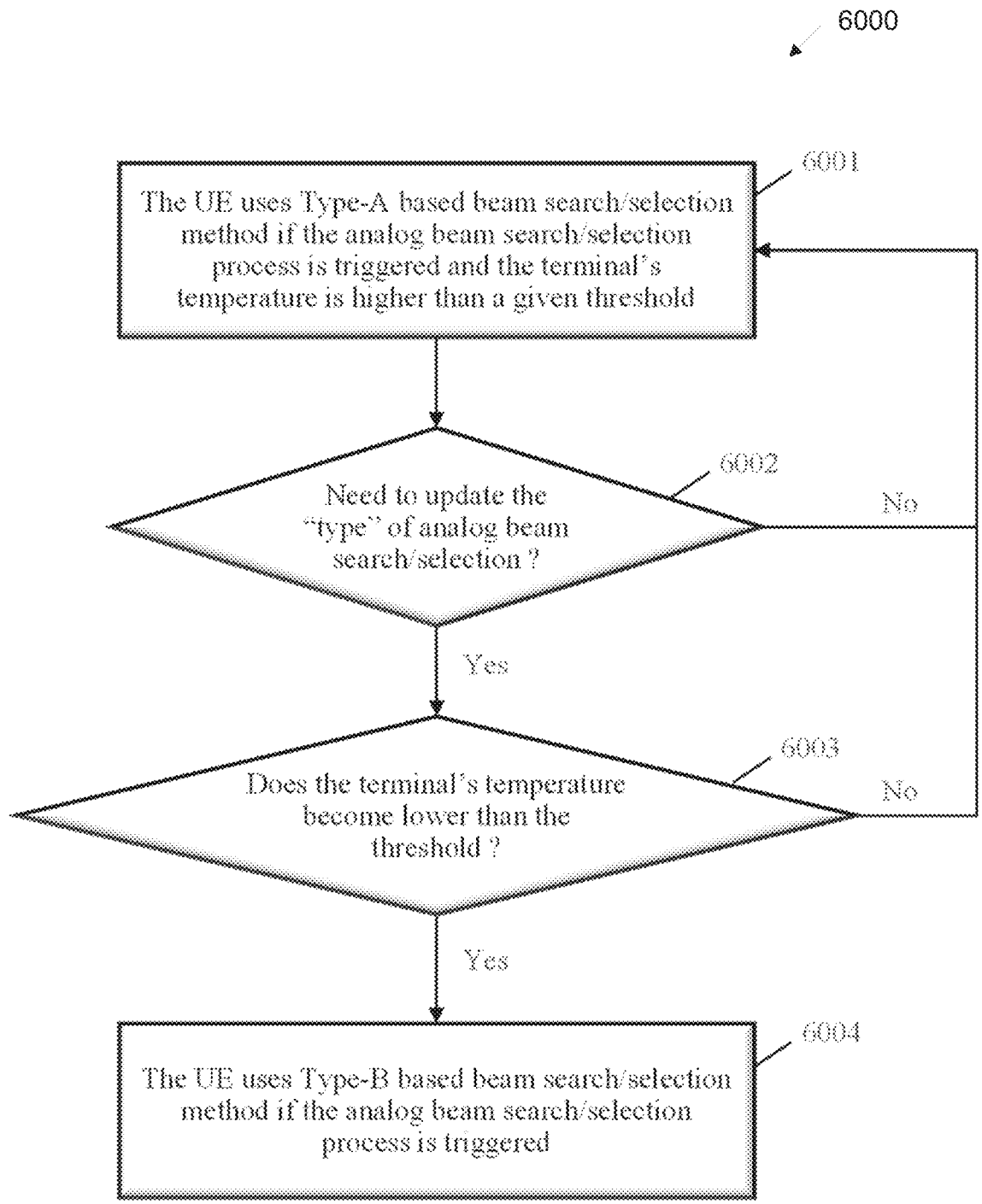
FIG. 60 illustrates a flow chart of a method for beam search/selection method based on the UE's power/energy consumption status according to embodiments of the present disclosure.

FIG. 60 illustrates a flow chart of a method 6000 for beam search/selection method based on the UE's power/energy consumption status according to embodiments of the present disclosure. An embodiment of the method 6000 shown in FIG. 60 is for illustration only. One or more of the components illustrated in FIG. 60 can be implemented in specialized circuitry configured to perform the noted functions or one or more of the components can be implemented by one or more processors executing instructions to perform the noted functions.

FIG. 60 illustrates an algorithm flow-chart of beam search/selection method based on the UE's power/energy consumption status and the power/energy consumption indicator may correspond to the battery life of the terminal.

As illustrated in FIG. 60, an algorithm flow-chart characterizing another beam search/selection strategy is provided, in which the terminal optimizes the beam operation/management procedure based on their temperature. The terminal's temperature is an essential performance indicator for the 5G devices. A high working temperature of the device not only would significantly limit the processing capabilities of many important modules such as the communication module, sensing module and etc., but also is unsafe for direct skin contact. Hence, if the terminal of interest is operating with relatively high temperature, it may be beneficial for the terminal to execute any necessary algorithms with the least complexity.

It is evident from FIG. 60 that the provided temperature enabled beam search/selection approach has similar design procedures to those in the provided energy/power consumption aware beam search/selection strategy in FIG. 59. For the temperature based design approach, however, the Type-A based strategy corresponds to the coarse beam search/selection method with the least complexity because it is assumed in step 6001 that the terminal's working temperature is above the predetermined threshold/level, which needs to be lowered to avoid overheating.

In step 6004, however, the terminal may arbitrarily choose either the fine beam search/selection method or the coarse beam search/selection method as the Type-B algorithm according to other performance metrics such as the UE's buffer status, traffic type, channel condition and etc., because now, the terminal's temperature is below the given threshold.

Figure 61:
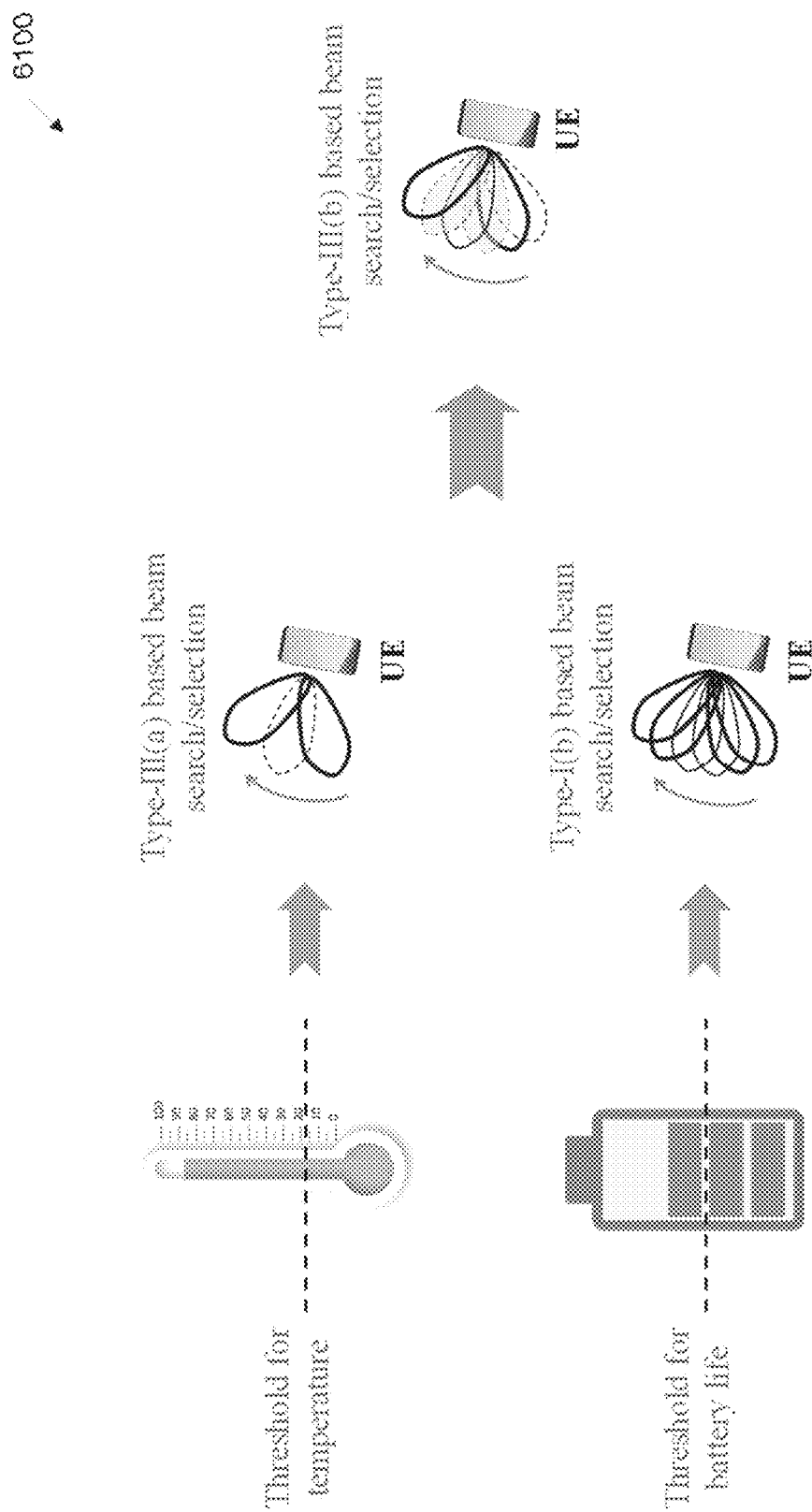
FIG. 61 illustrates an example temperature and/or energy/power consumption-based beam search/selection strategy according to embodiments of the present disclosure.

FIG. 61 illustrates an example temperature and/or energy/power consumption-based beam search/selection strategy 6100 according to embodiments of the present disclosure. An embodiment of the temperature and/or energy/power consumption-based beam search/selection strategies 6100 shown in FIG. 61 is for illustration only. One or more of the components illustrated in FIG. 61 can be implemented in specialized circuitry configured to perform the noted functions or one or more of the components can be implemented by one or more processors executing instructions to perform the noted functions.

As illustrated in FIG. 61, conceptual examples of the provided temperature and/or energy/power consumption aware beam search/selection strategies are presented. It is evident from FIG. 61 that the terminal's temperature is higher than the predetermined level, and the UE's battery life is also beyond the corresponding threshold. First, assume that the UE determines the appropriate beam search/selection algorithm only according to the temperature information. In this example, as the UE's temperature is higher than the threshold, the UE uses the least complex Type-III(a) based beam search/selection strategy to identify one or more best beams to use for communicating with the base station once the beam search/selection process is triggered.

It is expected that by using the coarse beam search/selection method, the UE's temperature may not be further increased during this process. Similarly, if the UE only considers the energy/power consumption to determine the appropriate beam search/selection method, the UE may choose the Type-I(b) based strategy because their battery life is beyond the given threshold in this example. If the UE jointly considers their temperature and energy/power consumption status to decide the appropriate beam search/selection strategy, a different "type" of beam search/selection design from the Type-I(b) and Type-III(a) may be used by the terminal to better tradeoff the complexity and accuracy performances.

In this example, the terminal uses the Type-III(b) based approach assuming that their temperature is beyond the threshold and their battery life is beyond the corresponding level as well. The computational complexity of the Type-III(b) based method may be higher than the Type-III(a) based strategy, but smaller than the Type-I(b) based strategy. The beam selection accuracy of the Type-III(b) based method may be better than the Type-III(a) based approach, but worse than the Type-I(b) based strategy.

Figure 62A:
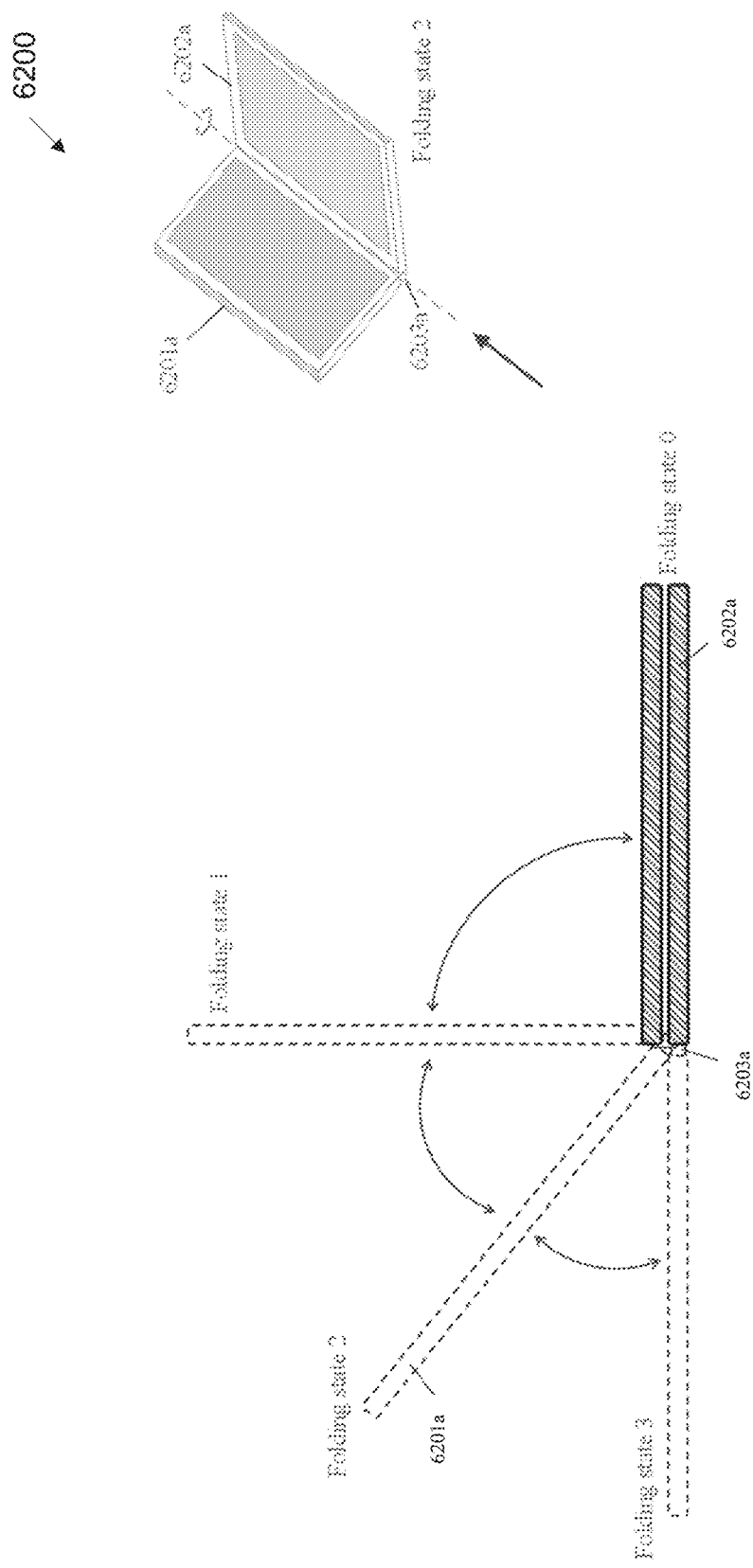
FIG. 62A illustrates an example various folding states of a foldable device according to embodiments of the present disclosure.

FIG. 62A illustrates an example various folding states of a foldable device 6200 according to embodiments of the present disclosure. An embodiment of the various folding states of a foldable device 6200 shown in FIG. 62A is for illustration only. One or more of the components illustrated in FIG. 62A can be implemented in specialized circuitry configured to perform the noted functions or one or more of the components can be implemented by one or more processors executing instructions to perform the noted functions.

The provided situation-aware analog beam operation and management strategies can be applied to foldable devices as well. Conceptual examples of a foldable device and various folding states of the device are given in FIG. 62A. The foldable device shown in FIG. 62A includes two key operating components (e.g., 6201a and 6202a). The foldable device is connected via 6203a, and their relatively position is adjustable as depicted in FIG. 62A.

Specifically, four folding states are provided in FIG. 62A to characterize the relative position between 6201a and 6202a. For instance, if the foldable device is a mobile phone, the components 6201a and 6202a may have displays facing each other, and the components may be turned on or off either jointly or separately. In this case, the folding state 0 can be regarded as a fully closed state, and the folding state 3 in FIG. 62A can be considered as a fully open state of a mobile phone. For a mobile terminal, a fully closed state, e.g., the folding state 0 in FIG. 62A may only require low data rate communication in both the downlink and uplink directions.

In certain cases, a mobile terminal with a fully closed state, e.g., the folding state 0 in FIG. 62A, may be in their power saving mode, sleep mode, and etc. In this case, if the beam search/selection process is triggered, it may be preferable for the terminal to execute a low-complexity low-delay beam search/selection method to identify the best beam(s) to maintain the basic communication with the network without consuming much power. On the other hand, a fully open state of a mobile phone may imply that the device may require relatively large amounts of data in both the downlink and uplink directions (e.g., video streaming), and it may be desirable to use the beam search/selection method (if triggered) that has a good tradeoff between the beam selection accuracy and beam search latency performances to find the best beam(s) to maintain a good link quality with the network.

Figure 62B:
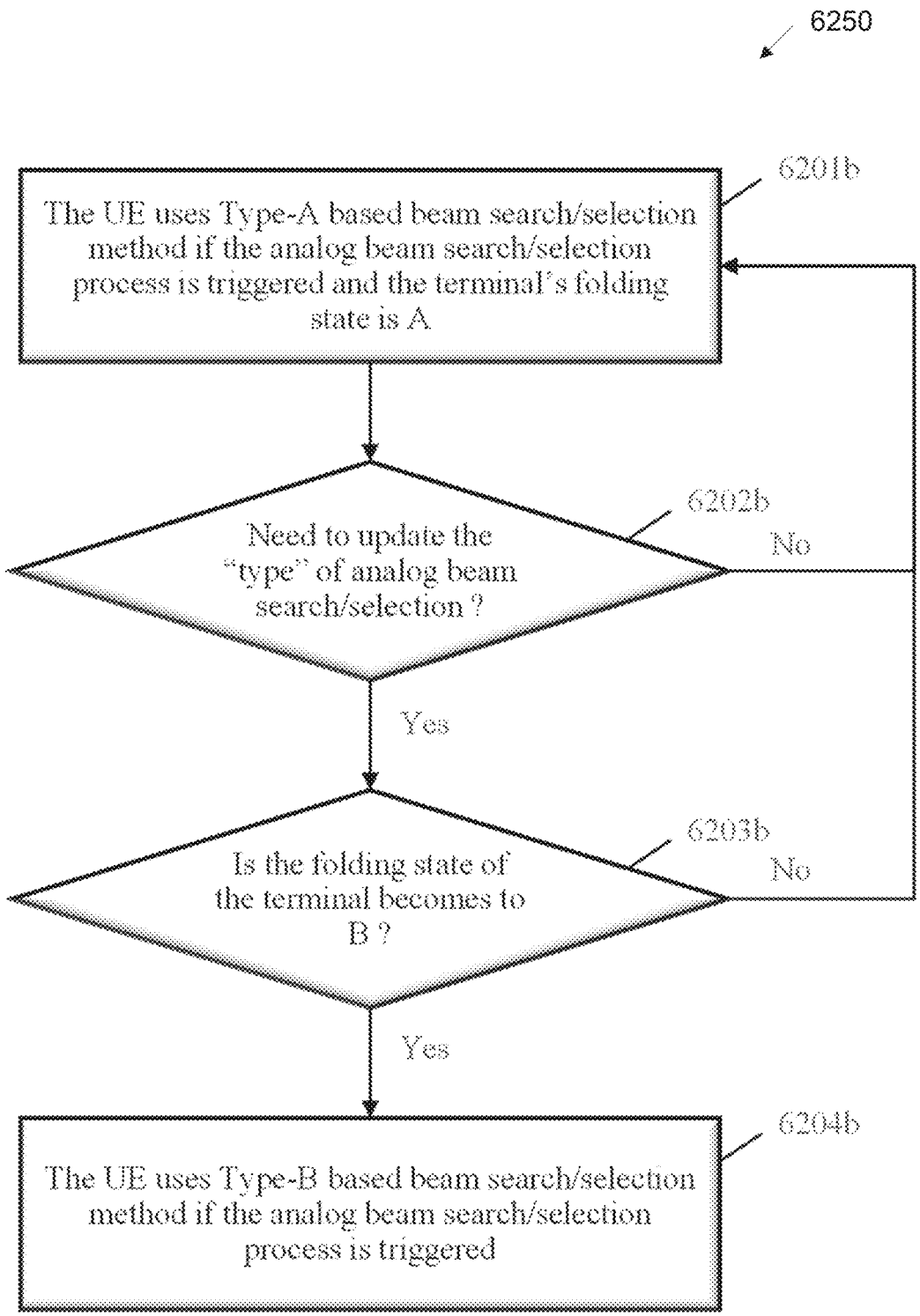
FIG. 62B illustrates a flow chart of a method for beam search/selection method based on the terminal's folding state if the terminal is a foldable device according to embodiments of the present disclosure.

FIG. 62B illustrates a flow chart of a method 6250 for beam search/selection method based on the terminal's folding state if the terminal is a foldable device according to embodiments of the present disclosure. An embodiment of the method 6250 shown in FIG. 62B is for illustration only. One or more of the components illustrated in FIG. 62B can be implemented in specialized circuitry configured to perform the noted functions or one or more of the components can be implemented by one or more processors executing instructions to perform the noted functions.

As illustrated in FIG. 62B, an algorithm flow-chart characterizing another beam search/selection strategy is provided, in which the terminal optimizes the beam operation/management procedure based on their folding state. As discussed above, if the terminal of interest is operating with the folding state 0, it may be beneficial for the terminal to execute any necessary algorithms with the least complexity to save the energy. It is evident from FIG. 62B that the provided folding state enabled beam search/selection approach has similar design procedures to other situation-aware beam operation/management designs such as the energy/power consumption aware beam search/selection strategy provided in FIG. 59.

As illustrated in FIG. 62B, in step 6201b, the UE first checks their folding state by using their embedded sensor(s), indicators and etc. For instance, the folding state A may correspond to the fully closed state such as the folding state 0 in FIG. 62A if the device is under the power saving or the sleep mode. In this case, the Type-A based beam search/selection method may correspond to the Type-I(a) based strategy with the least beam search delay and implementation complexity.

If a new beam search/selection process is triggered, or there is a need to update the selected beam (e.g., step 6202b), the terminal would check again their folding state by using their embedded sensor(s), indicators and etc. (e.g., step 6203b). In this example, the terminal would only check one other folding state (folding state B) in step 6203b but note that multiple folding states (larger than two) can be supported and implemented in the provided algorithm with moderation modifications on the algorithm procedures.

If the device's folding state is still A, the algorithm would go back to step 6201b; otherwise, the algorithm would proceed to step 6204b. In step 6204b, the UE would use the Type-B based beam search/selection method to identify the best beam(s) to communicate with their serving base station if the beam search/selection process is triggered. If the folding state B corresponds to the folding state 3 in FIG. 62A, the Type-B based method may be the Type-II based beam search/selection strategy considered in this disclosure.

This is because the folding state 3 in FIG. 62A may imply that the device may have relatively high demand on the data rate, so a beam search/selection method such as the Type-II based design with good tradeoff between the beam selection accuracy and beam search latency is a desirable option. Note that other mappings between the beam search/selection strategies and the device's folding states are also possible depending on their specific requirements on the beam selection accuracy and beam search latency performances.

Figure 63:
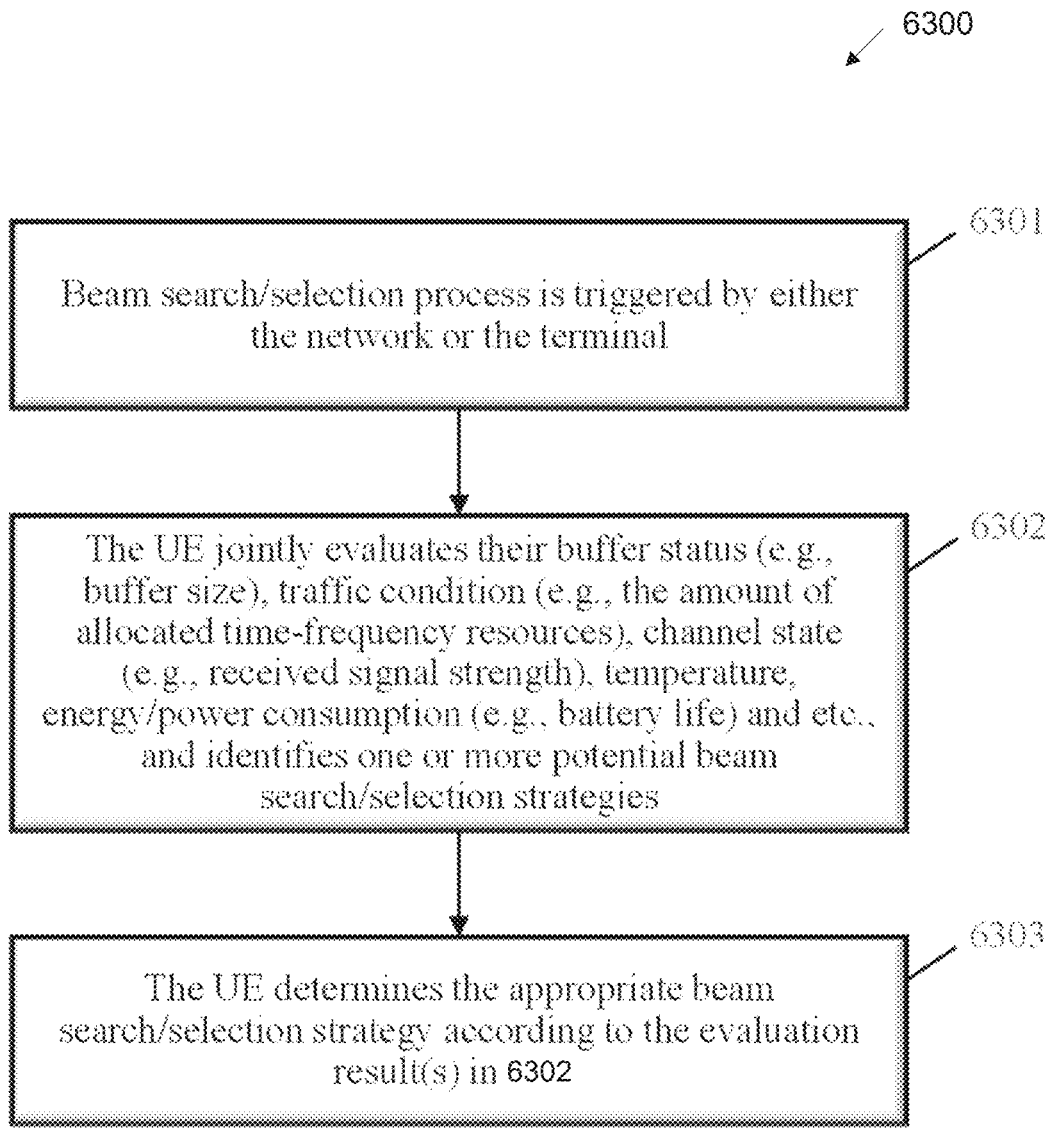
FIG. 63 illustrates a flow chart of a method for beam search/selection method according to embodiments of the present disclosure.

FIG. 63 illustrates a flow chart of a method 6300 for beam search/selection method according to embodiments of the present disclosure. An embodiment of the method 6300 shown in FIG. 63 is for illustration only. One or more of the components illustrated in FIG. 63 can be implemented in specialized circuitry configured to perform the noted functions or one or more of the components can be implemented by one or more processors executing instructions to perform the noted functions.

FIG. 63 illustrates an algorithm flow-chart of beam search/selection method based on the joint evalution of the UE's buffer status, traffic condition, channel state, temperature, power/energy consumption status and etc.

In another embodiment, the UE jointly evaluates many performance metrics such as the UE's buffer status, the ongoing traffic condition, the channel state, the temperature, their energy/power consumption and etc. to select the appropriate beam search/selection strategy once the beam search/selection process is triggered. In FIG. 63, the algorithm flow-chart of the provided beam search/selection algorithm is presented.

As illustrated in FIG. 63, in step 6301, the beam search/selection process for the UE is triggered by either the network or the terminal. Once the beam search/selection process is triggered, the UE needs to determine an appropriate beam search/selection strategy to identify one or more best beams to communicate with the base station. The beam search/selection process may be triggered in either a periodic or aperiodic manner.

In step 6302, the UE jointly evaluates one or more performance metrics such as their buffer status, traffic condition, channel state, temperature, power/energy consumption and etc., and identifies one or more potential beam search/selection methods. For instance, the UE first compares their buffer size with the corresponding threshold, the amount of the scheduled resource blocks with the corresponding threshold, the average received signal strength with the corresponding threshold, the temperature with the corresponding level, and their battery life with the corresponding threshold. Then, the UE separately identifies all the beam search/selection methods according to the results of all these comparisons.

For instance, assume that the performance metrics of interest is: (1) the UE's buffer status, (2) the channel condition, and (3) the terminal's temperature and their energy/power consumption status. If (i) the UE's buffer size is larger than the corresponding threshold, (ii) the average received signal power is below the given threshold, (iii) the UE' temperature is higher than the predetermined level, and (iv) the battery life is larger than the given threshold, the UE may first determine the Type-I(b) based beam search/selection method for (i) to more efficiently process the data packets in the buffer, the Type-I(b) based strategy for (ii) to further improve the link quality, the Type-I(a) based method for (iii) not to increase the terminal's temperature, and the Type-III(b) based approach for (iv).

In step 6303, the UE determines the appropriate beam search/selection strategy based on the evaluation results from step 6302. Once the beam search/selection process is triggered, the UE executes the selected beam search/selection algorithm to choose one or more best beams to communicate with the network. Consider the example presented in step 6302, in which the UE determines the Type-I(b) based beam search/selection strategy for both the buffer status and the channel condition, the Type-I(a) based method for the temperature metric, and the Type-III(b) based approach for the power/energy consumption status.

If all the performance metrics of interest are equally weighted, the terminal may select the Type-I(b) based beam search/selection method. Still for this example, the UE may determine a different beam search/selection method from the Type-I(b) based approach if the performance metrics of interest are weighted differently. For example, if the temperature metric has the highest priority among all the performance metrics, the UE may just simply pick the Type-I(a) based beam search/selection strategy to identify the best beam(s) to communicate with their serving base station and to avoid the device overheating. Note that other strategies to determine the most appropriate beam search/selection method from all the candidate solutions than the ones described above are also possible depending on practical implementation requirements and settings.

In addition to the performance metrics considered in the previous embodiments, the UE may also choose different beam search/selection algorithms, or switch among various beam search/selection strategies for various protocol states and/or deployment scenarios. This is mainly because different protocol states or deployment scenarios may have different requirements on the beam search latency and beam selection accuracy.

Three deployment scenarios or protocol states are considered in this embodiment, which are the inter-cell measurement, receive beam refinement during the initial access, and receive beam operation/management under the TCI state change. Conceptual examples of the beam search/selection strategies corresponding to these three deployment scenarios are provided in FIGS. 64 through 66.

Figure 64:
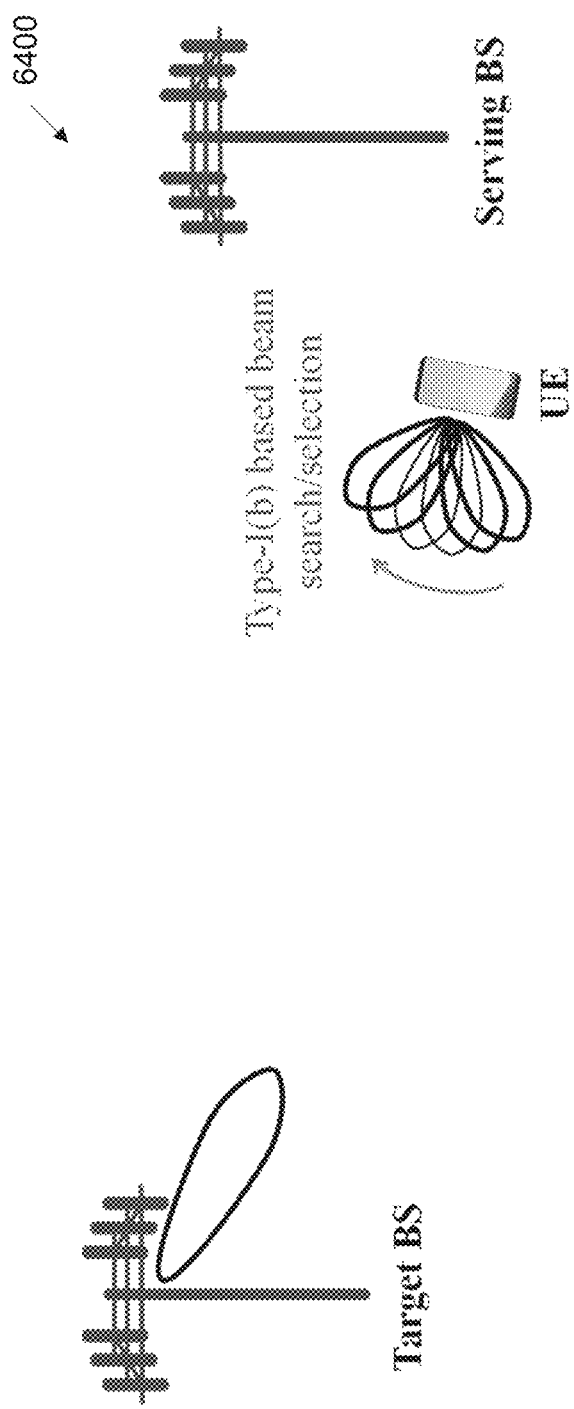
FIG. 64 illustrates an example Type-I (b) based beam search/selection method in the inter-cell measurement according to embodiments of the present disclosure.

FIG. 64 illustrates an example Type-I (b) based beam search/selection method 6400 in the inter-cell measurement according to embodiments of the present disclosure. An embodiment of the Type-I (b) based beam search/selection method 6400 shown in FIG. 64 is for illustration only. One or more of the components illustrated in FIG. 64 can be implemented in specialized circuitry configured to perform the noted functions or one or more of the components can be implemented by one or more processors executing instructions to perform the noted functions.

As illustrated in FIG. 64, the UE forms analog beams to collect the necessary measurement from the target BS, and this measurement may be used by the UE for future handover or other mobility related inter-cell configurations. With the necessary measurement from the target BS, the UE can quickly form one or more beams to communicate with the target BS once the UE is handed over from the current serving BS to the target BS. In general, the channel condition between the UE of interest and the target BS may not be favorable due to the large path-loss and/or many NLOS components. In this case, the UE may execute the fine beam search/selection method to improve the radio link quality between the target BS and the UE of interest once the beam search/selection process is triggered.

In the example shown in FIG. 64, the Type-III(b) based beam search/selection strategy is used, in which the UE performs the exhaustive search over the second tier beams from the beam codebook and selects one or more of them as the final receive beams for the target BS. Note that other types of beam search/selection methods are also possible for the inter-cell measurement depending on the practical requirements.

Figure 65:
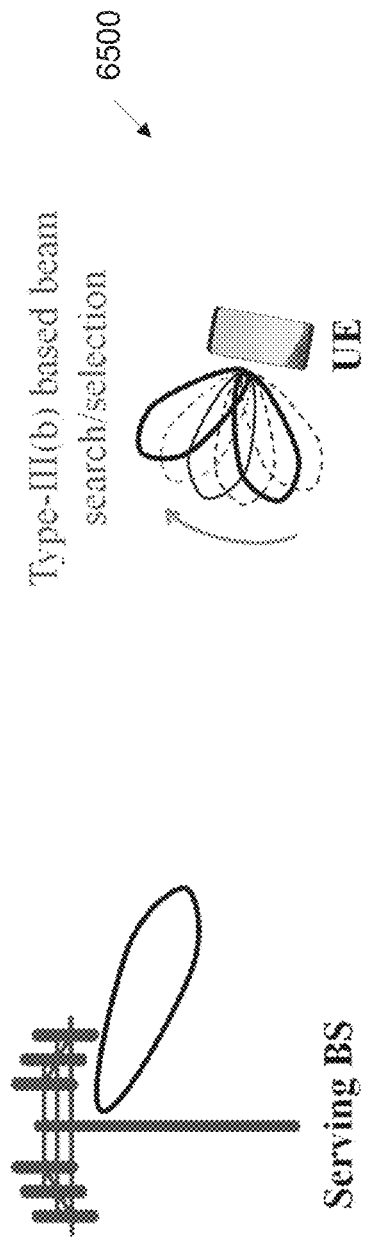
FIG. 65 illustrates an example Type-III (b) based beam search/selection method in the initial access according to embodiments of the present disclosure.

FIG. 65 illustrates an example Type-III (b) based beam search/selection method 6500 in the initial access according to embodiments of the present disclosure. An embodiment of the Type-III (b) based beam search/selection method 6500 shown in FIG. 65 is for illustration only. One or more of the components illustrated in FIG. 65 can be implemented in specialized circuitry configured to perform the noted functions or one or more of the components can be implemented by one or more processors executing instructions to perform the noted functions.

As illustrated in FIG. 65, a conceptual example of the receive beam search/selection and their refinement during the initial access phase is presented. For the initial access, the beam search/selection strategy that can achieve a good tradeoff between the beam search latency and the beam selection accuracy is desired. In the example shown in FIG. 65, the Type-III(b) based beam search/selection method is implemented at the terminal side to support the beam search/selection process once triggered.

In the Type-III(b) based strategy, only a few beams selected from the second tier beam codewords in the beam codebook are used for collecting the necessary measurement, and the final receive beams are determined by the terminal from the second tier beam codewords via beam prediction/interpolation described in the previous embodiments. Note that other types of beam search/selection methods than the Type-III(b) based method can also be implemented at the terminal to better support the initial access.

Figure 66:
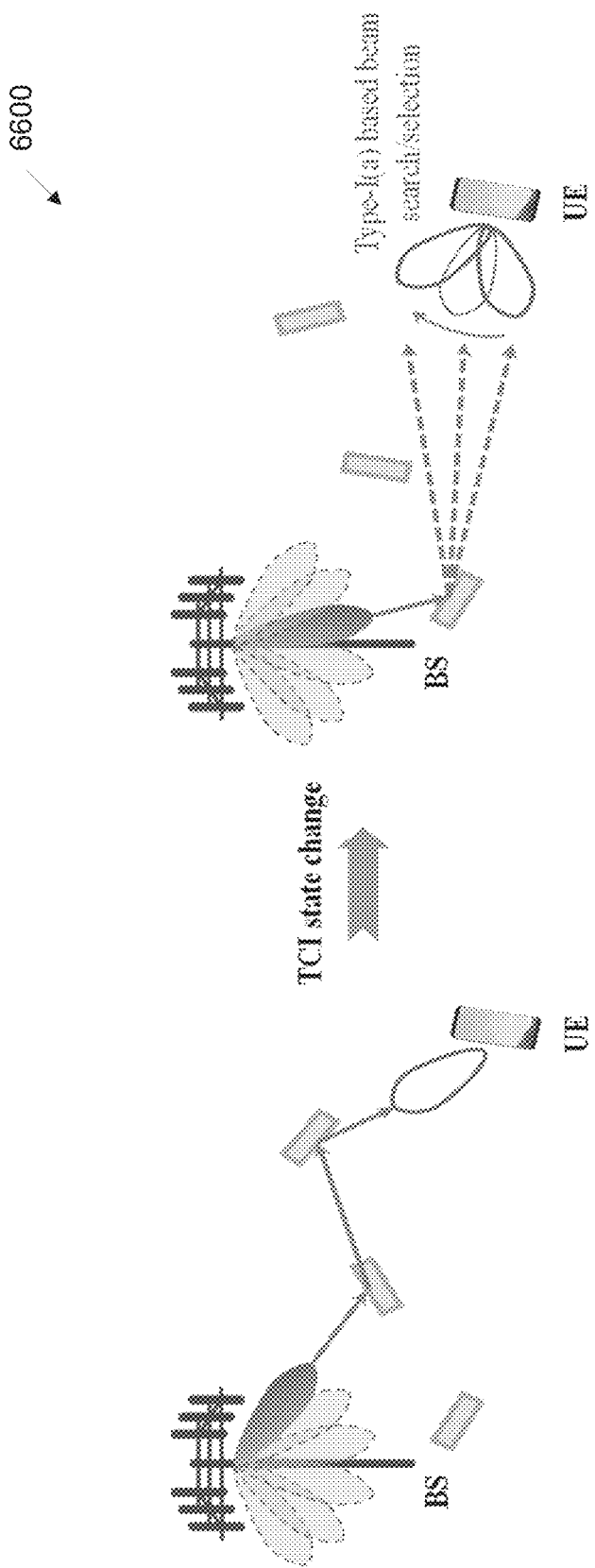
FIG. 66 illustrates an example Type-I (a) based beam search/selection method in supporting the TCI state change according to embodiments of the present disclosure.

FIG. 66 illustrates an example Type-I (a) based beam search/selection method 6600 in supporting the TCI state change according to embodiments of the present disclosure. An embodiment of the Type-I (a) based beam search/selection method 6600 shown in FIG. 66 is for illustration only. One or more of the components illustrated in FIG. 66 can be implemented in specialized circuitry configured to perform the noted functions or one or more of the components can be implemented by one or more processors executing instructions to perform the noted functions.

As illustrated in FIG. 66, a conceptual example of the receive beam operation/management process for the TCI state change/switch is depicted. For instance, due to a sudden blockage, the BS may change the TCI state and/or the transmit beam. To establish the radio link with the base station due to the TCI state change/switch as quick as possible, the terminal may perform the coarse beam search/selection to minimize the beam search delay and avoid potential outage.

In the example shown in FIG. 66, the Type-I(a) based beam search/selection approach is used, in which the terminal searches over the first tier beam codewords in the beam codebook and identifies one or more best beams from the first tier beam codewords to communicate with the base station. Note that other types of beam search/selection methods than the Type-I(a) based strategy can also be implemented at the terminal side for the TCI state change/switch.

Figure 67:
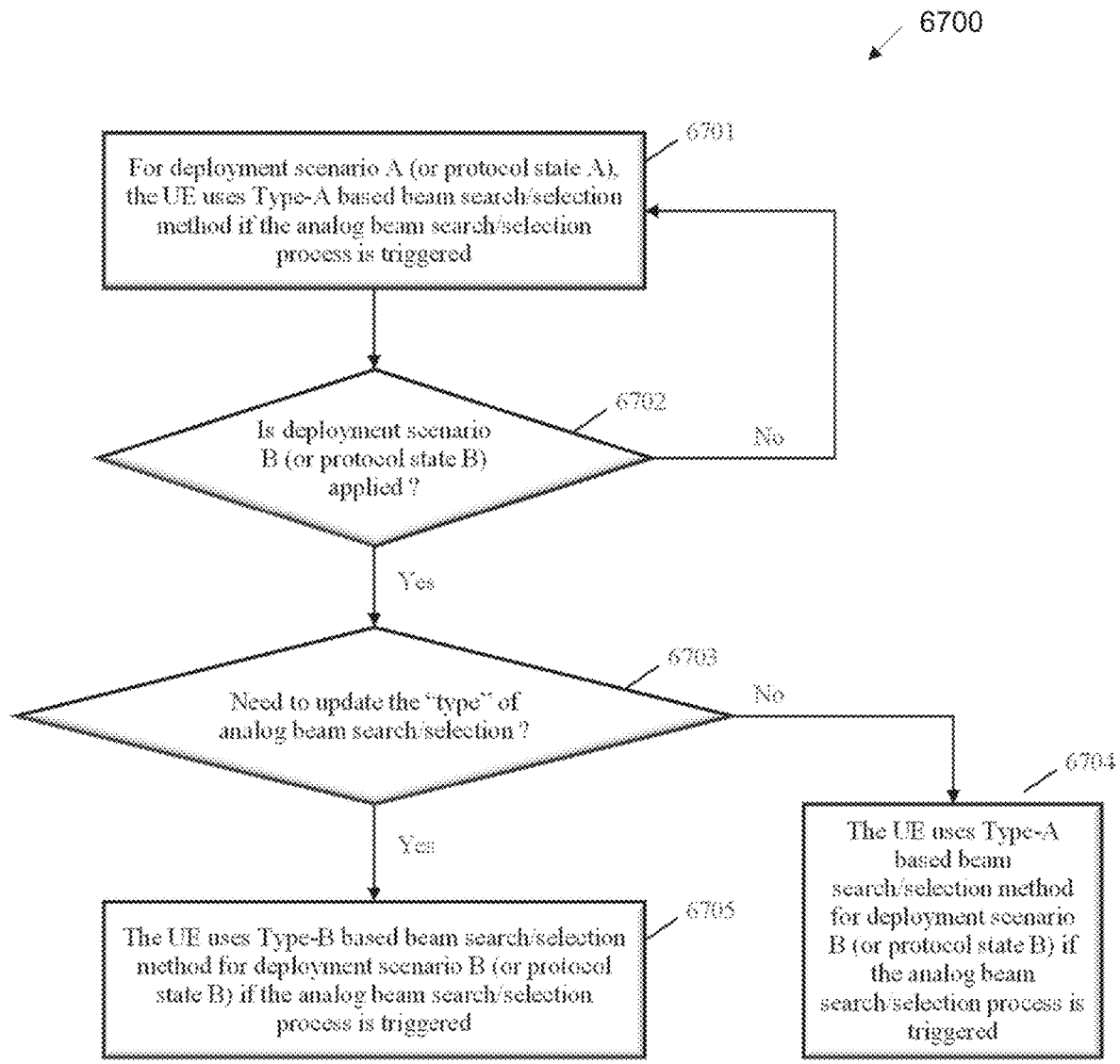
FIG. 67 illustrates a flow chart of a method for deployment scenario or protocol state enabled beam search/selection design at the terminal side according to embodiments of the present disclosure.

FIG. 67 illustrates a flow chart of a method 6700 for deployment scenario or protocol state enabled beam search/selection design at the terminal side according to embodiments of the present disclosure. An embodiment of the method 6700 shown in FIG. 67 is for illustration only. One or more of the components illustrated in FIG. 67 can be implemented in specialized circuitry configured to perform the noted functions or one or more of the components can be implemented by one or more processors executing instructions to perform the noted functions.

As illustrated in FIG. 67, an algorithm flow-chart characterizing the provided deployment scenario or protocol state enabled beam search/selection design is presented. The UE performs similar procedures in steps 6701, 6702, 6703, 6704, and 6705 to their counterparts in FIGS. 53A, 53B, 55, 57, 59, and 60.

As illustrated in FIG. 67, in step 6701, the UE uses the Type-A based beam search/selection strategy for the deployment scenario A or protocol state A once the beam search/selection process is triggered. For instance, the deployment scenario A may be the receive beam search/selection/refinement during the initial access. In this case, according to the example shown in FIG. 66, the Type-A based method may correspond to the Type-III(b) based beam search/selection strategy to better trade off the beam search latency and beam selection accuracy performances.

If deployment scenario B or protocol state B is configured and applied, the algorithm would proceed from step 6702 to step 6703. Otherwise, the algorithm would go back from step 6702 to step 6701. Here, deployment scenario B (or protocol B) is different from deployment scenario A (or protocol state A) in step 6701. In step 6703, the UE checks whether the terminal needs to update the "type" of the beam search/selection strategy. Note that a change in the deployment scenario (or the protocol state), e.g., from deployment scenario A to deployment scenario B, does not necessarily imply that the UE needs to change the beam search/selection strategy as well.

For instance, if deployment scenario A and deployment scenario B have similar requirements on the beam search latency and beam selection accuracy performances, the scenarios A and B may correspond to the same beam search/selection strategy. In this case, the algorithm would go to step 6704, and the terminal would continue to use the Type-A based method for beam search and selection, though a different deployment scenario (or protocol state) is applied from that in step 6701. Otherwise, the algorithm would proceed to step 6705 to determine the appropriate beam search/selection method for deployment scenario B or protocol state B.

In step 6705, the UE determines the Type-B based beam search/selection strategy for deployment scenario B (or protocol state B). For example, if the protocol state B is the TCI state switch depicted in FIG. 66, the Type-B based method may correspond to the Type-I(a) based coarse beam search/selection strategy to minimize the beam search latency.

Figure 68:
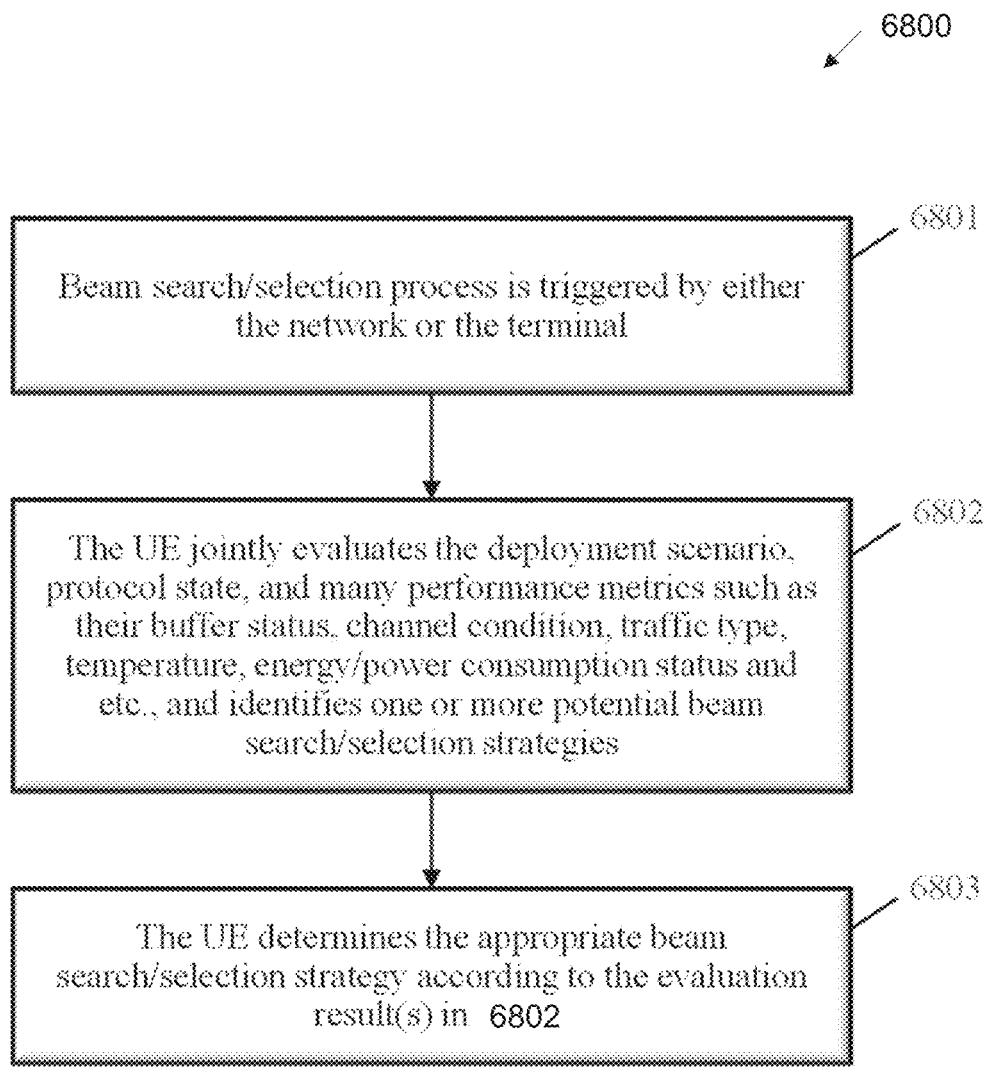
FIG. 68 illustrates a flow chart of a method for beam search/selection according to embodiments of the present disclosure.

FIG. 68 illustrates a flow chart of a method 6800 for beam search/selection according to embodiments of the present disclosure. An embodiment of the method 6800 shown in FIG. 68 is for illustration only. One or more of the components illustrated in FIG. 68 can be implemented in specialized circuitry configured to perform the noted functions or one or more of the components can be implemented by one or more processors executing instructions to perform the noted functions.

FIG. 68 illustrates an algorithm flow-chart of beam search/selection method based on the joint evaluation of the deployment scenario, protocol state, UE's radio performance metrics such as their buffer status, traffic condition, channel state, temperature, power/energy consumption status and etc.

As illustrated in FIG. 68, an algorithm flow-chart depicting a provided beam search/selection strategy is provided. In the provided method, the UE jointly considers many factors such as the deployment scenario, protocol state, UE's buffer status, channel condition, energy/power consumption status and etc. to determine the appropriate beam search/selection strategy. For instance, for the given deployment scenario or protocol state, the UE may first determine one or more candidate beam search/selection strategies. From all these candidate solutions, the UE may then determine one beam search/selection strategy based on a joint evaluation of the UE's buffers status, traffic condition, channel state, temperature, power/energy consumption status and etc.

As illustrated in FIG. 68, in step 6801, the beam search/selection process is triggered by either the network or the terminal. This module is similar to step 6301 in FIG. 63. That is, once the beam search/selection process is triggered, the UE needs to determine an appropriate beam search/selection strategy to identify one or more best beams to communicate with the base station. The beam search/selection process may be triggered in either a periodic or aperiodic manner.

In step 6802, the UE jointly evaluates many design factors such as the deployment scenario, protocol state, UE's buffer size, the amount of scheduled time-frequency resources, the average received signal strength, temperature, battery life and etc., and identifies one or more potential beam search/selection methods. Similar to step 6302 as illustrated in FIG. 63, the UE may separately determine one or more potential beam search/selection strategies for every one of the design factors.

For instance, assume that the deployment scenario for this example is the inter-cell measurement, and other performance metrics are the temperature (lower than the predefined level) and the buffer status (below the given threshold). The UE may first select the Type-I(b), Type-II, Type-III(b) and Type-IV(a) based beam search/selection methods as the potential solutions to the inter-cell measurement. For the temperature lower than the predetermined threshold, the UE may choose the Type-II, Type-III(b) and Type-IV(a) based approaches as the candidate solutions. For the buffer size below the given threshold, the UE may select the Type-I(a) based strategy as the sole candidate solution. All the above selected potential beam search/selection methods and their corresponding design factors are input to step 6803 as the evaluation results.

In step 6803, the UE determines the appropriate beam search/selection method according the evaluation results from step 6802. There could be many implementation options to realize this module. In the following, two implementation examples are presented. Consider the example depicted in step 6802. For one example, the UE may use the Type-I(b), Type-II, Type-III(b) and Type-IV(a) based beam search/selection methods determined for the inter-cell measurement as the overall candidate beam search/selection strategies.

The candidate beam search/selection methods for the temperature metric (the Type-II, Type-III(b) and Type-IV(a)) belong to the overall candidate solutions, but the candidate beam search/selection method for the buffer status metric, i.e., the Type-I(a) based strategy is out of the overall candidate options. Hence, the UE may down select the Type-II, Type-III(b) and Type-VI(a) based methods from the overall candidate solutions. As the terminal's buffer size is below the corresponding threshold, the UE may intend to select the beam search/selection method with the least complexity.

In this case, the UE may finally select the Type-VI(a) based strategy to identify one or more best beams to communicate with the base station. For another example, if the UE considers the buffer status as the highest priority to determine the appropriate beam search/selection strategy, the UE may simply select the Type-I(a) based beam search/selection strategy in this example. Note that other implementation options are also possible for the terminal to decide the appropriate beam search/selection method based on many candidate solutions derived from a joint evaluation of the deployment scenario, protocol state, terminal's buffer status, channel condition, temperature, energy/power consumptions status and etc.

Some important use cases have been extensively discussed in FIG. 64 through 68 in this disclosure, which include applying the provided methods in various application scenarios/protocol states such as the beamforming based inter-cell measurement, receive beam search/selection/refinement during the initial access, and the receive beam operation/management optimization under the TCI state change/switch. The provided methods can also be applied to other essential deployment scenarios for the 5G terminal such as saving the power/energy and avoiding the device from overheating during the beam search/selection process.

For example, in some embodiments, the UE (e.g., UE 116) is assumed to include 3 wireless communication modules (antenna panels, RF chains, etc.) for forming beams for wireless communication. In this example, each module has 3 wide beams (WBs) and 7 narrow beams (NBs) and only one module may be able to be activated at a given time. The UE manages the modules and beams selected for wireless communication. The high level functions include the UE determining whether the link quality of the serving module drops below a threshold, performing module sweeping to determine whether a new serving module other than the current serving module needs to be activated, and tracking the NBs of the serving module by measuring the NBs formed from the current serving module. The UE performs module monitoring and module sweeping to measure WBs of the current serving module to monitor the current serving module and WBs of other modules to determine whether another module may be better to use. Next, the UE can perform NB tracking to measure and track the NBs to use for wireless communication. In these examples, embodiments of the present disclosure recognize that the time used to perform module monitoring, module sweeping, and NB tracking can lead to latency. Accordingly, various embodiments of the present disclosure provide for fast module monitoring, module sweeping, and NB tracking to reduce and/or manage latency and/or accuracy. Additionally, embodiments for fast module monitoring, module sweeping, and NB tracking can be used in various applications and scenarios including, for example, RX beam refinement based on CSI-RS, beam management (BM) enhancements in multi-TRP scenarios, inter-cell measurement, and beam failure recovery (BFR).

Figure 69:
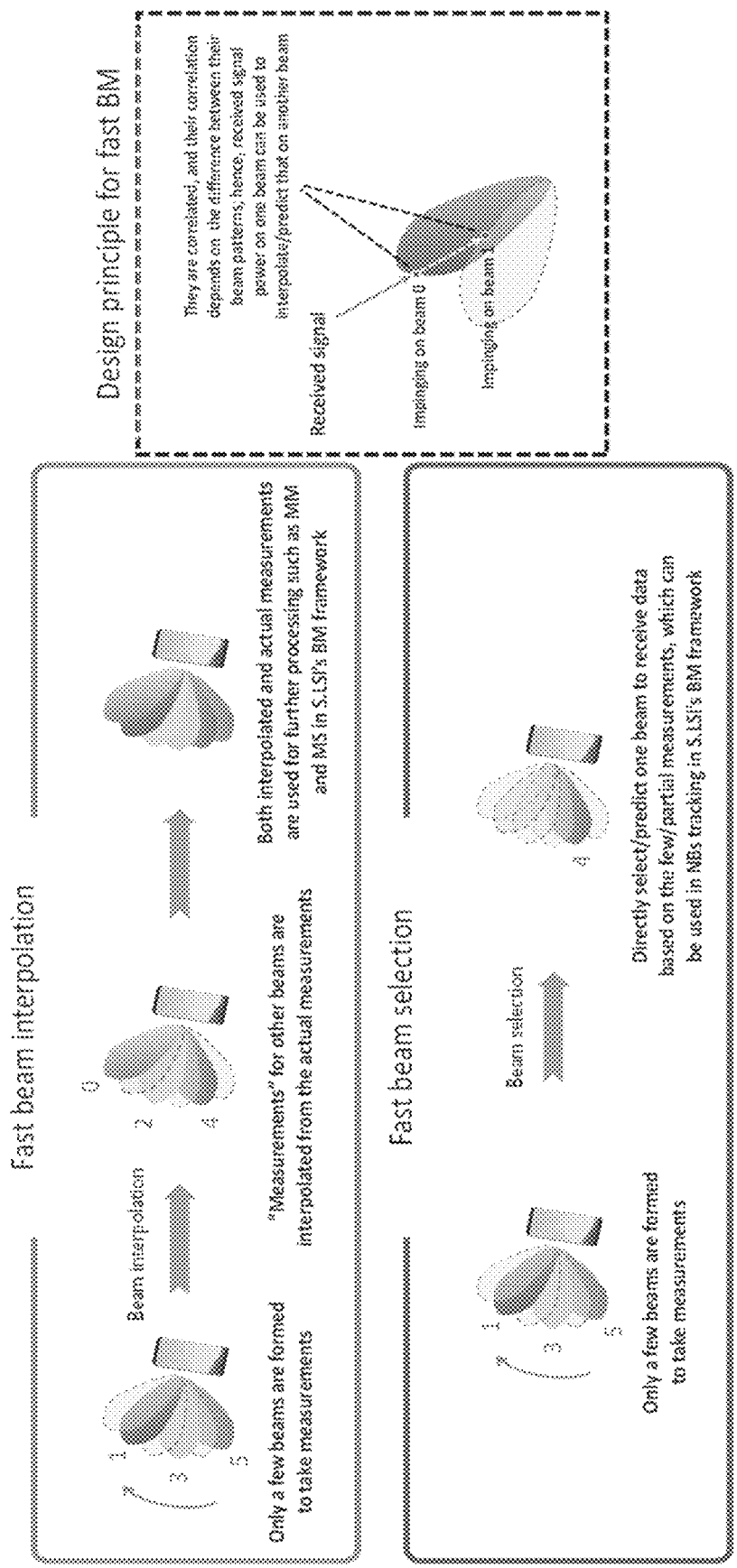
FIG. 69 illustrates an example fast beam interpolation and fast beam selection according to embodiments of the present disclosure.

FIG. 69 illustrates an example fast beam interpolation and fast beam selection 6900 according to embodiments of the present disclosure. An embodiment of the fast beam interpolation and fast beam selection 6900 shown in FIG. 69 is for illustration only. One or more of the components illustrated in FIG. 69 can be implemented in specialized circuitry configured to perform the noted functions or one or more of the components can be implemented by one or more processors executing instructions to perform the noted functions.

As illustrated in FIG. 69, various embodiments of the present disclosure provide for fast beam interpolation and fast beam selection. One design principle for fast BM is that beams are correlated, and their correlation depends on the difference between their beam patterns. Hence, received signal power on one beam can be used to interpolate/predict that on another beam. For fast beam interpolation, only a few beams are formed to take measurements, estimates for what measurements for other beams would be are interpolated from the actual measurements, and both interpolated and actual measurements are used for further processing such as module monitoring and sweeping. For fast beam selection, only a few beams are formed to take measurements; however, here the UE directly selects/predicts beam(s) to receive data based on the few/partial measurements, which can be used in NBs tracking.

Figure 70:
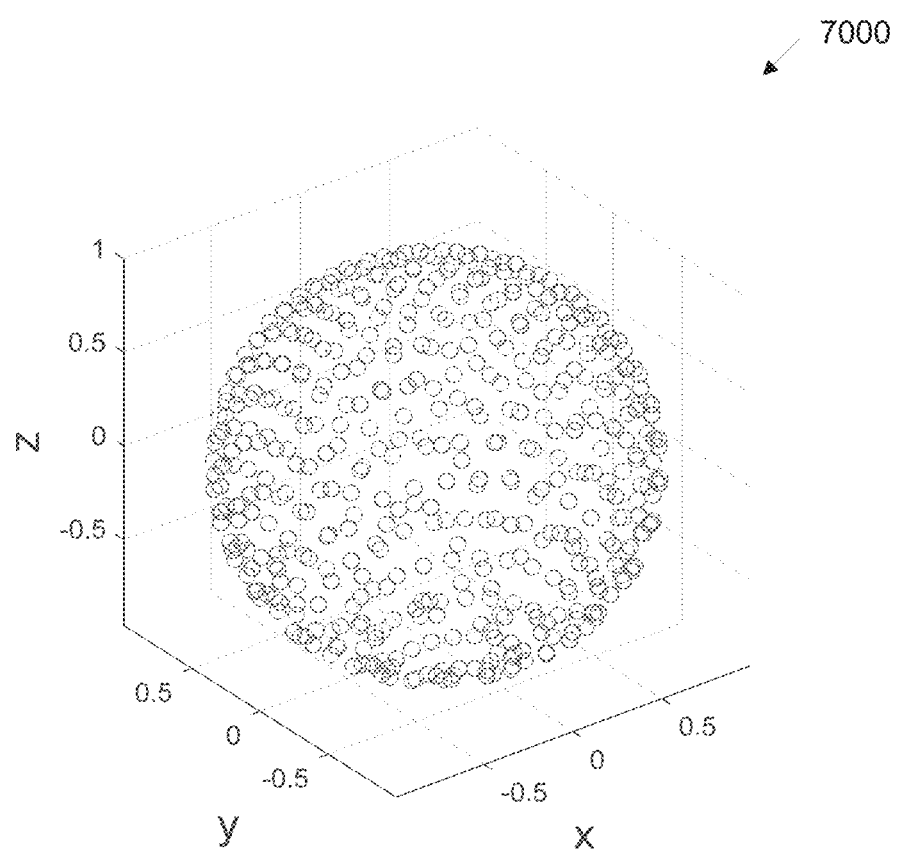
FIG. 70 illustrates an example a uniformly distributed angles on a sphere according to embodiments of the present disclosure.

FIG. 70 illustrates an example uniformly distributed angles on a sphere 7000 according to embodiments of the present disclosure. An embodiment of the uniformly distributed angles on a sphere 7000 shown in FIG. 70 is for illustration only. One or more of the components illustrated in FIG. 70 can be implemented in specialized circuitry configured to perform the noted functions or one or more of the components can be implemented by one or more processors executing instructions to perform the noted functions.

For example, the dots on the sphere illustrate points of beams that are at uniformly distributed angles from a point (such as a UE or antenna module) that may be codified in a codebook. The UE may generate or store measurement information for the beams in the code book. For example, as discussed above, the UE may construct a radiation pattern based look-up table where each row in the look-up table corresponds to an angle on the sphere, which can be interpreted as a potential channel direction and each column in the look-up table represents the radiation powers of a given beam on all the angles over the sphere, as illustrated in Table 9 below. The UE then takes actual measurement for measured beams: x={x[0], x[2], x[4]}; determines their correspondence in the look-up table for the i-th angle/row: $c_i$={$b_i$[0], $b_i$[2], $b_i$[4]}. The UE then solves $$i_{opt} = \underset{i=0,1,\ldots,5808}{\mathrm{argmax}}\ \mathrm{var}(x - c_i)$$

and then determines the interpolated measurement according to: $b_{i_{opt}}$={$b_{i_{opt}}$[0], $b_{i_{opt}}$[1], $b_{i_{opt}}$[2], $b_{i_{opt}}$[3], $b_{i_{opt}}$[4], $b_{i_{opt}}$[5]} which is used for further processing such as module monitoring and module sweeping in the BM framework.

TABLE 9 example radiation pattern based look-up table:

| | Beam #0 | Beam #1 | Beam #2 | Beam #3 | Beam #4 | Beam #5 |
|---|---|---|---|---|---|---|
| $b_0$ | $b_0$[0] | $b_0$[1] | $b_0$[2] | $b_0$[3] | $b_0$[4] | $b_0$[5] |
| $b_1$ | $b_1$[0] | $b_1$[1] | $b_1$[2] | $b_1$[3] | $b_1$[4] | $b_1$[5] |
| $b_2$ | $b_2$[0] | $b_2$[1] | $b_2$[2] | $b_2$[3] | $b_2$[4] | $b_2$[5] |
| $b_3$ | $b_3$[0] | $b_3$[1] | $b_3$[2] | $b_3$[3] | $b_3$[4] | $b_3$[5] |
| $b_4$ | $b_4$[0] | $b_4$[1] | $b_4$[2] | $b_4$[3] | $b_4$[4] | $b_4$[5] |
| . | . | . | . | . | . | . |
| $b_{5808}$ | $b_{5808}$[0] | $b_{5808}$[1] | $b_{5808}$[2] | $b_{5808}$[3] | $b_{5808}$[4] | $b_{5808}$[5] |

In some embodiments for fast beam selection, the UE may perform additional steps of solving $$j_{opt} = \underset{j=0,1,2,3,4,5}{\mathrm{argmax}}\ b_{i_{opt}}[j]$$

and selecting the beam corresponding to $b_{i_{opt}}[j_{opt}]$ in the look-up table as the final receive beam for data communications. In these embodiments, two additional steps to those in the first set of fast BM solutions are implemented. The solution discussed here can be extended to other look-up table based methods such as those based on RSRP offset and real-field historical measurement.

In various embodiments, an RSRP offset is applied to the interpolated measurements. In one example in these embodiments, the UE applies $\hat{b}_i[j]=b_i[j]-\Delta b$ and the RSRP offset $\Delta b$ (e.g., −95 dBm) is configurable and could be determined based on UE's position (e.g., cell-edge or cell-center) and NLOS/LOS conditions. Here, the UE takes actual measurement for measured beams: $x=\{x[0], x[2], x[4]\}$ and determines their correspondence in the LUT. with RSRP offset for the i-th angle/row: $\hat{c}_i=\{\hat{b}_i[0], \hat{b}_i[2], \hat{b}_i[4]\}$. Thereafter, the UE, solving $$i_{opt} = \underset{i=0,1,\ldots,5808}{\mathrm{argmax}}\ \mathrm{var}(x - \hat{c}_i)$$

and according thereto, uses $\hat{b}_{i_{opt}}=\{\hat{b}_{i_{opt}}[0], \hat{b}_{i_{opt}}[1], \hat{b}_{i_{opt}}[2], \hat{b}_{i_{opt}}[3], \hat{b}_{i_{opt}}[4], \hat{b}_{i_{opt}}[5]\}$, to determine the interpolated measurement for further processing such as module monitoring and module sweeping in the BM framework.

TABLE 10 example radiation pattern based look-up table with RSRP offset $\Delta b$:

| | Beam #0 | Beam #1 | Beam #2 | Beam #3 | Beam #4 | Beam #5 |
|---|---|---|---|---|---|---|
| $\hat{b}_0$ | $\hat{b}_0[0]$ | $\hat{b}_0[1]$ | $\hat{b}_0[2]$ | $\hat{b}_0[3]$ | $\hat{b}_0[4]$ | $\hat{b}_0[5]$ |
| $\hat{b}_1$ | $\hat{b}_1[0]$ | $\hat{b}_1[1]$ | $\hat{b}_1[2]$ | $\hat{b}_1[3]$ | $\hat{b}_1[4]$ | $\hat{b}_1[5]$ |
| $\hat{b}_2$ | $\hat{b}_2[0]$ | $\hat{b}_2[1]$ | $\hat{b}_2[2]$ | $\hat{b}_2[3]$ | $\hat{b}_2[4]$ | $\hat{b}_2[5]$ |
| $\hat{b}_3$ | $\hat{b}_3[0]$ | $\hat{b}_3[1]$ | $\hat{b}_3[2]$ | $\hat{b}_3[3]$ | $\hat{b}_3[4]$ | $\hat{b}_3[5]$ |
| $\hat{b}_4$ | $\hat{b}_4[0]$ | $\hat{b}_4[1]$ | $\hat{b}_4[2]$ | $\hat{b}_4[3]$ | $\hat{b}_4[4]$ | $\hat{b}_4[5]$ |
| . | . | . | . | . | . | . |
| $\hat{b}_{5808}$ | $\hat{b}_{5808}[0]$ | $\hat{b}_{5808}[1]$ | $\hat{b}_{5808}[2]$ | $\hat{b}_{5808}[3]$ | $\hat{b}_{5808}[4]$ | $\hat{b}_{5808}[5]$ |

Figure 71:
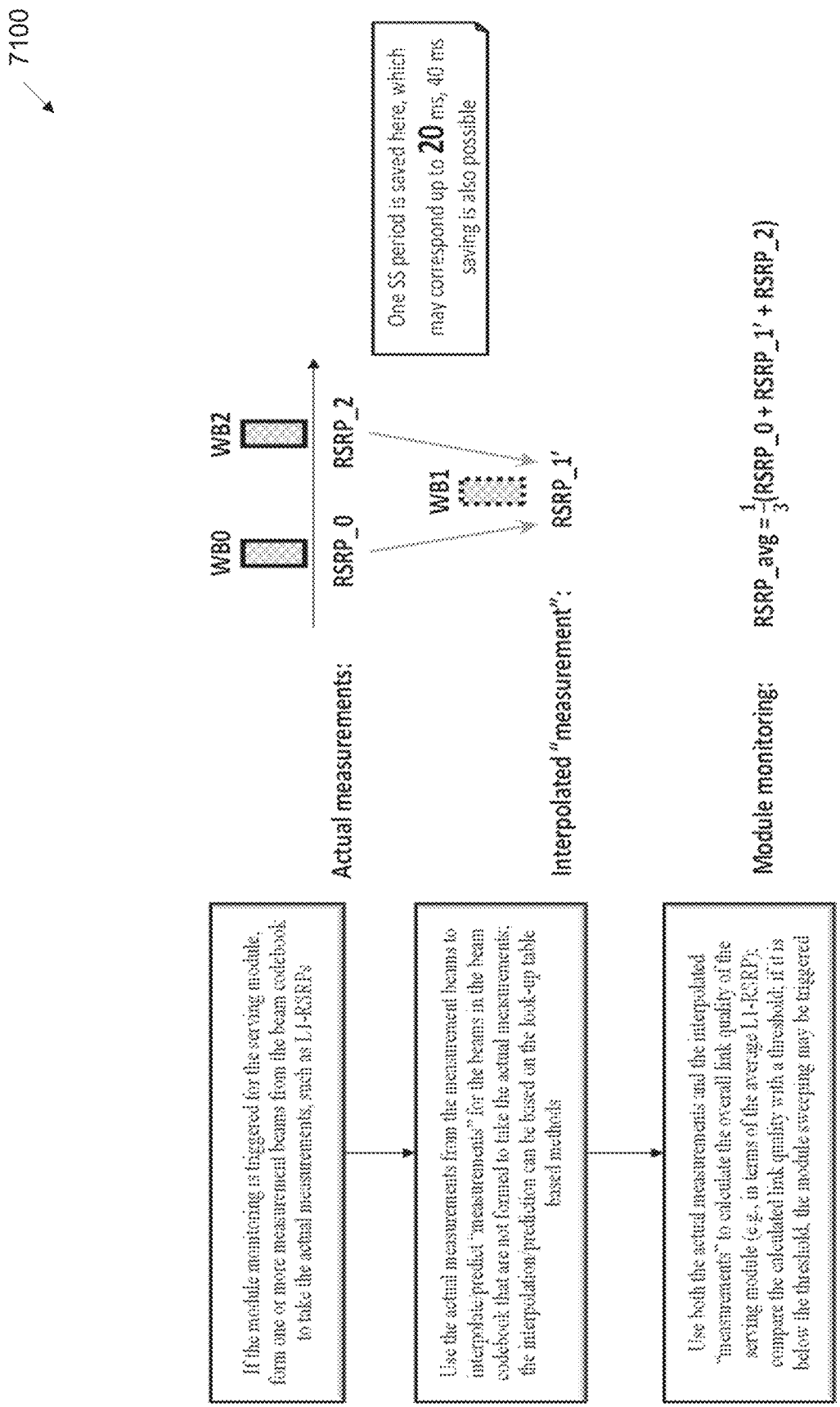
FIG. 71 illustrates a flow chart of method for fast beam interpolation-based module monitoring according to embodiments of the present disclosure.

FIG. 71 illustrates a flow chart of method 7100 for fast beam interpolation-based module monitoring according to embodiments of the present disclosure. An embodiment of the method 7100 shown in FIG. 71 is for illustration only. One or more of the components illustrated in FIG. 71 can be implemented in specialized circuitry configured to perform the noted functions or one or more of the components can be implemented by one or more processors executing instructions to perform the noted functions.

In the method 7100, the UE, if the module is triggered for the serving module, forms one or monitoring measurement beams from the beam codebook to take the actual measurements, such as L1-RSRPs. The UE uses the actual measurements from the measurement beams to interpolate/predict measurements for the beams in the beam codebook that are not formed to take the actual measurements. Here, the interpolation/prediction can be based on the look-up table based methods. The UE then uses both the actual measurements and the interpolated measurements to calculate the overall link quality of the serving module (e.g., in terms of the average L1-RSRP); compare the calculated link quality with a threshold. If below the threshold, the module sweeping may be triggered.

Figure 72:
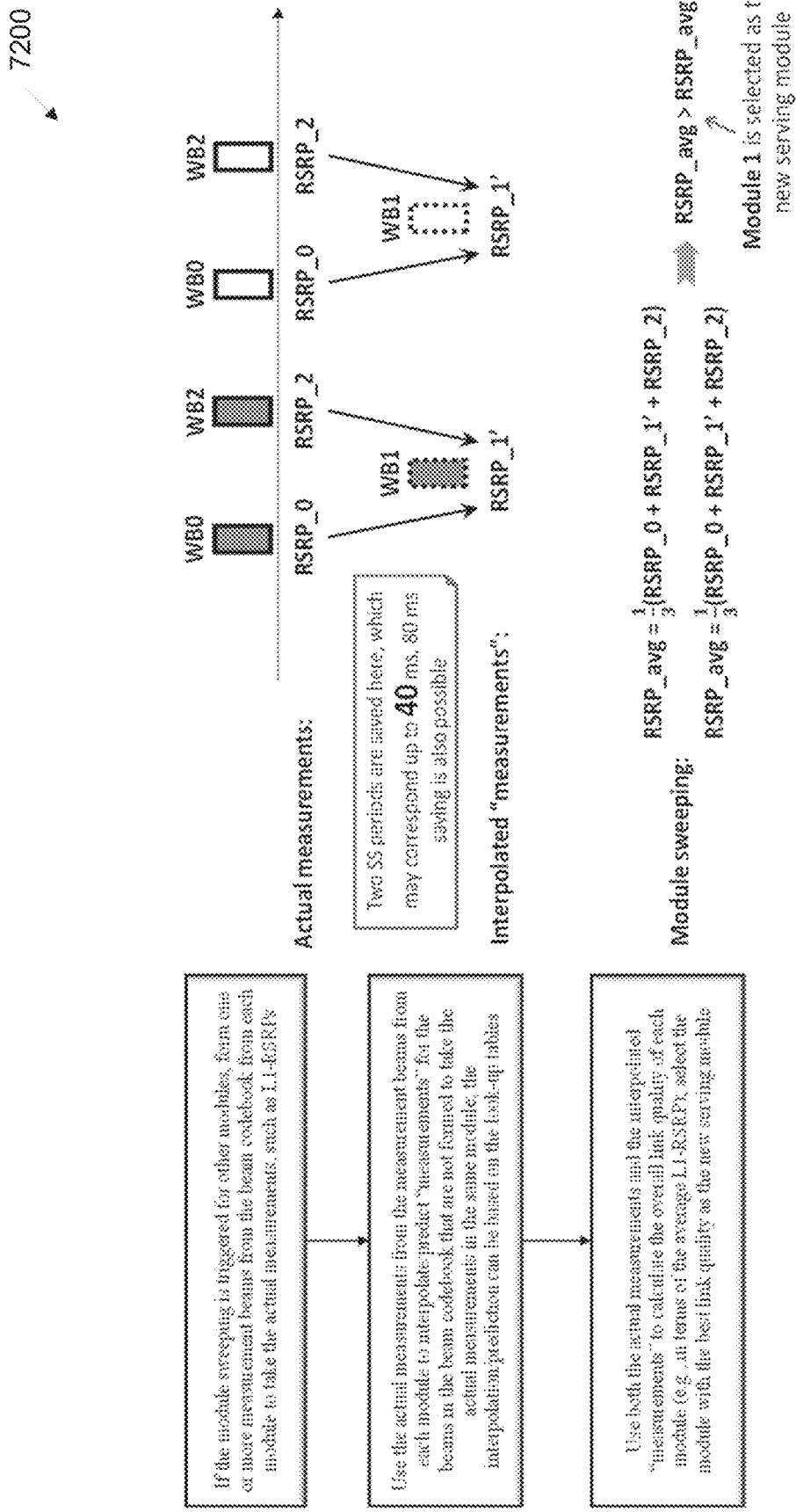
FIG. 72 illustrates a flow chart of a method for fast beam interpolation-based module sweeping according to embodiments of the present disclosure.

FIG. 72 illustrates a flow chart of a method 7200 for fast beam interpolation-based module sweeping according to embodiments of the present disclosure. An embodiment of the method 7200 shown in FIG. 72 is for illustration only. One or more of the components illustrated in FIG. 72 can be implemented in specialized circuitry configured to perform the noted functions or one or more of the components can be implemented by one or more processors executing instructions to perform the noted functions.

In the method 7200, the UE, if the module sweeping is triggered for other modules, forms one or more measurement beams from the beam codebook from each module to take the actual measurements, such as L1-RSRPs. The UE then uses the actual measurements from the measurement beams from each module to interpolate/predict measurements for the beams in the beam codebook that are not formed to take the actual measurements in the same module. The interpolation/prediction can be based on the look-up tables. The UE uses both the actual measurements and the interpolated measurements to calculate the overall link quality of each module (e.g., in terms of the average L1-RSRP). The UE then selects the module with the best link quality as the new serving module.

Figure 73:
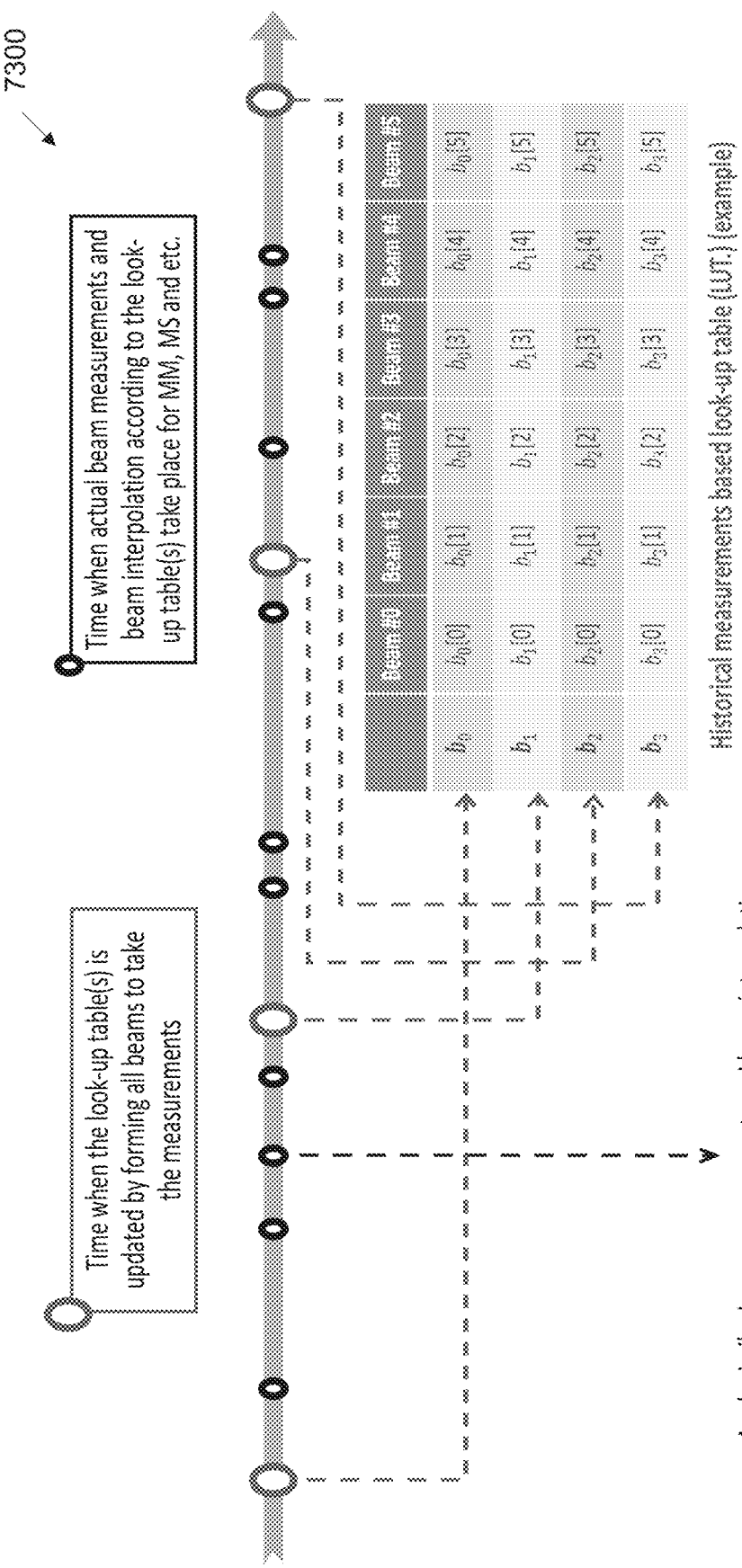
FIG. 73 illustrates an example historical measurement-based look-up table according to embodiments of the present disclosure.

FIG. 73 illustrates an example historical measurement-based look-up table 7300 according to embodiments of the present disclosure. An embodiment of the historical measurement-based look-up table 7300 shown in FIG. 73 is for illustration only. One or more of the components illustrated in FIG. 73 can be implemented in specialized circuitry configured to perform the noted functions or one or more of the components can be implemented by one or more processors executing instructions to perform the noted functions. In this illustrative example, the UE generates and updates the look up table as measurements are performed over time, for example, in at periodic or aperiodic intervals.

Figure 74:
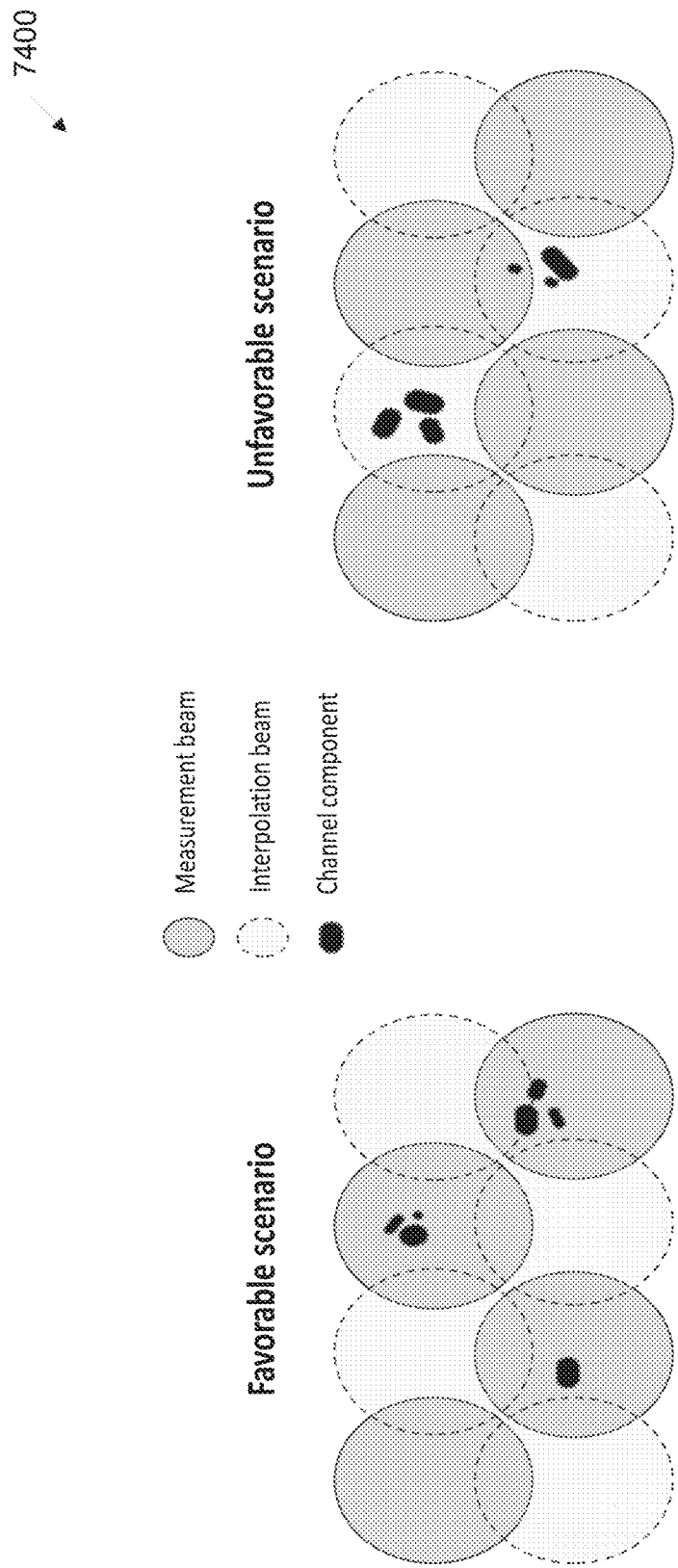
FIG. 74 illustrates an example measurement beam selection according to embodiments of the present disclosure.

FIG. 74 illustrates an example measurement beam selection 7400 according to embodiments of the present disclosure. An embodiment of the measurement beam selection 7400 shown in FIG. 74 is for illustration only. One or more of the components illustrated in FIG. 74 can be implemented in specialized circuitry configured to perform the noted functions or one or more of the components can be implemented by one or more processors executing instructions to perform the noted functions.

In this illustrative example, the darker circles illustrate beam locations where actual beam measurements are performed. In these embodiments, it is desired to have actual measurements performed on channel components, that is reference beams or locations where transmitted signals are likely to be received.

Figure 75A:
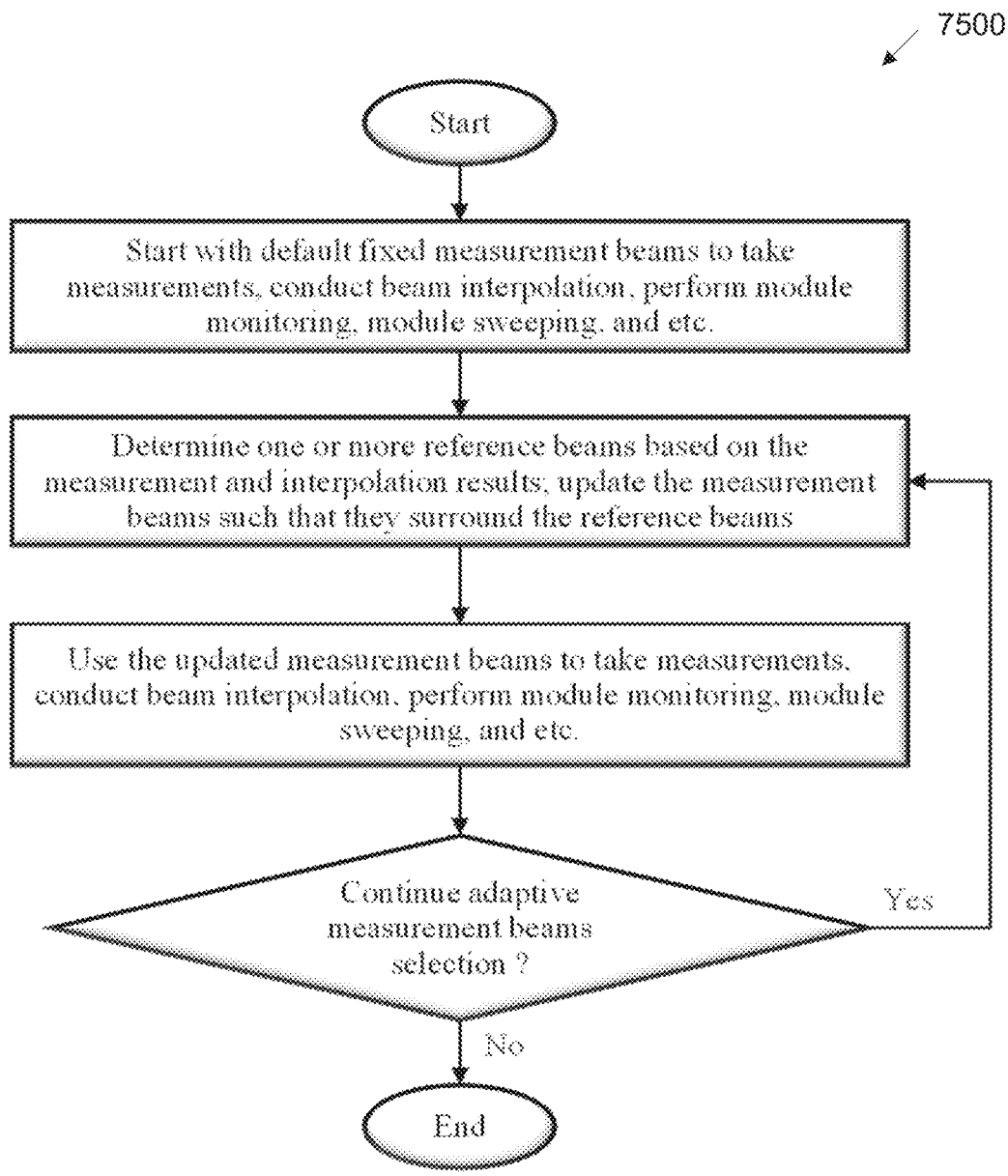
FIG. 75A illustrates a flow chart of a method for adaptive measurement beam selection according to embodiments of the present disclosure.

FIG. 75A illustrates a flow chart of a method 7500 for adaptive measurement beam selection according to embodiments of the present disclosure. An embodiment of the method 7500 shown in FIG. 75A is for illustration only. One or more of the components illustrated in FIG. 75A can be implemented in specialized circuitry configured to perform the noted functions or one or more of the components can be implemented by one or more processors executing instructions to perform the noted functions.

In the method 7500, the UE uses an adaptive mode for selecting beams. The UE starts with default fixed measurement beams to take measurements, conduct beam interpolation, perform module monitoring, module sweeping, and etc. The UE then determines one or more reference beams based on the measurement and interpolation results and updates the measurement beams such that the measurement beams include and surrounds the reference beams as possible. The UE uses the updated measurement beams to take measurements, conduct beam interpolation, perform module monitoring, perform module sweeping, etc. Thereafter, the UE continues to perform adaptive measurement beam selection as needed.

Figure 75B:
FIG. 75B illustrates an example adaptive measurement beam selection according to embodiments of the present disclosure.
Figure 75B:
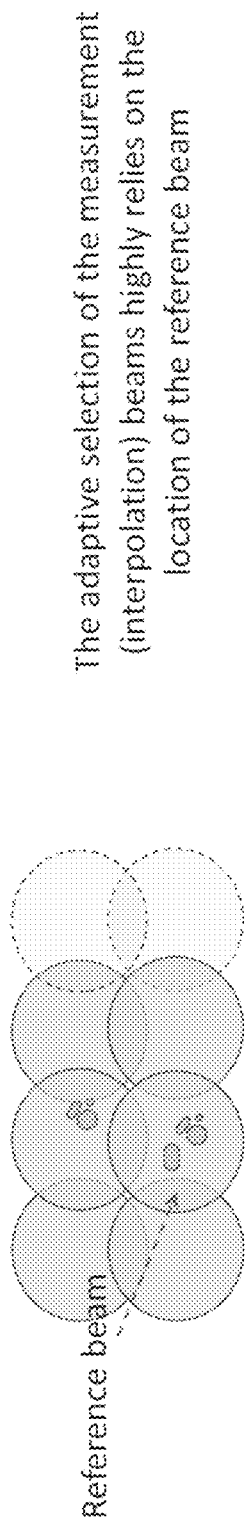
Figure 75B:
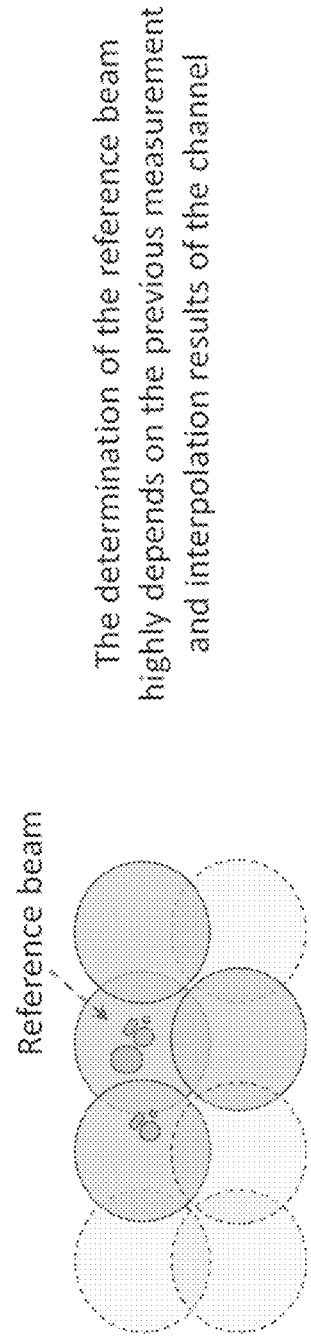

FIG. 75B illustrates an example adaptive measurement beam selection 7550 according to embodiments of the present disclosure. Here, corresponding to FIG. 75A, the adaptively selected measurement beams are selected to surround the reference beams and/or are based on interpolation results of a previous channel measurement. An embodiment of the adaptive measurement beam selection 7550 shown in FIG. 75B is for illustration only. One or more of the components illustrated in FIG. 75B can be implemented in specialized circuitry configured to perform the noted functions or one or more of the components can be implemented by one or more processors executing instructions to perform the noted functions.

Figure 76:
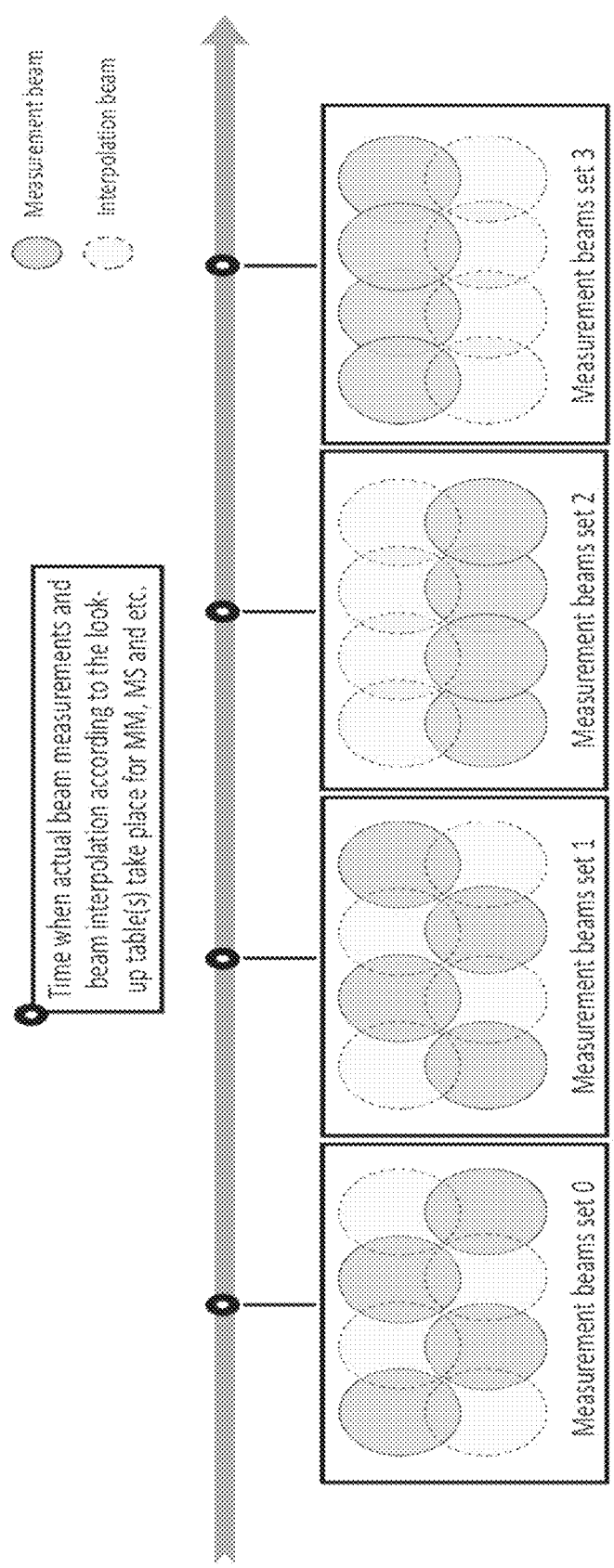
FIG. 76 illustrates an example cycling of predefined sets of measurement beams selection according to embodiments of the present disclosure.

FIG. 76 illustrates an example cycling of predefined sets of measurement beams selection 7600 according to embodiments of the present disclosure. An embodiment of the cycling of predefined sets of measurement beams selection 7600 shown in FIG. 76 is for illustration only. One or more of the components illustrated in FIG. 76 can be implemented in specialized circuitry configured to perform the noted functions or one or more of the components can be implemented by one or more processors executing instructions to perform the noted functions.

In this illustrative example, the UE uses a cycling method to select the beams for measurement. Here, the beams include predetermined sets of measurement beams: {set 0, set 1, set 2, set 3, . . . }. In this embodiment, different sets of measurement beams are used in a cyclic manner, e.g., set 0→set 1→set 2→set 3→set 0→set 1, etc. This cycling method approach does not rely on the previous measurement and interpolation results and may allows for all and potentially missed beams to be measured at some point.

Figure 77:
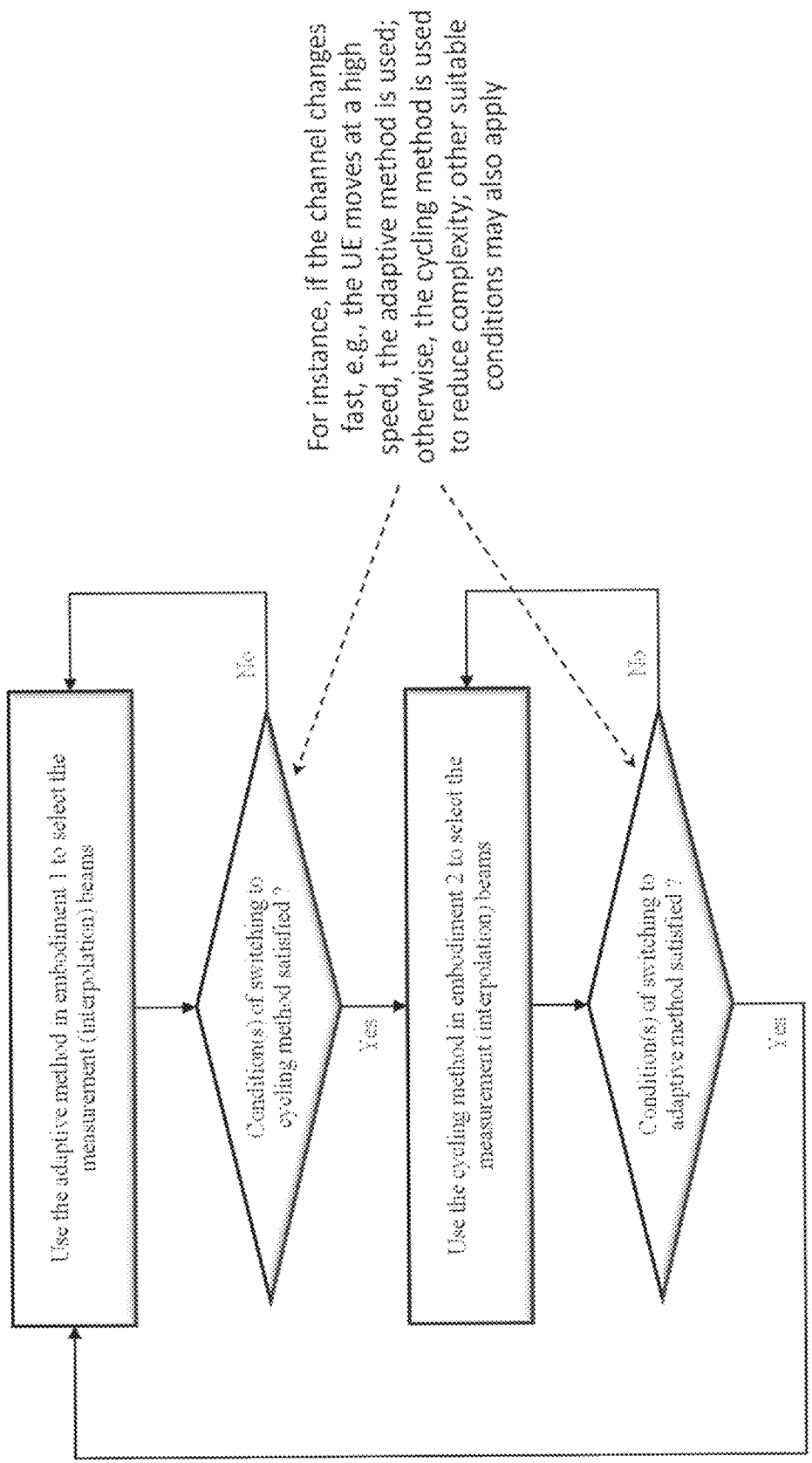
FIG. 77 illustrates a flow chart of a method for switching between adaptive and cycling measurement beams selections according to embodiments of the present disclosure.

FIG. 77 illustrates a flow chart of a method 7700 for switching between adaptive and cycling measurement beams selections according to embodiments of the present disclosure. An embodiment of the method 7700 shown in FIG. 77 is for illustration only. One or more of the components illustrated in FIG. 77 can be implemented in specialized circuitry configured to perform the noted functions or one or more of the components can be implemented by one or more processors executing instructions to perform the noted functions.

In the method 7700, the UE may start with using the adaptive method discussed above to select the measurement (or the interpolation) beams. If condition(s) of switching to the cycling method are satisfied, the UE uses the cycling method discussed above to select the measurement (or interpolation) beams. If condition(s) of switching to the adaptive method are satisfied, the UE switches to the adaptive method to select the beams. For example, the switching conditions may include that if the channel changes quickly, e.g., the UE moves at a high speed, the adaptive method is used; otherwise, the cycling method is used to reduce complexity. Other suitable conditions may also apply.

Figure 78:
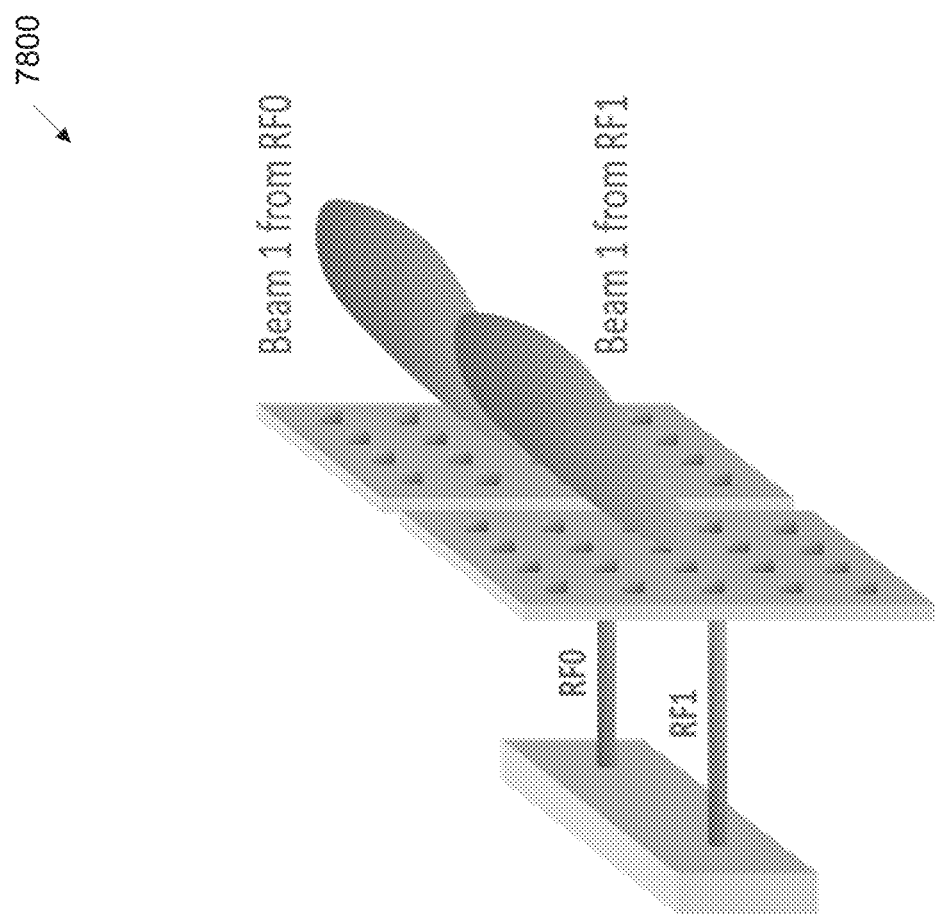
FIG. 78 illustrates an example digital sampling assisted super-resolution channel angle acquisition according to embodiments of the present disclosure.
Figure 78:
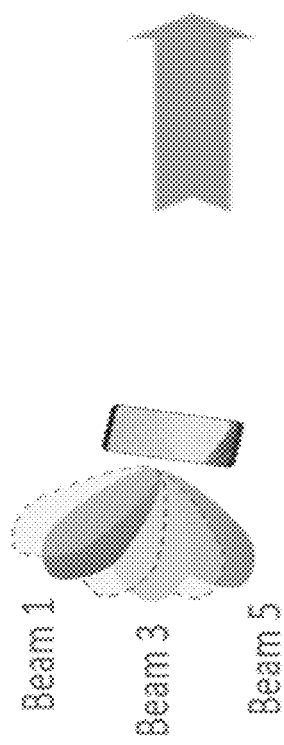

FIG. 78 illustrates an example digital sampling assisted super-resolution channel angle acquisition 7800 according to embodiments of the present disclosure. An embodiment of the digital sampling assisted super-resolution channel angle acquisition 7800 shown in FIG. 78 is for illustration only. One or more of the components illustrated in FIG. 78 can be implemented in specialized circuitry configured to perform the noted functions or one or more of the components can be implemented by one or more processors executing instructions to perform the noted functions.

In this illustrative example, a single beam (e.g., beam 1) is formed at a given time to take measurement. However, in practice, if multiple RF chains are equipped at the UE, multiple beam is can be simultaneously formed to take measurement and the same principle is applied to selected beam 3 and beam 5. Here, two identical (e.g., same precoding/steering) beams are simultaneously formed by RF0 and RF1. This solution exploits such a special beamforming structure to provide super-resolution channel angle acquisition.

Figure 79:
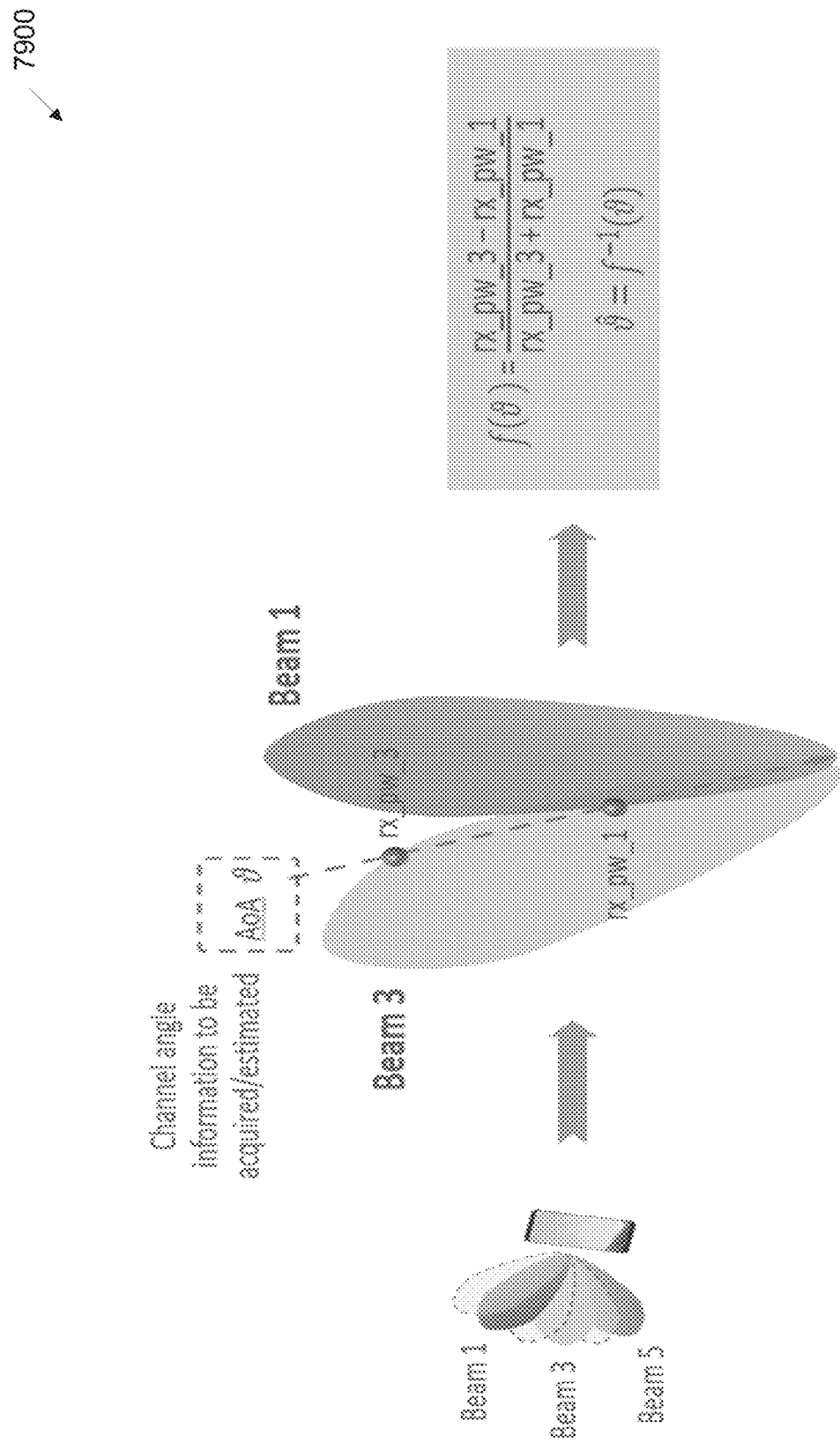
FIG. 79 illustrates an example receive power ratio based super-resolution channel angle acquisition according to embodiments of the present disclosure.

FIG. 79 illustrates an example receive power ratio based super-resolution channel angle acquisition 7900 according to embodiments of the present disclosure. An embodiment of the receive power ratio based super-resolution channel angle acquisition 7900 shown in FIG. 79 is for illustration only. One or more of the components illustrated in FIG. 79 can be implemented in specialized circuitry configured to perform the noted functions or one or more of the components can be implemented by one or more processors executing instructions to perform the noted functions.

In this illustrative example, the UE uses a receive power ratio to obtain a super-resolution channel angle acquisition. Here, the UE identifies a receive power exceeding a threshold for two beams and uses the receive power inherent correlations between beam patterns of beam 1 and beam 3 are to estimate a channel angle acquisition and determines to use a beam corresponding to the estimated channel angle acquisition.

Figure 80:
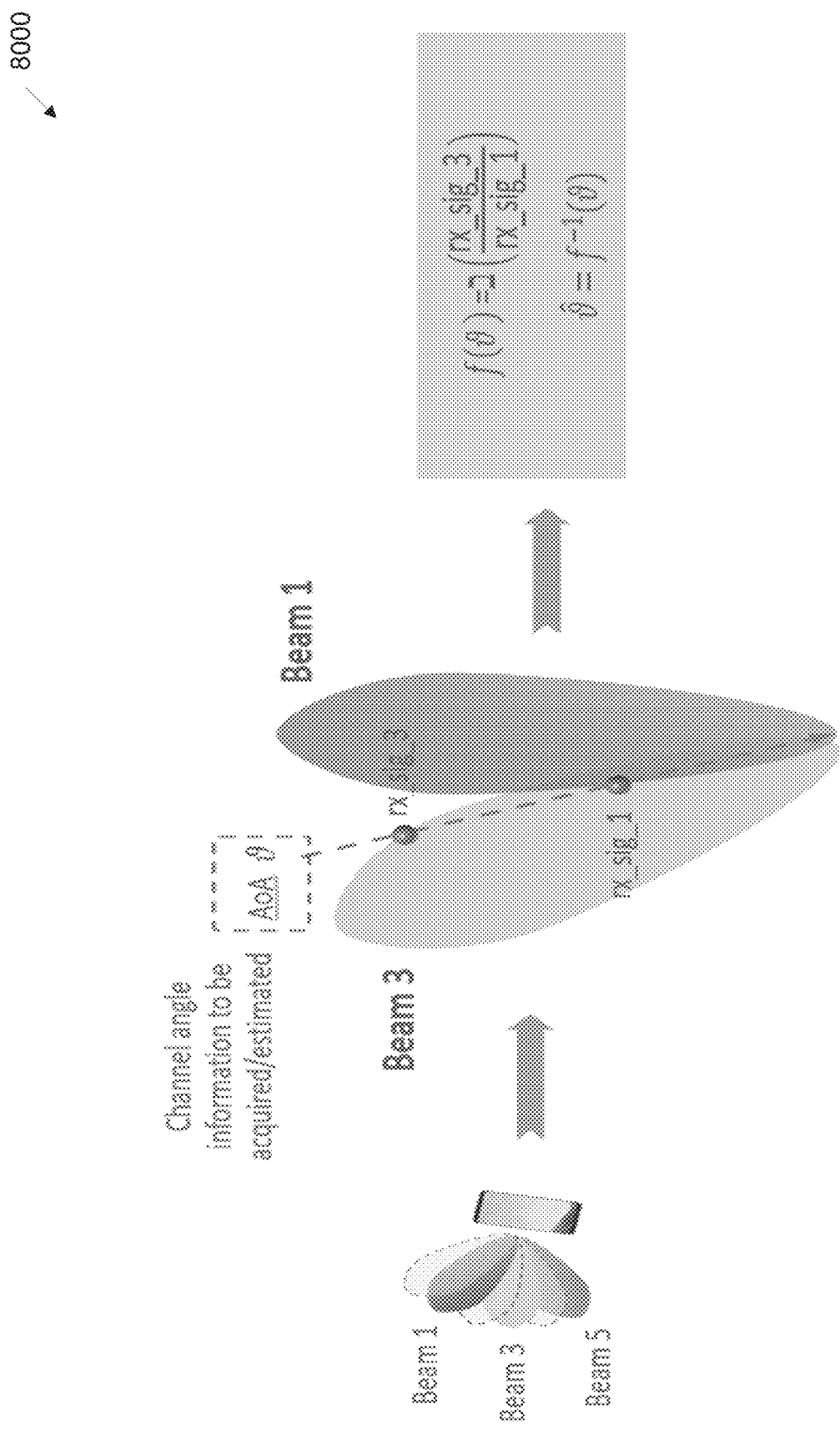
FIG. 80 illustrates another example receive power ratio based super-resolution channel angle acquisition according to embodiments of the present disclosure.

FIG. 80 illustrates another example receive power ratio based super-resolution channel angle acquisition 8000 according to embodiments of the present disclosure. An embodiment of the receive power ratio based super-resolution channel angle acquisition 8000 shown in FIG. 80 is for illustration only. One or more of the components illustrated in FIG. 80 can be implemented in specialized circuitry configured to perform the noted functions or one or more of the components can be implemented by one or more processors executing instructions to perform the noted functions.

In this illustrative example, the UE uses a receive signal ratio to obtain a super-resolution channel angle acquisition. Here, the UE identifies a signal power exceeding a threshold for two beams and uses the signal power inherent correlations between beam patterns of beam 1 and beam 3 are to estimate a channel angle acquisition and determines to use a beam corresponding to the estimated channel angle acquisition.

Figure 81:
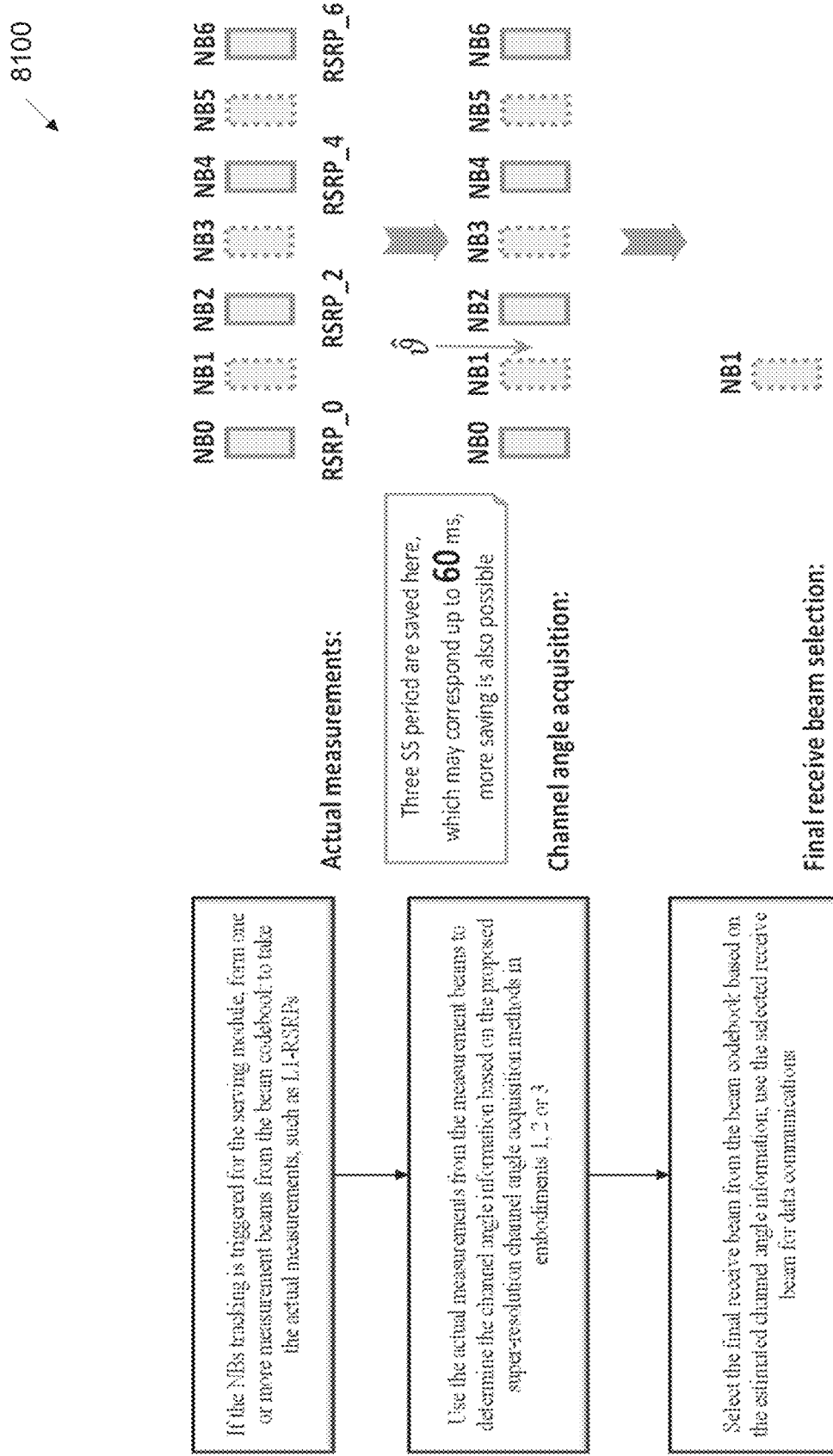
FIG. 81 illustrates an example fast beam selection-based NBs tracking according to embodiments of the present disclosure.

FIG. 81 illustrates an example fast beam selection-based NBs tracking method 8100 according to embodiments of the present disclosure. An embodiment of the fast beam selection-based NBs tracking 8100 shown in FIG. 81 is for illustration only. One or more of the components illustrated in FIG. 81 can be implemented in specialized circuitry configured to perform the noted functions or one or more of the components can be implemented by one or more processors executing instructions to perform the noted functions.

As illustrated in method 8100, the UE, if the NBs tracking is triggered for the serving module, forms one or more measurement beams from the beam codebook to take the actual measurements, such as L1-RSRPs. The UE uses the actual measurements from the measurement beams to determine the channel angle information based on the proposed super-resolution channel angle acquisition methods in embodiments 1, 2 or 3. Thereafter, the UE selects the final receive beam from the beam codebook based on the estimated channel angle information; use the selected receive beam for data communications.

Figure 82:
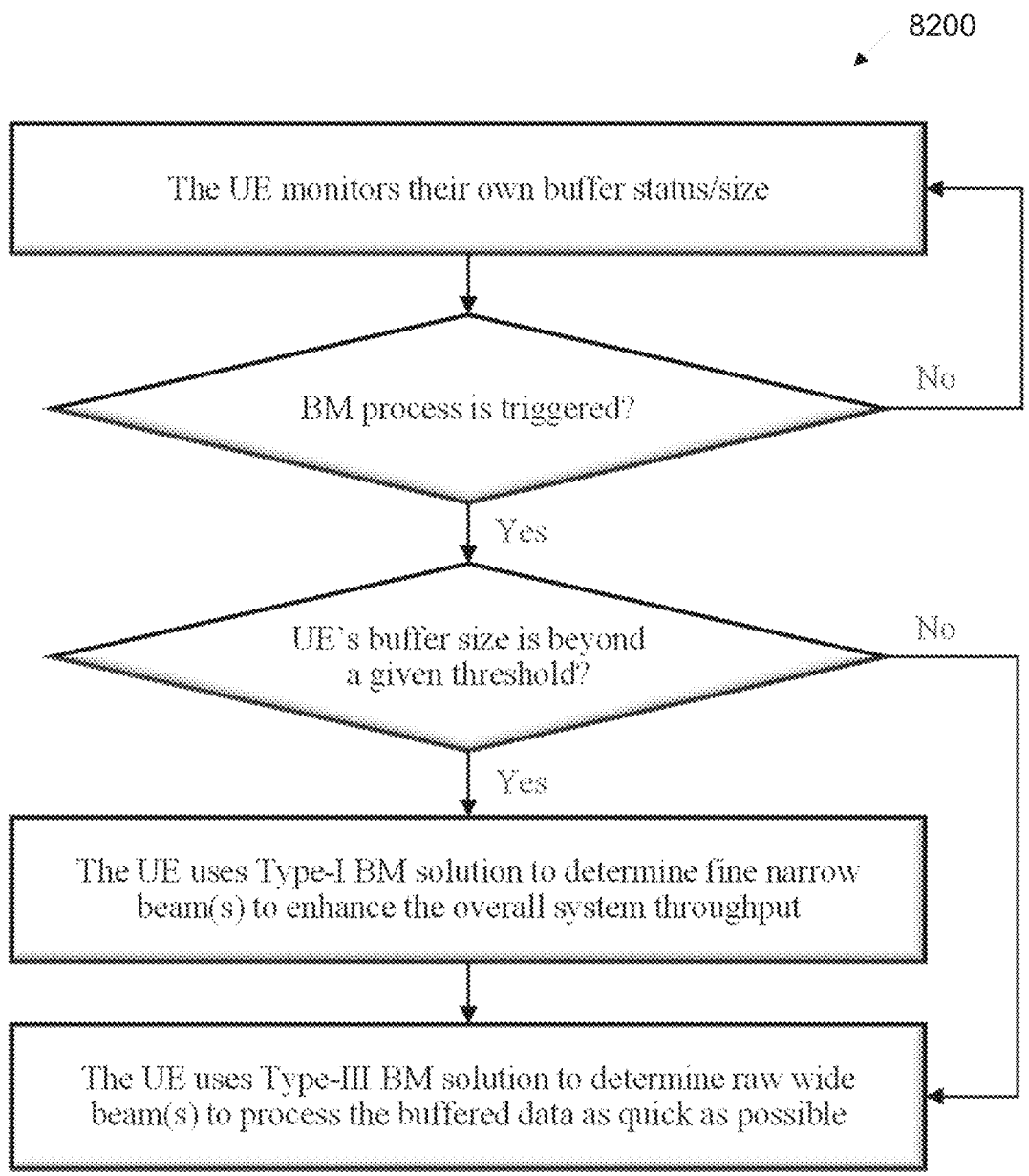
FIG. 82 illustrates a flow chart of a method for UE's buffer status-based BM enhancement according to embodiments of the present disclosure.

FIG. 82 illustrates a flow chart of a method 8200 for UE's buffer status-based BM enhancement according to embodiments of the present disclosure. An embodiment of the method 8200 shown in FIG. 82 is for illustration only. One or more of the components illustrated in FIG. 82 can be implemented in specialized circuitry configured to perform the noted functions or one or more of the components can be implemented by one or more processors executing instructions to perform the noted functions.

In this illustrative example, the UE The UE monitors its buffer status/size. If a BM process is triggered, the UE determines whether the UE's buffer size is beyond a threshold. If so, the UE uses Type-I BM solution to determine fine narrow beam(s) to enhance the overall system throughput. In this example, a Type-I BM solution includes a sweep of the NBs, which may provide high accuracy at the cost of high latency. If the UE's buffer size is not beyond a threshold, the UE uses Type-III BM solution to determine raw wide beam(s) to process the buffered data in a more time effective manner. In this example, a Type-III BM solution includes a sweep of the WBs, which may provide lower accuracy with the benefit of lower latency.

Figure 83:
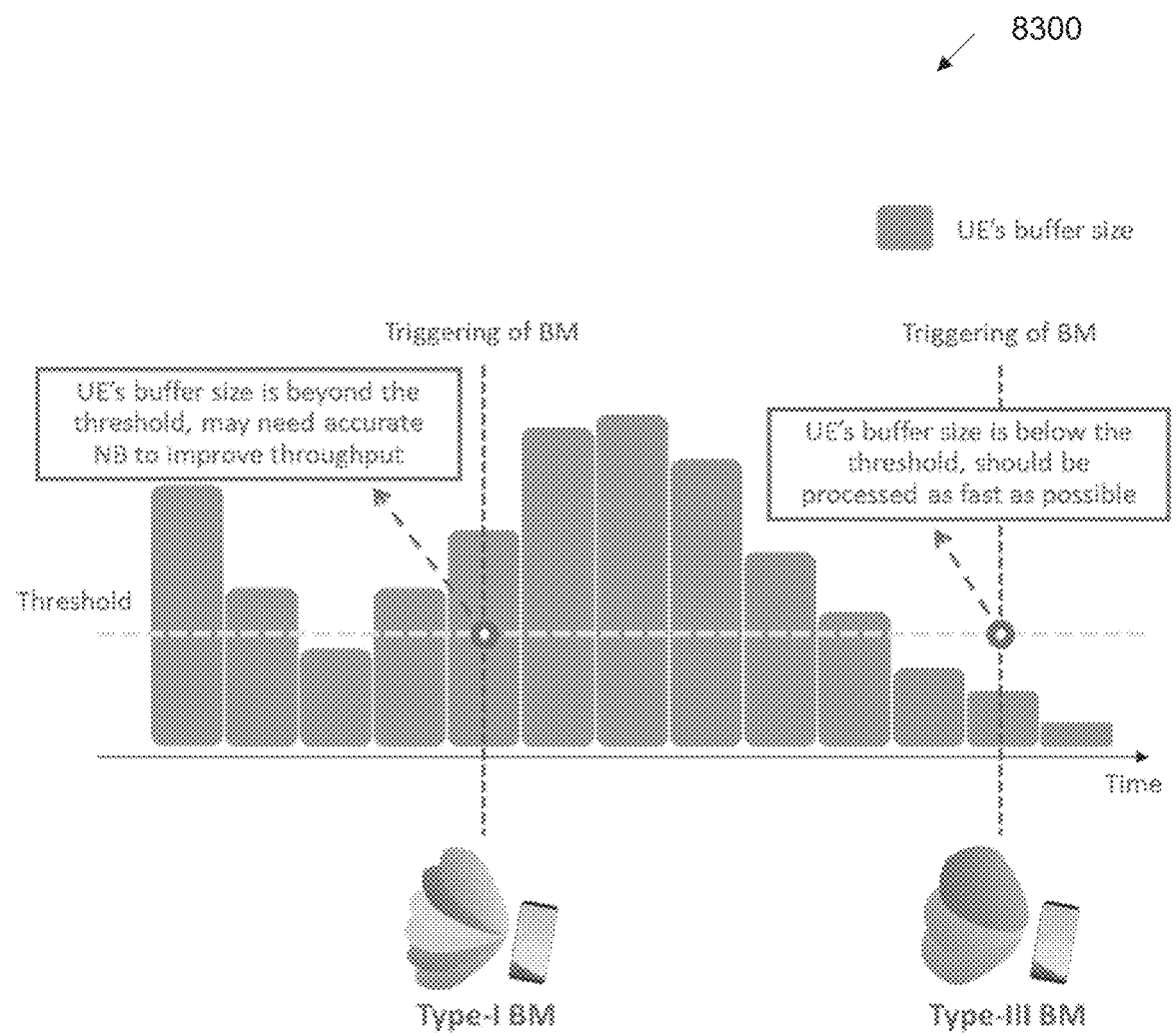
FIG. 83 illustrates an example UE's buffer status-based BM enhancement according to embodiments of the present disclosure.

FIG. 83 illustrates an example UE's buffer status-based BM enhancement 8300 according to embodiments of the present disclosure. An embodiment of the UE's buffer status-based BM enhancement 8300 shown in FIG. 83 is for illustration only. One or more of the components illustrated in FIG. 83 can be implemented in specialized circuitry configured to perform the noted functions or one or more of the components can be implemented by one or more processors executing instructions to perform the noted functions. As illustrated, the UE determines the BM solution to apply as a function of buffer status/size.

Figure 84A:
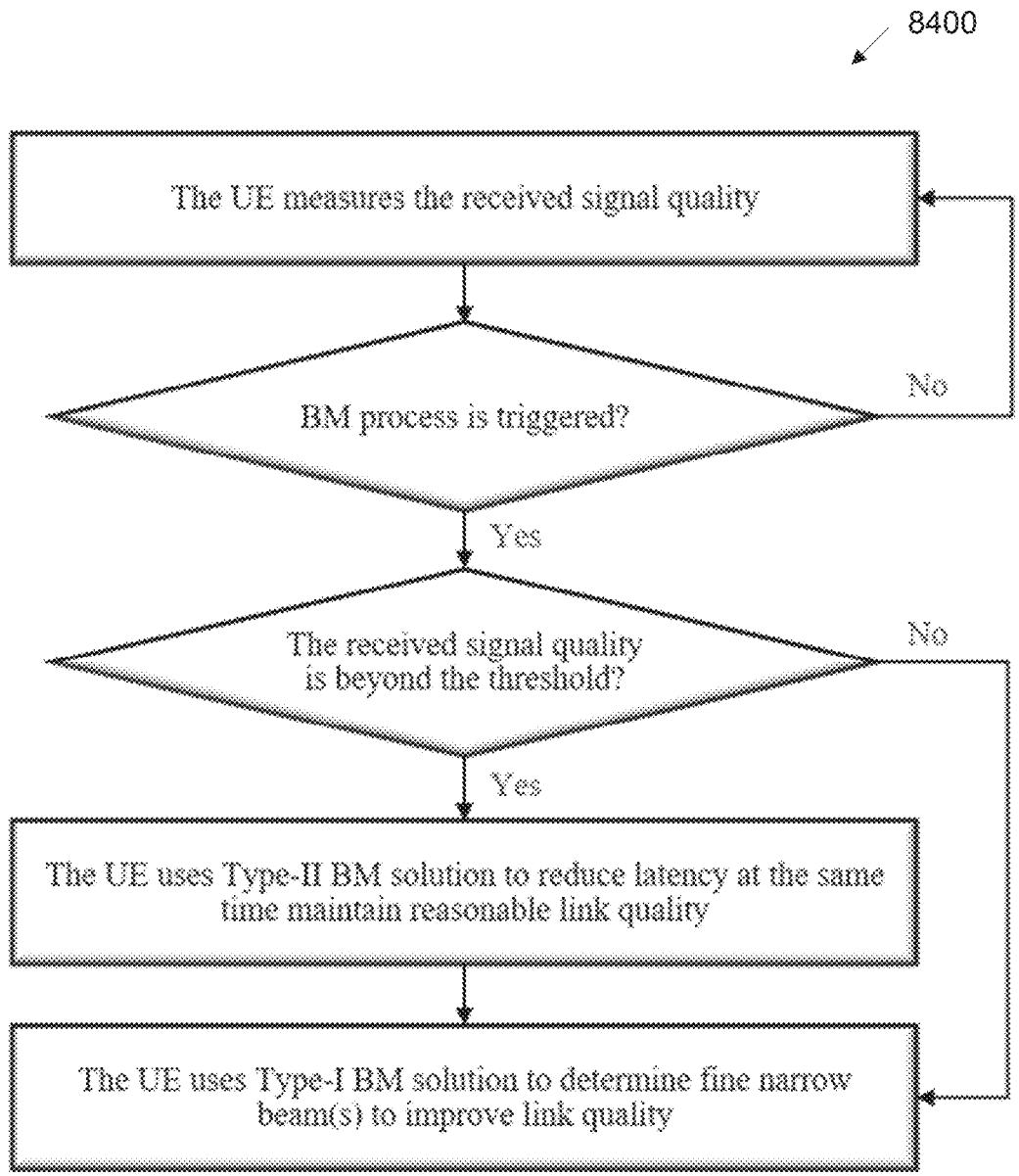
FIG. 84A illustrates a flow chart of a method for received signal quality-based BM enhancement according to embodiments of the present disclosure.

FIG. 84A illustrates a flow chart of a method 8400 for received signal quality-based BM enhancement according to embodiments of the present disclosure. An embodiment of the method 8400 shown in FIG. 84A is for illustration only. One or more of the components illustrated in FIG. 84A can be implemented in specialized circuitry configured to perform the noted functions or one or more of the components can be implemented by one or more processors executing instructions to perform the noted functions.

In this illustrative example, the UE measures the received signal quality. If a BM process is triggered, the UE determines whether the received signal quality is beyond a threshold. If so, the UE uses Type-II BM solution to reduce latency and at the same time maintain a reasonable link quality. Here, the Type-II BM solution is the fast beam interpolation/selection methods discussed herein. As compared with Type-I and Type-II solutions, the Type-II BM solution provides medium accuracy and medium latency. If the received signal quality is not beyond the threshold, the UE uses Type-I BM solution to determine fine narrow beam(s) to improve link quality.

Figure 84B:
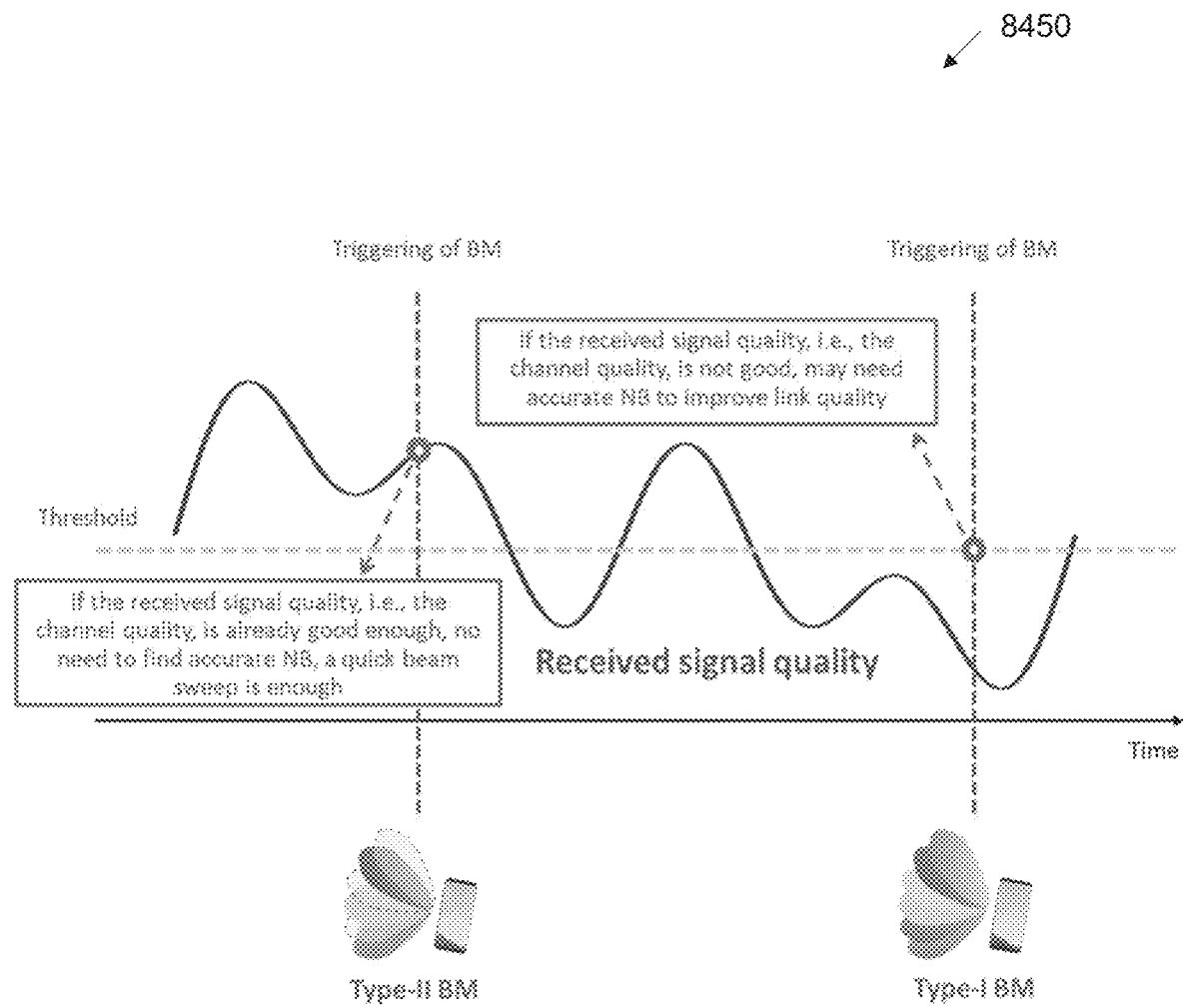
FIG. 84B illustrates an example received signal quality-based BM enhancement according to embodiments of the present disclosure.

FIG. 84B illustrates an example received signal quality-based BM enhancement 8450 according to embodiments of the present disclosure. An embodiment of the received signal quality-based BM enhancement 8450 shown in FIG. 84B is for illustration only. One or more of the components illustrated in FIG. 84B can be implemented in specialized circuitry configured to perform the noted functions or one or more of the components can be implemented by one or more processors executing instructions to perform the noted functions. As illustrated, the UE determines the BM solution to apply as a function of signal quality.

Figure 85A:
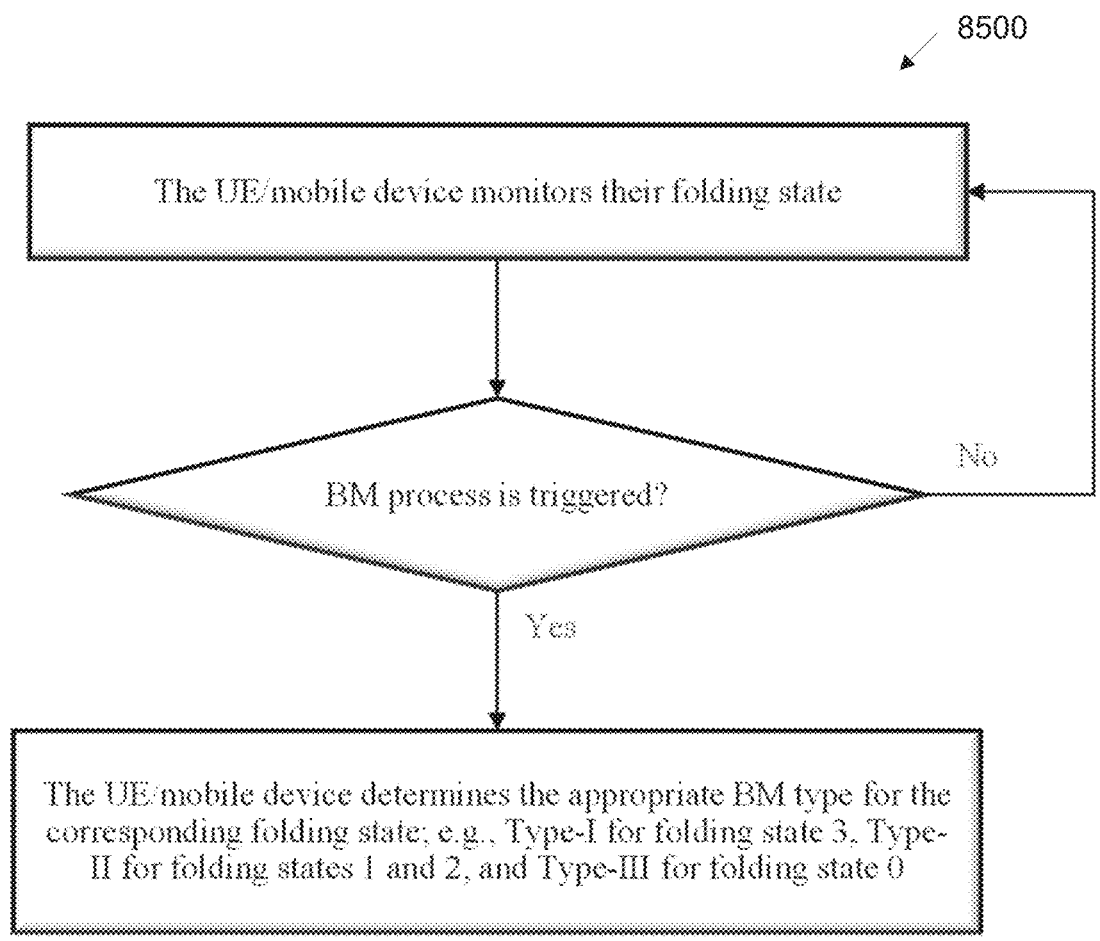
FIG. 85A illustrates a flow chart of a method for BM enhancements for foldable phone according to embodiments of the present disclosure.

FIG. 85A illustrates a flow chart of a method 8500 for BM enhancements for foldable phone according to embodiments of the present disclosure. An embodiment of the method 8500 shown in FIG. 85A is for illustration only. One or more of the components illustrated in FIG. 85A can be implemented in specialized circuitry configured to perform the noted functions or one or more of the components can be implemented by one or more processors executing instructions to perform the noted functions.

In this illustrative example, the UE monitors the folding state of the UE. If a BM process is triggered, the UE/mobile device determines the appropriate BM type for the corresponding folding state. For example, Type-I for folding state 3, Type-II for folding states 1 and 2, and Type-III for folding state 0

Figure 85B:
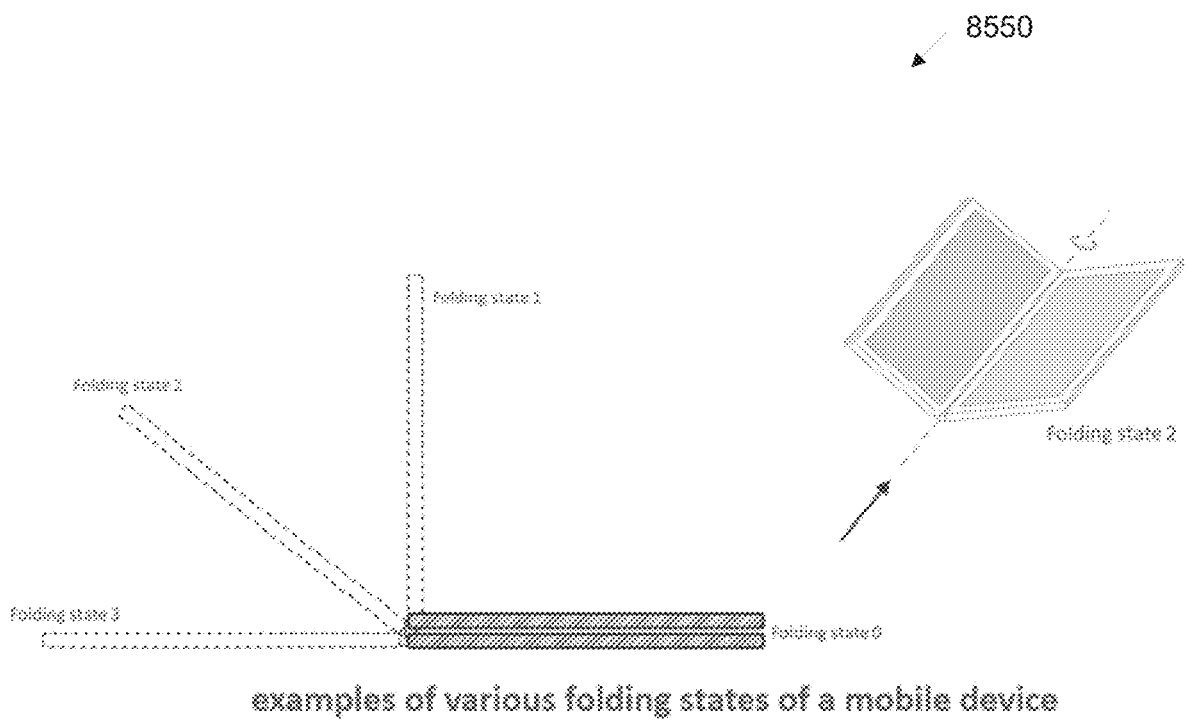
FIG. 85B illustrates an example BM enhancement for foldable phone according to embodiments of the present disclosure.

FIG. 85B illustrates an example BM enhancement for foldable phone 8550 according to embodiments of the present disclosure. An embodiment of the BM enhancement for foldable phone 8550 shown in FIG. 85B is for illustration only. One or more of the components illustrated in FIG. 85B can be implemented in specialized circuitry configured to perform the noted functions or one or more of the components can be implemented by one or more processors executing instructions to perform the noted functions. As illustrated, the UE determines the BM solution to apply as a function of a device state of the UE.

FIG. 86 illustrates a flow chart of a method 8600 for a beam selection according to embodiments of the present disclosure, as may be performed by a UE (e.g., 111-116 as illustrated in FIG. 1). An embodiment of the method 8600 shown in FIG. 86 is for illustration only. One or more of the components illustrated in FIG. 86 can be implemented in specialized circuitry configured to perform the noted functions or one or more of the components can be implemented by one or more processors executing instructions to perform the noted functions.

The method 8600 begins with the UE determining a selection method to select a beam subset for measurement based on channel condition step 8605. For example, in step 8605 the UE selects a subset (i.e., fewer) than the total number of possible beams total number of beams in the codebook. The selection method is determined based on any type of channel conditions that could affect the desired or best beams available to the UE. For example, without limitation, the channel condition may include change in the channel due to a threshold amount of movement or rotation of the UE (e.g., as determined through sensors in the sensor module 476), a threshold amount time between beam measurements, or other factors that could cause the channel relative to the UE to change.

For a first channel condition, the UE uses the adaptive selection method to select the subset of beams for the beam measurement step 8610. For example, in step 8610, the first channel condition may be the change or activity of any of the channel conditions discussed above exceeding predefined thresholds. As illustrated and discussed, for example, in and with regard to FIGS. 74-75B above, for the adaptive selection method, the UE determines a location of a reference beam in a beam codebook based on a prior beam measurement, a channel angle estimation, or prior beam selection results. The UE then selects the subset of beams for the beam measurement based on the location of the reference beam to include at least the reference beam in the selected subset of beams. For example, the UE may select beams from the beam codebook that correspond to the location of the prior determined reference beam(s) and beams adjacent thereto.

For a second channel condition, the UE uses the cycling selection method to select the subset of beams for the beam measurement step 8615. For example, in step 8615, the first channel condition may be the change or activity of any of the channel conditions discussed above not predefined thresholds or a lapse of an amount of time since a last beam measurement. As illustrated and discussed, for example, in and with regard to FIG. 76-77 above, for the cycling selection method, the UE identifies predetermined subsets of the plurality of beams from the codebook and selects a first of the predetermined subsets as the subset of beams for the beam measurement. Then for sequential or next beam measurement, the UE cycles through next predetermined subsets of the plurality of beams in a predetermined or random order.

Thereafter, the UE performs the beam measurement on the selected subset of beams step 8620. For example, in step 8620, the UE generates receive beams for the selected subset of beams and measures channel information (e.g., RSRP, RSRQ, SNR, SINR, etc.) of the selected beams.

The UE then generates beam measurement information based on the beam measurement step 8625. For example, in step 8625, the UE may determine the beam measurement information for both measured beams and non-measured beams using interpolation or correlations between radiation patterns. For interpolation, the UE may determine interpolated beam measurement information for other beams in the plurality of beams not in the subset of beams measured in the beam measurement based on actual beam measurement information from the beam measurement performed on the subset of beams, and values in a table corresponding to the plurality of beams as illustrated and discussed, for example, in and with regard to FIGS. 70-72. Here, the generated beam measurement information includes the actual beam measurement information for the subset of beams and the interpolated beam measurement information for the other beams. The table is generated based on beam radiation parameters measured in a plurality of possible beam directions. In various embodiments, these values in the table are generated based on historical beam measurements. Additionally, illustrated and discussed, for example, in and with regard to FIG. 73, the UE updates the values in the table over time based on updated beam measurements.

In one embodiment where the UE utilizes correlations between radiation patterns, the UE can identify two of the subset of beams measured in the beam measurement with beam measurement values exceeding a threshold and estimate an angle of arrival of a receive beam between the two beams based on the beam measurement information for the two beams and beam properties of the two beams. The UE can then determine the one or more beams to use for the wireless communication comprises selecting a beam in the plurality of beams, that corresponds to the estimated angle of arrival, to use in the one or more beams for the wireless communication as illustrated and discussed, for example, in and with regard to FIGS. 79-80.

Thereafter, the UE determines one or more of the beams to use based on the beam measurement information step 8630. For example, in step 8630, the UE uses the beams for a wireless communication, such as a transmission to another device or a reception from another device, such as a base station. In some examples, the UE determines to use beam(s) that were not in the subset of beams measured in the beam measurement based on the measurement information generated on the subset of beams and correlations between radiation patterns of the subset of beams and the determined beam(s) or measurement interpolations as discussed above.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) for selecting beams in a wireless communication system, the UE comprising:
 a transceiver; and
 a processor operably connected to the transceiver, the processor configured to:
  determine, based on a channel condition, whether to use an adaptive selection operation or a cycling selection operation to select a subset of beams from a plurality of beams for a beam measurement;
  based on the channel condition being a first channel condition, use the adaptive selection operation to select, based at least in part on a location of a reference beam that is derived from past measurements associated with a plurality of beam patterns for measurement beams, the subset of beams from the plurality of beams for the beam measurement;
  based on the channel condition being a second channel condition, use the cycling selection operation to select the subset of beams from the plurality of beams for the beam measurement, wherein a repetition of different subsets of the measurement beams from the plurality of beams is used in the cycling selection operation, wherein the first channel condition is different from the second channel condition;
  perform the beam measurement on the selected subset of beams;
  generate beam measurement information based on the beam measurement on the selected subset of beams; and
  determine one or more of the plurality of beams to use for a wireless communication based on the beam measurement information.

2. The UE of claim 1, wherein, to use the adaptive selection operation, the processor is configured to: determine the location of the reference beam in a beam codebook based on a prior beam measurement, a channel angle estimation, or prior beam selection results; and select the subset of beams from the plurality of beams for the beam measurement based on the location of the reference beam to include at least the reference beam in the selected subset of beams.

3. The UE of claim 1, wherein, to use the cycling selection operation, the processor is configured to: identify predetermined subsets of the plurality of beams; and select a first of the predetermined subsets of the plurality of beams as the subset of beams for the beam measurement; and for a next beam measurement, select a second of the predetermined subsets of the plurality of beams as the subset of beams for the next beam measurement.

4. The UE of claim 1, wherein the processor is configured to: determine interpolated beam measurement information for other beams in the plurality of beams not in the subset of beams measured in the beam measurement based on: actual beam measurement information from the beam measurement performed on the subset of beams, and values in a table corresponding to the plurality of beams, wherein the generated beam measurement information includes the actual beam measurement information for the subset of beams and the interpolated beam measurement information for the other beams, and wherein the table is generated based on beam radiation parameters measured in a plurality of possible beam directions.

5. The UE of claim 1, wherein the processor is configured to: determine interpolated beam measurement information for other beams in the plurality of beams not in the subset of beams measured in the beam measurement based on values in a table corresponding to the plurality of beams, wherein the values in the table are generated based on historical beam measurements; and update the values in the table over time based on updated beam measurements including the beam measurement.

6. The UE of claim 1, wherein the processor is configured to: determine the one or more of the plurality of beams to use for the wireless communication that are not in the subset of beams measured in the beam measurement based on: the beam measurement information generated on the subset of beams, and correlations between radiation patterns of the subset of beams and the one or more of the plurality of beams.

7. The UE of claim 1, wherein the processor is configured to: identify two beams in the subset of beams measured in the beam measurement with beam measurement values exceeding a threshold; estimate an angle of arrival of a receive beam between the two beams based on the beam measurement information for the two beams and beam properties of the two beams; and select a beam in the plurality of beams, that corresponds to the estimated angle of arrival, to use in the one or more of the plurality of beams for the wireless communication.

8. The UE of claim 1, wherein the processor is further configured to: identify, based on a beam codebook corresponding to the plurality of beams, a set of analog beams in an analog domain to perform the beam measurement; and process the beam measurement in a digital domain using a digital domain signal processing technique including a matched filtering technique or a maximum ratio combining technique.

9. The UE of claim 8, wherein the processor is further configured to: identify a receive beam-space measurement; process the receive beam-space measurement with digital combining vectors; identify a combination of the digital combining vectors and analog combining vectors including a highest signal strength of an analog beam among the set of analog beams; estimate an angle of arrival of a receive beam based on the identified combination; and select a beam in the plurality of beams that corresponds to the estimated angle of arrival to use in the one or more of the plurality of beams for the wireless communication.

10. The UE of claim 8, wherein: the transceiver is configured to simultaneously generate the set of analog beams to include a receive beam for each of a plurality of antenna panels of the UE, and the set of analog beams are generated using a same beam codeword to steer the set of analog beams towards a same angular direction.

11. A method for selecting beams by a user equipment (UE) in a wireless communication system, the method comprising:
determining, by the UE based on a channel condition, whether to use an adaptive selection operation or a cycling selection operation to select a subset of beams from a plurality of beams for a beam measurement;
based on the channel condition being a first channel condition, using the adaptive selection operation to select, based at least in part on a location of a reference beam that is derived from past measurements associated with a plurality of beam patterns for measurement beams, the subset of beams from the plurality of beams for the beam measurement;
based on the channel condition being a second channel condition, using the cycling selection operation to select the subset of beams from the plurality of beams for the beam measurement, wherein a repetition of different subsets of the measurement beams from the plurality of beams is used in the cycling selection operation, wherein the first channel condition is different from the second channel condition, wherein the first channel condition is different from the second channel condition;
performing the beam measurement on the selected subset of beams;
generating beam measurement information based on the beam measurement on the selected subset of beams; and
determining one or more of the plurality of beams to use for a wireless communication based on the beam measurement information.

12. The method of claim 11, wherein using the adaptive selection operation to select the subset of beams comprises: determining the location of the reference beam in a beam codebook based on a prior beam measurement, a channel angle estimation, or prior beam selection results; and selecting the subset of beams from the plurality of beams for the beam measurement based on the location of the reference beam to include at least the reference beam in the selected subset of beams.

13. The method of claim 11, wherein using the cycling selection operation to select the subset of beams comprises: identifying predetermined subsets of the plurality of beams; and selecting a first of the predetermined subsets of the plurality of beams as the subset of beams for the beam measurement; and for a next beam measurement, selecting a second of the predetermined subsets of the plurality of beams as the subset of beams for the next beam measurement.

14. The method of claim 11, wherein generating the beam measurement information comprises: determining interpolated beam measurement information for other beams in the plurality of beams not in the subset of beams measured in the beam measurement based on: actual beam measurement information from the beam measurement performed on the subset of beams, and values in a table corresponding to the plurality of beams, wherein the generated beam measurement information includes the actual beam measurement information for the subset of beams and the interpolated beam measurement information for the other beams, and wherein the table is generated based on beam radiation parameters measured in a plurality of possible beam directions.

15. The method of claim 11, wherein: generating the beam measurement information comprises determining interpolated beam measurement information for other beams in the plurality of beams not in the subset of beams measured in the beam measurement based on values in a table corresponding to the plurality of beams, wherein the values in the table are generated based on historical beam measurements; and the method further comprises updating the values in the table over time based on updated beam measurements including the beam measurement.

16. The method of claim 11, wherein determining the one or more of the plurality of beams to use for the wireless communication comprises: determining the one or more of the plurality of beams to use for the wireless communication that are not in the subset of beams measured in the beam measurement based on: the beam measurement information generated on the subset of beams, and correlations between radiation patterns of the subset of beams and the one or more of the plurality of beams.

17. The method of claim 11, wherein: generating the beam measurement information comprises: identifying two beams in the subset of beams measured in the beam measurement with beam measurement values exceeding a threshold; and estimating an angle of arrival of a receive beam between the two beams based on the beam measurement information for the two beams and beam properties of the two beams; and determining the one or more of the plurality of beams to use for the wireless communication comprises selecting a beam in the plurality of beams, that corresponds to the estimated angle of arrival, to use in the one or more of the plurality of beams for the wireless communication.

18. The method of claim 11, further comprising: identifying, based on a beam codebook corresponding to the plurality of beams, a set of analog beams in an analog domain to perform the beam measurement, wherein generating the beam measurement information comprises processing the beam measurement in a digital domain using a digital domain signal processing technique including a matched filtering technique or a maximum ratio combining technique.

19. The method of claim 18, wherein: generating the beam measurement information comprises: identifying a receive beam-space measurement; processing the receive beam-space measurement with digital combining vectors; identifying a combination of the digital combining vectors and analog combining vectors including a highest signal strength of an analog beam among the set of analog beams; and estimating an angle of arrival of a receive beam based on the identified combination; and determining the one or more of the plurality of beams to use for the wireless communication comprises selecting a beam in the plurality of beams that corresponds to the estimated angle of arrival to use in the one or more of the plurality of beams for the wireless communication.

20. The method of claim 18, wherein: performing the beam measurement comprises generating the set of analog beams to include a receive beam for each of a plurality of antenna panels of the UE, wherein the set of analog beams are generated using a same beam codeword to steer the set of analog beams towards a same angular direction.

* * * * *